(12) United States Patent
Feldman et al.

(10) Patent No.: US 11,921,018 B2
(45) Date of Patent: Mar. 5, 2024

(54) FILTRATION SAMPLING DEVICES

(71) Applicant: HERO SCIENTIFIC LTD., Jerusalem (IL)

(72) Inventors: Zvi Feldman, Sde Zvi (IL); Robert Eric Levitz, Beit Shemesh (IL); Rinat Adi, Holon (IL)

(73) Assignee: HERO SCIENTIFIC LTD., Jerusalem (IL)

( * ) Notice: Subject to any disclaimer, the term of this patent is extended or adjusted under 35 U.S.C. 154(b) by 0 days.

(21) Appl. No.: 18/093,939

(22) Filed: Jan. 6, 2023

(65) Prior Publication Data
US 2023/0160787 A1 May 25, 2023

Related U.S. Application Data

(63) Continuation of application No. PCT/IL2022/050024, filed on Jan. 6, 2022.
(Continued)

(51) Int. Cl.
*G01N 1/22* (2006.01)
*G01N 1/40* (2006.01)
*G01N 1/10* (2006.01)

(52) U.S. Cl.
CPC .......... *G01N 1/2205* (2013.01); *G01N 1/4077* (2013.01); *G01N 2001/1006* (2013.01);
(Continued)

(58) Field of Classification Search
CPC .................. G01N 1/2205; G01N 2001/1012
See application file for complete search history.

(56) References Cited

U.S. PATENT DOCUMENTS

| 1,856,811 A | 5/1932 | Inaki |
| 2,425,945 A | 8/1947 | Leach |

(Continued)

FOREIGN PATENT DOCUMENTS

| CN | 1084045 A | 3/1994 |
| CN | 102325598 A | 1/2012 |

(Continued)

OTHER PUBLICATIONS

Arnold, John C. and Victor Nizet. (2002). 27 Pharyngitis. Clin Infect Dis. 35: 113-125.

(Continued)

*Primary Examiner* — Xiaoyun R Xu
(74) *Attorney, Agent, or Firm* — Sughrue Mion, PLLC

(57) ABSTRACT

A sampling device is provided for concentrating a liquid specimen sample. The sampling device includes a filtration assembly and a filter-collection receptacle disengageably coupled to the filtration assembly. The filtration assembly includes a tubular container and a plunger, which is insertable into the tubular container via a proximal container opening. The filtration assembly is configured such that movement of the plunger within the tubular container, when a liquid specimen sample is contained in the tubular container and a filter is disposed in the tubular container, pushes at least a portion of the liquid specimen sample through the filter. The sampling device is configured such that the filter is advanceable into the filter-collection receptacle while the filter-collection receptacle is disengageably coupled to the filtration assembly. Other embodiments are also described.

41 Claims, 49 Drawing Sheets

Related U.S. Application Data

(60) Provisional application No. 63/134,282, filed on Jan. 6, 2021.

(52) U.S. Cl.
CPC .............. *G01N 2001/1012* (2013.01); *G01N 2001/4088* (2013.01); *Y10T 436/255* (2015.01)

(56) References Cited

U.S. PATENT DOCUMENTS

| | | |
|---|---|---|
| 2,857,908 A | 10/1958 | Cornfield |
| 3,295,686 A | 1/1967 | Kruger |
| 3,449,081 A | 6/1969 | Hughes |
| 3,481,712 A | 12/1969 | Bernstein et al. |
| 3,745,090 A | 7/1973 | Chappelle |
| 3,897,902 A | 8/1975 | Yanez |
| 3,933,592 A | 1/1976 | Clendenning |
| 3,971,703 A | 7/1976 | Picciolo et al. |
| 4,144,134 A | 3/1979 | Plakas |
| 4,303,752 A | 12/1981 | Kolehmainen et al. |
| 4,421,848 A | 12/1983 | Whitlock |
| 4,503,149 A | 3/1985 | Boyd |
| 4,698,311 A | 10/1987 | Hall et al. |
| 4,729,846 A | 3/1988 | Matsui et al. |
| 4,829,005 A | 5/1989 | Friedman et al. |
| 4,863,602 A | 9/1989 | Johnson |
| 4,902,421 A | 2/1990 | Pascale et al. |
| 4,906,565 A | 3/1990 | Vossen |
| 5,024,237 A * | 6/1991 | Guirguis .......... A61B 5/150244 600/573 |
| 5,073,272 A | 12/1991 | O'Neill et al. |
| 5,077,012 A | 12/1991 | Guirguis |
| 5,139,031 A | 8/1992 | Guirguis |
| 5,186,897 A | 2/1993 | Eason et al. |
| 5,238,812 A | 8/1993 | Coulter et al. |
| 5,258,285 A | 11/1993 | Aegidius |
| 5,264,184 A | 11/1993 | Aysta et al. |
| 5,339,829 A | 8/1994 | Thieme et al. |
| 5,376,337 A | 12/1994 | Seymour |
| 5,403,551 A | 4/1995 | Galloway et al. |
| 5,405,527 A | 4/1995 | Covington |
| 5,427,739 A | 6/1995 | Meserol et al. |
| 5,429,742 A | 7/1995 | Gutman et al. |
| 5,576,185 A | 11/1996 | Coulter et al. |
| 5,595,653 A | 1/1997 | Good et al. |
| 5,634,885 A | 6/1997 | Kiro |
| 5,690,825 A | 11/1997 | Parton |
| 5,695,989 A | 12/1997 | Kalamasz |
| 5,736,351 A | 4/1998 | Miller et al. |
| 5,776,341 A | 7/1998 | Barnard et al. |
| 5,830,359 A | 11/1998 | Knight et al. |
| 5,868,928 A | 2/1999 | Bradley |
| 5,888,729 A | 3/1999 | Kacian et al. |
| 5,891,702 A | 4/1999 | Sakakibara et al. |
| 5,897,492 A | 4/1999 | Feller et al. |
| 5,905,029 A | 5/1999 | Andreotti et al. |
| 5,908,751 A | 6/1999 | Higo et al. |
| 5,980,456 A | 11/1999 | Falcone |
| 6,004,766 A | 12/1999 | Atrache et al. |
| 6,015,681 A | 1/2000 | Ralls et al. |
| 6,045,913 A | 4/2000 | Castle |
| 6,090,572 A | 7/2000 | Crosby |
| 6,140,040 A | 10/2000 | Palm et al. |
| 6,152,887 A | 11/2000 | Blume |
| 6,174,704 B1 | 1/2001 | Chu et al. |
| 6,197,598 B1 | 3/2001 | Schrier et al. |
| 6,200,767 B1 | 3/2001 | Sakakibara et al. |
| 6,207,445 B1 | 3/2001 | Crosby |
| 6,221,655 B1 | 4/2001 | Fung et al. |
| 6,251,660 B1 | 6/2001 | Muir et al. |
| 6,265,229 B1 | 7/2001 | Fodstad et al. |
| 6,451,260 B1 | 9/2002 | Dusterhoft et al. |
| 6,465,201 B1 | 10/2002 | Presente et al. |
| 6,531,578 B1 | 3/2003 | Webber et al. |
| 6,565,749 B1 | 5/2003 | Hou et al. |
| 6,576,460 B1 | 6/2003 | Baeumner et al. |
| 6,588,681 B2 | 7/2003 | Rothrum et al. |
| 6,641,543 B1 | 11/2003 | Osgoodby |
| 6,660,489 B2 | 12/2003 | Schrecengost et al. |
| 6,677,129 B1 | 1/2004 | Blume |
| 6,767,714 B2 | 7/2004 | Nazareth et al. |
| 6,811,971 B2 | 11/2004 | Klepp et al. |
| 6,824,560 B2 | 11/2004 | Pelton |
| 6,846,648 B2 | 1/2005 | Maes |
| 6,861,067 B2 | 3/2005 | McGhee et al. |
| 6,911,148 B1 | 6/2005 | Demmer et al. |
| 6,967,261 B1 | 11/2005 | Soerens et al. |
| 6,991,898 B2 | 1/2006 | O'Connor |
| 7,005,143 B2 | 2/2006 | Abuelyaman et al. |
| 7,045,913 B2 | 5/2006 | Ebrahim et al. |
| 7,052,831 B2 | 5/2006 | Fletcher et al. |
| 7,060,223 B2 | 6/2006 | Dicesare et al. |
| 7,083,911 B2 | 8/2006 | Wood et al. |
| 7,141,033 B2 | 11/2006 | Kanjilal et al. |
| 7,160,689 B2 | 1/2007 | Matsumoto et al. |
| 7,282,181 B2 | 10/2007 | Hudak et al. |
| 7,338,692 B2 | 3/2008 | Smith et al. |
| 7,422,868 B2 | 9/2008 | Fan et al. |
| 7,485,609 B2 | 2/2009 | Reddy et al. |
| 7,553,417 B2 | 6/2009 | Waller, Jr. et al. |
| 7,618,591 B2 | 11/2009 | Slowey et al. |
| 7,642,060 B2 | 1/2010 | Nagar et al. |
| 7,682,688 B2 | 3/2010 | Smith |
| 7,682,835 B2 | 3/2010 | Giordano |
| 7,824,732 B2 | 11/2010 | Sahouani et al. |
| 7,837,939 B2 | 11/2010 | Tung et al. |
| 7,927,548 B2 | 4/2011 | Slowey et al. |
| 7,935,161 B1 | 5/2011 | Adams et al. |
| 7,993,283 B1 | 8/2011 | Altschul |
| 8,030,088 B2 | 10/2011 | McCash et al. |
| 8,039,206 B1 | 10/2011 | Keenan |
| 8,057,608 B1 | 11/2011 | Saaski et al. |
| 8,069,690 B2 | 12/2011 | Desantolo et al. |
| 8,110,112 B2 | 2/2012 | Alburty et al. |
| 8,142,570 B1 | 3/2012 | Saaski et al. |
| 8,268,634 B2 | 9/2012 | Wu et al. |
| 8,272,255 B2 | 9/2012 | Halverson et al. |
| 8,278,091 B2 | 10/2012 | Rutter et al. |
| 8,281,937 B2 | 10/2012 | Collins et al. |
| 8,287,809 B2 | 10/2012 | Gould et al. |
| 8,322,539 B1 | 12/2012 | Ellis et al. |
| 8,343,726 B2 | 1/2013 | Boone et al. |
| 8,404,479 B2 | 3/2013 | Shimizu et al. |
| 8,475,739 B2 | 7/2013 | Holmes et al. |
| 8,541,242 B2 | 9/2013 | Boone et al. |
| 8,546,100 B2 | 10/2013 | Kshirsagar et al. |
| 8,562,572 B2 | 10/2013 | Proulx et al. |
| 8,563,264 B2 | 10/2013 | Halverson et al. |
| 8,569,072 B2 | 10/2013 | Halverson et al. |
| 8,584,535 B2 | 11/2013 | Page et al. |
| 8,597,878 B2 | 12/2013 | Hillebrand et al. |
| 8,603,008 B2 | 12/2013 | Libby et al. |
| 8,640,882 B2 | 2/2014 | Collins et al. |
| 8,647,508 B2 | 2/2014 | Halverson |
| 8,647,574 B2 | 2/2014 | Halverson et al. |
| 8,647,890 B2 | 2/2014 | Aberl et al. |
| 8,664,001 B2 | 3/2014 | Niskanen et al. |
| 8,685,746 B2 | 4/2014 | Halverson et al. |
| 8,709,796 B2 | 4/2014 | Faure et al. |
| 8,726,744 B2 | 5/2014 | Alburty et al. |
| 8,741,595 B2 | 6/2014 | Kshirsagar |
| 8,871,155 B2 | 10/2014 | Wu et al. |
| 8,898,069 B2 | 11/2014 | Hood et al. |
| 8,900,462 B2 | 12/2014 | Yamada et al. |
| 8,940,527 B2 | 1/2015 | Guirguis |
| 9,044,694 B2 | 6/2015 | Hacker et al. |
| 9,103,843 B2 | 8/2015 | Nieuwenhuis et al. |
| 9,113,850 B2 | 8/2015 | Skakoon |
| 9,115,382 B2 | 8/2015 | Bell |
| 9,295,453 B2 | 3/2016 | Katz |
| 9,297,804 B2 | 3/2016 | Palmon et al. |
| 9,314,570 B2 | 4/2016 | Kim |
| 9,327,284 B2 | 5/2016 | Rosman et al. |

(56) References Cited

U.S. PATENT DOCUMENTS

| | | |
|---|---|---|
| 9,328,325 B2 | 5/2016 | Kshirsagar et al. |
| 9,360,404 B2 | 6/2016 | Okanojo et al. |
| 9,381,000 B2 | 7/2016 | Morsey |
| 9,388,448 B2 | 7/2016 | Halverson |
| 9,470,612 B2 | 10/2016 | Rajagopal et al. |
| 9,482,351 B2 | 11/2016 | Proulx et al. |
| 9,546,391 B2 | 1/2017 | Rey et al. |
| 9,592,508 B2 | 3/2017 | Holmes et al. |
| 9,675,755 B2 | 6/2017 | Shick et al. |
| 9,709,468 B2 | 7/2017 | Ebi et al. |
| 9,719,125 B2 | 8/2017 | Kshirsagar et al. |
| 9,945,855 B2 | 4/2018 | Carrino et al. |
| 9,987,633 B2 | 6/2018 | Roscoe et al. |
| 10,106,830 B2 | 10/2018 | Maitra et al. |
| 10,376,878 B2 | 8/2019 | Calanca et al. |
| 10,612,258 B2 | 4/2020 | Coelho et al. |
| 10,993,705 B2 | 5/2021 | Katz et al. |
| 2002/0127630 A1 | 9/2002 | Diguiseppi et al. |
| 2003/0003441 A1 | 1/2003 | Colston et al. |
| 2003/0057147 A1 | 3/2003 | Sutcliffe |
| 2003/0064526 A1 | 4/2003 | Niedbala et al. |
| 2003/0092086 A1 | 5/2003 | Hirata et al. |
| 2003/0098271 A1 | 5/2003 | Somack et al. |
| 2003/0104507 A1 | 6/2003 | Wood et al. |
| 2003/0153021 A1 | 8/2003 | Lu et al. |
| 2004/0005246 A1 | 1/2004 | Efthimiadis et al. |
| 2004/0038425 A1 | 2/2004 | Ferguson et al. |
| 2004/0149636 A1 | 8/2004 | Backes |
| 2004/0157971 A1 | 8/2004 | Kim |
| 2004/0161788 A1 | 8/2004 | Chen et al. |
| 2004/0197845 A1 | 10/2004 | Hassibi et al. |
| 2004/0220498 A1 | 11/2004 | Li et al. |
| 2005/0048592 A1 | 3/2005 | Wood et al. |
| 2005/0070701 A1 | 3/2005 | Hochstetler et al. |
| 2005/0142571 A1 | 6/2005 | Parthasarathy et al. |
| 2005/0152992 A1 | 7/2005 | Johnson, Jr. et al. |
| 2005/0153423 A1 | 7/2005 | Baba et al. |
| 2005/0181467 A1 | 8/2005 | Schrecengost et al. |
| 2005/0181521 A1 | 8/2005 | Niskanen et al. |
| 2005/0189290 A1 | 9/2005 | Maiden |
| 2005/0244943 A1 | 11/2005 | Ladisch et al. |
| 2005/0250138 A1 | 11/2005 | Young et al. |
| 2006/0062854 A1 | 3/2006 | Chandra et al. |
| 2006/0166347 A1 | 7/2006 | Faulstich et al. |
| 2006/0184085 A1 | 8/2006 | Kimura et al. |
| 2006/0273049 A1 | 12/2006 | Leach et al. |
| 2007/0062870 A1 | 3/2007 | Chen et al. |
| 2007/0148458 A1 | 6/2007 | Sahouani et al. |
| 2007/0212266 A1 | 9/2007 | Johnston et al. |
| 2007/0254320 A1 | 11/2007 | Olstein |
| 2007/0269341 A1 | 11/2007 | Halverson et al. |
| 2008/0023408 A1 | 1/2008 | Hansen |
| 2008/0064939 A1 | 3/2008 | Reynolds et al. |
| 2008/0078717 A1 | 4/2008 | Shigesada et al. |
| 2008/0153125 A1 | 6/2008 | Buttry et al. |
| 2008/0207794 A1 | 8/2008 | Wright et al. |
| 2009/0011403 A1 | 1/2009 | Smith et al. |
| 2009/0068065 A1 | 3/2009 | Pagoria et al. |
| 2009/0238725 A1 | 9/2009 | Ellis et al. |
| 2009/0258411 A1 | 10/2009 | Petithory et al. |
| 2009/0281483 A1 | 11/2009 | Baker et al. |
| 2010/0190171 A1 | 7/2010 | Kshirsagar et al. |
| 2010/0209927 A1 | 8/2010 | Menon et al. |
| 2010/0209961 A1 | 8/2010 | Kshirsagar et al. |
| 2010/0248214 A1 | 9/2010 | Kshirsagar et al. |
| 2010/0248350 A1 | 9/2010 | Gazenko |
| 2010/0273177 A1 | 10/2010 | Piasio et al. |
| 2011/0315625 A1 | 12/2011 | Keenan et al. |
| 2011/0318814 A1 | 12/2011 | Kshirsagar et al. |
| 2012/0107799 A1 | 5/2012 | Daum |
| 2012/0156114 A1 | 6/2012 | Ziegman et al. |
| 2012/0203167 A1 | 8/2012 | Johnson |
| 2012/0301907 A1 | 11/2012 | Sellappan et al. |
| 2013/0023443 A1 | 1/2013 | Shirai et al. |
| 2013/0059290 A1 | 3/2013 | Armes |
| 2013/0244225 A1 | 9/2013 | Kshirsagar et al. |
| 2013/0260370 A1 | 10/2013 | Kshirsagar et al. |
| 2014/0110356 A1 | 4/2014 | McKay |
| 2014/0315221 A1 | 10/2014 | Morsey |
| 2015/0010918 A1 | 1/2015 | Ruvinsky |
| 2015/0031040 A1 | 1/2015 | Calanca et al. |
| 2015/0076069 A1 | 3/2015 | Ellis et al. |
| 2015/0093749 A1 | 4/2015 | Ling |
| 2015/0133574 A1 | 5/2015 | Kshirsagar et al. |
| 2016/0209305 A1 | 7/2016 | Kshirsagar et al. |
| 2016/0296927 A1 | 10/2016 | Kirschhoffer et al. |
| 2016/0341641 A1 | 11/2016 | Williams et al. |
| 2017/0043336 A1 | 2/2017 | Khattak et al. |
| 2017/0248503 A1 | 8/2017 | Kshirsagar et al. |
| 2017/0283792 A1 | 10/2017 | Benitez Porras et al. |
| 2018/0051313 A1 | 2/2018 | Rajagopal et al. |
| 2018/0339292 A1 | 11/2018 | Katz et al. |
| 2019/0383807 A1 | 12/2019 | Connelly et al. |
| 2020/0140251 A1 | 5/2020 | Katz et al. |
| 2020/0209235 A1 | 7/2020 | Guckenberger |
| 2021/0102876 A1 | 4/2021 | Fruchter et al. |
| 2022/0288583 A1 | 9/2022 | Katz et al. |
| 2022/0291213 A1 | 9/2022 | Guckenberger |

FOREIGN PATENT DOCUMENTS

| | | |
|---|---|---|
| CN | 206910919 U | 1/2018 |
| CN | 109567967 A | 4/2019 |
| EP | 0 325 910 A1 | 8/1989 |
| EP | 0364173 A1 | 4/1990 |
| EP | 0378353 A2 | 7/1990 |
| EP | 0 520 408 A2 | 12/1992 |
| EP | 0 952 209 A2 | 10/1999 |
| EP | 1089800 B1 | 11/2003 |
| EP | 1166078 B1 | 9/2004 |
| EP | 1674867 B1 | 7/2009 |
| EP | 2214830 B1 | 9/2012 |
| EP | 2214829 B1 | 12/2012 |
| EP | 2217378 B1 | 2/2013 |
| EP | 2217377 B1 | 9/2013 |
| EP | 1907527 B1 | 2/2016 |
| EP | 3290920 A1 | 3/2018 |
| EP | 2868742 B1 | 8/2018 |
| GB | 2 411 668 B | 7/2008 |
| JP | 5-203649 A | 8/1993 |
| JP | 2002-153297 A | 5/2002 |
| JP | 2003-38162 A | 2/2003 |
| JP | 2003-215126 A | 7/2003 |
| JP | 2004-279113 A | 10/2004 |
| JP | 2005-257604 A | 9/2005 |
| JP | 2006-167411 A | 6/2006 |
| JP | 2013-107 A | 1/2013 |
| JP | 6931839 B1 | 9/2021 |
| WO | 89/09279 A1 | 10/1989 |
| WO | 93/01271 A1 | 1/1993 |
| WO | 96/04067 A1 | 2/1996 |
| WO | 00/21973 A1 | 4/2000 |
| WO | 00/29112 A1 | 5/2000 |
| WO | 01/14257 A1 | 3/2001 |
| WO | 03/069301 A2 | 8/2003 |
| WO | 2004/015413 A1 | 2/2004 |
| WO | 2006/100452 A1 | 9/2006 |
| WO | 2007/050072 A1 | 5/2007 |
| WO | 2007/137257 A2 | 11/2007 |
| WO | 2008/075044 A2 | 6/2008 |
| WO | 2008/093329 A2 | 8/2008 |
| WO | 2009/018544 A1 | 2/2009 |
| WO | 2009/048743 A1 | 4/2009 |
| WO | 2009/067498 A1 | 5/2009 |
| WO | 2009/067503 A1 | 5/2009 |
| WO | 2009/067513 A1 | 5/2009 |
| WO | 2009/067518 A1 | 5/2009 |
| WO | 2009/082667 A1 | 7/2009 |
| WO | 2010/056128 A1 | 5/2010 |
| WO | 2012/031156 A1 | 3/2012 |
| WO | 2013/013253 A1 | 1/2013 |
| WO | 2013/082301 A1 | 6/2013 |
| WO | 2014/048263 A1 | 4/2014 |
| WO | 2014/145810 A2 | 9/2014 |

(56) References Cited

FOREIGN PATENT DOCUMENTS

| WO | 2017/112911 A1 | 6/2017 |
| WO | 2018/102783 A1 | 6/2018 |
| WO | 2018/158768 A1 | 9/2018 |
| WO | 2019/060950 A1 | 4/2019 |
| WO | 2019/139901 A1 | 7/2019 |
| WO | 2020/049566 A1 | 3/2020 |
| WO | 2020/049569 A2 | 3/2020 |
| WO | 2021/044417 A1 | 3/2021 |
| WO | 2021/181338 A1 | 9/2021 |
| WO | 2021/181339 A1 | 9/2021 |
| WO | 2021/224925 A1 | 11/2021 |
| WO | 2021/229564 A1 | 11/2021 |
| WO | 2022/044002 A1 | 3/2022 |

OTHER PUBLICATIONS

Bernheimer, A. W. and Pappenheimer A. M. Jr., "Factors necessary for massive growth of Group A hemolytic *Streptococcus*". Journal of Bacteriology, vol. 43(4), pp. 481-494 (1941).

Decelle JG & Taylor GR. (1976). Autoflora in the Upper Respiratory Tract of Apollo Astronauts. Applied and Environmental Microbiology. 32(5): 659-665.

Edwards E.A. et al., "Diagnosis of Group A Streptococcal Infections Directly from Throat Secretions," Journal of Clinical Microbiology Mar. 1982, p. 481-483 (1982).

Covalciuc KA et al., "Comparison of Four Clinical Specimen Types for Detection of Influenza A and B Viruses by Optical Immunoassay (FLU OIA Test) and Cell Culture Methods," Journal of Clinical Microbiology, Dec. 1999, p. 3971-3974.

Bisno, Alan L., Michael A. Gerber, Jack M. Gwaltney Jr., Edward L. Kaplan, and Richard H. Schwartz. (2002). Practice Guidelines for the Diagnosis and Management of Group A Streptococcal Pharyngitis. Clinical Infectious Diseases. 35: 113-125.

Fox, James W et al., "Diagnosis of Streptococcal Pharyngitis by Detection of *Streptococcus pyogenes* in Posterior Pharyngeal versus Oral Cavity Specimens," Journal of Clinical Microbiology, Jul. 2006. p. 2593-2594.

Gao Y et al., "The Scl1 of M41-type group A *Streptococcus* binds the highdensity lipoprotein," FEMS Microbiol Lett. Aug. 1, 2010; 309(1): 55-61.

Garbieri et al., "Human DNA extraction from whole saliva that was fresh or stored for 3, 6 or 12 months using five different protocols," J. Appl. Oral Sci. vol. 25 No. 2 Bauru Mar./Apr. 2017.

Hamburger, Morton Jr. (1944). Studies on the Transmission of Hemolytic *Streptococcus* Infections: II. Beta Hemolytic Streptococci in the Saliva of Persons with Positive Throat Cultures. The Journal of Infectious Diseases. 75(1): 71-78. https://www.jstor.org/stable/30089409.

Johnston DA & Bodey GP. (1970). Semiquantitative Oropharyngeal Culture Technique. Applied Microbiology. 20(2): 218-223.

Jordens JZ, et al. (2002). Detection of Meningococcal Carriage by Culture and PCR of Throat Swabs and Mouth Gargles. J Clin Microbiol. 40(1): 75-79.

Kaplan, Edward L., Robert Couser, Barbara Ballard Huwe, Carolyn Mckay, and Lewis W. Wannamaker. (1979). Significance of Quantitative Salivary Cultures for Group A and Non-group A Beta-Hemolytic Streptococci in Patients with Pharyngitis and in Their Family Contacts. Pediatrics. 64(6): 904-912.

Karaby O et al., "Efficacy of Throat Gargling for Detection of Group A Beta-Hemolytic *Streptococcus*," Jpn. J. Infect. Dis. 58, 39-40, 2005.

Mckesson Strep_A_5003_insert_2015_12.

Spellerberg, Barbara and Claudia Brandt. (2016). Laboratory Diagnosis of *Streptococcus pyogenes* (group A streptococci). In Ferretti JJ, Stevens DL, Fischetti VA (Ed). *Streptococcus pyogenes*: Basic Biology to Clinical Manifestations [Internet]. Oklahoma City (OK): University of Oklahoma Health Sciences Center. 2016.

Thermo Scientific Titan3 and Target2 Syringe Filters Product Catalog 2016.

Yilmaz F et al. (Abstract) 2008, "Effectiveness of rapid antigen test with throat gargle in detecting group A beta-hemolytic streptococci," Kulak Burun Bogaz Ihtis Derg. Sep.-Oct. 2008;18(5):280-3.

Yilmaz, Fahrettin, et al.(2008). Boğaz gargaras ile yapilan hizli antijen testinin grup A beta-hemolitik streptokoklar saptamadaki etkinlii. Kulak Burun Bogaz Ihtis Derg. 18(5): 280-283. KLiNiK Çalişma. Turkish.

Yilmaz, Fahrettin, et al. (2008). Effectiveness of rapid antigen test with throat gargle in detecting group A beta-hemolytic streptococci. Journal of Ear Nose and Throat. 18(5): 280-283. Clinical Study. Google Translation.

An International Search Report and a Written Opinion both dated Jun. 29, 2020, which issued during the prosecution of Applicant's PCT/IL2019/050997.

An International Search Report and a Written Opinion both dated Dec. 31, 2019, which issued during the prosecution of Applicant's PCT/IL2019/050994.

An International Search Report and a Written Opinion both dated Aug. 23, 2018, which issued during the prosecution of Applicant's PCT/IL2018/050225.

An Invitation to pay additional fees dated Mar. 3, 2020, which issued during the prosecution of Applicant's PCT/IL2019/050997.

An Office Action dated Jul. 21, 2017, which issued during the prosecution of UK Patent Application No. 1703383.8.

An Invitation to pay additional fees dated Jun. 12, 2018, which issued during the prosecution of Applicant's PCT/IL2018/050225.

"DNA extraction from water: 50-50-50 buffer-chloroform/phenol method", Laboratory for Environmental Pathogens Research, Department of Environmental Sciences, University of Toledo, Oct. 1, 2004, pp. 1-5.

International Search Report and Written Opinion dated Dec. 3, 2020, in International Application No. PCT/IL2020/050957.

Invitation to Pay Additional Fees issued May 25, 2022 in International Application No. PCT/IL2022/050024.

ISR and Written Opinion in PCT/IL2021/051035, dated Jan. 10, 2022.

Karabay et al., "Efficacy of Throat Gargling for Detection of Group A Beta-Hemolytic *Streptococcus*", Jpn. J. Infect. Dis., 2005, vol. 58, pp. 39-40.

Notice of Allowance issued in the counterpart Chinese Application CN 201880028401.4 dated Oct. 25, 2022.

Office Action dated Jul. 15, 2022 in U.S. Appl. No. 17/122,594.

Office Action dated Jul. 8, 2022 in European Application No. 19769600.8.

Official Action dated Oct. 15, 2021 in Chinese Appl. No. CN 201880028401.4.

"Oil filter", Wikipedia, Accessed via the Internet: https://en.wikipedia.org/w/index.php?title=Oil_filter&oldid=978674262 Nov. 24, 2020 (5 pages total).

Translation of Office Action dated Apr. 15, 2022 in Chinese Application No. 201880028401.4.

Written Opinion of the International Searching Authority dated Jul. 21, 2022 in International Application No. PCT/IL2022/050024.

International Search Report dated Jun. 22, 2021 in International Application No. PCT/IB2021/052055.

Written Opinion of the International Searching Authority dated Jun. 22, 2021 in International Application No. PCT/IB2021/052055.

International Search Report dated Jun. 22, 2021 in International Application No. PCT/IB2021/052056.

Written Opinion of the International Searching Authority dated Jun. 22, 2021 in International Application. No. PCT/IB2021/052056.

Ek et al., "A combination of naso- and oropharyngeal swabs improves the diagnostic yield of respiratory viruses in adult emergency department patients", Infectious Diseases, 2019, vol. 51, No. 4, pp. 241-248.

Kim et al., "Comparison of Nasopharyngeal and Oropharyngeal Swabs for the Diagnosis of Eight Respiratory Viruses by Real-Time Reverse Transcription-PCR Assays", PLoS One, Jun. 2011, vol. 6, Issue 6, e21610, pp. 1-6.

Dou et al., "A low-cost microfluidic platform for rapid and instrument-free detection of whooping cough", Analytica Chimica Acta, 2019, vol. 1065, pp. 71-78.

(56) References Cited

OTHER PUBLICATIONS

Duverlie et al., "A nylon membrane enzyme immunoassay for rapid diagnosis of influenza A infection", Journal of Virological Methods, 1992, vol. 40, pp. 77-84.
Black et al., "Reverse transcriptase-polymerase chain reaction for the detection of equine rhinitis B viruses and cell culture isolation of the virus", Arch Virol, 2007, vol. 152, pp. 137-149.
International Search Report and Written Opinion dated Aug. 4, 2021 in International Application No. PCT/IL2021/050519.
Non-Final Office Action dated Mar. 25, 2021 in U.S. Appl. No. 16/489,853.
Final Office Action dated Aug. 24, 2021 in U.S. Appl. No. 16/489,853.
Non-Final Office Action dated Apr. 1, 2022 in U.S. Appl. No. 16/489,853.
Notice of Allowance including Examiner's Interview Summary dated Nov. 15, 2022 in U.S. Appl. No. 16/489,853.
Medline Group A Strep Test Instructions for Use, 2020 (2 pages total).
Strep A Test Instructions for Use—ezleveltests, 2022, Accessed via the Internet: https://ezleveltests.com/pages/strep-a-test-instructions-for-use (6 pages total).
An International Search Report (ISR) and Written Opinion in PCT/IL2023/050014, dated Jul. 26, 2023.
A Non-Final Office Action in U.S. Appl. No. 18/079,222, dated Aug. 1, 2023.
Requirement for Election/Restrictions dated Feb. 22, 2023 issued in U.S. Appl. No. 17/270,544.
Yilmaz, Fahrettin, et al.(2008). Boaz gargaras ile yaplan hizli antijen testinin grup A beta-hemolitik streptokoklari saptamadaki etkinliği. Kulak Burun Bogaz Ihtis Derg. 18(5): 280-283. KLiNiK Çalişma. Turkish.
Strep A Test Instructions for Use—ezleveltests, 2002, Accessed via the Internet: https://ezleveltests.com/pages/strep-a-test-instructions-for-use (6 pages total).
Office Action dated Apr. 28, 2023 issued in U.S. Appl. No. 18/079,222.
Office Action dated May 12, 2023 issued in U.S. Appl. No. 18/093,942.
An Invitation to Pay Additional Fees issued in PCT/IL2023/050728, dated Oct. 26, 2023.

* cited by examiner

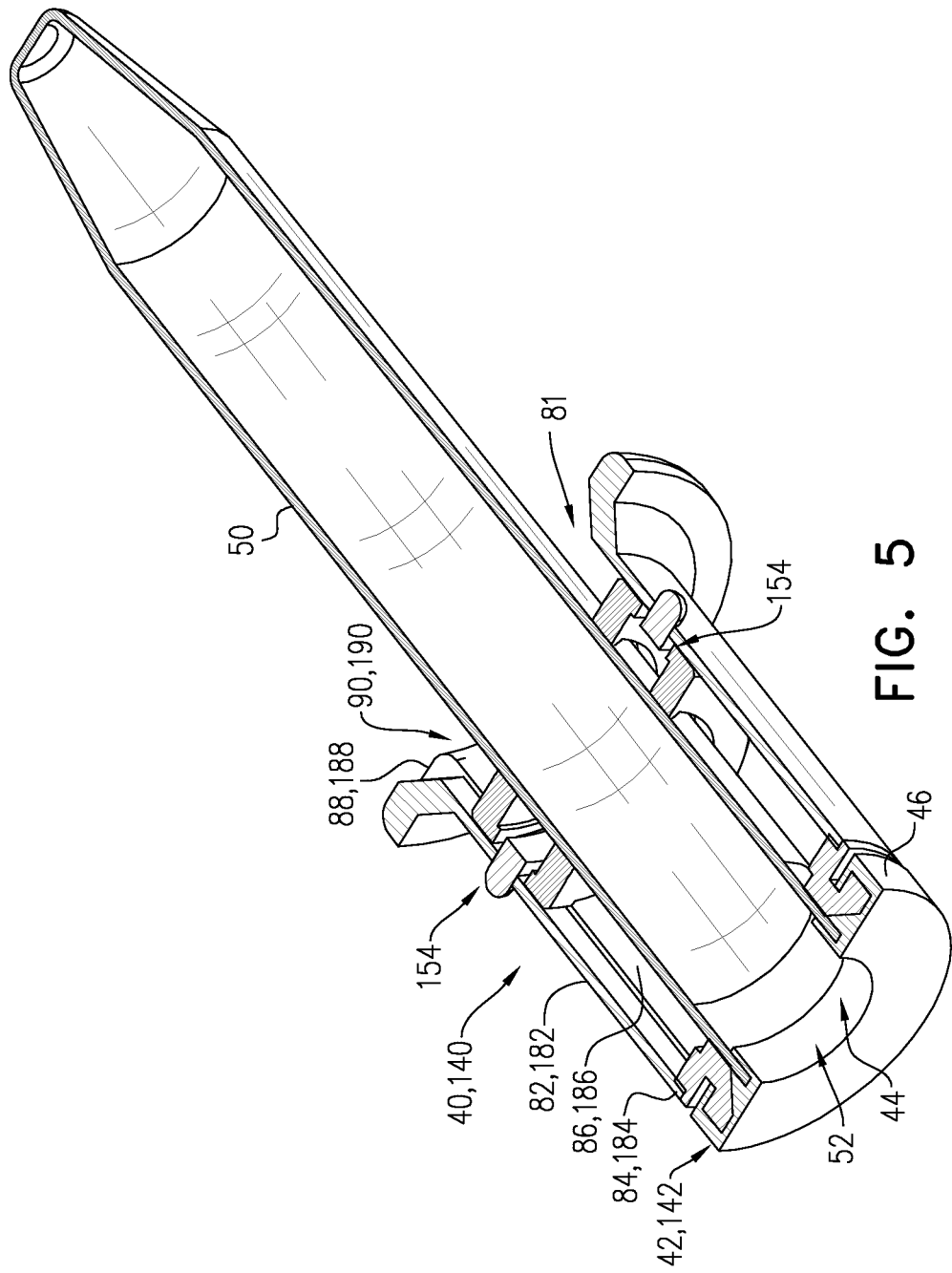

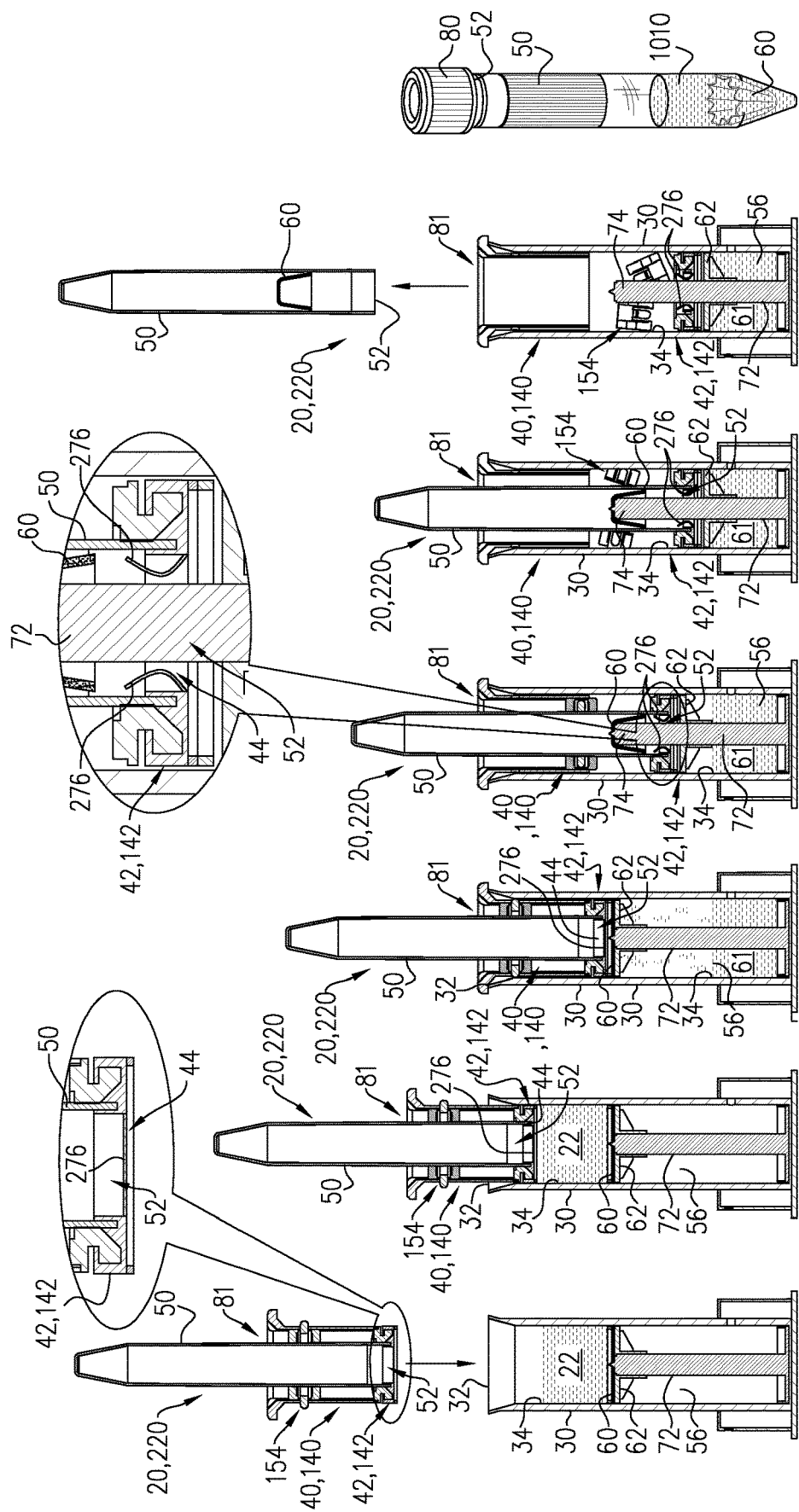

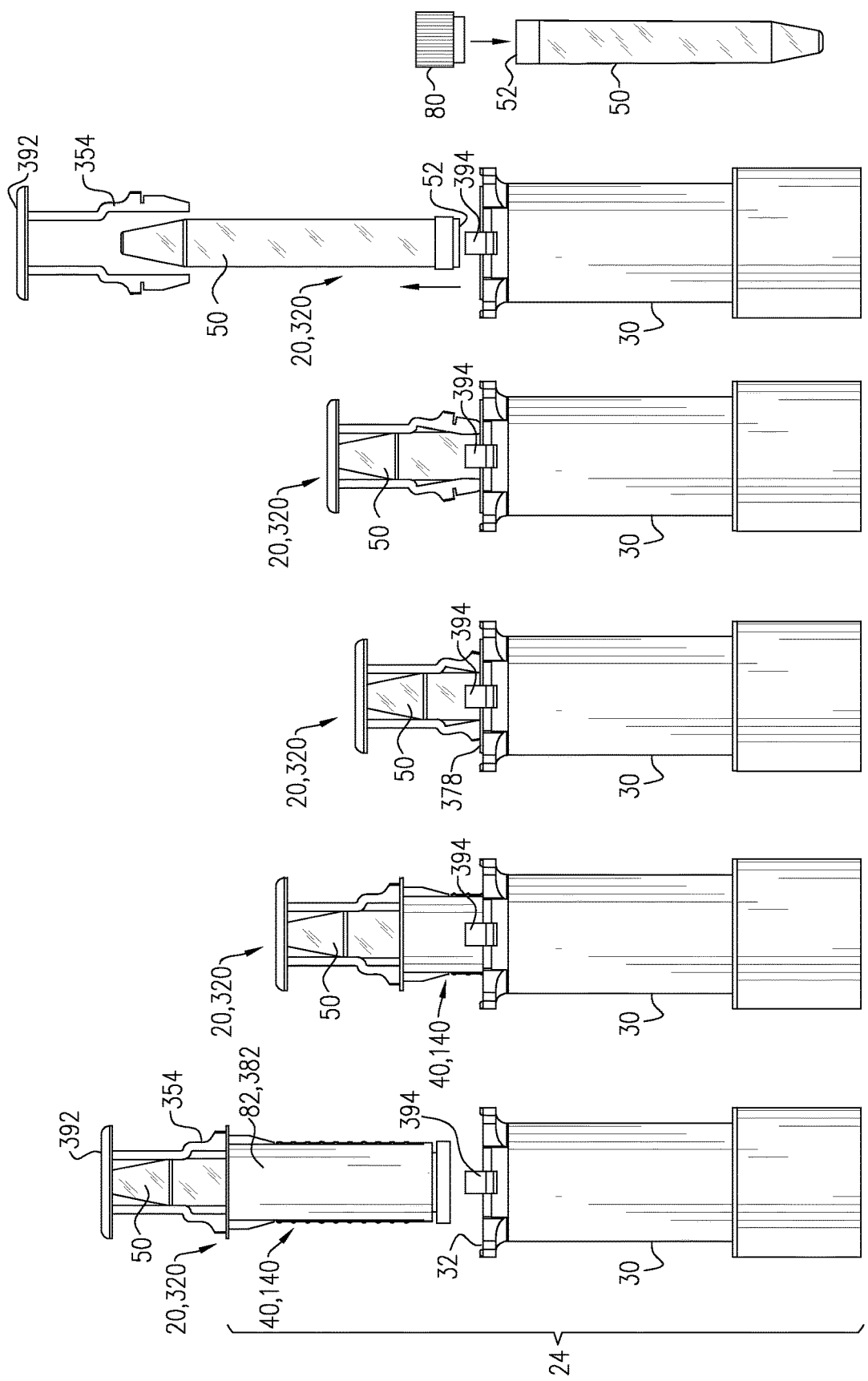

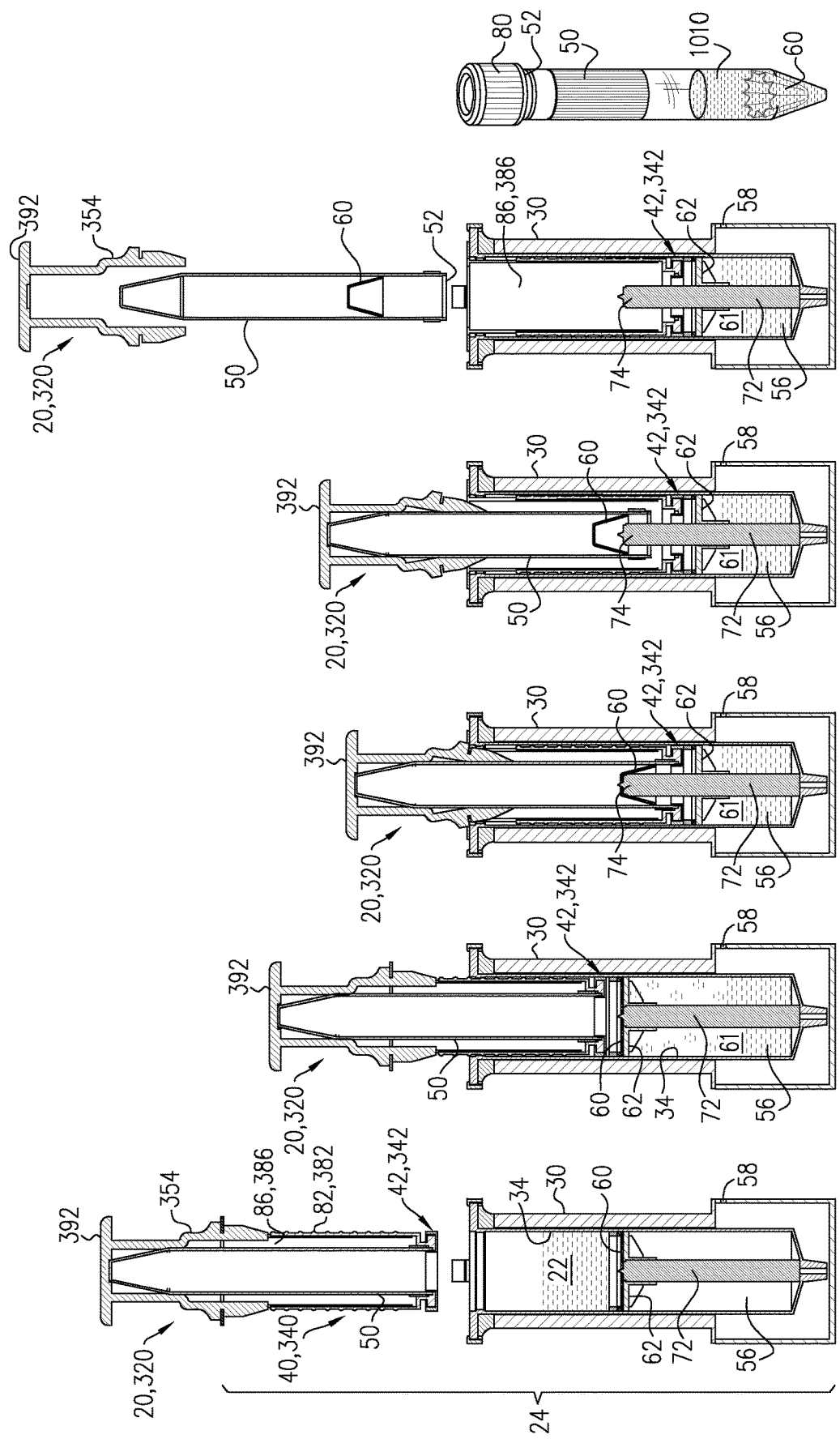

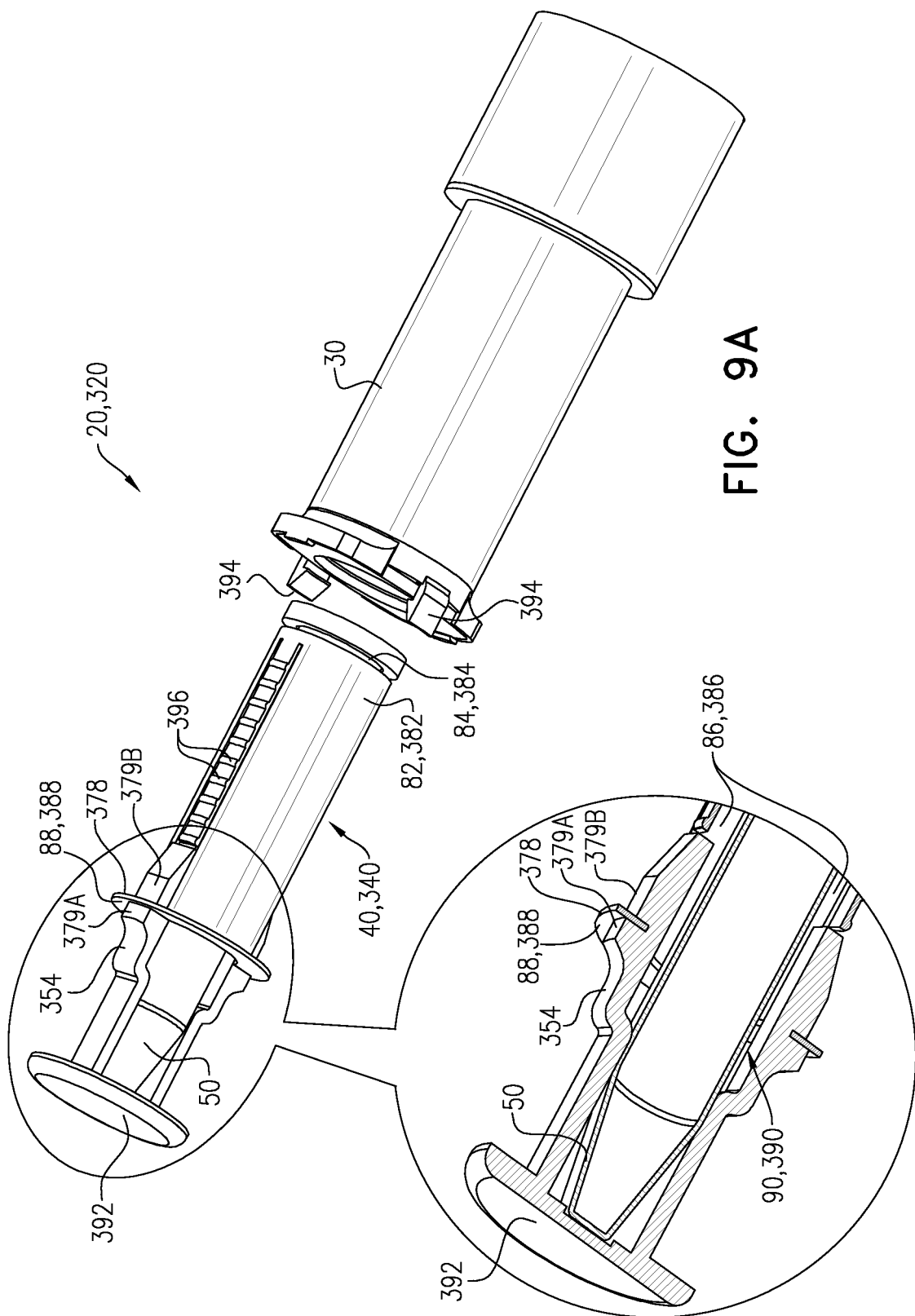

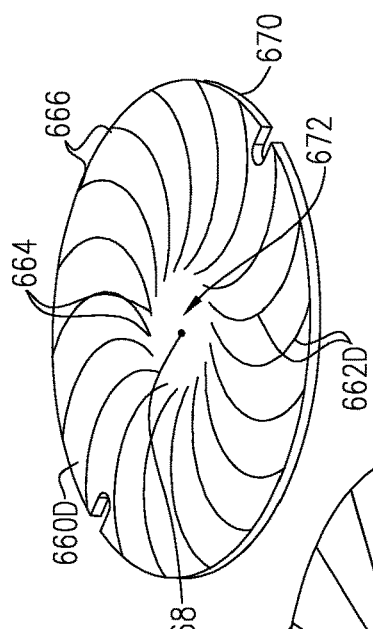
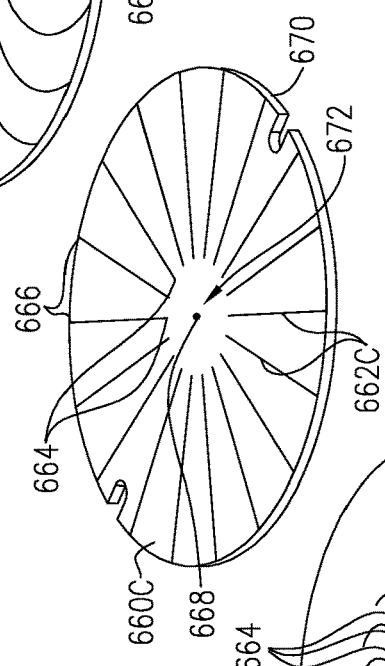
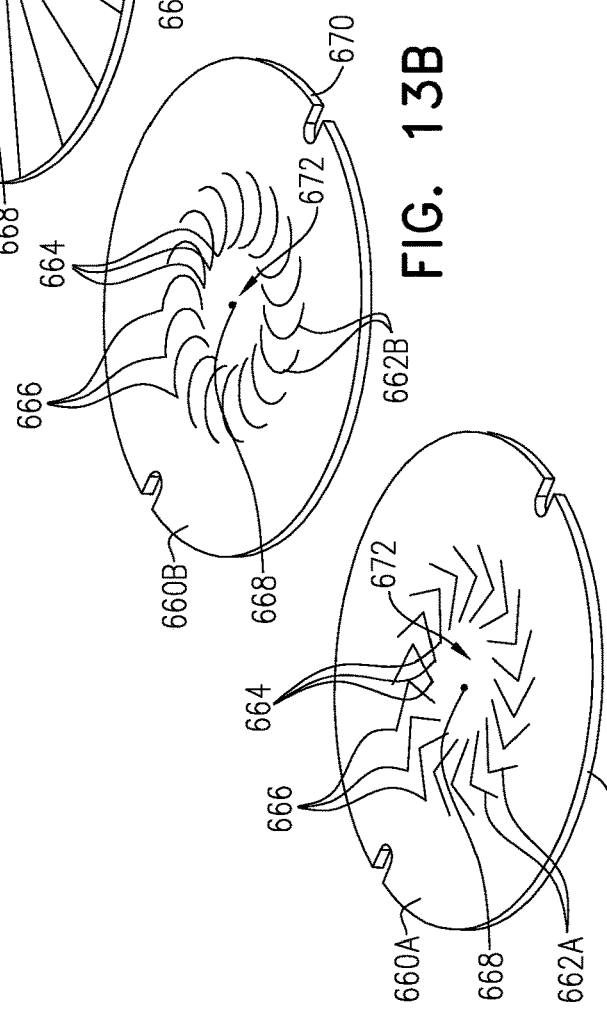
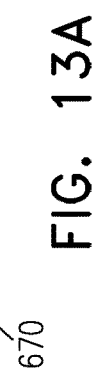

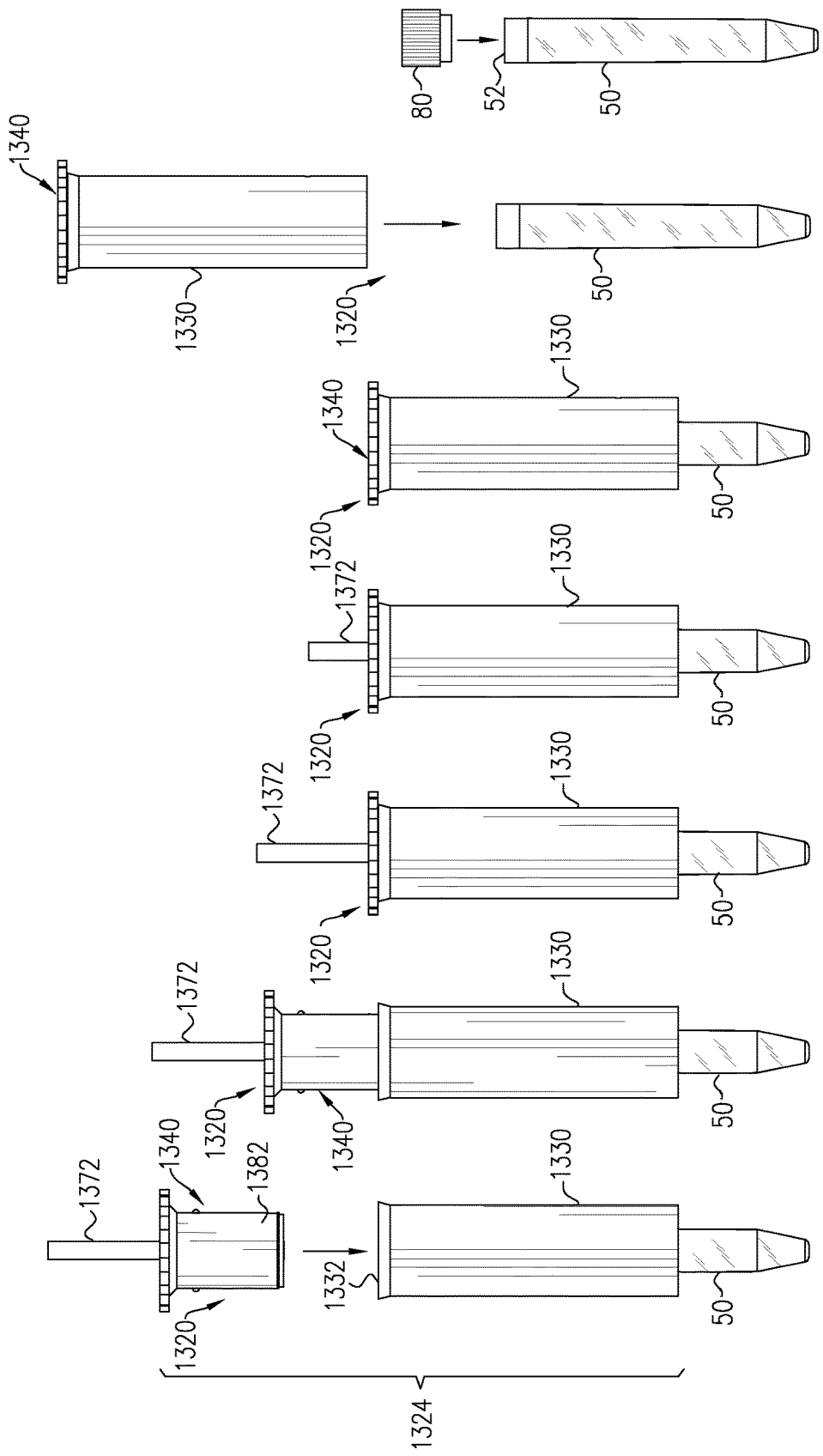

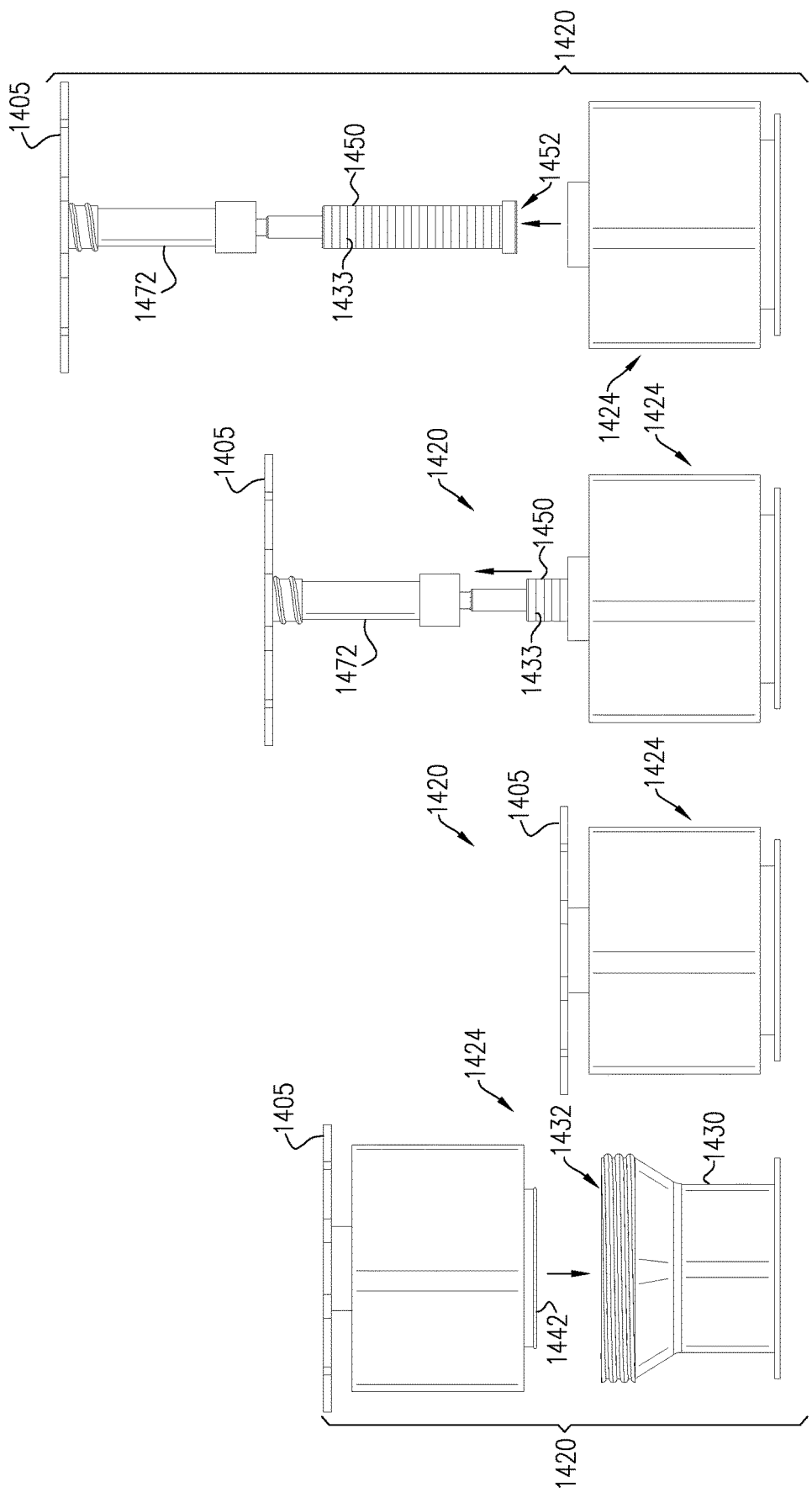

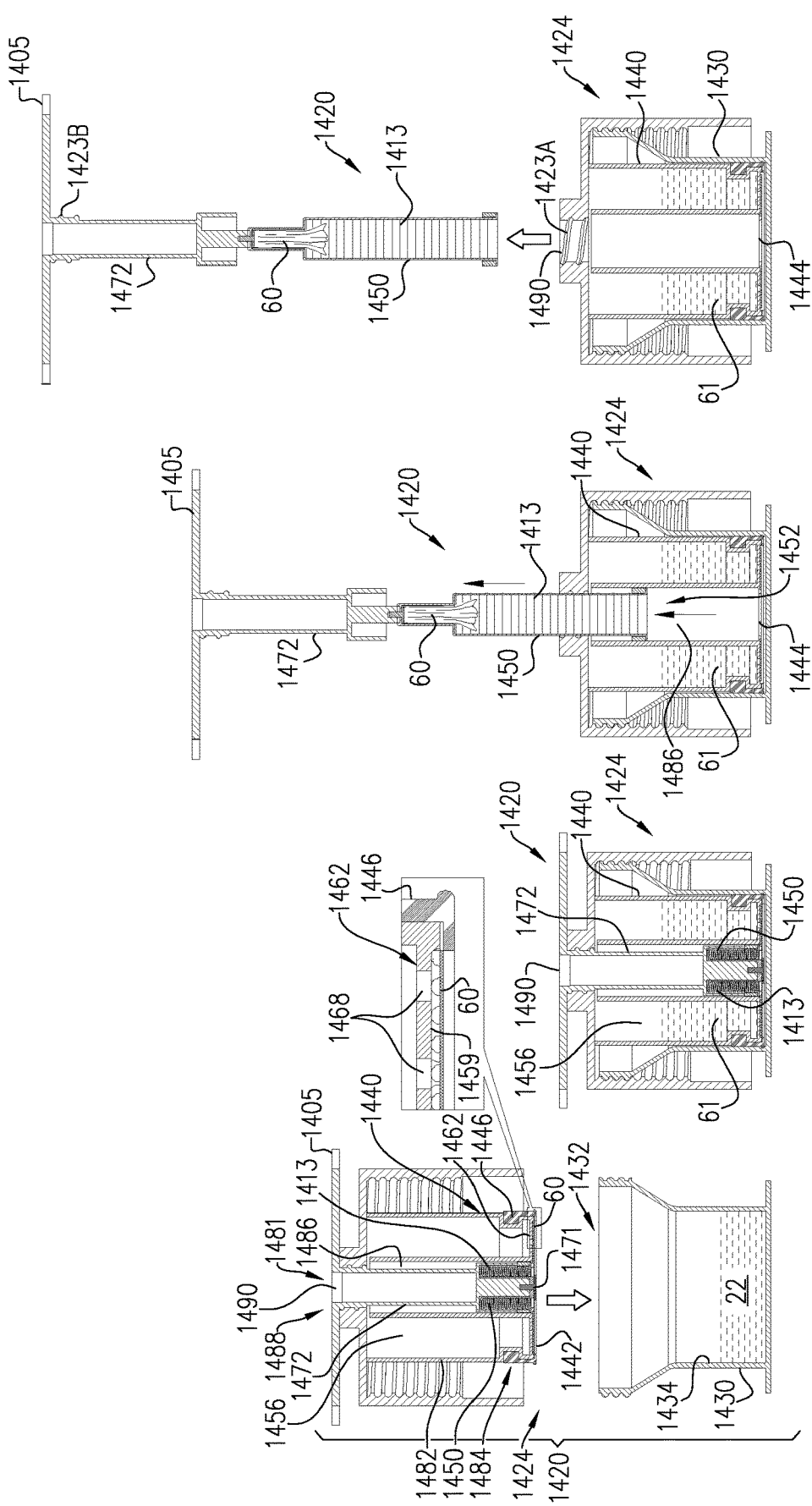

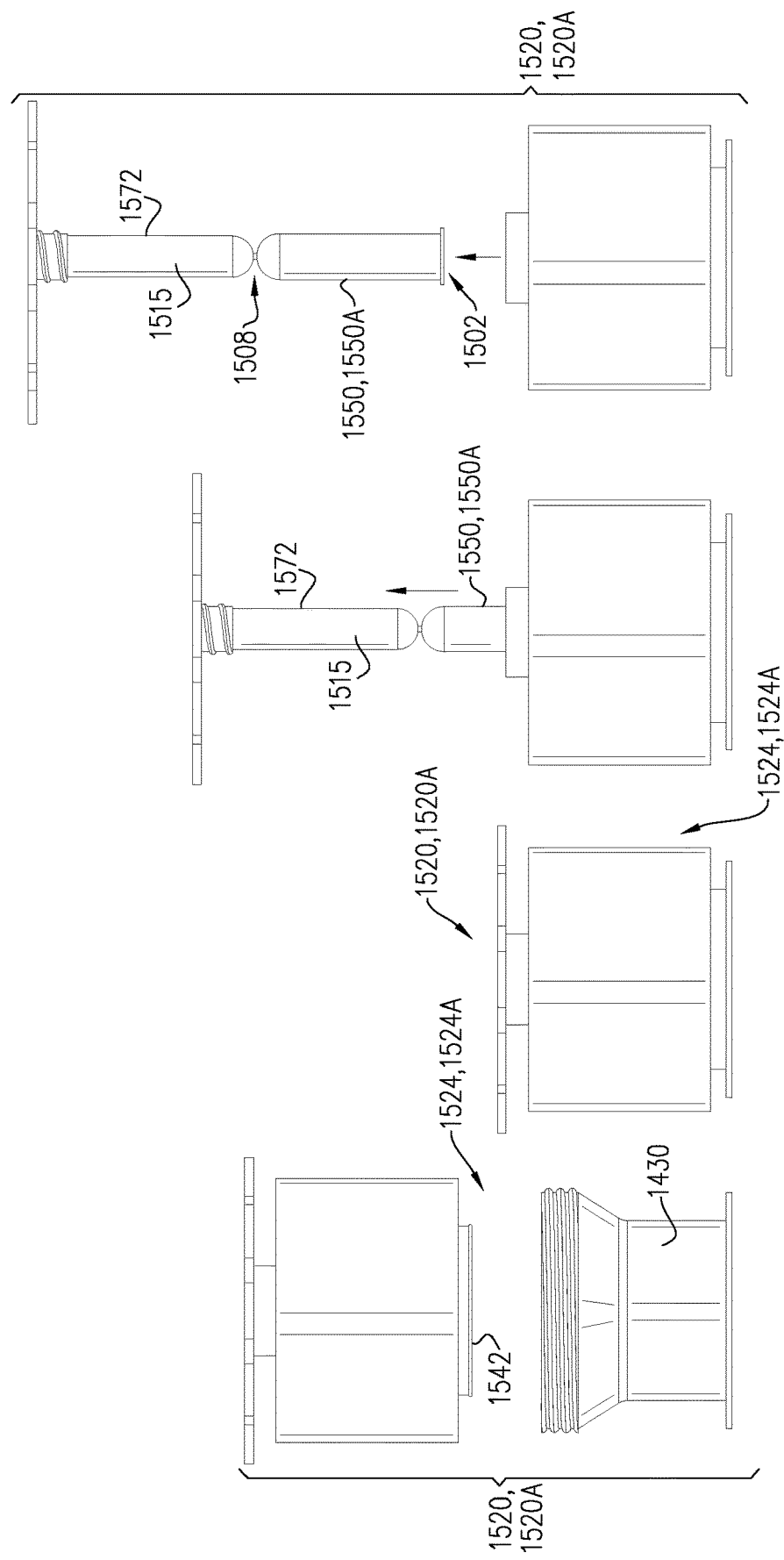

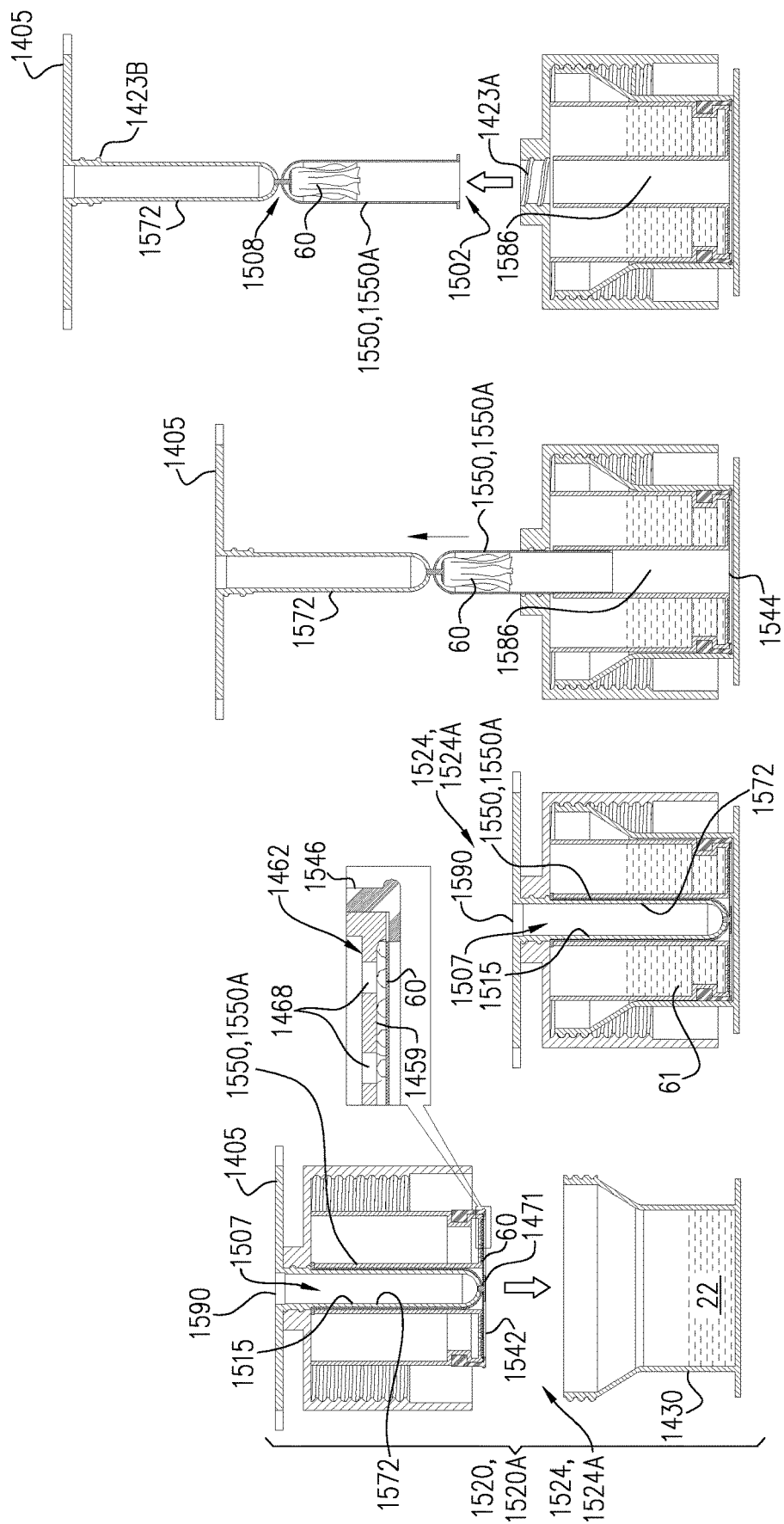

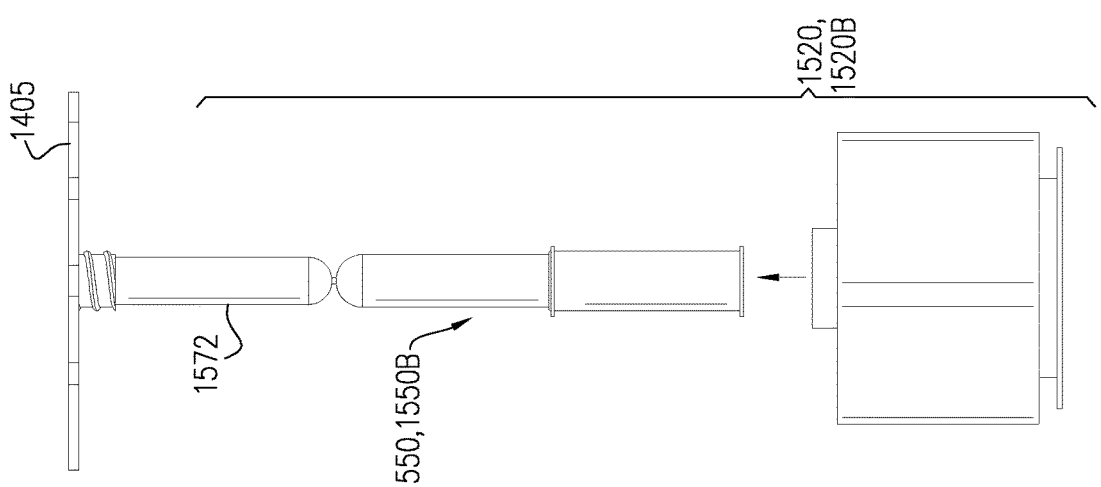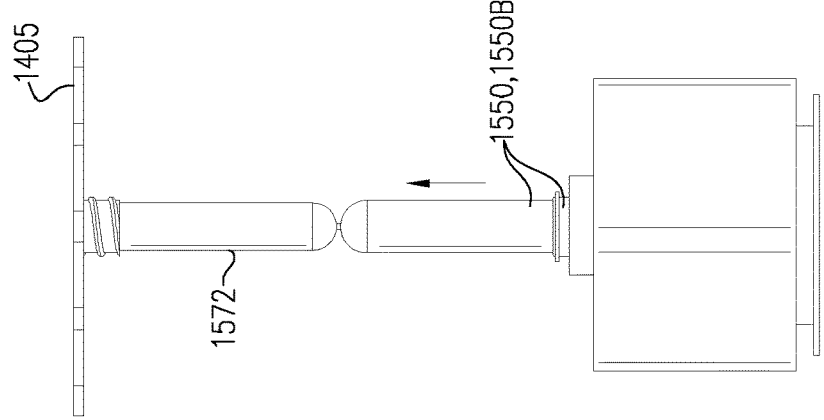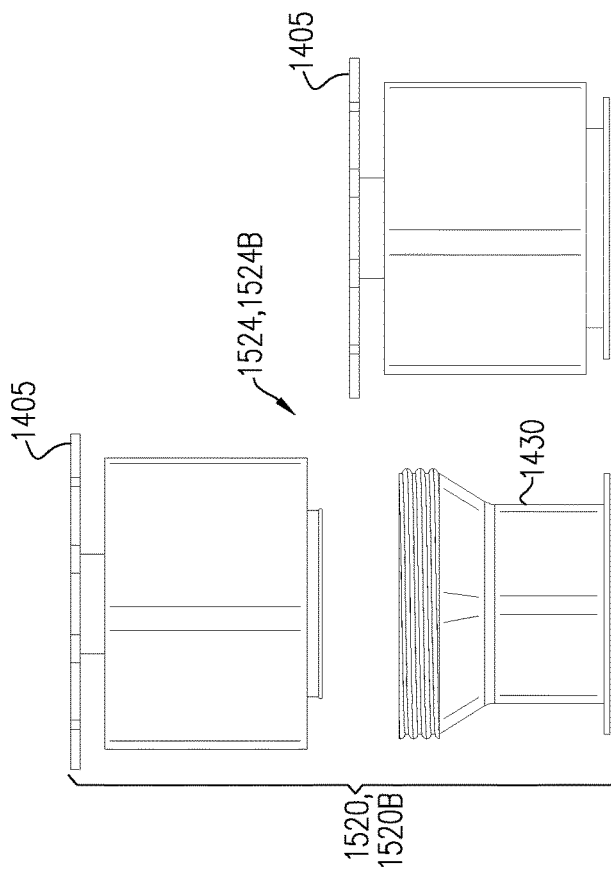
FIG. 31A  FIG. 31B  FIG. 31C  FIG. 31D

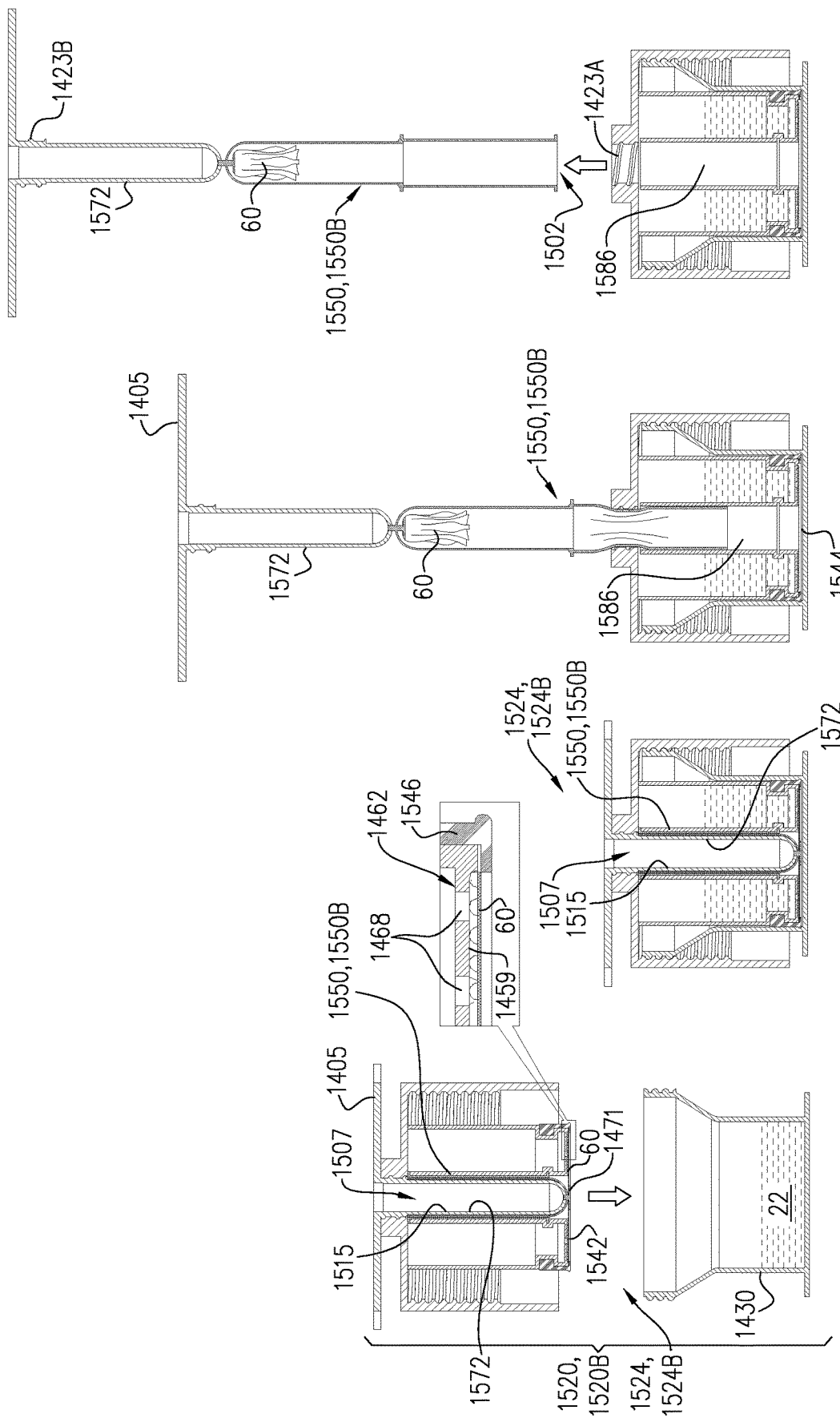

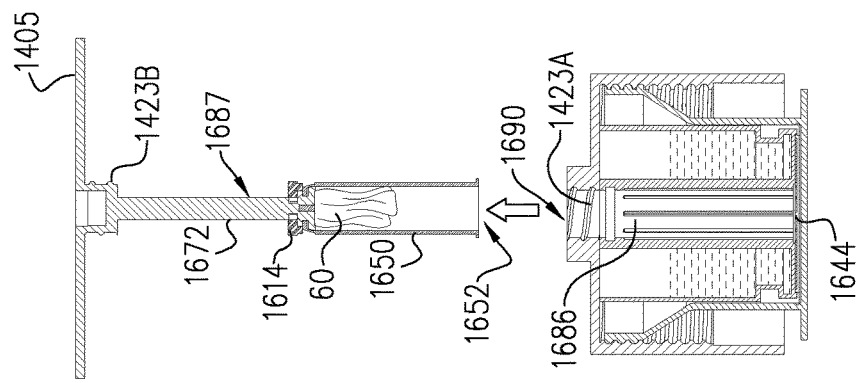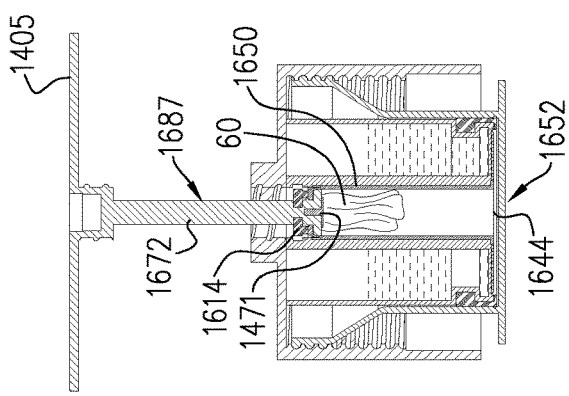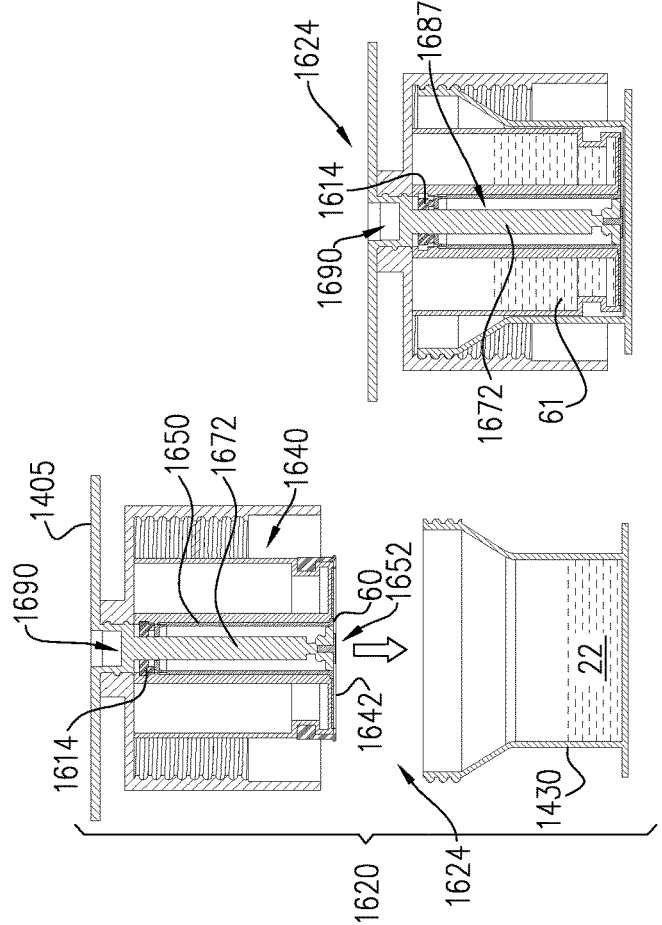
FIG. 38A  FIG. 38B  FIG. 38C  FIG. 38D

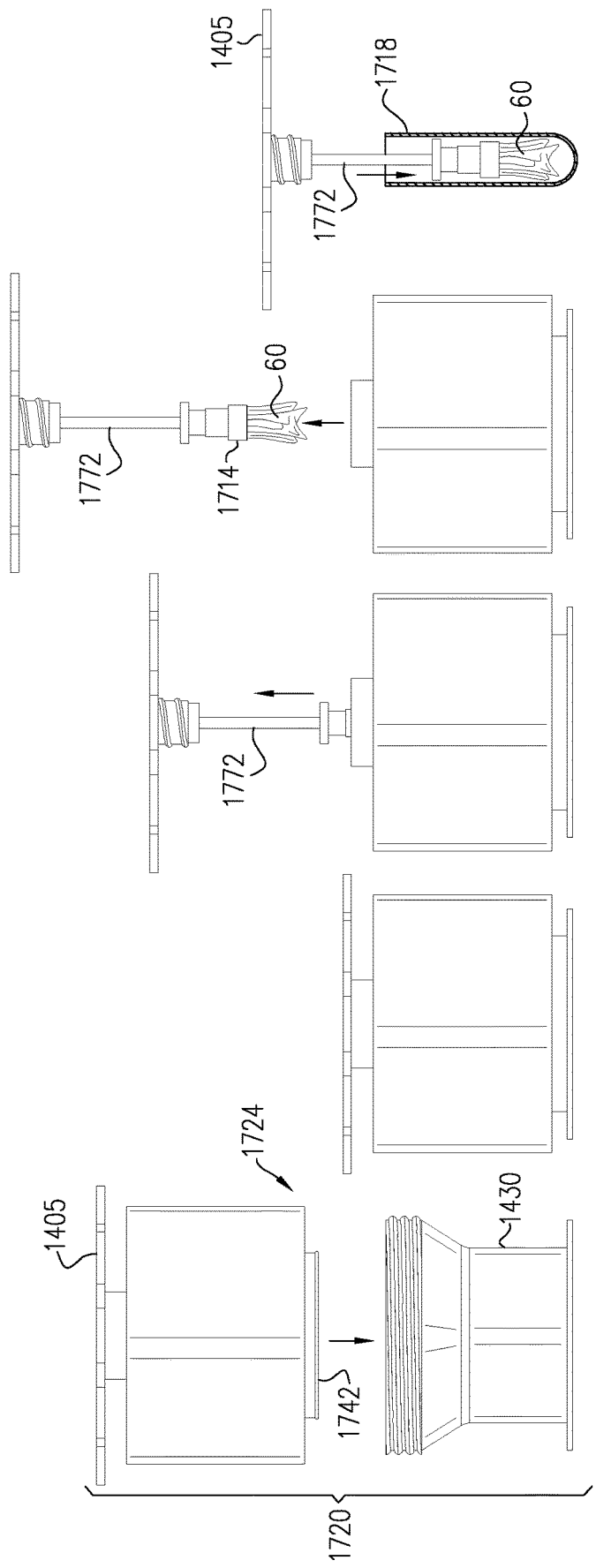

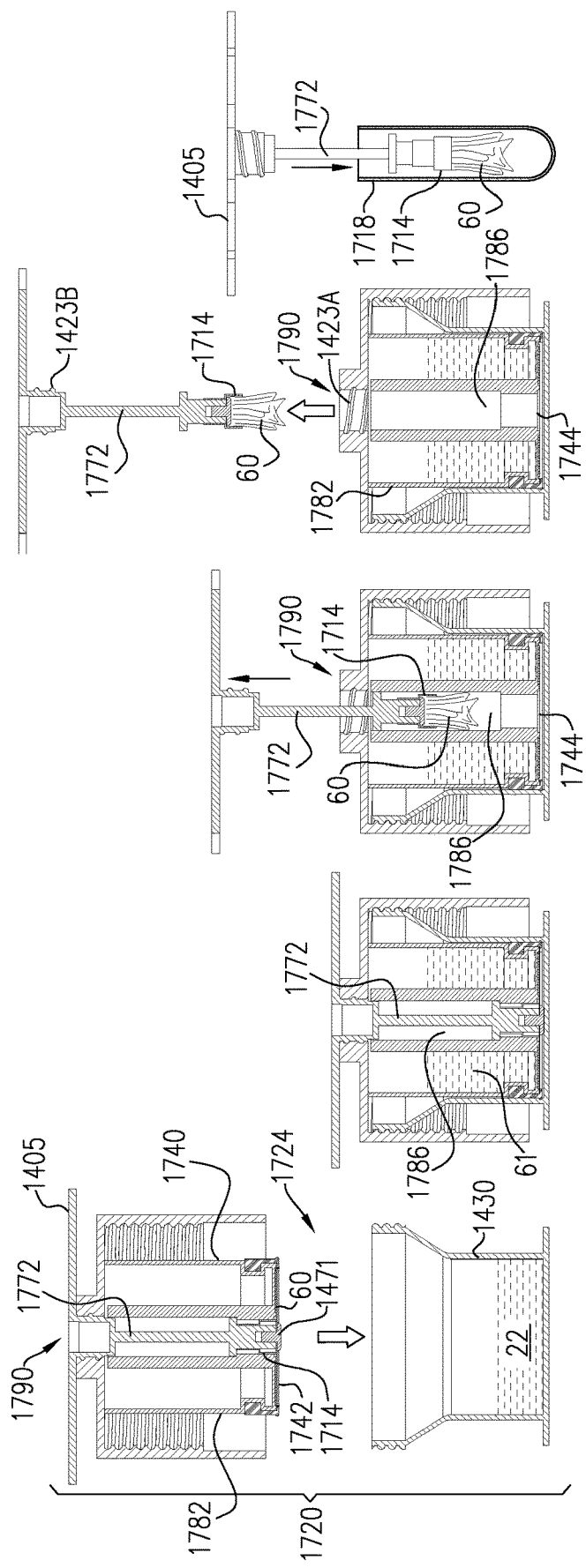

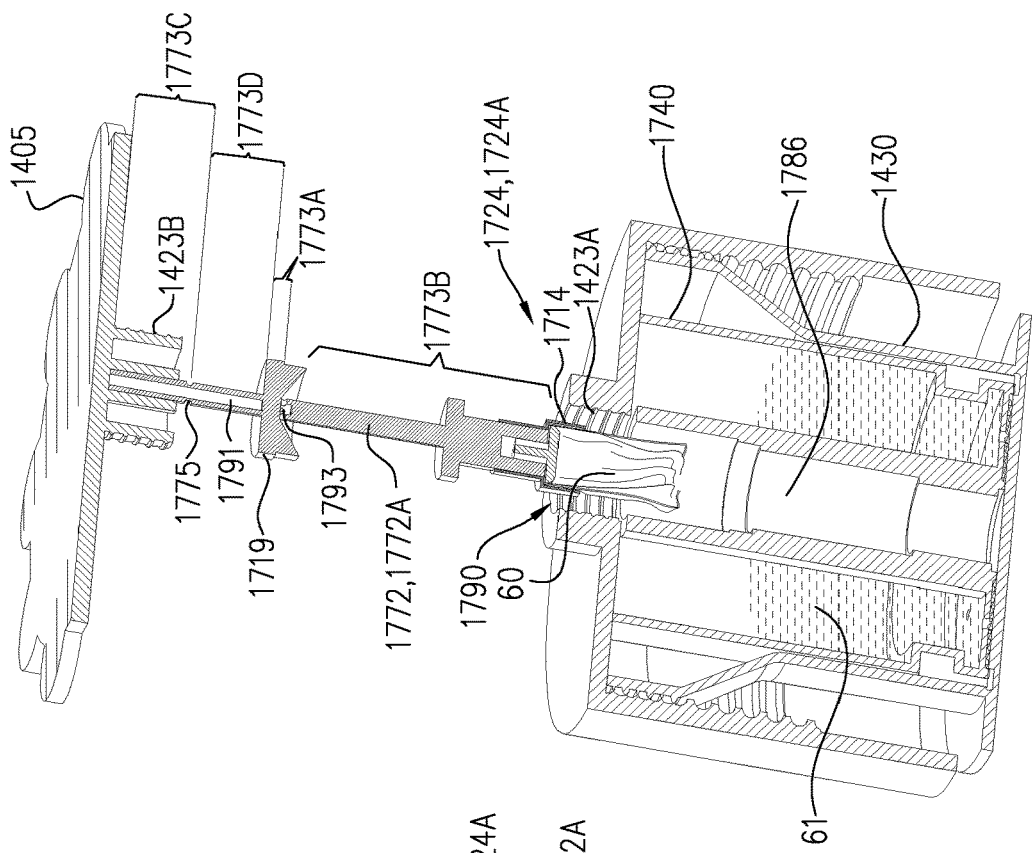
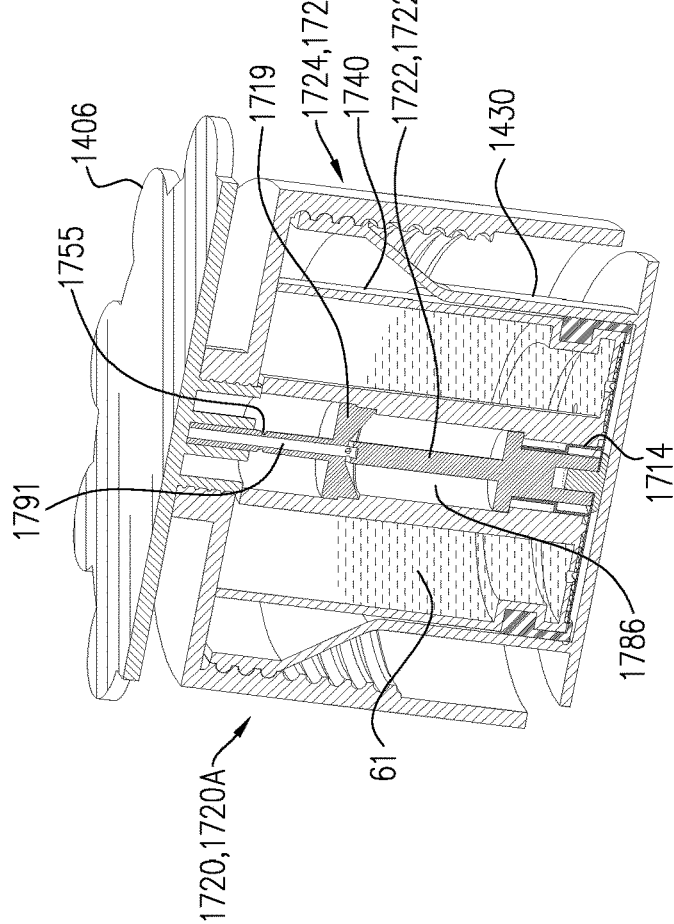
FIG. 43B
FIG. 43A

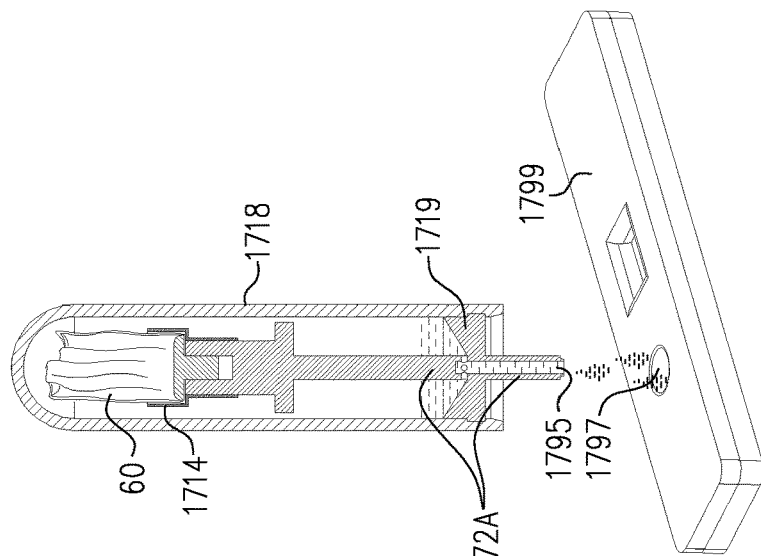
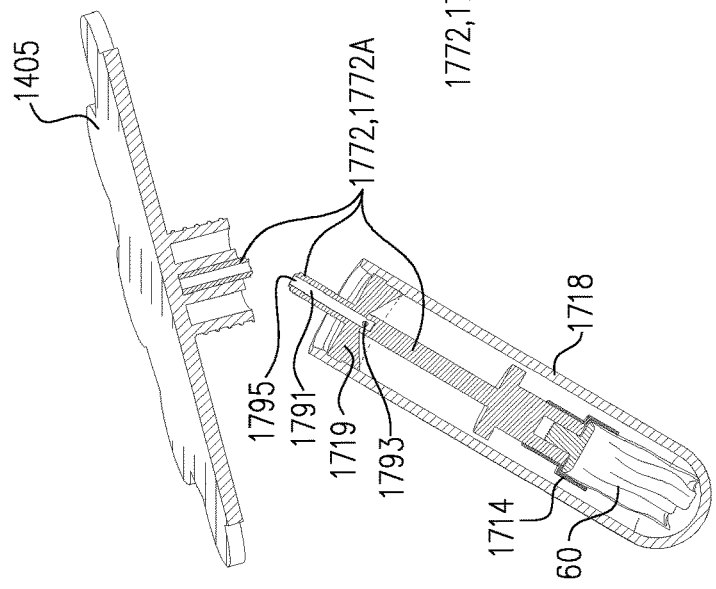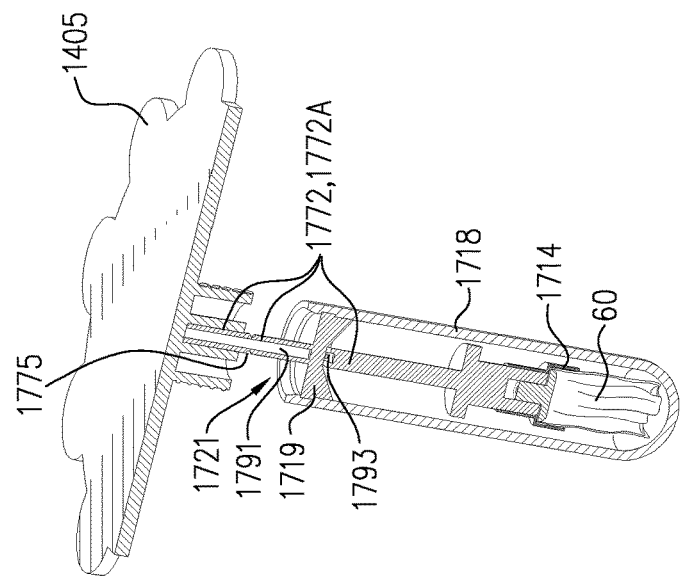
FIG. 43C
FIG. 43D
FIG. 43E

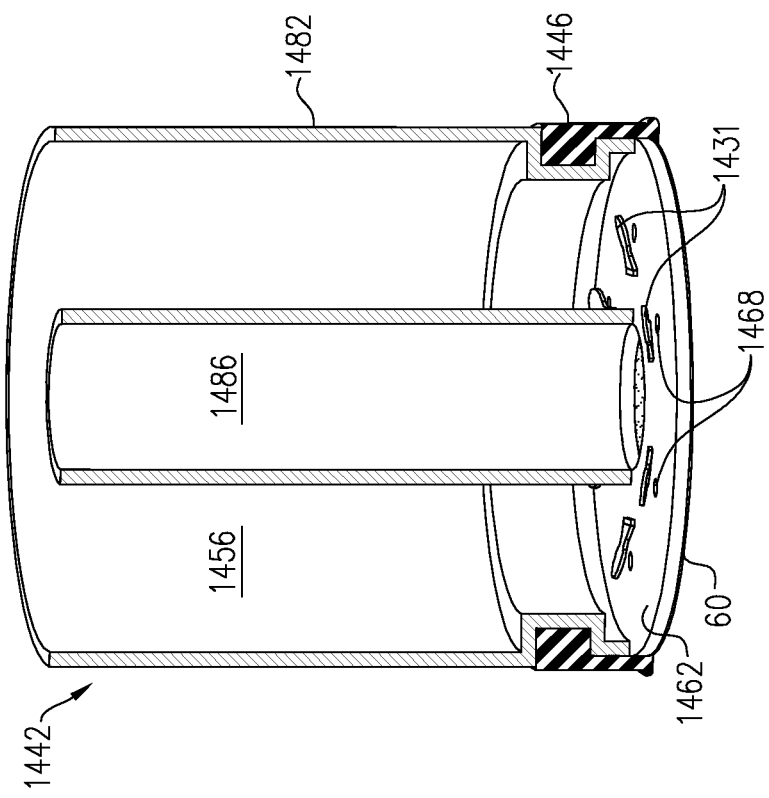
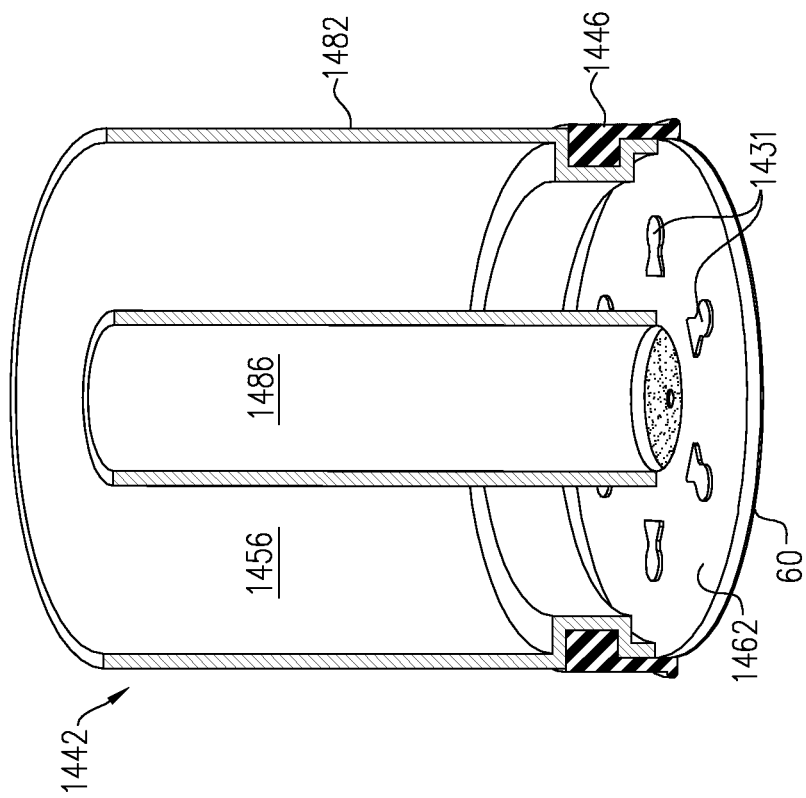

FILTRATION SAMPLING DEVICES

CROSS-REFERENCE TO RELATED APPLICATIONS

The present application is a continuation of International Application PCT/IL2022/050024, filed Jan. 6, 2022, which published as WO 2022/149135 to Feldman et al., and which claims priority from U.S. Provisional Application 63/134,282, filed Jan. 6, 2021.

The present application is related to U.S. application Ser. No. 18/093,942, filed Jan. 6, 2023, on even date herewith, entitled, "Filtration Sampling Devices," which published as US 2023/0152192 to Feldman et al. and is a continuation of International Application PCT/IL2022/050024, filed Jan. 6, 2022, which claims priority from U.S. Provisional Application 63/134,282, filed Jan. 6, 2021.

All of the above-referenced applications are assigned to the assignee of the present application and incorporated herein by reference.

FIELD OF THE APPLICATION

Applications of the present invention relate to sampling biological liquids.

BACKGROUND OF THE APPLICATION

Many techniques exist for testing for the presence of bacteria and viruses for aiding in disease diagnosis. For example, testing for the Influenza virus includes molecular-based detection methods, viral culture methods, and immunoassay methods. Influenza virus testing includes the testing of nasal swabs, nasopharyngeal swabs, nasal aspirates, nasopharyngeal aspirates, nasal washes, nasopharyngeal washes, throat swabs, and a combination of samples.

PCT Publication WO 2018/158768 to Fruchter et al. describes inter alia a method for testing for presence of a particulate selected from the group consisting of: a microorganism, a fungus, a bacteria, a spore, a virus, a mite, a biological cell, a biological antigen, a protein, a protein antigen, and a carbohydrate antigen. The method includes (a) collecting, in a tube, fluid that potentially contains the particulate, (b) using a plunger to push the fluid through a filter disposed at a distal portion of the tube or at a distal end of the plunger, and subsequently, (c) while the filter is inside the tube, ascertaining if any of the particulate was trapped by the filter by applying a particulate-presence-testing-facilitation solution to the filter.

PCT Publication WO 2020/049569 to Fruchter et al. describes inter alia a testing device for testing for the presence of particulate in a liquid. The testing device includes a liquid container for containing the liquid; a filter, disposed in or downstream of the liquid container; a liquid-pressure source, which is arranged to apply pressure to drive the liquid contained in the liquid container through the filter; and a filter chamber that is (a) disposed downstream of the liquid container, (b) shaped so as to define an inlet, and (c) in fluid communication with the filter.

US Patent Application Publication 2011/0318814 to Kshirsagar et al. describes inter alia a method for isolating microorganisms from a sample, the sample including sample matrix and microorganisms, the method including the steps of providing a receptacle, the receptacle configured to allow filtering of the sample and to reversibly contain the sample and a concentration agent; adding the sample to the receptacle, wherein a microorganism-bound composition will be formed in the receptacle, the microorganism-bound composition including concentration agent-bound microorganisms and sample matrix; and filtering the microorganism-bound composition through a filter to collect the concentration agent-bound microorganisms on the filter. The filter has an average pore size that is greater than the average size of the microorganisms. Kits and systems are also described.

SUMMARY OF THE APPLICATION

Some applications of the present invention provide sampling devices for concentrating a liquid specimen sample. Some of the sampling devices comprise a filtration assembly and a collection vial disengageably coupled to the filtration assembly. The filtration assembly comprises a tubular container for receiving the liquid specimen sample, a plunger, and a filter disposed in the tubular container. The filtration assembly is configured such that movement of a plunger head within the tubular container, when the liquid specimen sample is contained in the tubular container and the filter is disposed in the tubular container, pushes at least a portion of the liquid specimen sample through the filter.

The sampling device is configured such that the filter is advanceable into the collection vial via a vial opening while the collection vial is disengageably coupled to the filtration assembly. Once the collection vial has been disengaged from the filtration assembly, a diagnostic test may be performed for the presence of particulate trapped by the filter, which is now in the collection vial. For some applications, such as for transporting the collection vial to a remote diagnostic laboratory, the sampling device further comprises a collection vial cap, which is configured to seal the vial opening.

Some of the sampling devices do not necessarily comprise a collection vial. The plunger of these sampling devices comprises a plunger head and a plunger rod. The plunger rod has a distal end portion to which the plunger head is coupled, and is shaped so as to define an internal plunger space having a plunger-space proximal opening through a proximal end of the plunger rod. These sampling devices are configured such that the filter is removable from the tubular container via the plunger-space proximal opening while the plunger head is within the tubular container.

In some configurations, the plunger head is shaped so as to define a plunger-head opening through the plunger head and into the internal plunger space. The sampling device comprises a filter-withdrawal shaft, which includes a distal portion that is directly or indirectly coupled to the filter, and which is disposed passing through the internal plunger space. The sampling device is configured such that proximal withdrawal of the filter-withdrawal shaft out of the internal plunger space, while the plunger head is within the tubular container, pulls the filter into the internal plunger space via the plunger-head opening and out of the internal plunger space via the plunger-space proximal opening, and removes the filter-withdrawal shaft and the filter from the filtration assembly.

There is therefore provided, in accordance with an Inventive Concept 1 of the present invention, a sampling device for concentrating a liquid specimen sample, the sampling device comprising:
 a filtration assembly, which comprises:
  (i) a tubular container, which is shaped so as to define an inner wall and a proximal container opening for receiving the liquid specimen sample;
  (ii) a plunger, which (A) comprises a plunger head and a plunger rod, which (1) has a distal end portion to which the plunger head is coupled, and (2) is shaped so as to define an internal plunger space having a plunger-space proximal opening through a proximal end of the plunger rod, and (B) is insertable into the tubular container via the proximal container opening, such that a lateral surface of the plunger head forms a fluid-tight movable seal with the inner wall; and
(iii) a filter,
wherein the filtration assembly is configured such that movement of the plunger head within the tubular container, when the liquid specimen sample is contained in the tubular container and the filter is disposed in the tubular container, pushes at least a portion of the liquid specimen sample through the filter, and
wherein the sampling device is configured such that the filter is removable from the tubular container via the plunger-space proximal opening while the plunger head is within the tubular container.

Inventive Concept 2. The sampling device according to Inventive Concept 1,
wherein the plunger head is shaped so as to define a plunger-head opening through the plunger head and into the internal plunger space,
wherein the sampling device comprises a filter-withdrawal shaft, which (a) includes a distal portion that is directly or indirectly coupled to the filter, and (b) which is disposed passing through the internal plunger space, and
wherein the sampling device is configured such that proximal withdrawal of the filter-withdrawal shaft out of the internal plunger space, while the plunger head is within the tubular container, pulls the filter into the internal plunger space via the plunger-head opening and out of the internal plunger space via the plunger-space proximal opening, and removes the filter-withdrawal shaft and the filter from the filtration assembly.

Inventive Concept 3. The sampling device according to Inventive Concept 2,
wherein the sampling device comprises a filter receptacle that is slidably coupled to a distal end portion of the filter-withdrawal shaft and shaped so as to define a distal receptacle opening, and
wherein the sampling device is configured such that the proximal withdrawal of the filter-withdrawal shaft out of the internal plunger space, while the plunger head is within the tubular container, pulls a portion of the filter into the filter receptacle via the distal receptacle opening.

Inventive Concept 4. The sampling device according to Inventive Concept 2, further comprising an extraction-tube cap, which (a) is disposed radially surrounding the filter-withdrawal shaft along a first longitudinal portion of the filter-withdrawal shaft, such that a distal second longitudinal portion of the filter-withdrawal shaft is distal to the extraction-tube cap, and (b) has an outer diameter that is greater than an outer diameter of the filter-withdrawal shaft.

Inventive Concept 5. The sampling device according to Inventive Concept 4, further comprising an extraction tube having a proximal end opening, wherein the filter-withdrawal shaft, the filter, the extraction tube, and the extraction-tube cap are configured such that the filter and the distal second longitudinal portion of the filter-withdrawal shaft are disposable within the extraction tube via the proximal end opening of the extraction tube, such that the extraction-tube cap seals at least a portion of the extraction tube.

Inventive Concept 6. The sampling device according to Inventive Concept 4, wherein the filter-withdrawal shaft is shaped so as to define, proximal to the extraction-tube cap, a proximal third longitudinal portion that is configured to provide a predetermined separation border between the proximal third longitudinal portion and the filter-withdrawal shaft distal to the predetermined separation border.

Inventive Concept 7. The sampling device according to Inventive Concept 6, wherein the proximal third longitudinal portion is directly longitudinally adjacent the extraction-tube cap.

Inventive Concept 8. The sampling device according to Inventive Concept 6, wherein the proximal third longitudinal portion is longitudinally connected to the first longitudinal portion of the filter-withdrawal shaft by a fourth longitudinal portion of the filter-withdrawal shaft longitudinally between the predetermined separation border and the extraction-tube cap.

Inventive Concept 9. The sampling device according to Inventive Concept 6, wherein the predetermined separation border is defined by a lesser cross-sectional area of the filter-withdrawal shaft at the predetermined separation border than longitudinally adjacent to the predetermined separation border.

Inventive Concept 10. The sampling device according to Inventive Concept 6, wherein the predetermined separation border is defined by scoring.

Inventive Concept 11. The sampling device according to Inventive Concept 6, wherein the predetermined separation border is defined by perforation.

Inventive Concept 12. The sampling device according to Inventive Concept 6, wherein the predetermined separation border is defined by corresponding male and female screw threads.

Inventive Concept 13. The sampling device according to Inventive Concept 6, wherein the predetermined separation border is defined by corresponding male and female tapered friction-fitting surfaces.

Inventive Concept 14. The sampling device according to Inventive Concept 6, wherein the filter-withdrawal shaft is shaped so as to define an internal channel that passes longitudinally through the first longitudinal portion and has (a) one or more distal openings distal to the extraction-tube cap and (b) a proximal opening that is disposed at the predetermined separation border and that is open to outside the filter-withdrawal shaft upon separation of the proximal third longitudinal portion at the predetermined separation border.

Inventive Concept 15. The sampling device according to Inventive Concept 14, further comprising an extraction tube having a proximal end opening, wherein the filter-withdrawal shaft, the filter, the extraction tube, and the extraction-tube cap are configured such that the filter and the distal second longitudinal portion of the filter-withdrawal shaft are disposable within the extraction tube via the proximal end opening of the extraction tube, such that the extraction-tube cap seals at least a portion of the extraction tube other than allowing fluid flow through the internal channel via the one or more distal openings and the proximal opening.

Inventive Concept 16. The sampling device according to Inventive Concept 2,
wherein the plunger rod is shaped so as to define therewithin a waste liquid receptacle,
wherein the plunger head is shaped so as to define a filter support, which is shaped so as to define (a) a distal support surface, (b) a plurality of filtrate-passage openings through the filter support into the waste liquid receptacle, and (c) the plunger-head opening,
wherein the filter is disposed on the distal support surface, and wherein the filtration assembly is configured such that movement of the plunger head within the tubular container, when the liquid specimen sample is contained in the tubular container and the filter is disposed in the tubular container, pushes at least a portion of the liquid specimen sample through the filter and the filtrate-passage openings and into the waste liquid receptacle.

Inventive Concept 17. The sampling device according to Inventive Concept 2,
wherein the plunger-space proximal opening and a longitudinal portion of the filter-withdrawal shaft are shaped so as to define corresponding female and male screw threads, respectively, which (a) removably couple the filter-withdrawal shaft to the plunger rod while the filter-withdrawal shaft is disposed passing through the internal plunger space, and (b) prevent the premature proximal withdrawal of the filter-withdrawal shaft out of the internal plunger space, and
wherein the sampling device is configured such that rotation of the filter-withdrawal shaft and the plunger-space proximal opening with respect to each other (a) causes an initial portion of the proximal withdrawal of the filter-withdrawal shaft out of the internal plunger space, and (b) decouples the female and the male screw threads from each other.

Inventive Concept 18. The sampling device according to Inventive Concept 1,
wherein the sampling device further comprises a collection vial, which is disengageably coupled to the filtration assembly, and
wherein the sampling device is configured such that the filter is advanceable into the collection vial while the collection vial is disengageably coupled to the filtration assembly.

Inventive Concept 19. The sampling device according to Inventive Concept 18, wherein the sampling device is configured such that the collection vial is decouplable from the filtration assembly while the plunger head is within the tubular container.

Inventive Concept 20. The sampling device according to Inventive Concept 18, wherein the collection vial is removably disposed at least partially within the internal plunger space.

Inventive Concept 21. The sampling device according to Inventive Concept 20, wherein the sampling device is configured such that the collection vial is decouplable from the filtration assembly while the plunger head is within the tubular container.

Inventive Concept 22. The sampling device according to Inventive Concept 20,
wherein the plunger head is shaped so as to define a plunger-head opening through the plunger head and into the internal plunger space,
wherein the collection vial is shaped so as to define a vial opening and a shaft-passage hole at an end of the collection vial opposite the vial opening,
wherein the sampling device is configured such that the filter is advanceable into the collection vial via the plunger-head opening and the vial opening while the collection vial is disengageably coupled to the filtration assembly,
wherein the sampling device comprises a filter-withdrawal shaft, which (a) is disposed partially within the collection vial within the internal plunger space, (b) includes a proximal portion that is slidably disposed passing through the shaft-passage hole, and (c) includes a distal portion that passes through the vial opening and is directly or indirectly coupled to the filter, and
wherein the sampling device is configured such that proximal withdrawal of the filter-withdrawal shaft, while the plunger head is within the tubular container, pulls the filter into the collection vial via the plunger-head opening and the vial opening.

Inventive Concept 23. The sampling device according to Inventive Concept 22, wherein the sampling device is configured such that further proximal withdrawal of the filter-withdrawal shaft out of the internal plunger space, while the plunger head is within the tubular container, pulls the collection vial out of the internal plunger space via the plunger-space proximal opening.

Inventive Concept 24. The sampling device according to Inventive Concept 22, further comprising a seal that inhibits fluid leakage between the proximal portion of the filter-withdrawal shaft and the shaft-passage hole.

Inventive Concept 25. The sampling device according to Inventive Concept 20, wherein the collection vial is removably disposed at least partially within the internal plunger space while the collection vial is an axially-compressed configuration, and wherein the collection vial is elongatable from the axially-compressed configuration.

Inventive Concept 26. The sampling device according to Inventive Concept 25, wherein a wall of the collection vial is accordion-shaped.

Inventive Concept 27. The sampling device according to Inventive Concept 20, wherein the collection vial comprises a flexible material and is removably disposed at least partially within the internal plunger space while the collection vial is an inverted configuration, in which the inverted collection vial defines a proximal vial opening.

Inventive Concept 28. The sampling device according to Inventive Concept 27, wherein the inverted configuration is a double-inverted configuration.

Inventive Concept 29. The sampling device according to Inventive Concept 27,
wherein the plunger head is shaped so as to define a plunger-head opening through the plunger head and into the internal plunger space,
wherein the sampling device comprises a filter-withdrawal shaft, which (a) is disposed partially within the inverted collection vial within the internal plunger space, and (b) includes a distal portion that is directly or indirectly coupled to the filter,
wherein the sampling device is configured such that proximal withdrawal of the filter-withdrawal shaft out of the internal plunger space, while the plunger head is within the tubular container, inverts the inverted collection vial to an uninverted configuration, pulls the filter into the collection vial via the plunger-head opening, pulls the collection vial out of the internal plunger space via the plunger-space proximal opening, and removes the filter-withdrawal shaft and the filter from the filtration assembly.

Inventive Concept 30. The sampling device according to Inventive Concept 18, wherein the collection vial is shaped so as to define a vial opening, and wherein the sampling device is configured such that the filter is advanceable into the collection vial via the vial opening while the collection vial is disengageably coupled to the filtration assembly.

Inventive Concept 31. The sampling device according to Inventive Concept 30,
wherein the sampling device further comprises a shaft, and wherein the sampling device is configured such that that a distal portion of the shaft is axially movable through the vial opening so as to advance the filter into the collection vial via the vial opening.

Inventive Concept 32. The sampling device according to Inventive Concept 31,
wherein the collection vial is removably disposed at least partially within the internal plunger space while the collection vial is an axially-compressed configuration,
wherein the collection vial is elongatable from the axially-compressed configuration, and
wherein the sampling device is configured such that proximal withdrawal of the shaft out of the internal plunger space, while the plunger head is within the tubular container, pulls the filter into the collection vial and elongates the collection vial.

Inventive Concept 33. The sampling device according to Inventive Concept 30, wherein the sampling device is configured such that the collection vial is decouplable from the filtration assembly while the plunger head is within the tubular container.

Inventive Concept 34. The sampling device according to Inventive Concept 33, wherein the sampling device is configured such that the collection vial is decouplable from the filtration assembly without any proximal withdrawal of the plunger head within the tubular container.

Inventive Concept 35. The sampling device according to Inventive Concept 18, wherein the sampling device is configured such that the filter is advanceable into the collection vial while the plunger head is within the tubular container.

Inventive Concept 36. The sampling device according to Inventive Concept 35, wherein the sampling device is configured such that the filter is advanceable into the collection vial while the plunger head is advanced as far as possible within the tubular container.

Inventive Concept 37. The sampling device according to Inventive Concept 18, wherein the sampling device is configured such that the collection vial is decouplable from the filtration assembly by distal movement of the collection vial with respect to the tubular container.

Inventive Concept 38. The sampling device according to Inventive Concept 18,
wherein the plunger head is shaped so as to define a plunger-head opening through the plunger head and into the internal plunger space,
wherein the collection vial is positioned proximal to the plunger head, and
wherein the sampling device is configured such that the movement of the plunger head and the collection vial within the tubular container advances the filter into the collection vial via the plunger-head opening.

Inventive Concept 39. The sampling device according to Inventive Concept 38, wherein the sampling device is configured such that the movement of the plunger head and the collection vial within the tubular container advances the filter into the collection vial via the plunger-head opening while the filter remains stationary with respect to a distal end of the tubular container.

Inventive Concept 40. The sampling device according to Inventive Concept 38,
wherein the collection vial is shaped so as to define a vial opening, and wherein the sampling device is configured such that the filter is advanceable into the collection vial via the vial opening while the collection vial is disengageably coupled to the filtration assembly, and
wherein the collection vial is positioned proximal to the plunger head such that the vial opening is in fluid communication with the plunger-head opening.

Inventive Concept 41. The sampling device according to Inventive Concept 38,
wherein the collection vial is shaped so as to define a vial opening, and wherein the sampling device is configured such that the filter is advanceable into the collection vial via the vial opening while the collection vial is disengageably coupled to the filtration assembly, and
wherein the sampling device further comprises a fluid-tight frangible seal, and wherein the collection vial is positioned proximal to the plunger head such that the frangible seal removably blocks liquid flow from the plunger-head opening into the vial opening, such that upon breaching of the frangible seal the vial opening is in fluid communication with the plunger-head opening.

Inventive Concept 42. A testing kit comprising the sampling device according to any one of Inventive Concepts 1-41, the testing kit further comprising a lateral flow immunoassay test strip, which is configured to detect the presence of a biological particulate trapped by the filter.

Inventive Concept 43. The testing kit according to Inventive Concept 42, further comprising reagents for use with the lateral flow immunoassay test strip.

Inventive Concept 44. The testing kit according to Inventive Concept 42, wherein the biological particulate is selected from the group consisting of: a virus, a bacterium, a microorganism, a fungus, a spore, a mite, a biological cell, a biological antigen, a protein, a protein antigen, and a carbohydrate antigen.

There is further provided, in accordance with an Inventive Concept 45 of the present invention, a method for concentrating a liquid specimen sample, the method comprising:
placing the liquid specimen sample in a tubular container of a filtration assembly of a sampling device;
inserting a plunger head of a plunger of the filtration assembly into the tubular container via a proximal container opening of the tubular container, such that a lateral surface of the plunger head forms a fluid-tight movable seal with an inner wall of the tubular container, wherein the plunger includes a plunger rod that (a) has a distal end portion to which the plunger head is coupled, and (b) is shaped so as to define an internal plunger space having a plunger-space proximal opening through a proximal end of the plunger rod;
distally advancing the plunger head within the tubular container to drive at least a portion of the liquid specimen sample through a filter disposed in the tubular container; and
removing the filter from the tubular container via the plunger-space proximal opening while the plunger head is within the tubular container.

Inventive Concept 46. The method according to Inventive Concept 45,
wherein the plunger head is shaped so as to define a plunger-head opening through the plunger head and into the internal plunger space,
wherein the sampling device includes a filter-withdrawal shaft, which (a) includes a distal portion that is directly or indirectly coupled to the filter, and (b) is disposed passing through the internal plunger space, and
wherein removing the filter from the tubular container comprises proximally withdrawing the filter-withdrawal shaft out of the internal plunger space, while the plunger head is within the tubular container, so as to pull the filter into the internal plunger space via the plunger-head opening and out of the internal plunger space via the plunger-space proximal opening, and to remove the filter-withdrawal shaft and the filter from the filtration assembly.

Inventive Concept 47. The method according to Inventive Concept 46,
wherein the sampling device includes a filter receptacle that is slidably coupled to a distal end portion of the filter-withdrawal shaft and shaped so as to define a distal receptacle opening, and
wherein proximally withdrawing the filter-withdrawal shaft out of the internal plunger space, while the plunger head is within the tubular container, pulls a portion of the filter into the filter receptacle via the distal receptacle opening.

Inventive Concept 48. The method according to Inventive Concept 46, wherein the sampling device further comprises an extraction-tube cap, which (a) is disposed radially surrounding the filter-withdrawal shaft along a first longitudinal portion of the filter-withdrawal shaft, such that a distal second longitudinal portion of the filter-withdrawal shaft is distal to the extraction-tube cap, and (b) has an outer diameter that is greater than an outer diameter of the filter-withdrawal shaft.

Inventive Concept 49. The method according to Inventive Concept 48, further comprising disposing the filter and the distal second longitudinal portion of the filter-withdrawal shaft are disposable within the extraction tube via a proximal end opening of the extraction tube, such that the extraction-tube cap seals at least a portion of the extraction tube.

Inventive Concept 50. The method according to Inventive Concept 48,
wherein the filter-withdrawal shaft is shaped so as to define, proximal to the extraction-tube cap, a proximal third longitudinal portion that is configured to provide a predetermined separation border between the proximal third longitudinal portion and the filter-withdrawal shaft distal to the predetermined separation border, and
wherein the method further comprises separating, at the predetermined separation border, the proximal third longitudinal portion from the filter-withdrawal shaft distal to the predetermined separation border.

Inventive Concept 51. The method according to Inventive Concept 50, wherein the proximal third longitudinal portion is directly longitudinally adjacent the extraction-tube cap.

Inventive Concept 52. The method according to Inventive Concept 50, wherein the proximal third longitudinal portion is longitudinally connected to the first longitudinal portion of the filter-withdrawal shaft by a fourth longitudinal portion of the filter-withdrawal shaft longitudinally between the predetermined separation border and the extraction-tube cap.

Inventive Concept 53. The method according to Inventive Concept 50, wherein the predetermined separation border is defined by a lesser cross-sectional area of the filter-withdrawal shaft at the predetermined separation border than longitudinally adjacent to the predetermined separation border, and wherein separating comprises breaking the filter-withdrawal shaft at the predetermined separation border.

Inventive Concept 54. The method according to Inventive Concept 50, wherein the predetermined separation border is defined by scoring, and wherein separating comprises breaking the filter-withdrawal shaft at the predetermined separation border.

Inventive Concept 55. The method according to Inventive Concept 50, wherein the predetermined separation border is defined by perforation, and wherein separating comprises breaking the filter-withdrawal shaft at the predetermined separation border.

Inventive Concept 56. The method according to Inventive Concept 50, wherein the predetermined separation border is defined by corresponding male and female screw threads, and wherein separating comprises unscrewing the male and the female screw threads from each other.

Inventive Concept 57. The method according to Inventive Concept 50, wherein the predetermined separation border is defined by corresponding male and female tapered friction-fitting surfaces, and wherein separating comprises separating the male and the female tapered friction-fitting surfaces from each other.

Inventive Concept 58. The method according to Inventive Concept 50,
wherein the filter-withdrawal shaft is shaped so as to define an internal channel that passes longitudinally through the first longitudinal portion and has (a) one or more distal openings distal to the extraction-tube cap and (b) a proximal opening that is disposed at the predetermined separation border and that is open to outside the filter-withdrawal shaft upon separation of the proximal third longitudinal portion at the predetermined separation border, and
wherein the method further comprises dripping a liquid through the internal channel and out of the proximal opening.

Inventive Concept 59. The method according to Inventive Concept 58, further comprising disposing the filter and the distal second longitudinal portion of the filter-withdrawal shaft are disposable within the extraction tube via a proximal end opening of the extraction tube, such that the extraction-tube cap seals at least a portion of the extraction tube other than allowing fluid flow through the internal channel via the one or more distal openings and the proximal opening.

Inventive Concept 60. The method according to Inventive Concept 46,
wherein the plunger rod is shaped so as to define therewithin a waste liquid receptacle,
wherein the plunger head is shaped so as to define a filter support, which is shaped so as to define (a) a distal support surface, (b) a plurality of filtrate-passage openings through the filter support into the waste liquid receptacle, and (c) the plunger-head opening,
wherein the filter is disposed on the distal support surface, and
wherein distally advancing the plunger head within the tubular container, when the liquid specimen sample is contained in the tubular container and the filter is disposed in the tubular container, pushes at least a portion of the liquid specimen sample through the filter and the filtrate-passage openings and into the waste liquid receptacle.

Inventive Concept 61. The method according to Inventive Concept 46,
wherein the plunger-space proximal opening and a longitudinal portion of the filter-withdrawal shaft are shaped so as to define corresponding female and male screw threads, respectively, which (a) removably couple the filter-withdrawal shaft to the plunger rod while the filter-withdrawal shaft is disposed passing through the internal plunger space, and (b) prevent the premature proximal withdrawal of the filter-withdrawal shaft out of the internal plunger space, and
wherein proximally withdrawing the filter-withdrawal shaft out of the internal plunger space comprises rotating the filter-withdrawal shaft and the plunger-space proximal opening with respect to each other so as to (a) cause an initial portion of the proximal withdrawal of the filter-withdrawal shaft out of the internal plunger space, and (b) decouple the female and the male screw threads from each other.

Inventive Concept 62. The method according to Inventive Concept 45,
  wherein the sampling device further includes a collection vial, which is disengageably coupled to the filtration assembly, and
  wherein the method further comprises advancing the filter into the collection vial while the collection vial is disengageably coupled to the filtration assembly.

Inventive Concept 63. The method according to Inventive Concept 62, further comprising decoupling the collection vial from the filtration assembly while the plunger head is within the tubular container.

Inventive Concept 64. The method according to Inventive Concept 62, wherein distally advancing the plunger head within the tubular container comprises distally advancing the plunger head within the tubular container while the collection vial is removably disposed at least partially within the internal plunger space.

Inventive Concept 65. The method according to Inventive Concept 64, wherein decoupling the collection vial from the filtration assembly comprises decoupling the collection vial from the filtration assembly while the plunger head is within the tubular container.

Inventive Concept 66. The method according to Inventive Concept 64,
  wherein the plunger head is shaped so as to define a plunger-head opening through the plunger head and into the internal plunger space,
  wherein the collection vial is shaped so as to define a vial opening and a shaft-passage hole at an end of the collection vial opposite the vial opening,
  wherein the sampling device includes a filter-withdrawal shaft, which (a) is disposed partially within the collection vial within the internal plunger space, (b) includes a proximal portion that is slidably disposed passing through the shaft-passage hole, and (c) includes a distal portion that passes through the vial opening and is directly or indirectly coupled to the filter, and
  wherein advancing the filter into the collection vial comprises proximally withdrawing the filter-withdrawal shaft, while the plunger head is within the tubular container, so as to pull the filter into the collection vial via the plunger-head opening and the vial opening, while the collection vial is disengageably coupled to the filtration assembly.

Inventive Concept 67. The method according to Inventive Concept 66, wherein decoupling the collection vial from the filtration assembly comprises further proximally withdrawing the filter-withdrawal shaft out of the internal plunger space, while the plunger head is within the tubular container, so as to pull the collection vial out of the internal plunger space via the plunger-space proximal opening.

Inventive Concept 68. The method according to Inventive Concept 64,
  wherein the collection vial is removably disposed at least partially within the internal plunger space while the collection vial is an axially-compressed configuration, and
  wherein the method further comprises elongating the collection vial from the axially-compressed configuration.

Inventive Concept 69. The method according to Inventive Concept 68, wherein a wall of the collection vial is accordion-shaped.

Inventive Concept 70. The method according to Inventive Concept 64, wherein the collection vial includes a flexible material and is removably disposed at least partially within the internal plunger space while the collection vial is an inverted configuration, in which the inverted collection vial defines a proximal vial opening.

Inventive Concept 71. The method according to Inventive Concept 70, wherein the inverted configuration is a double-inverted configuration.

Inventive Concept 72. The method according to Inventive Concept 70,
  wherein the plunger head is shaped so as to define a plunger-head opening through the plunger head and into the internal plunger space,
  wherein the sampling device includes a filter-withdrawal shaft, which (a) is disposed partially within the inverted collection vial within the internal plunger space, and (b) includes a distal portion that is directly or indirectly coupled to the filter, and
  wherein removing the filter from the tubular container comprises proximally withdrawing the filter-withdrawal shaft out of the internal plunger space, while the plunger head is within the tubular container, so as to invert the inverted collection vial to an uninverted configuration, to pull the filter into the collection vial via the plunger-head opening, to pull the collection vial out of the internal plunger space via the plunger-space proximal opening, and to remove the filter-withdrawal shaft and the filter from the filtration assembly.

Inventive Concept 73. The method according to Inventive Concept 62, wherein the collection vial is shaped so as to define a vial opening, and wherein the method further comprising advancing the filter into the collection vial via the vial opening while the collection vial is disengageably coupled to the filtration assembly.

Inventive Concept 74. The method according to Inventive Concept 73,
  wherein the sampling device further includes a shaft, and
  wherein advancing the filter into the collection vial comprises axially moving a distal portion of the shaft through the vial opening.

Inventive Concept 75. The method according to Inventive Concept 74,
  wherein the collection vial is removably disposed at least partially within the internal plunger space while the collection vial is an axially-compressed configuration,
  wherein the collection vial is elongatable from the axially-compressed configuration, and
  wherein advancing the filter into the collection vial comprises proximally withdrawing the shaft out of the internal plunger space, while the plunger head is within the tubular container, so as to pull the filter into the collection vial and to elongate the collection vial.

Inventive Concept 76. The method according to Inventive Concept 73, wherein decoupling the collection vial from the filtration assembly comprises decoupling the collection vial from the filtration assembly while the plunger head is within the tubular container.

Inventive Concept 77. The method according to Inventive Concept 76, wherein decoupling the collection vial from the filtration assembly comprises decoupling the collection vial from the filtration assembly without proximally withdrawing the plunger head within the tubular container.

Inventive Concept 78. The method according to Inventive Concept 62, wherein advancing the filter into the collection vial comprises advancing the filter into the collection vial while the plunger head is within the tubular container.

Inventive Concept 79. The method according to Inventive Concept 78, wherein advancing the filter into the collection vial comprises advancing the filter into the collection vial while the plunger head is advanced as far as possible within the tubular container.

Inventive Concept 80. The method according to Inventive Concept 62, wherein decoupling the collection vial from the filtration assembly comprises distally moving the collection vial with respect to the tubular container.

Inventive Concept 81. The method according to Inventive Concept 62,
  wherein the plunger head is shaped so as to define a plunger-head opening through the plunger head and into the internal plunger space,
  wherein the collection vial is positioned proximal to the plunger head, and
  wherein distally advancing the plunger head within the tubular container comprises distally advancing the plunger head and the collection vial within the tubular container so as to advance the filter into the collection vial via the plunger-head opening.

Inventive Concept 82. The method according to Inventive Concept 81, wherein distally advancing the plunger head and the collection vial within the tubular container advances the filter into the collection vial via the plunger-head opening while the filter remains stationary with respect to a distal end of the tubular container.

Inventive Concept 83. The method according to Inventive Concept 81,
  wherein the collection vial is shaped so as to define a vial opening, and wherein the sampling device is configured such that the filter is advanceable into the collection vial via the vial opening while the collection vial is disengageably coupled to the filtration assembly, and
  wherein the collection vial is positioned proximal to the plunger head such that the vial opening is in fluid communication with the plunger-head opening.

Inventive Concept 84. The method according to Inventive Concept 81,
  wherein the collection vial is shaped so as to define a vial opening, and wherein the sampling device is configured such that the filter is advanceable into the collection vial via the vial opening while the collection vial is disengageably coupled to the filtration assembly, and
  wherein the sampling device further includes a fluid-tight frangible seal, wherein the collection vial is positioned proximal to the plunger head such that the frangible seal removably blocks liquid flow from the plunger-head opening into the vial opening, such that upon breaching of the frangible seal the vial opening is in fluid communication with the plunger-head opening.

Inventive Concept 85. The method according to Inventive Concept 62,
  wherein the plunger head is shaped so as to define a plunger-head opening through the plunger head and into the internal plunger space,
  wherein the collection vial is positioned proximal to the plunger head, and
  wherein advancing the filter into the collection vial comprises moving the plunger head and the collection vial within the tubular container so as to advance the filter into the collection vial via the plunger-head opening.

Inventive Concept 86. The method according to Inventive Concept 85, wherein moving the plunger head and the collection vial within the tubular container comprises moving the plunger head and the collection vial within the tubular container so as to advance the filter into the collection vial via the plunger-head opening while the filter remains stationary with respect to a distal end of the tubular container.

Inventive Concept 87. The method according to Inventive Concept 85,
  wherein the collection vial is shaped so as to define a vial opening, and wherein advancing the filter into the collection vial comprises advancing the filter into the collection vial via the vial opening while the collection vial is disengageably coupled to the filtration assembly, and
  wherein the collection vial is positioned proximal to the plunger head such that the vial opening is in fluid communication with the plunger-head opening.

Inventive Concept 88. The method according to Inventive Concept 85,
  wherein the collection vial is shaped so as to define a vial opening, and wherein advancing the filter into the collection vial comprises advancing the filter into the collection vial via the vial opening while the collection vial is disengageably coupled to the filtration assembly, and
  wherein the sampling device further comprises a fluid-tight frangible seal, wherein the collection vial is positioned proximal to the plunger head such that the frangible seal removably blocks liquid flow from the plunger-head opening into the vial opening, such that upon breaching of the frangible seal the vial opening is in fluid communication with the plunger-head opening.

Inventive Concept 89. The method according to any one of Inventive Concepts 45-88, further comprising, after the filter has been removed from the tubular container, detecting the presence of a biological particulate trapped by the filter.

Inventive Concept 90. The method according to Inventive Concept 89, wherein detecting the presence of the biological particulate trapped by the filter comprising using a lateral flow immunoassay test strip to detect the presence of the biological particulate trapped by the filter.

Inventive Concept 91. The method according to Inventive Concept 89, wherein the biological particulate is selected from the group consisting of: a virus, a bacterium, a microorganism, a fungus, a spore, a mite, a biological cell, a biological antigen, a protein, a protein antigen, and a carbohydrate antigen.

There is still further provided, in accordance with an Inventive Concept 92 of the present invention, a sampling device for concentrating a liquid specimen sample, the sampling device comprising:
  (a) a filtration assembly, which comprises:
    (i) a tubular container, which is shaped so as to define an inner wall and a proximal container opening for receiving the liquid specimen sample;
    (ii) a plunger, which (A) comprises a plunger head, and (B) is insertable into the tubular container via the proximal container opening, such that a lateral surface of the plunger head forms a fluid-tight movable seal with the inner wall; and
    (iii) a filter; and
  (b) a collection vial, which is disengageably coupled to the filtration assembly,
  wherein the filtration assembly is configured such that movement of the plunger head within the tubular container, when the liquid specimen sample is contained in the tubular container and the filter is disposed in the tubular container, pushes at least a portion of the liquid specimen sample through the filter, and wherein the sampling device is configured such that the filter is advanceable into the collection vial while the collection vial is disengageably coupled to the filtration assembly.

Inventive Concept 93. The sampling device according to Inventive Concept 92, wherein the sampling device is configured such that the filter is advanceable entirely into the collection vial while the collection vial is disengageably coupled to the filtration assembly.

Inventive Concept 94. The sampling device according to Inventive Concept 92, wherein the collection vial is disengageably coupled to the tubular container of the filtration assembly.

Inventive Concept 95. The sampling device according to Inventive Concept 92, wherein the collection vial is not shaped so as to define any pressure-release openings and does not comprise any pressure-release valves.

Inventive Concept 96. The sampling device according to Inventive Concept 92, wherein the collection vial has a volume of between 1 and 50 ml.

Inventive Concept 97. The sampling device according to Inventive Concept 92, wherein the plunger comprises a plunger rod, which (a) has a distal end portion to which the plunger head is coupled, and (b) is shaped so as to define an internal plunger space having a plunger-space proximal opening through a proximal end of the plunger rod, and wherein the sampling device is configured such that the collection vial is removable from the filtration assembly via the plunger-space proximal opening while the plunger head is within the tubular container.

Inventive Concept 98. The sampling device according to Inventive Concept 97, wherein the plunger rod is shaped so as to define therewithin a waste liquid receptacle, wherein the plunger head is shaped so as to define a filter support, which is shaped so as to define (a) a distal support surface, (b) a plurality of filtrate-passage openings through the filter support into the waste liquid receptacle, and (c) the plunger-head opening, wherein the filter is disposed on the distal support surface, and wherein the filtration assembly is configured such that movement of the plunger head within the tubular container, when the liquid specimen sample is contained in the tubular container and the filter is disposed in the tubular container, pushes at least a portion of the liquid specimen sample through the filter and the filtrate-passage openings and into the waste liquid receptacle.

Inventive Concept 99. The sampling device according to Inventive Concept 97, wherein the collection vial is removably disposed at least partially within the internal plunger space.

Inventive Concept 100. The sampling device according to Inventive Concept 99, wherein the plunger head is shaped so as to define a plunger-head opening through the plunger head and into the internal plunger space, wherein the collection vial is shaped so as to define a vial opening and a shaft-passage hole at an end of the collection vial opposite the vial opening, wherein the sampling device is configured such that the filter is advanceable into the collection vial via the plunger-head opening and the vial opening while the collection vial is disengageably coupled to the filtration assembly, wherein the sampling device comprises a filter-withdrawal shaft, which (a) is disposed partially within the collection vial within the internal plunger space, (b) includes a proximal portion that is slidably disposed passing through the shaft-passage hole, and (c) includes a distal portion that is directly or indirectly coupled to the filter, and wherein the sampling device is configured such that proximal withdrawal of the filter-withdrawal shaft, while the plunger head is within the tubular container, pulls the filter into the collection vial via the plunger-head opening and the vial opening.

Inventive Concept 101. The sampling device according to Inventive Concept 99, wherein the collection vial is removably disposed at least partially within the internal plunger space while the collection vial is an axially-compressed configuration, and wherein the collection vial is elongatable from the axially-compressed configuration.

Inventive Concept 102. The sampling device according to Inventive Concept 101, wherein a wall of the collection vial is accordion-shaped.

Inventive Concept 103. The sampling device according to Inventive Concept 99, wherein the collection vial comprises a flexible material and is removably disposed at least partially within the internal plunger space while the collection vial is an inverted configuration, in which the inverted collection vial defines a proximal vial opening.

Inventive Concept 104. The sampling device according to Inventive Concept 103, wherein the inverted configuration is a double-inverted configuration.

Inventive Concept 105. The sampling device according to Inventive Concept 103, wherein the plunger head is shaped so as to define a plunger-head opening through the plunger head and into the internal plunger space, wherein the sampling device comprises a filter-withdrawal shaft, which (a) is disposed partially within the inverted collection vial within the internal plunger space, and (b) includes a distal portion that is directly or indirectly coupled to the filter, wherein the sampling device is configured such that proximal withdrawal of the filter-withdrawal shaft out of the internal plunger space, while the plunger head is within the tubular container, inverts the inverted collection vial to an uninverted configuration, pulls the filter into the collection vial via the plunger-head opening, pulls the collection vial out of the internal plunger space via the plunger-space proximal opening, and removes the filter-withdrawal shaft and the filter from the filtration assembly.

Inventive Concept 106. The sampling device according to Inventive Concept 92, wherein the collection vial is shaped so as to define a vial opening, and wherein the sampling device is configured such that the filter is advanceable into the collection vial via the vial opening while the collection vial is disengageably coupled to the filtration assembly.

Inventive Concept 107. The sampling device according to any one of Inventive Concepts 92-106, wherein the sampling device is configured such that the filter is advanceable into the collection vial while the plunger head is within the tubular container.

Inventive Concept 108. The sampling device according to Inventive Concept 107, wherein the sampling device is configured such that the filter is advanceable into the collection vial while the plunger head is advanced as far as possible within the tubular container.

Inventive Concept 109. The sampling device according to Inventive Concept 107, wherein the sampling device is configured such that the filter is advanceable into the collection vial without any proximal withdrawal of the plunger head within the tubular container.

Inventive Concept 110. The sampling device according to any one of Inventive Concepts 92-106, wherein the filtration assembly is configured such that when the plunger head is within the tubular container, fluid communication is blocked between (a) the tubular container distal to the plunger head and (b) the proximal container opening.

Inventive Concept 111. The sampling device according to Inventive Concept 110, wherein the filter is advanceable into the collection vial while the plunger head is within the tubular container.

Inventive Concept 112. The sampling device according to any one of Inventive Concepts 92-96,
wherein the collection vial is shaped so as to define a vial opening, and wherein the sampling device is configured such that the filter is advanceable into the collection vial via the vial opening while the collection vial is disengageably coupled to the filtration assembly,
wherein the sampling device further comprises a shaft, and
wherein the sampling device is configured such that that a distal portion of the shaft is axially movable through the vial opening so as to advance the filter into the collection vial via the vial opening.

Inventive Concept 113. The sampling device according to Inventive Concept 112,
wherein the plunger comprises a plunger rod, which (a) has a distal end portion to which the plunger head is coupled, and (b) is shaped so as to define an internal plunger space having a plunger-space proximal opening through a proximal end of the plunger rod,
wherein the collection vial is removably disposed at least partially within the internal plunger space while the collection vial is an axially-compressed configuration,
wherein the collection vial is elongatable from the axially-compressed configuration, and
wherein the sampling device is configured such that proximal withdrawal of the shaft out of the internal plunger space, while the plunger head is within the tubular container, pulls the filter into the collection vial and elongates the collection vial.

Inventive Concept 114. The sampling device according to Inventive Concept 112, wherein the shaft is coupled to the plunger.

Inventive Concept 115. The sampling device according to Inventive Concept 114, wherein the sampling device is configured such that the shaft remains axially stationary with respect to the plunger head during the movement of the plunger head within the tubular container.

Inventive Concept 116. The sampling device according to Inventive Concept 114, wherein the plunger head is shaped so as to define a plunger-head opening through the plunger head, and wherein the shaft is slidable through the plunger-head opening.

Inventive Concept 117. The sampling device according to Inventive Concept 116, wherein the plunger-head opening forms a fluid-tight movable seal with an outer surface of the shaft.

Inventive Concept 118. The sampling device according to any one of Inventive Concepts 92-96,
wherein the collection vial is shaped so as to define a vial opening, and wherein the sampling device is configured such that the filter is advanceable into the collection vial via the vial opening while the collection vial is disengageably coupled to the filtration assembly,
wherein the sampling device further comprises a fluid-tight frangible seal, and
wherein the collection vial is positioned distal to the filter such that the frangible seal removably blocks liquid flow into the vial opening.

Inventive Concept 119. The sampling device according to Inventive Concept 118, further comprising a liquid that is contained in the collection vial, for bathing the filter within the collection vial.

Inventive Concept 120. The sampling device according to Inventive Concept 119, wherein the liquid is selected from the group consisting of: a lysis buffer, saline solution, and transport medium.

Inventive Concept 121. The sampling device according to Inventive Concept 118,
wherein the filtration assembly further comprises a filter support, which is disposed within the tubular container,
wherein the filter support is shaped so as to define:
(a) a proximal support surface,
(b) a plurality of filtrate-passage openings through the filter support, and
(c) a filter-support shaft-passage region,
wherein the filter is disposed on the proximal support surface, and
wherein the collection vial is positioned distal to the filter such that the frangible seal removably blocks liquid flow through the filter-support shaft-passage region into the vial opening, such that upon breaching of the frangible seal the vial opening is in fluid communication with the filter-support shaft-passage region.

Inventive Concept 122. The sampling device according to Inventive Concept 121, wherein the filter-support shaft-passage region is shaped so as to define a filter-support opening through the filter support.

Inventive Concept 123. The sampling device according to Inventive Concept 122, wherein the proximal portion of the shaft is positioned within the filter-support opening, releasably coupled to the filter support by one or more frangible portions of the filtration assembly.

Inventive Concept 124. The sampling device according to Inventive Concept 121, wherein the filter-support shaft-passage region is at least partially frangible, and wherein the filter support and the shaft are configured such that axial movement of the proximal portion of the shaft through the filter-support shaft-passage region forms a filter-support opening through the filter support.

Inventive Concept 125. The sampling device according to Inventive Concept 124, wherein the filter-support shaft-passage region comprises a frangible membrane.

Inventive Concept 126. The sampling device according to Inventive Concept 124, wherein the filter-support shaft-passage region is integral with other portions of the filter support and is thinner than the other portions of the filter support.

Inventive Concept 127. The sampling device according to Inventive Concept 121, further comprising a waste liquid receptacle downstream of the filter support, wherein the filter support is shaped so as to define the filtrate-passage openings through the filter support into the waste liquid receptacle.

Inventive Concept 128. The sampling device according to Inventive Concept 127, wherein the filter support is not shaped so as to define the filter-support shaft-passage region into the waste liquid receptacle.

Inventive Concept 129. The sampling device according to Inventive Concept 121, wherein the collection vial is disengageably coupled to the filter support of the filtration assembly.

Inventive Concept 130. The sampling device according to Inventive Concept 121, wherein a cross-sectional area of the filter-support shaft-passage region is between 2.5% and 20% of a cross-sectional area of the proximal support surface of the filter support.

Inventive Concept 131. The sampling device according to Inventive Concept 121,
wherein the sampling device further comprises a shaft, and
wherein the filter support and the shaft are configured such that that a distal portion of the shaft is axially movable through the filter-support shaft-passage region and the vial opening so as to breach the frangible seal and advance the filter into the collection vial via the vial opening.

Inventive Concept 132. The sampling device according to Inventive Concept 131,
wherein the plunger comprises a plunger rod, which (a) has a distal end portion to which the plunger head is coupled, and (b) is shaped so as to define an internal plunger space, and
wherein the shaft is slidably disposed at least partially within the internal plunger space.

Inventive Concept 133. The sampling device according to Inventive Concept 132,
wherein a proximal end of the plunger rod is shaped so as to define a proximal opening of the internal plunger space, and
wherein a proximal portion of the shaft is accessible via the proximal opening of the internal plunger space.

Inventive Concept 134. The sampling device according to Inventive Concept 131, wherein a cross-sectional area of the distal portion of the shaft is between 80% and 110% of a cross-sectional area of the filter-support shaft-passage region.

Inventive Concept 135. The sampling device according to any one of Inventive Concepts 92-106, wherein the sampling device is configured such that the collection vial is decouplable from the filtration assembly while the plunger head is within the tubular container.

Inventive Concept 136. The sampling device according to Inventive Concept 135, wherein the sampling device is configured such that the collection vial is decouplable from the filtration assembly while the plunger head is advanced as far as possible within the tubular container.

Inventive Concept 137. The sampling device according to Inventive Concept 135, wherein the sampling device is configured such that the collection vial is decouplable from the filtration assembly without any proximal withdrawal of the plunger head within the tubular container.

Inventive Concept 138. The sampling device according to any one of Inventive Concepts 92-106, wherein the sampling device is configured such that the collection vial is decouplable from the filtration assembly by distal movement of the collection vial with respect to the tubular container.

Inventive Concept 139. The sampling device according to any one of Inventive Concepts 92-106, further comprising a waste liquid receptacle, wherein the collection vial is disposed at least partially alongside the waste liquid receptacle.

Inventive Concept 140. The sampling device according to Inventive Concept 139, wherein the collection vial extends distally beyond a distal end of the waste liquid receptacle.

Inventive Concept 141. The sampling device according to Inventive Concept 139, wherein the waste liquid receptacle surrounds the collection vial.

Inventive Concept 142. The sampling device according to Inventive Concept 141, wherein the collection vial extends distally beyond a distal end of the waste liquid receptacle.

Inventive Concept 143. The sampling device according to any one of Inventive Concepts 92-96,
wherein the collection vial is shaped so as to define a vial opening, and wherein the sampling device is configured such that the filter is advanceable into the collection vial via the vial opening while the collection vial is disengageably coupled to the filtration assembly, and
wherein the sampling device further comprises a collection vial cap, which is configured to seal the vial opening.

Inventive Concept 144. A testing kit comprising the sampling device according to any one of Inventive Concepts 92-106, the testing kit further comprising a liquid selected from the group consisting of: a lysis buffer, saline solution, and transport medium, for bathing the filter within the collection vial.

Inventive Concept 145. A testing kit comprising the sampling device according to any one of Inventive Concepts 92-106, the testing kit further comprising a lateral flow immunoassay test strip, which is configured to detect the presence of a biological particulate trapped by the filter.

Inventive Concept 146. The testing kit according to Inventive Concept 145, further comprising reagents for use with the lateral flow immunoassay test strip.

Inventive Concept 147. The testing kit according to Inventive Concept 145, wherein the biological particulate is selected from the group consisting of: a virus, a bacterium, a microorganism, a fungus, a spore, a mite, a biological cell, a biological antigen, a protein, a protein antigen, and a carbohydrate antigen.

Inventive Concept 148. The testing kit according to Inventive Concept 144, wherein the collection vial comprises an internal chamber, which contains the liquid and is configured to prevent spillage of the liquid out of the collection vial regardless of an orientation of the collection vial.

Inventive Concept 149. The testing kit according to Inventive Concept 148,
wherein the collection vial is shaped so as to define a vial opening, and wherein the sampling device is configured such that the filter is advanceable into the collection vial via the vial opening while the collection vial is disengageably coupled to the filtration assembly, and
wherein the testing kit further comprises a collection vial cap, which is configured to seal the vial opening, wherein the collection vial and the collection vial cap are configured such that placement of the collection vial cap on the vial opening automatically releases the liquid from the internal chamber.

Inventive Concept 150. The testing kit according to Inventive Concept 149, wherein the collection vial cap comprises a shaft that extends from an inner surface of the collection vial cap, and is configured to puncture the internal chamber when the collection vial cap is placed on the vial opening.

Inventive Concept 151. The sampling device according to any one of Inventive Concepts 92-96,
wherein the collection vial is shaped so as to define a vial opening, and wherein the sampling device is configured such that the filter is advanceable into the collection vial via the vial opening while the collection vial is disengageably coupled to the filtration assembly, wherein the plunger head is shaped so as to define a plunger-head opening through the plunger head, wherein the filtration assembly comprises a filter support, which is disposed within the tubular container, and is shaped so as to define: (a) a proximal support surface, (b) a plurality of filtrate-passage openings through the filter support, and (c) a filter-support shaft-passage region, wherein the filter is disposed on the proximal support surface, wherein the filtration assembly comprises a shaft, wherein the collection vial is positioned proximal to the plunger head such that the vial opening is in fluid communication with the plunger-head opening, and wherein the plunger head, the filter support, and the shaft are configured such that a proximal portion of the shaft is axially movable through the filter-support shaft-passage region, the plunger-head opening, and the vial opening.

Inventive Concept 152. The sampling device according to Inventive Concept 151, wherein the filter-support shaft-passage region is shaped so as to define a filter-support opening through the filter support.

Inventive Concept 153. The sampling device according to Inventive Concept 152, wherein the proximal portion of the shaft is positioned within the filter-support opening, releasably coupled to the filter support by one or more frangible portions of the filtration assembly.

Inventive Concept 154. The sampling device according to Inventive Concept 151, wherein the filter-support shaft-passage region is at least partially frangible, and wherein the filter support and the shaft are configured such that axial movement of the proximal portion of the shaft through the filter-support shaft-passage region forms a filter-support opening through the filter support.

Inventive Concept 155. The sampling device according to Inventive Concept 154, wherein the filter-support shaft-passage region comprises a frangible membrane.

Inventive Concept 156. The sampling device according to Inventive Concept 154, wherein the filter-support shaft-passage region is integral with other portions of the filter support and is thinner than the other portions of the filter support.

Inventive Concept 157. The sampling device according to any one of Inventive Concepts 92-106, wherein the plunger head is shaped so as to define a plunger-head opening through the plunger head, wherein the filtration assembly comprises a fluid-tight frangible seal, and wherein the collection vial is disengageably coupled to the plunger and positioned proximal to the plunger head such that the frangible seal removably blocks liquid flow from the plunger-head opening into a vial opening of the collection vial, such that upon breaching of the frangible seal the vial opening is in fluid communication with the plunger-head opening.

Inventive Concept 158. The sampling device according to Inventive Concept 157, wherein the sampling device is configured such that the movement of the plunger head and the collection vial within the tubular container advances the filter into the collection vial via the plunger-head opening and the vial opening.

Inventive Concept 159. The sampling device according to Inventive Concept 158, wherein the sampling device is configured such that distal advancement of the plunger head and the collection vial within the tubular container advances the filter into the collection vial via the plunger-head opening and the vial opening.

Inventive Concept 160. The sampling device according to any one of Inventive Concepts 92-106, for use on the Earth, wherein the plunger head is shaped so as to define a plunger-head opening through the plunger head, and wherein the collection vial is (i) positioned proximal to the plunger head such that a vial opening of the collection vial is in fluid communication with the plunger-head opening, and (ii) configured to prevent escape of air from the collection vial as pressure builds up in the collection vial during distal advancement of the plunger head in the tubular container while the sampling device is oriented such that the proximal container opening faces upward away from the Earth.

Inventive Concept 161. The sampling device according to any one of Inventive Concepts 92-106, wherein the plunger head is shaped so as to define a plunger-head opening through the plunger head, wherein the collection vial is positioned proximal to the plunger head, and wherein the sampling device is configured such that the movement of the plunger head and the collection vial within the tubular container advances the filter into the collection vial via the plunger-head opening.

Inventive Concept 162. The sampling device according to Inventive Concept 161, wherein the sampling device is configured such that the movement of the plunger head and the collection vial within the tubular container advances the filter into the collection vial via the plunger-head opening while the filter remains stationary with respect to a distal end of the tubular container.

Inventive Concept 163. The sampling device according to Inventive Concept 161, wherein the collection vial is shaped so as to define a vial opening, and wherein the sampling device is configured such that the filter is advanceable into the collection vial via the vial opening while the collection vial is disengageably coupled to the filtration assembly, and wherein the collection vial is positioned proximal to the plunger head such that the vial opening is in fluid communication with the plunger-head opening.

Inventive Concept 164. The sampling device according to Inventive Concept 161, wherein the collection vial is shaped so as to define a vial opening, and wherein the sampling device is configured such that the filter is advanceable into the collection vial via the vial opening while the collection vial is disengageably coupled to the filtration assembly, and wherein the sampling device further comprises a fluid-tight frangible seal, wherein the collection vial is positioned proximal to the plunger head such that the frangible seal removably blocks liquid flow from the plunger-head opening into the vial opening, such that upon breaching of the frangible seal the vial opening is in fluid communication with the plunger-head opening.

There is additionally provided, in accordance with an Inventive Concept 165 of the present invention, a method for concentrating a liquid specimen sample, the method comprising:

placing the liquid specimen sample in a tubular container of a filtration assembly of a sampling device;

inserting a plunger head of a plunger of the filtration assembly into the tubular container via a proximal container opening of the tubular container, while a collection vial is disengageably coupled to the filtration assembly, such that a lateral surface of the plunger head forms a fluid-tight movable seal with an inner wall of the tubular container;

distally advancing the plunger head within the tubular container to drive at least a portion of the liquid specimen sample through a filter of the filtration assembly;

advancing the filter into the collection vial while the collection vial is disengageably coupled to the filtration assembly; and thereafter, decoupling the collection vial from the filtration assembly.

Inventive Concept 166. The method according to Inventive Concept 165, wherein the filter is disposed within the tubular container before the liquid specimen sample is placed in the tubular container, and wherein placing the liquid specimen sample in the tubular container comprises placing the liquid specimen sample in the tubular container proximal to the filter that is disposed within the tubular container.

Inventive Concept 167. The method according to Inventive Concept 165, wherein advancing the filter into the collection vial comprises advancing the filter entirely into the collection vial while the collection vial is disengageably coupled to the filtration assembly.

Inventive Concept 168. The method according to Inventive Concept 165, wherein the collection vial is not shaped so as to define any pressure-release openings and does not comprise any pressure-release valves.

Inventive Concept 169. The method according to Inventive Concept 165,
  wherein the plunger comprises a plunger rod, which (a) has a distal end portion to which the plunger head is coupled, and (b) is shaped so as to define an internal plunger space having a plunger-space proximal opening through a proximal end of the plunger rod, and
  wherein decoupling the collection vial from the filtration assembly comprises removing the collection vial from the filtration assembly via the plunger-space proximal opening while the plunger head is within the tubular container.

Inventive Concept 170. The method according to Inventive Concept 169,
  wherein the plunger rod is shaped so as to define therewithin a waste liquid receptacle,
  wherein the plunger head is shaped so as to define a filter support, which is shaped so as to define (a) a distal support surface, (b) a plurality of filtrate-passage openings through the filter support into the waste liquid receptacle, and (c) the plunger-head opening,
  wherein the filter is disposed on the distal support surface, and
  wherein distally advancing the plunger head within the tubular container pushes at least a portion of the liquid specimen sample through the filter and the filtrate-passage openings and into the waste liquid receptacle.

Inventive Concept 171. The method according to Inventive Concept 169, wherein the collection vial is removably disposed at least partially within the internal plunger space.

Inventive Concept 172. The method according to Inventive Concept 171,
  wherein the plunger head is shaped so as to define a plunger-head opening through the plunger head and into the internal plunger space,
  wherein the collection vial is shaped so as to define a vial opening and a shaft-passage hole at an end of the collection vial opposite the vial opening, wherein advancing the filter into the collection vial comprises advancing the filter into the collection vial via the plunger-head opening and the vial opening while the collection vial is disengageably coupled to the filtration assembly,
  wherein the sampling device comprises a filter-withdrawal shaft, which (a) is disposed partially within the collection vial within the internal plunger space, (b) includes a proximal portion that is slidably disposed passing through the shaft-passage hole, and (c) includes a distal portion that is directly or indirectly coupled to the filter, and
  wherein advancing the filter into the collection vial comprises proximally withdrawing the filter-withdrawal shaft, while the plunger head is within the tubular container, so as to pull the filter into the collection vial via the plunger-head opening and the vial opening.

Inventive Concept 173. The method according to Inventive Concept 171,
  wherein the collection vial is removably disposed at least partially within the internal plunger space while the collection vial is an axially-compressed configuration, and
  wherein the method further comprises elongating the collection vial from the axially-compressed configuration.

Inventive Concept 174. The method according to Inventive Concept 173, wherein a wall of the collection vial is accordion-shaped.

Inventive Concept 175. The method according to Inventive Concept 171, wherein the collection vial includes a flexible material and is removably disposed at least partially within the internal plunger space while the collection vial is an inverted configuration, in which the inverted collection vial defines a proximal vial opening.

Inventive Concept 176. The method according to Inventive Concept 175, wherein the inverted configuration is a double-inverted configuration.

Inventive Concept 177. The method according to Inventive Concept 175,
  wherein the plunger head is shaped so as to define a plunger-head opening through the plunger head and into the internal plunger space,
  wherein the sampling device comprises a filter-withdrawal shaft, which (a) is disposed partially within the inverted collection vial within the internal plunger space, and (b) includes a distal portion that is directly or indirectly coupled to the filter,
  wherein removing the filter from the tubular container comprises proximally withdrawing the filter-withdrawal shaft out of the internal plunger space, while the plunger head is within the tubular container, so as to invert the inverted collection vial to an uninverted configuration, to pull the filter into the collection vial via the plunger-head opening, to pull the collection vial out of the internal plunger space via the plunger-space proximal opening, and to remove the filter-withdrawal shaft and the filter from the filtration assembly.

Inventive Concept 178. The method according to Inventive Concept 165, wherein advancing the filter into the collection vial comprises advancing the filter into the collection vial via a vial opening of the collection vial while the collection vial is disengageably coupled to the filtration assembly.

Inventive Concept 179. The method according to any one of Inventive Concepts 165-178, wherein advancing the filter into the collection vial comprises advancing the filter into the collection vial while the plunger head is within the tubular container.

Inventive Concept 180. The method according to Inventive Concept 179, wherein advancing the filter into the collection vial comprises advancing the filter into the collection vial while the plunger head is advanced as far as possible within the tubular container.

Inventive Concept 181. The method according to Inventive Concept 179, wherein advancing the filter into the collection vial comprises advancing the filter into the collection vial without proximally withdrawing the plunger head within the tubular container.

Inventive Concept 182. The method according to any one of Inventive Concepts 165-178, wherein the filtration assembly is configured such that when the plunger head is within the tubular container, fluid communication is blocked between (a) the tubular container distal to the plunger head and (b) the proximal container opening.

Inventive Concept 183. The method according to Inventive Concept 182, wherein advancing the filter into the collection vial comprises advancing the filter into the collection vial while the plunger head is within the tubular container.

Inventive Concept 184. The method according to any one of Inventive Concepts 165-168, wherein the collection vial is disengageably coupled to the tubular container of the filtration assembly.

Inventive Concept 185. The method according to any one of Inventive Concepts 165-168,
  wherein the sampling device further includes a shaft, and
  wherein advancing the filter into the collection vial comprises axially moving a distal portion of the shaft through a vial opening of the collection vial so as to advance the filter into the collection vial via the vial opening.

Inventive Concept 186. The method according to Inventive Concept 185,
  wherein the plunger comprises a plunger rod, which (a) has a distal end portion to which the plunger head is coupled, and (b) is shaped so as to define an internal plunger space having a plunger-space proximal opening through a proximal end of the plunger rod,
  wherein the collection vial is removably disposed at least partially within the internal plunger space while the collection vial is an axially-compressed configuration,
  wherein the collection vial is elongatable from the axially-compressed configuration, and
  wherein advancing the filter into the collection vial comprises proximally withdrawing the shaft out of the internal plunger space, while the plunger head is within the tubular container, so as to pull the filter into the collection vial and to elongate the collection vial.

Inventive Concept 187. The method according to Inventive Concept 185, wherein the shaft is coupled to the plunger.

Inventive Concept 188. The method according to Inventive Concept 187, wherein distally advancing the plunger head within the tubular container comprises distally advancing the plunger head within the tubular container while the shaft remains axially stationary with respect to the plunger head.

Inventive Concept 189. The method according to Inventive Concept 187, wherein the plunger head is shaped so as to define a plunger-head opening through the plunger head, and wherein the shaft is slidable through the plunger-head opening.

Inventive Concept 190. The method according to Inventive Concept 189, wherein the plunger-head opening forms a fluid-tight movable seal with an outer surface of the shaft.

Inventive Concept 191. The method according to any one of Inventive Concepts 165-168,
  wherein the sampling device further includes a fluid-tight frangible seal, and
  wherein the collection vial is positioned distal to the filter such that the frangible seal removably blocks liquid flow into a vial opening of the collection vial.

Inventive Concept 192. The method according to Inventive Concept 191, further comprising a liquid that is contained in the collection vial, for bathing the filter within the collection vial.

Inventive Concept 193. The method according to Inventive Concept 192, wherein the liquid is selected from the group consisting of: a lysis buffer, saline solution, and transport medium.

Inventive Concept 194. The method according to Inventive Concept 191,
  wherein the filtration assembly further includes a filter support, which is disposed within the tubular container,
  wherein the filter support is shaped so as to define:
    (a) a proximal support surface,
    (b) a plurality of filtrate-passage openings through the filter support, and
    (c) a filter-support shaft-passage region,
  wherein the filter is disposed on the proximal support surface, and
  wherein the collection vial is positioned distal to the filter such that the frangible seal removably blocks liquid flow through the filter-support shaft-passage region into the vial opening, such that upon breaching of the frangible seal the vial opening is in fluid communication with the filter-support shaft-passage region.

Inventive Concept 195. The method according to Inventive Concept 194, wherein the filter-support shaft-passage region is shaped so as to define a filter-support opening through the filter support.

Inventive Concept 196. The method according to Inventive Concept 195, wherein the proximal portion of the shaft is positioned within the filter-support opening, releasably coupled to the filter support by one or more frangible portions of the filtration assembly.

Inventive Concept 197. The method according to Inventive Concept 194, wherein the filter-support shaft-passage region is at least partially frangible, and wherein the filter support and the shaft are configured such that axial movement of the proximal portion of the shaft through the filter-support shaft-passage region forms a filter-support opening through the filter support.

Inventive Concept 198. The method according to Inventive Concept 197, wherein the filter-support shaft-passage region comprises a frangible membrane.

Inventive Concept 199. The method according to Inventive Concept 197, wherein the filter-support shaft-passage region is integral with other portions of the filter support and is thinner than the other portions of the filter support.

Inventive Concept 200. The method according to Inventive Concept 194, further comprising a waste liquid receptacle downstream of the filter support, wherein the filter support is shaped so as to define the filtrate-passage openings through the filter support into the waste liquid receptacle.

Inventive Concept 201. The method according to Inventive Concept 200, wherein the filter support is not shaped so as to define the filter-support shaft-passage region into the waste liquid receptacle.

Inventive Concept 202. The method according to Inventive Concept 194, wherein the collection vial is disengageably coupled to the filter support of the filtration assembly.

Inventive Concept 203. The method according to Inventive Concept 194, wherein the sampling device further includes a shaft, and
wherein advancing the filter into the collection vial comprises axially moving a distal portion of the shaft through the filter-support shaft-passage region and the vial opening so as to breach the frangible seal and advance the filter into the collection vial via the vial opening.

Inventive Concept 204. The method according to Inventive Concept 203,
wherein the plunger includes a plunger rod, which (a) has a distal end portion to which the plunger head is coupled, and (b) is shaped so as to define an internal plunger space, and
wherein the shaft is slidably disposed at least partially within the internal plunger space.

Inventive Concept 205. The method according to Inventive Concept 204,
wherein a proximal end of the plunger rod is shaped so as to define a proximal opening of the internal plunger space, and
wherein the method further comprises accessing a proximal portion of the shaft via the proximal opening of the internal plunger space.

Inventive Concept 206. The method according to any one of Inventive Concepts 165-168, wherein decoupling the collection vial from the filtration assembly comprises decoupling the collection vial from the filtration assembly while the plunger head is within the tubular container.

Inventive Concept 207. The method according to Inventive Concept 206, wherein decoupling the collection vial from the filtration assembly comprises decoupling the collection vial from the filtration assembly while the plunger head is advanced as far as possible within the tubular container.

Inventive Concept 208. The method according to Inventive Concept 206, wherein decoupling the collection vial from the filtration assembly comprises decoupling the collection vial from the filtration assembly without proximally withdrawing the plunger head within the tubular container.

Inventive Concept 209. The method according to any one of Inventive Concepts 165-168, wherein decoupling the collection vial from the filtration assembly comprises distally moving the collection vial with respect to the tubular container.

Inventive Concept 210. The method according to any one of Inventive Concepts 165-178, wherein the sampling device further includes a waste liquid receptacle, and wherein the collection vial is disposed at least partially alongside the waste liquid receptacle.

Inventive Concept 211. The method according to Inventive Concept 210, wherein the collection vial extends distally beyond a distal end of the waste liquid receptacle.

Inventive Concept 212. The method according to Inventive Concept 210, wherein the waste liquid receptacle surrounds the collection vial.

Inventive Concept 213. The method according to Inventive Concept 212, wherein the collection vial extends distally beyond a distal end of the waste liquid receptacle.

Inventive Concept 214. The method according to any one of Inventive Concepts 165-168, further comprising sealing a vial opening of the collection vial with a collection vial cap after the filter has been advanced into the collection vial via the vial opening.

Inventive Concept 215. The method according to any one of Inventive Concepts 165-178, further comprising bathing the filter with a liquid within the collection vial after the filter has been advanced into the collection vial.

Inventive Concept 216. The method according to Inventive Concept 215, wherein the liquid is selected from the group consisting of: a lysis buffer, saline solution, and transport medium.

Inventive Concept 217. The method according to Inventive Concept 215, wherein the collection vial includes an internal chamber, which contains the liquid and is configured to prevent spillage of the liquid out of the collection vial regardless of an orientation of the collection vial.

Inventive Concept 218. The method according to Inventive Concept 217, further comprising, after the filter has been advanced into the collection vial via a vial opening of the collection vial, sealing the vial opening with a collection vial cap so as to automatically release the liquid from the internal chamber.

Inventive Concept 219. The method according to Inventive Concept 218, wherein the collection vial cap includes a shaft that extends from an inner surface of the collection vial cap, and is configured to puncture the internal chamber when the collection vial cap is placed on the vial opening.

Inventive Concept 220. The method according to any one of Inventive Concepts 165-168, further comprising, after the filter has been advanced into the collection vial, detecting the presence of a biological particulate trapped by the filter.

Inventive Concept 221. The method according to Inventive Concept 220, wherein detecting the presence of the biological particulate trapped by the filter comprising using a lateral flow immunoassay test strip to detect the presence of the biological particulate trapped by the filter.

Inventive Concept 222. The method according to Inventive Concept 220, wherein the biological particulate is selected from the group consisting of: a virus, a bacterium, a microorganism, a fungus, a spore, a mite, a biological cell, a biological antigen, a protein, a protein antigen, and a carbohydrate antigen.

Inventive Concept 223. The method according to any one of Inventive Concepts 165-178,
wherein the plunger head is shaped so as to define a plunger-head opening through the plunger head,
wherein the collection vial is positioned proximal to the plunger head, and
wherein distally advancing the plunger head within the tubular container comprises distally advancing the plunger head and the collection vial within the tubular container so as to advance the filter into the collection vial via the plunger-head opening.

Inventive Concept 224. The method according to Inventive Concept 223, wherein distally advancing the plunger head and the collection vial within the tubular container advances the filter into the collection vial via the plunger-head opening while the filter remains stationary with respect to a distal end of the tubular container.

Inventive Concept 225. The method according to Inventive Concept 223,
wherein the collection vial is shaped so as to define a vial opening, and wherein the sampling device is configured such that the filter is advanceable into the collection vial via the vial opening while the collection vial is disengageably coupled to the filtration assembly, and
wherein the collection vial is positioned proximal to the plunger head such that the vial opening is in fluid communication with the plunger-head opening.

Inventive Concept 226. The method according to Inventive Concept 223,
wherein the collection vial is shaped so as to define a vial opening, and wherein the sampling device is configured such that the filter is advanceable into the collection vial via the vial opening while the collection vial is disengageably coupled to the filtration assembly, and wherein the sampling device further includes a fluid-tight frangible seal, and wherein the collection vial is positioned proximal to the plunger head such that the frangible seal removably blocks liquid flow from the plunger-head opening into the vial opening, such that upon breaching of the frangible seal the vial opening is in fluid communication with the plunger-head opening.

There is yet additionally provided, in accordance with an Inventive Concept 227 of the present invention, a sampling device for concentrating a liquid specimen sample, the sampling device comprising:
(a) a filtration assembly, which comprises:
  (i) a tubular container, which is shaped so as to define a proximal container opening and an inner wall;
  (ii) a plunger, which (A) comprises a plunger head, which is shaped so as to define a plunger-head opening through the plunger head, and (B) is insertable into the tubular container via the proximal container opening, such that a lateral surface of the plunger head forms a fluid-tight movable seal with the inner wall;
  (iii) a filter support, which is disposed within the tubular container, and is shaped so as to define: (A) a proximal support surface, (B) a plurality of filtrate-passage openings through the filter support, and (C) a filter-support shaft-passage region;
  (iv) a filter, which is disposed on the proximal support surface; and
  (v) a shaft; and
(b) a collection vial, which is positioned proximal to the plunger head such that a vial opening of the collection vial is in fluid communication with the plunger-head opening,
wherein the plunger head, the filter support, and the shaft are configured such that a proximal portion of the shaft is axially movable through the filter-support shaft-passage region, the plunger-head opening, and the vial opening.

There is also provided, in accordance with an Inventive Concept 228 of the present invention, a sampling device for concentrating a liquid specimen sample, the sampling device comprising:
(a) a filtration assembly, which comprises:
  (i) a tubular container, which is shaped so as to define a proximal container opening and an inner wall; and
  (ii) a plunger, which (A) comprises a plunger head, which is shaped so as to define a plunger-head opening through the plunger head, and (B) is insertable into the tubular container via the proximal container opening, such that a lateral surface of the plunger head forms a fluid-tight movable seal with the inner wall;
(b) a fluid-tight frangible seal; and
(c) a collection vial, which is disengageably coupled to the plunger and positioned proximal to the plunger head such that the frangible seal removably blocks liquid flow from the plunger-head opening into a vial opening of the collection vial, such that upon breaching of the frangible seal the vial opening is in fluid communication with the plunger-head opening.

Inventive Concept 229. The sampling device according to Inventive Concept 228, wherein the filtration assembly further comprises a filter disposed within the tubular container.

Inventive Concept 230. The sampling device according to Inventive Concept 229, wherein the plunger is insertable into the tubular container from outside the tubular container via the proximal container opening while the filter is disposed within the tubular container.

Inventive Concept 231. The sampling device according to Inventive Concept 229, wherein the sampling device is configured such that movement of the plunger head and the collection vial within the tubular container advances the filter into the collection vial via the plunger-head opening and the vial opening.

Inventive Concept 232. The sampling device according to Inventive Concept 231, wherein the sampling device is configured such that the movement of the plunger head and the collection vial within the tubular container advances the filter entirely into the collection vial via the plunger-head opening and the vial opening.

Inventive Concept 233. The sampling device according to Inventive Concept 231, wherein the sampling device is configured such that distal advancement of the plunger head and the collection vial within the tubular container advances the filter into the collection vial via the plunger-head opening and the vial opening.

Inventive Concept 234. The sampling device according to Inventive Concept 233, wherein the sampling device is configured such that the distal advancement of the plunger head and the collection vial within the tubular container advances the filter entirely into the collection vial via the plunger-head opening and the vial opening.

Inventive Concept 235. The sampling device according to Inventive Concept 228, wherein the filtration assembly further comprises:
  a filter support, which is disposed within the tubular container, and is shaped so as to define: (a) a proximal support surface, and (b) a plurality of filtrate-passage openings through the filter support; and
  a filter, which is disposed on the proximal support surface.

Inventive Concept 236. The sampling device according to Inventive Concept 235, further comprising a shaft,
  wherein the filter support is shaped so as to define a filter-support shaft-passage region, and
  wherein the plunger head, the filter support, and the shaft are configured such that a proximal portion of the shaft is axially movable through the filter-support shaft-passage region, the plunger-head opening, and the vial opening.

There is further provided, in accordance with an Inventive Concept 237 of the present invention, a sampling device for concentrating a liquid specimen sample, for use on the Earth, the sampling device comprising:
(a) a filtration assembly, which comprises:
  (i) a tubular container, which is shaped so as to define a proximal container opening and an inner wall; and
  (ii) a plunger, which (A) comprises a plunger head, which is shaped so as to define a plunger-head opening through the plunger head, and (B) is insertable into the tubular container via the proximal container opening, such that a lateral surface of the plunger head forms a fluid-tight movable seal with the inner wall; and
(b) a collection vial, which is (i) positioned proximal to the plunger head such that a vial opening of the collection vial is in fluid communication with the plunger-head opening, and (ii) configured to prevent escape of air from the collection vial as pressure builds up in the collection vial during distal advancement of the plunger head in the tubular container while the sampling device is oriented such that the proximal container opening faces upward away from the Earth.

Inventive Concept 238. The sampling device according to Inventive Concept 237, wherein the filtration assembly further comprises a filter disposed within the tubular container.

Inventive Concept 239. The sampling device according to Inventive Concept 238, wherein the plunger is insertable into the tubular container from outside the tubular container via the proximal container opening while the filter is disposed within the tubular container.

Inventive Concept 240. The sampling device according to Inventive Concept 238, wherein the sampling device is configured such that movement of the plunger head and the collection vial within the tubular container advances the filter into the collection vial via the plunger-head opening and the vial opening.

Inventive Concept 241. The sampling device according to Inventive Concept 240, wherein the sampling device is configured such that the movement of the plunger head and the collection vial within the tubular container advances the filter entirely into the collection vial via the plunger-head opening and the vial opening.

Inventive Concept 242. The sampling device according to Inventive Concept 240, wherein the sampling device is configured such that distal advancement of the plunger head and the collection vial within the tubular container advances the filter into the collection vial via the plunger-head opening and the vial opening.

Inventive Concept 243. The sampling device according to Inventive Concept 242, wherein the sampling device is configured such that the distal advancement of the plunger head and the collection vial within the tubular container advances the filter entirely into the collection vial via the plunger-head opening and the vial opening.

Inventive Concept 244. The sampling device according to Inventive Concept 237, wherein the filtration assembly further comprises:
- a filter support, which is disposed within the tubular container, and is shaped so as to define: (a) a proximal support surface, and (b) a plurality of filtrate-passage openings through the filter support; and
- a filter, which is disposed on the proximal support surface.

Inventive Concept 245. The sampling device according to Inventive Concept 244, further comprising a shaft,
- wherein the filter support is shaped so as to define a filter-support shaft-passage region, and
- wherein the plunger head, the filter support, and the shaft are configured such that a proximal portion of the shaft is axially movable through the filter-support shaft-passage region, the plunger-head opening, and the vial opening.

There is still further provided, in accordance with an Inventive Concept 246 of the present invention, a sampling device for concentrating a liquid specimen sample, the sampling device comprising:
- (a) a filtration assembly, which comprises:
  - (i) a tubular container, which is shaped so as to define a proximal container opening and an inner wall;
  - (ii) a plunger, which (A) comprises a plunger head, which is shaped so as to define a plunger-head opening through the plunger head, and (B) is insertable into the tubular container via the proximal container opening, such that a lateral surface of the plunger head forms a fluid-tight movable seal with the inner wall; and
  - (iii) a filter; and
- (b) a collection vial, which is positioned proximal to the plunger head, and is shaped so as to define a vial opening,
- wherein the sampling device is configured such that movement of the plunger head and the collection vial within the tubular container advances the filter into the collection vial via the plunger-head opening and the vial opening.

Inventive Concept 247. The sampling device according to Inventive Concept 246, wherein the sampling device is configured such that the movement of the plunger head and the collection vial within the tubular container advances the filter entirely into the collection vial via the plunger-head opening and the vial opening.

Inventive Concept 248. The sampling device according to Inventive Concept 246, wherein the sampling device is configured such that the movement of the plunger head and the collection vial within the tubular container advances the filter into the collection vial via the plunger-head opening and the vial opening while the filter remains stationary with respect to a distal end of the tubular container.

Inventive Concept 249. The sampling device according to Inventive Concept 246, wherein the sampling device is configured such that distal advancement of the plunger head and the collection vial within the tubular container advances the filter into the collection vial via the plunger-head opening and the vial opening.

Inventive Concept 250. The sampling device according to Inventive Concept 249, wherein the sampling device is configured such that the distal advancement of the plunger head and the collection vial within the tubular container advances the filter entirely into the collection vial via the plunger-head opening and the vial opening.

Inventive Concept 251. The sampling device according to Inventive Concept 246, wherein the collection vial is positioned proximal to the plunger head such that the vial opening is in fluid communication with the plunger-head opening.

Inventive Concept 252. The sampling device according to Inventive Concept 251, wherein the collection vial is configured to prevent escape of air from the collection vial as pressure builds up in the collection vial during distal advancement of the plunger head in the tubular container while the sampling device is oriented such that the proximal container opening faces upward away from the Earth.

Inventive Concept 253. The sampling device according to Inventive Concept 246, further comprising a fluid-tight frangible seal, wherein the collection vial is positioned proximal to the plunger head such that the frangible seal removably blocks liquid flow from the plunger-head opening into the vial opening, such that upon breaching of the frangible seal the vial opening is in fluid communication with the plunger-head opening.

Inventive Concept 254. The sampling device according to Inventive Concept 253, wherein the collection vial is disengageably coupled to the plunger.

Inventive Concept 255. The sampling device according to Inventive Concept 246, wherein the filter is disposed within the tubular container.

Inventive Concept 256. The sampling device according to Inventive Concept 255, wherein the plunger is insertable into the tubular container from outside the tubular container via the proximal container opening while the filter is disposed within the tubular container.

Inventive Concept 257. The sampling device according to Inventive Concept 255,
   wherein the filtration assembly further comprises a filter support, which is disposed within the tubular container, and is shaped so as to define: (a) a proximal support surface, and (b) a plurality of filtrate-passage openings through the filter support, and
   wherein the filter is disposed on the proximal support surface.

Inventive Concept 258. The sampling device according to Inventive Concept 257, further comprising a shaft,
   wherein the filter support is shaped so as to define a filter-support shaft-passage region, and
   wherein the plunger head, the filter support, and the shaft are configured such that a proximal portion of the shaft is axially movable through the filter-support shaft-passage region, the plunger-head opening, and the vial opening.

Inventive Concept 259. The sampling device according to Inventive Concept 258,
   wherein the sampling device further comprises a fluid-tight frangible seal,
   wherein the collection vial is positioned proximal to the plunger head such that the frangible seal removably blocks liquid flow from the plunger-head opening into the vial opening, such that upon breaching of the frangible seal the vial opening is in fluid communication with the plunger-head opening,
   wherein the sampling device is configured such that:
      movement of the plunger head and the collection vial within the tubular container advances the filter into the collection vial via the plunger-head opening and the vial opening, and
      relative axial movement between the shaft and the collection vial causes the proximal portion of the shaft to breach the frangible seal and push the filter into the collection vial via the vial opening.

Inventive Concept 260. The sampling device according to any one of Inventive Concepts 227, 236, 245, and 258, wherein the filter-support shaft-passage region is shaped so as to define a filter-support opening through the filter support.

Inventive Concept 261. The sampling device according to Inventive Concept 260, wherein the proximal portion of the shaft is positioned within the filter-support opening, releasably coupled to the filter support by one or more frangible portions of the filtration assembly.

Inventive Concept 262. The sampling device according to Inventive Concept 260, wherein a proximal end of the proximal portion of the shaft is positioned within the filter-support opening.

Inventive Concept 263. The sampling device according to Inventive Concept 260, wherein the proximal portion of the shaft is positioned within the filter-support opening such that a proximal end of the proximal portion of the shaft is flush with the proximal support surface.

Inventive Concept 264. The sampling device according to Inventive Concept 260, wherein the proximal portion of the shaft is positioned within the filter-support opening such that a proximal end of the proximal portion of the shaft protrudes proximally from the support surface of the filter support.

Inventive Concept 265. The sampling device according to any one of Inventive Concepts 227, 236, 245, and 258, wherein the filter-support shaft-passage region is at least partially frangible, and wherein the filter support and the shaft are configured such that axial movement of the proximal portion of the shaft through the filter-support shaft-passage region forms a filter-support opening through the filter support.

Inventive Concept 266. The sampling device according to Inventive Concept 265, wherein the filter-support shaft-passage region comprises a frangible membrane.

Inventive Concept 267. The sampling device according to Inventive Concept 265, wherein the filter-support shaft-passage region is integral with other portions of the filter support and is thinner than the other portions of the filter support.

Inventive Concept 268. The sampling device according to any one of Inventive Concepts 227, 228, 237, and 246, wherein the collection vial is not shaped so as to define any pressure-release openings and does not comprise any pressure-release valves.

Inventive Concept 269. The sampling device according to any one of Inventive Concepts 227, 228, 237, and 246, wherein the filtration assembly is configured such that when the plunger head is within the tubular container, fluid communication is blocked between (a) the tubular container distal to the plunger head and (b) the proximal container opening.

Inventive Concept 270. The sampling device according to any one of Inventive Concepts 227, 229, 235, 238, 244, and 246,
   wherein the filtration assembly is configured such that when the plunger head is within the tubular container, fluid communication is blocked between (a) the tubular container distal to the plunger head and (b) the proximal container opening, and
   wherein the filter is advanceable into the collection vial while the plunger head is within the tubular container.

Inventive Concept 271. The sampling device according to any one of Inventive Concepts 227, 236, 245, and 258, wherein a proximal end of the proximal portion of the shaft is positioned within the tubular container distal to the filter-support shaft-passage region.

Inventive Concept 272. The sampling device according to any one of Inventive Concepts 227, 235-236, 244-245, and 257-258, wherein the filter support is slidable along the tubular container.

Inventive Concept 273. The sampling device according to Inventive Concept 272, wherein a lateral surface of the filter support is configured to form a fluid-tight movable seal with the inner wall of the tubular container.

Inventive Concept 274. The sampling device according to Inventive Concept 272, wherein the sampling device is configured such that:
   first distal advancement of the plunger head within the tubular container, when the liquid specimen sample is contained in the tubular container and the filter is disposed in the tubular container, pushes at least a portion of the liquid specimen sample through the filter, without pushing the filter support distally within the tubular container, and
   further second distal advancement of the plunger head pushes the filter support distally within the tubular container.

Inventive Concept 275. The sampling device according to Inventive Concept 274, wherein the sampling device is configured such that the further second distal advancement of the plunger head pushes the filter support distally within the tubular container in the absence of a filter-support release action by a user.

Inventive Concept 276. The sampling device according to Inventive Concept 274, wherein the sampling device is configured such that the further second distal advancement of the plunger head pushes the filter support distally within the tubular container with respect to the shaft, such that the proximal portion of the shaft pushes the filter through the filter-support shaft-passage region, the plunger-head opening, and the vial opening, into the collection vial.

Inventive Concept 277. The sampling device according to Inventive Concept 276, wherein the filter support and the shaft are releasably coupled to each other such that:
the first distal advancement of the plunger head within the tubular container does not decouple the filter support from the shaft, and
the further second distal advancement of the plunger head decouples the filter support from the shaft.

Inventive Concept 278. The sampling device according to Inventive Concept 277, wherein the proximal portion of the shaft is releasably coupled to the filter support by one or more frangible portions of the filtration assembly.

Inventive Concept 279. The sampling device according to Inventive Concept 276, wherein the filter support and the shaft are releasably axially locked with respect to each other such that:
the first distal advancement of the plunger head within the tubular container does not axially unlock the filter support and the shaft with respect to each other, and
the further second distal advancement of the plunger head axially unlocks the filter support and the shaft with respect to each other, thereby enabling axial movement with respect to each other.

Inventive Concept 280. The sampling device according to Inventive Concept 279, wherein the filtration assembly comprises one or more release controls, which are configured to axially unlock the filter support and the shaft with respect to each other upon actuation of the one or more release controls by the further second distal advancement of the plunger head.

Inventive Concept 281. The sampling device according to Inventive Concept 274, wherein the plunger comprises a plunger rod, which has a distal end portion to which the plunger head is disengageably coupled.

Inventive Concept 282. The sampling device according to Inventive Concept 281, wherein the sampling device is configured such that the plunger head becomes decoupled from the plunger rod as the plunger head distally pushes the filter support within the tubular container.

Inventive Concept 283. The sampling device according to any one of Inventive Concepts 227, 236, 245, and 258, wherein the sampling device is configured such that:
movement of the plunger head and the collection vial within the tubular container advances the filter into the collection vial via the plunger-head opening and the vial opening, and
relative axial movement between the shaft and the collection vial causes the proximal portion of the shaft to push the filter into the collection vial via the vial opening.

Inventive Concept 284. The sampling device according to any one of Inventive Concepts 227-258, wherein a cross-sectional area of the plunger-head opening is between 20% and 90% of a cross-sectional area of a distal surface of the plunger head.

Inventive Concept 285. The sampling device according to any one of Inventive Concepts 227, 236, 245, and 258, wherein a cross-sectional area of the filter-support shaft-passage region is between 2.5% and 20% of a cross-sectional area of the proximal support surface of the filter support.

Inventive Concept 286. The sampling device according to any one of Inventive Concepts 227, 236, 245, and 258, wherein a cross-sectional area of the proximal portion of the shaft is between 80% and 110% of a cross-sectional area of the filter-support shaft-passage region.

Inventive Concept 287. The sampling device according to any one of Inventive Concepts 227-258, wherein the collection vial has a volume of between 1 and 50 ml.

Inventive Concept 288. The sampling device according to any one of Inventive Concepts 227, 237-245, and 246-258, wherein the collection vial is disengageably coupled to the plunger.

Inventive Concept 289. The sampling device according to any one of Inventive Concepts 228-236 and 288, wherein the sampling device is configured such that the collection vial is decouplable from the plunger while the plunger head is within the tubular container.

Inventive Concept 290. The sampling device according to Inventive Concept 289, wherein the sampling device is configured such that the collection vial is decouplable from the plunger via a proximal end of the plunger.

Inventive Concept 291. The sampling device according to Inventive Concept 289, wherein the sampling device is configured such that the collection vial is decouplable from the plunger while the plunger head is advanced as far as possible within the tubular container.

Inventive Concept 292. The sampling device according to Inventive Concept 289, wherein the sampling device is configured such that the collection vial is decouplable from the plunger without any proximal withdrawal of the plunger head within the tubular container.

Inventive Concept 293. The sampling device according to any one of Inventive Concepts 228-236 and 288,
wherein the plunger comprises a plunger rod, which (a) has a distal end portion to which the plunger head is coupled, and (b) is shaped so as to define an internal plunger space, and
wherein the collection vial is removably disposed at least partially within the internal plunger space.

Inventive Concept 294. The sampling device according to Inventive Concept 293,
wherein a proximal end of the plunger rod is shaped so as to define a proximal opening of the internal plunger space, and
wherein the collection vial is removable from the internal plunger space through the proximal opening.

Inventive Concept 295. The sampling device according to Inventive Concept 294, wherein the sampling device comprises one or more couplers, which are configured to disengageably couple an external surface of the collection vial axially with respect to a proximal portion of the plunger rod.

Inventive Concept 296. The sampling device according to Inventive Concept 295, wherein the one or more couplers are configured to disengageably couple the external surface of the collection vial axially with respect to a flange defined by the proximal portion of the plunger rod.

Inventive Concept 297. The sampling device according to Inventive Concept 293, wherein the collection vial is removably disposed partially within the internal plunger space, with an axial portion of the collection vial protruding proximally out of the proximal opening, the axial portion of the collection vial including an end of the collection vial opposite an end of the collection vial that defines the vial opening.

Inventive Concept 298. The sampling device according to Inventive Concept 297, wherein the axial portion of the collection vial protrudes proximally out of the proximal opening by at least 4 cm.

Inventive Concept 299. The sampling device according to any one of Inventive Concepts 228-236 and 288,
- wherein the plunger comprises a plunger rod, which has a distal end portion to which the plunger head is coupled, and
- wherein the collection vial is disposed alongside the plunger rod.

Inventive Concept 300. The sampling device according to any one of Inventive Concepts 227, 236, 245, and 258, wherein the proximal portion of the shaft is axially fixed with respect to the proximal container opening.

Inventive Concept 301. The sampling device according to Inventive Concept 300, wherein the filter support is slidable along the tubular container.

Inventive Concept 302. The sampling device according to any one of Inventive Concepts 227, 236, 245, and 258, wherein the proximal portion of the shaft is axially movable with respect to the proximal container opening.

Inventive Concept 303. The sampling device according to Inventive Concept 302, wherein the sampling device is configured to automatically axially move the shaft through the filter-support shaft-passage region, the plunger-head opening, and the vial opening.

Inventive Concept 304. The sampling device according to Inventive Concept 302, wherein the sampling device further comprises a spring, which is configured to axially move the proximal portion of the shaft with respect to the proximal container opening.

Inventive Concept 305. The sampling device according to Inventive Concept 302,
- wherein the tubular container includes a distal tubular portion that is distal to the filter support and is configured to have an adjustable length, and
- wherein the sampling device is configured such that shortening of the adjustable length axially moves the shaft through the filter-support shaft-passage region, the plunger-head opening, and the vial opening.

Inventive Concept 306. The sampling device according to Inventive Concept 305, wherein the distal tubular portion is axially collapsible to provide the shortening of the length of the distal tubular portion.

Inventive Concept 307. The sampling device according to any one of Inventive Concepts 227-258, further comprising a collection vial cap, which is configured to seal the vial opening.

Inventive Concept 308. A testing kit comprising the sampling device according to any one of Inventive Concepts 227-258, the testing kit further comprising a liquid selected from the group consisting of: a lysis buffer, saline solution, and transport medium, for bathing the filter within the collection vial.

Inventive Concept 309. A testing kit comprising the sampling device according to any one of Inventive Concepts 227-245, the testing kit further comprising a lateral flow immunoassay test strip, which is configured to detect the presence of a biological particulate trapped by the filter.

Inventive Concept 310. The testing kit according to Inventive Concept 309, further comprising reagents for use with the lateral flow immunoassay test strip.

Inventive Concept 311. The testing kit according to Inventive Concept 309, wherein the biological particulate is selected from the group consisting of: a virus, a bacterium, a microorganism, a fungus, a spore, a mite, a biological cell, a biological antigen, a protein, a protein antigen, and a carbohydrate antigen.

Inventive Concept 312. The testing kit according to Inventive Concept 308, wherein the collection vial comprises an internal chamber, which contains the liquid and is configured to prevent spillage of the liquid out of the collection vial regardless of an orientation of the collection vial.

Inventive Concept 313. The testing kit according to Inventive Concept 312, further comprising a collection vial cap, which is configured to seal the vial opening, wherein the collection vial and the collection vial cap are configured such that placement of the collection vial cap on the vial opening automatically releases the liquid from the internal chamber.

Inventive Concept 314. The testing kit according to Inventive Concept 313, wherein the collection vial cap comprises a shaft that extends from an inner surface of the collection vial cap, and is configured to puncture the internal chamber when the collection vial cap is placed on the vial opening.

There is additionally provided, in accordance with an Inventive Concept 315 of the present invention, a sampling device for concentrating a liquid specimen sample, the sampling device comprising:
- (a) a filtration assembly, which comprises:
  - (i) a tubular container, which is shaped so as to define a proximal container opening and an inner wall;
  - (ii) a plunger, which (A) comprises a plunger head, which is shaped so as to define a plunger-head opening through the plunger head, and (B) is insertable into the tubular container via the proximal container opening, such that a lateral surface of the plunger head forms a fluid-tight movable seal with the inner wall; and
  - (iii) a filter; and
- (b) a collection vial, which is positioned proximal to the plunger head,
- wherein the sampling device is configured such that movement of the plunger head and the collection vial within the tubular container advances the filter into the collection vial via the plunger-head opening and a vial opening of the collection vial.

There is yet additionally provided, in accordance with an Inventive Concept 316 of the present invention, a method for concentrating a liquid specimen sample, the method comprising:
- placing the liquid specimen sample in a tubular container of a filtration assembly of a sampling device, proximal to a filter that is disposed within the tubular container;
- inserting a plunger head of a plunger of the filtration assembly into the tubular container via a proximal container opening of the tubular container, while a collection vial is positioned proximal to the plunger head, such that a lateral surface of the plunger head forms a fluid-tight movable seal with an inner wall of the tubular container;
- distally advancing the plunger head within the tubular container to drive at least a portion of the liquid specimen sample through the filter; and
- advancing the filter into the collection vial via (a) a plunger-head opening defined through the plunger head and (b) a vial opening of the collection vial.

Inventive Concept 317. The method according to Inventive Concept 316, wherein advancing the filter into the collection vial comprises advancing the filter entirely into the collection vial via the plunger-head opening and the vial opening of the collection vial.

Inventive Concept 318. The method according to Inventive Concept 316, wherein advancing the filter into the collection vial comprises advancing the filter into the collection vial while the filter remains stationary with respect to a distal end of the tubular container.

Inventive Concept 319. The method according to Inventive Concept 316, wherein advancing the filter into the collection vial via the plunger-head opening and the vial opening comprises moving the plunger head and the collection vial within the tubular container.

Inventive Concept 320. The method according to Inventive Concept 316, wherein advancing the filter into the collection vial via the plunger-head opening and the vial opening comprises axially moving a proximal portion of a shaft of the sampling device and the collection vial with respect to each other, such that (a) the proximal portion of the shaft moves through the plunger-head opening and the vial opening, and (a) a proximal end of the shaft pushes the filter through the plunger-head opening into the collection vial via the vial opening.

Inventive Concept 321. The method according to Inventive Concept 320, wherein the proximal portion of the shaft is axially fixed with respect to the proximal container opening.

Inventive Concept 322. The method according to Inventive Concept 316,
wherein the collection vial is positioned proximal to the plunger head such that the vial opening is in fluid communication with the plunger-head opening, and
wherein distally advancing the plunger head within the tubular container comprises distally advancing the plunger head within the tubular container, while the sampling device is oriented such that the proximal container opening faces upward away from the Earth, to drive the at least a portion of the liquid specimen sample through the filter.

Inventive Concept 323. The method according to Inventive Concept 316,
wherein the collection vial is positioned proximal to the plunger head such that a fluid-tight frangible seal of the sampling device removably blocks flow of the liquid specimen sample from the plunger-head opening into the vial opening, and
wherein advancing the filter into the collection vial via the plunger-head opening and the vial opening of the collection vial comprises breaching the frangible seal such that the vial opening is in fluid communication with the plunger-head opening.

Inventive Concept 324. The method according to any one of Inventive Concepts 316-323,
wherein placing the liquid specimen sample in the tubular container comprises placing the liquid specimen sample in the tubular container proximal to the filter that is disposed on a proximal support surface defined by a filter support that is disposed within the tubular container, and
wherein distally advancing the plunger head within the tubular container comprises distally advancing the plunger head within the tubular container to drive the at least a portion of the liquid specimen sample through the filter and a plurality of filtrate-passage openings defined by the filter support.

Inventive Concept 325. The method according to Inventive Concept 324, wherein a lateral surface of the filter support is configured to form a fluid-tight movable seal with the inner wall of the tubular container.

Inventive Concept 326. The method according to Inventive Concept 324,
wherein the filter support is slidable along the tubular container,
wherein the method further comprises, after distally advancing the plunger head within the tubular container to drive the at least a portion of the liquid specimen sample through the filter and the filtrate-passage openings of the filter support, further distally advancing the plunger head within the tubular container such that the plunger head distally pushes the filter support within the tubular container.

Inventive Concept 327. The method according to Inventive Concept 324, wherein advancing the filter into the collection vial via the plunger-head opening and the vial opening comprises axially moving a proximal portion of a shaft of the sampling device and the collection vial with respect to each other, such that (a) the proximal portion of the shaft moves through (i) a filter-support shaft-passage region defined by the filter support, (ii) the plunger-head opening, and (iii) the vial opening, and (a) a proximal end of the shaft pushes the filter through the plunger-head opening into the collection vial via the vial opening.

Inventive Concept 328. The method according to Inventive Concept 327, wherein the filter-support shaft-passage region is shaped so as to define a filter-support opening through the filter support.

Inventive Concept 329. The method according to Inventive Concept 328, wherein the proximal portion of the shaft is positioned within the filter-support opening, releasably coupled to the filter support by one or more frangible portions of the filtration assembly.

Inventive Concept 330. The method according to Inventive Concept 327, wherein the filter-support shaft-passage region is at least partially frangible, and wherein the filter support and the shaft are configured such that axial movement of the proximal portion of the shaft through the filter-support shaft-passage region forms a filter-support opening through the filter support.

Inventive Concept 331. The method according to Inventive Concept 330, wherein the filter-support shaft-passage region comprises a frangible membrane.

Inventive Concept 332. The method according to Inventive Concept 330, wherein the filter-support shaft-passage region is integral with other portions of the filter support and is thinner than the other portions of the filter support.

Inventive Concept 333. The method according to any one of Inventive Concepts 316-323, wherein the collection vial is disengageably coupled to the plunger, and wherein the method further comprises decoupling the collection vial from the plunger after advancing the filter into the collection vial.

Inventive Concept 334. The method according to Inventive Concept 333, wherein decoupling the collection vial from the plunger comprises decoupling the collection vial from the plunger while the plunger head is within the tubular container.

Inventive Concept 335. The method according to Inventive Concept 334, wherein decoupling the collection vial from the plunger comprises decoupling the collection vial from the plunger via a proximal end of the plunger.

Inventive Concept 336. The method according to Inventive Concept 334, wherein decoupling the collection vial from the plunger comprises decoupling the collection vial from the plunger while the plunger head is advanced as far as possible within the tubular container.

Inventive Concept 337. The method according to Inventive Concept 334, wherein decoupling the collection vial from the plunger comprises decoupling the collection vial from the plunger without proximally withdrawing the plunger head within the tubular container.

Inventive Concept 338. The method according to Inventive Concept 333,
- wherein the plunger includes a plunger rod, which (a) has a distal end portion to which the plunger head is coupled, and (b) is shaped so as to define an internal plunger space, and
- wherein inserting the plunger head into the tubular container comprises inserting the plunger head into the tubular container while the collection vial is disposed at least partially within the internal plunger space.

Inventive Concept 339. The method according to Inventive Concept 338, wherein decoupling the collection vial from the plunger comprises removing the collection vial from the internal plunger space through a proximal opening of the internal plunger space.

Inventive Concept 340. The method according to Inventive Concept 338, wherein inserting the plunger head into the tubular container comprises inserting the plunger head into the tubular container while the collection vial is disposed partially within the internal plunger space, with an axial portion of the collection vial protruding proximally out of the proximal opening, the axial portion of the collection vial including an end of the collection vial opposite an end of the collection vial that defines the vial opening.

Inventive Concept 341. The method according to Inventive Concept 340, wherein the axial portion of the collection vial protrudes proximally out of the proximal opening by at least 4 cm.

Inventive Concept 342. The method according to Inventive Concept 340, wherein distally advancing the plunger head within the tubular container to drive the at least a portion of the liquid specimen sample through the filter comprises pushing on the axial portion of the collection vial.

Inventive Concept 343. The method according to Inventive Concept 333,
- wherein the plunger comprises a plunger rod, which has a distal end portion to which the plunger head is coupled, and
- wherein inserting the plunger head into the tubular container comprises inserting the plunger head into the tubular container while the collection vial is disposed alongside the plunger rod.

Inventive Concept 344. The method according to any one of Inventive Concepts 316-323,
- wherein advancing the filter into the collection vial via the plunger-head opening and the vial opening comprises axially moving a proximal portion of a shaft of the sampling device and the collection vial with respect to each other, such that (a) the proximal portion of the shaft moves through the plunger-head opening and the vial opening, and (a) a proximal end of the shaft pushes the filter through the plunger-head opening into the collection vial via the vial opening, and
- wherein the proximal portion of the shaft is axially movable with respect to the proximal container opening.

Inventive Concept 345. The method according to Inventive Concept 344, wherein the sampling device is configured to automatically axially move the shaft through the filter-support shaft-passage region, the plunger-head opening, and the vial opening.

Inventive Concept 346. The method according to Inventive Concept 344, wherein the sampling device further comprises a spring, which is configured to axially move the proximal portion of the shaft with respect to the proximal container opening.

Inventive Concept 347. The method according to Inventive Concept 344,
- wherein placing the liquid specimen sample in the tubular container comprises placing the liquid specimen sample in the tubular container proximal to the filter that is disposed on a proximal support surface defined by a filter support that is disposed within the tubular container, and
- wherein distally advancing the plunger head within the tubular container comprises distally advancing the plunger head within the tubular container to drive the at least a portion of the liquid specimen sample through the filter and a plurality of filtrate-passage openings defined by the filter support,
- wherein the tubular container includes a distal tubular portion that is distal to the filter support and is configured to have an adjustable length, and
- wherein axially moving the proximal portion of the shaft and the collection vial with respect to each other comprises shortening the adjustable length, so as to axially move the shaft through the filter-support shaft-passage region, the plunger-head opening, and the vial opening.

Inventive Concept 348. The method according to Inventive Concept 347, wherein shortening the adjustable length comprises axially collapsing the distal tubular portion.

Inventive Concept 349. The method according to any one of Inventive Concepts 316-323, further comprising sealing the vial opening with a collection vial cap after the filter has been advanced into the collection vial.

Inventive Concept 350. The method according to any one of Inventive Concepts 316-323, further comprising bathing the filter with a liquid within the collection vial when the filter is in the collection vial.

Inventive Concept 351. The method according to Inventive Concept 350, wherein the liquid is selected from the group consisting of: a lysis buffer, saline solution, and transport medium.

Inventive Concept 352. The method according to Inventive Concept 350, wherein the collection vial includes an internal chamber, which contains the liquid and is configured to prevent spillage of the liquid out of the collection vial regardless of an orientation of the collection vial.

Inventive Concept 353. The method according to Inventive Concept 352, further comprising, after the filter has been advanced into the collection vial, sealing the vial opening with a collection vial cap so as to automatically release the liquid from the internal chamber.

Inventive Concept 354. The method according to Inventive Concept 353, wherein the collection vial cap includes a shaft that extends from an inner surface of the collection vial cap, and is configured to puncture the internal chamber when the collection vial cap is placed on the vial opening.

Inventive Concept 355. The method according to any one of Inventive Concepts 316-323, further comprising, after the filter has been advanced into the collection vial, detecting the presence of a biological particulate trapped by the filter.

Inventive Concept 356. The method according to Inventive Concept 355, wherein detecting the presence of the biological particulate trapped by the filter comprising using a lateral flow immunoassay test strip to detect the presence of the biological particulate trapped by the filter.

Inventive Concept 357. The method according to Inventive Concept 355, wherein the biological particulate is selected from the group consisting of: a virus, a bacterium, a microorganism, a fungus, a spore, a mite, a biological cell, a biological antigen, a protein, a protein antigen, and a carbohydrate antigen.

The present invention will be more fully understood from the following detailed description of embodiments thereof, taken together with the drawings, in which:

BRIEF DESCRIPTION OF THE DRAWINGS

FIG. 5 is an enlarged schematic illustration of a plunger and a collection vial of the sampling device of FIGS. 1A-G in the state shown in FIGS. 1A and 2A, in accordance with an application of the present invention;

FIGS. 6A-G are schematic illustrations of another sampling device for concentrating a liquid specimen sample, and a method of using the sampling device, in accordance with respective applications of the present invention;

FIGS. 7A-F are schematic illustrations of yet another sampling device for concentrating a liquid specimen sample, and a method of using the sampling device, in accordance with respective applications of the present invention;

FIGS. 8A-F are schematic cross-sectional illustrations of the sampling device of FIGS. 7A-F and the method of using the sampling device, in accordance with respective applications of the present invention;

FIGS. 9A-C are schematic illustrations of portions of the sampling device of FIGS. 7A-F, in accordance with respective applications of the present invention;

FIGS. 13A-D are schematic illustrations of filters, in accordance with respective applications of the present invention;

FIGS. 18A-G are schematic illustrations of yet another sampling device for concentrating a liquid specimen sample, and a method of using the sampling device, in accordance with respective applications of the present invention;

FIGS. 23A-D are schematic illustrations of the sampling device of FIGS. 22A-B and a method of using the sampling device, in accordance with respective applications of the present invention;

FIGS. 24A-D are schematic cross-sectional illustrations of the sampling device of FIGS. 22A-B and the method of using the sampling device, in accordance with respective applications of the present invention;

FIGS. 27A-D are schematic illustrations of the sampling device of FIGS. 26A-B and a method of using the sampling device, in accordance with respective applications of the present invention;

FIGS. 28A-D are schematic cross-sectional illustrations of the sampling device of FIGS. 26A-B and the method of using the sampling device, in accordance with respective applications of the present invention;

FIGS. 31A-D are schematic illustrations of the sampling device of FIGS. 30A-B and a method of using the sampling device, in accordance with respective applications of the present invention;

FIGS. 32A-D, which are schematic cross-sectional illustrations of the sampling device of FIGS. 30A-B and a method of using the sampling device, in accordance with respective applications of the present invention;

FIGS. 38A-D are schematic cross-sectional illustrations of the sampling device of FIGS. 36A-B and the method of using the sampling device, in accordance with respective applications of the present invention;

FIGS. 41A-E are schematic illustrations of the sampling device of FIGS. 40A-B and a method of using the sampling device, in accordance with respective applications of the present invention;

FIGS. 42A-E are schematic cross-sectional illustrations of the sampling device of FIGS. 40A-B and the method of using the sampling device, in accordance with respective applications of the present invention;

FIGS. 43A-E are schematic illustrations of still another sampling device and a method of using the sampling device, in accordance with respective applications of the present invention;

FIGS. 45A-B are schematic illustrations of a distal portion of a plunger head, in accordance with an application of the present invention.

DETAILED DESCRIPTION OF APPLICATIONS

In some embodiments of the present invention, a sampling device 20 is provided for concentrating a liquid specimen sample 22.

Reference is made to FIGS. 1A-G, which are schematic illustrations of a sampling device 120 for concentrating liquid specimen sample 22, and a method of using sampling device 120, in accordance with respective applications of the present invention. Sampling device 120 is one implementation of sampling device 20.

Reference is also made to FIGS. 2A-G, which are schematic cross-sectional illustrations of sampling device 120 and the method of using sampling device 120, in accordance with respective applications of the present invention.

Figure 1:
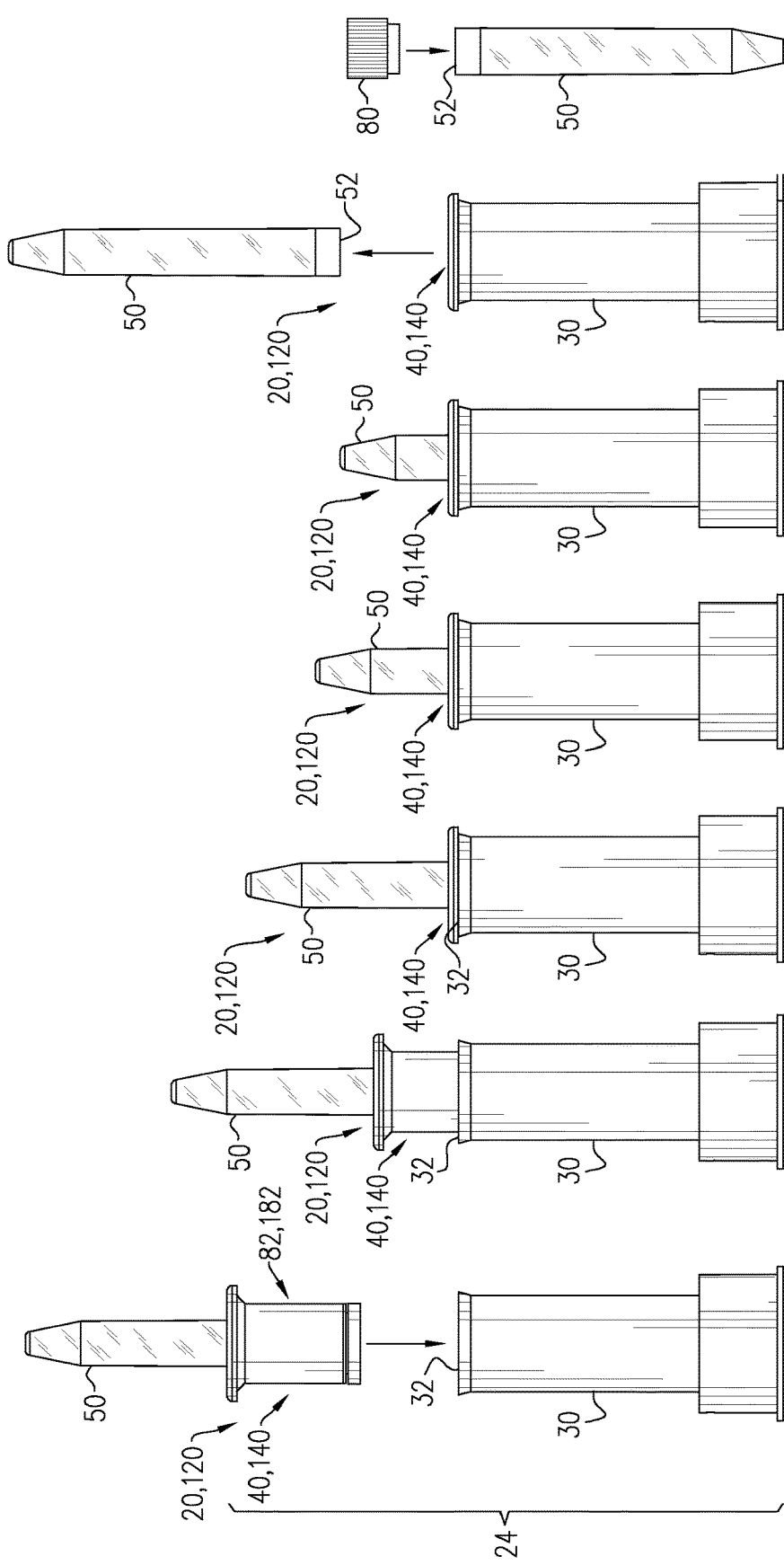
FIGS. 1A-G are schematic illustrations of a sampling device for concentrating a liquid specimen sample, and a method of using the sampling device, in accordance with respective applications of the present invention.
Figure 2:
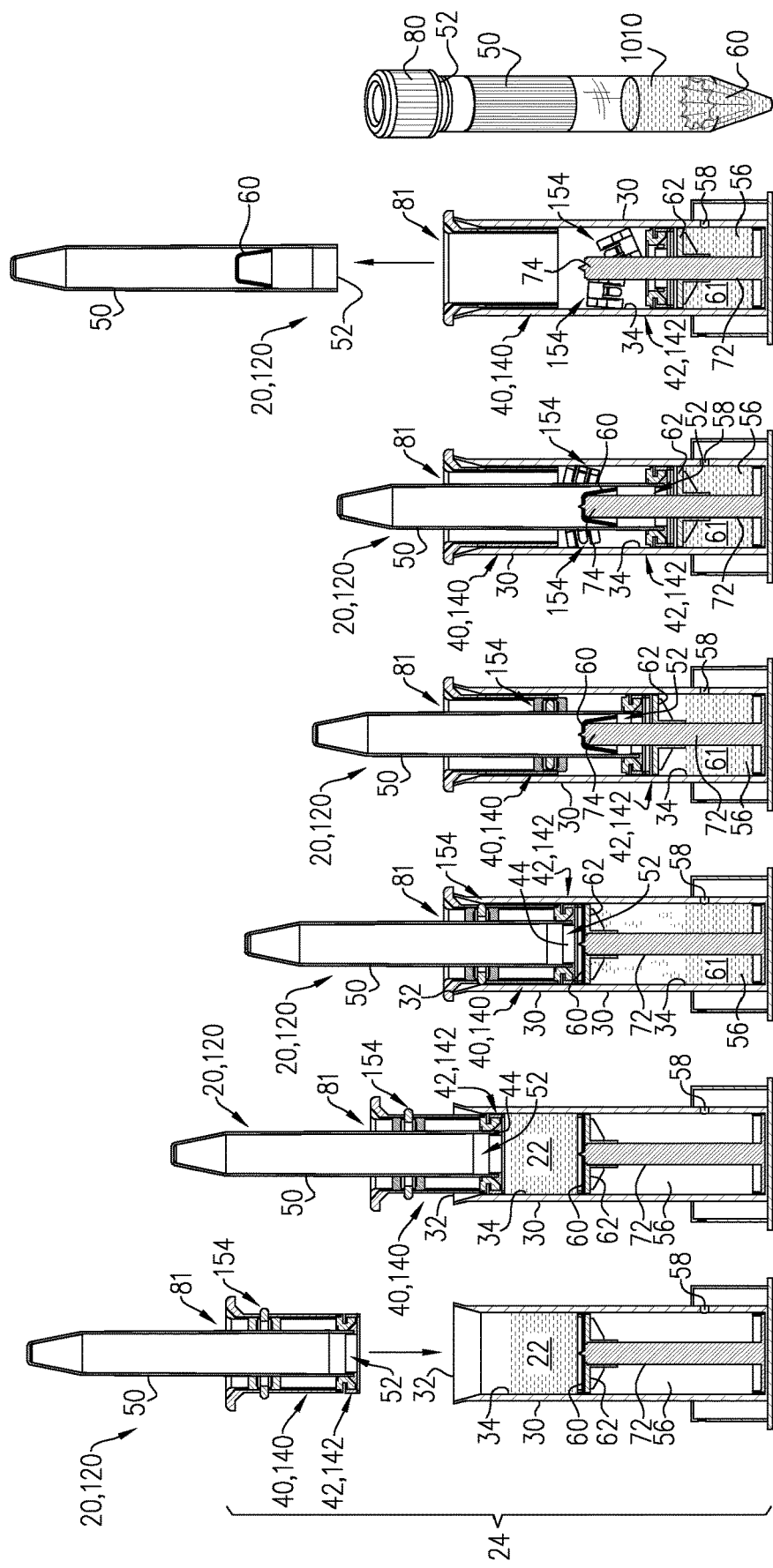
FIGS. 2A-G are schematic cross-sectional illustrations of the sampling device of FIGS. 1A-G and the method of using the sampling device, in accordance with respective applications of the present invention.
Figure 3:
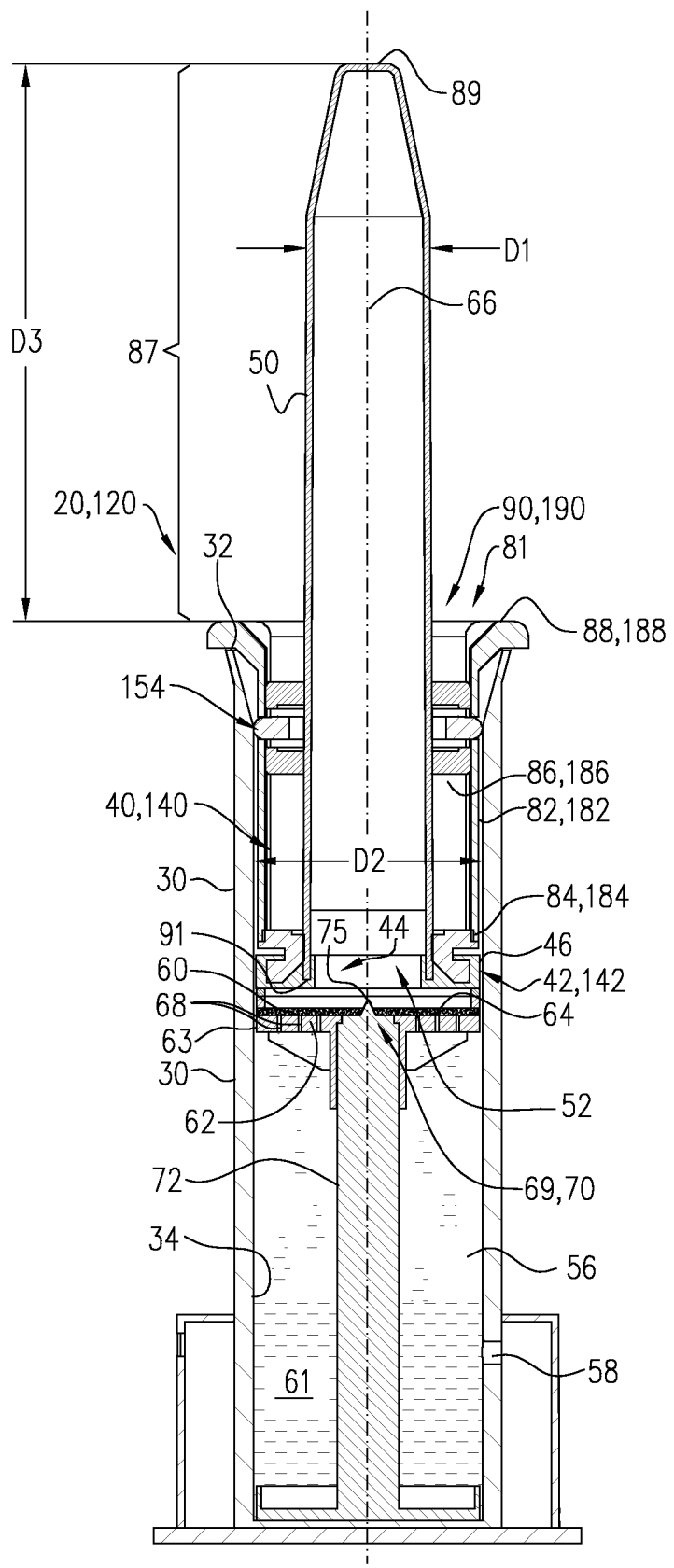
FIG. 3 is an enlarged schematic illustration of the sampling device of FIGS. 1A-G in the state shown in FIGS. 1C and 2C, in accordance with an application of the present invention.

Reference is further made to FIG. 3, which is an enlarged schematic illustration of sampling device 120 in the state shown in FIGS. 1C and 2C, in accordance with an application of the present invention.

Figure 4A:
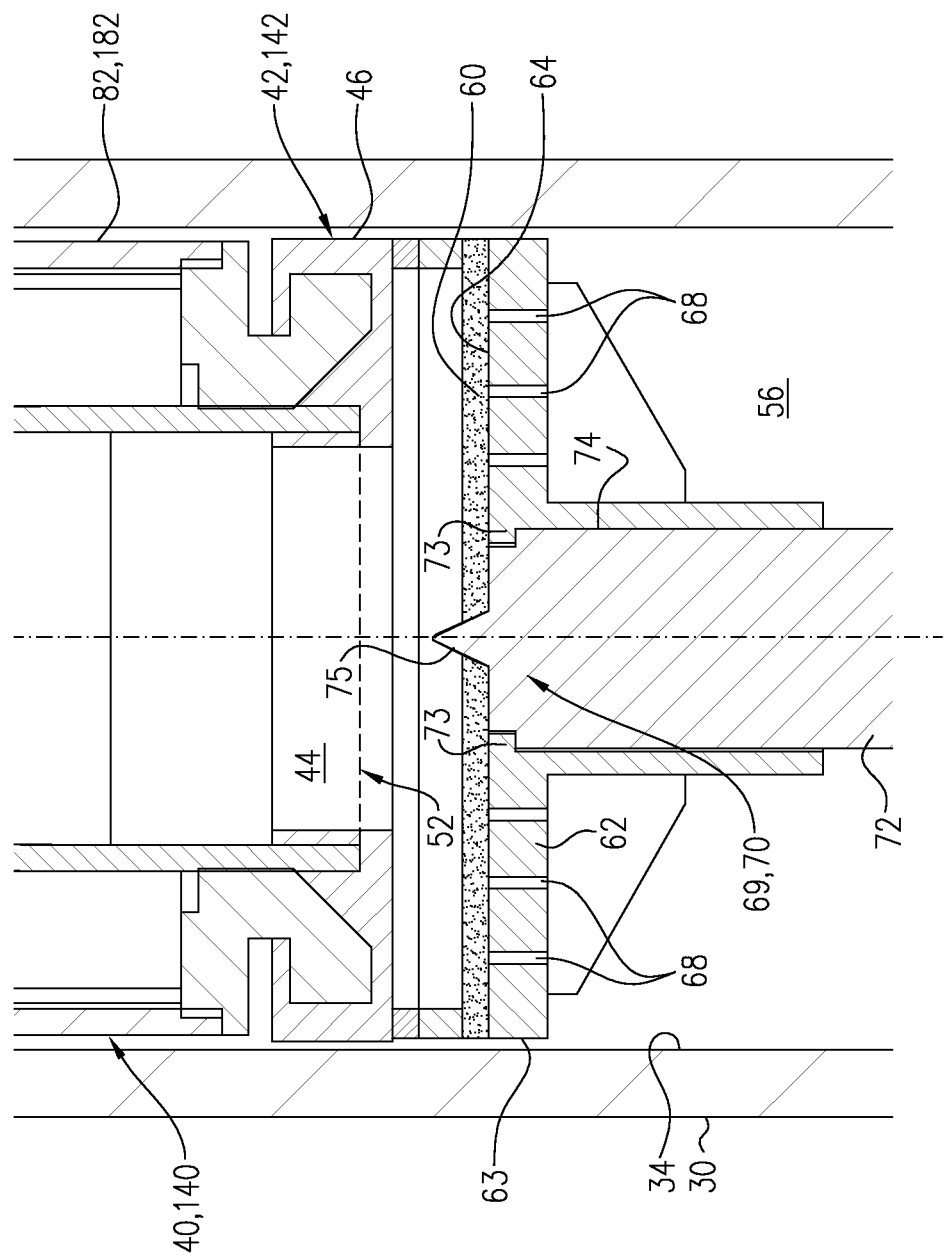
FIG. 4A is an enlarged schematic illustration of a portion of the sampling device of FIGS. 1A-G in the state shown in FIGS. 1C and 2C, in accordance with an application of the present invention.

Reference is still further made to FIG. 4A, which is an enlarged schematic illustration of a portion of sampling device 120 in the state shown in FIGS. 1C and 2C, in accordance with an application of the present invention.

Figure 4B:
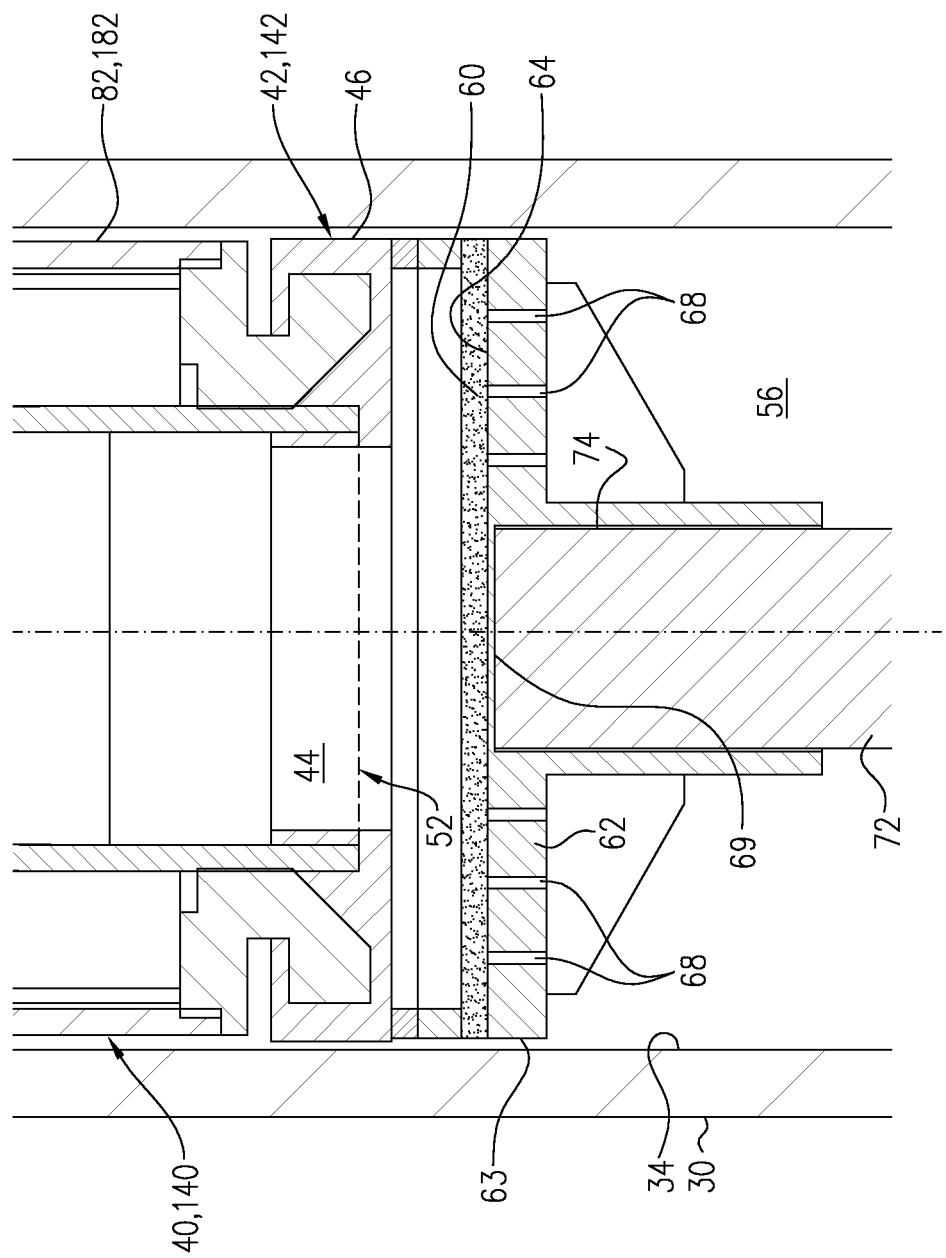
FIG. 4B is an enlarged schematic illustration of an alternative configuration of a portion of the sampling device of FIGS. 1A-G in the state shown in FIGS. 1C and 2C, in accordance with an application of the present invention.

Reference is still further made to FIG. 4B, which is an enlarged schematic illustration of an alternative configuration of a portion of sampling device 120 in the state shown in FIGS. 1C and 2C, in accordance with an application of the present invention.

Reference is still further made to FIG. 5, which is an enlarged schematic illustration of a plunger 40 and a collection vial 50 of sampling device 120 in the state shown in FIGS. 1A and 2A, in accordance with an application of the present invention.

Reference is additionally made to FIGS. 6A-G, which are schematic illustrations of a sampling device 220 for concentrating liquid specimen sample 22, and a method of using sampling device 220, in accordance with respective applications of the present invention. Sampling device 220 is one implementation of sampling device 20.

Reference is yet additionally made to FIGS. 7A-F, which are schematic illustrations of a sampling device 320 for concentrating liquid specimen sample 22, and a method of using sampling device 320, in accordance with respective applications of the present invention. Sampling device 320 is one implementation of sampling device 20.

Reference is also made to FIGS. 8A-F, which are schematic cross-sectional illustrations of sampling device 320 and the method of using sampling device 320, in accordance with respective applications of the present invention.

Figure 9B:
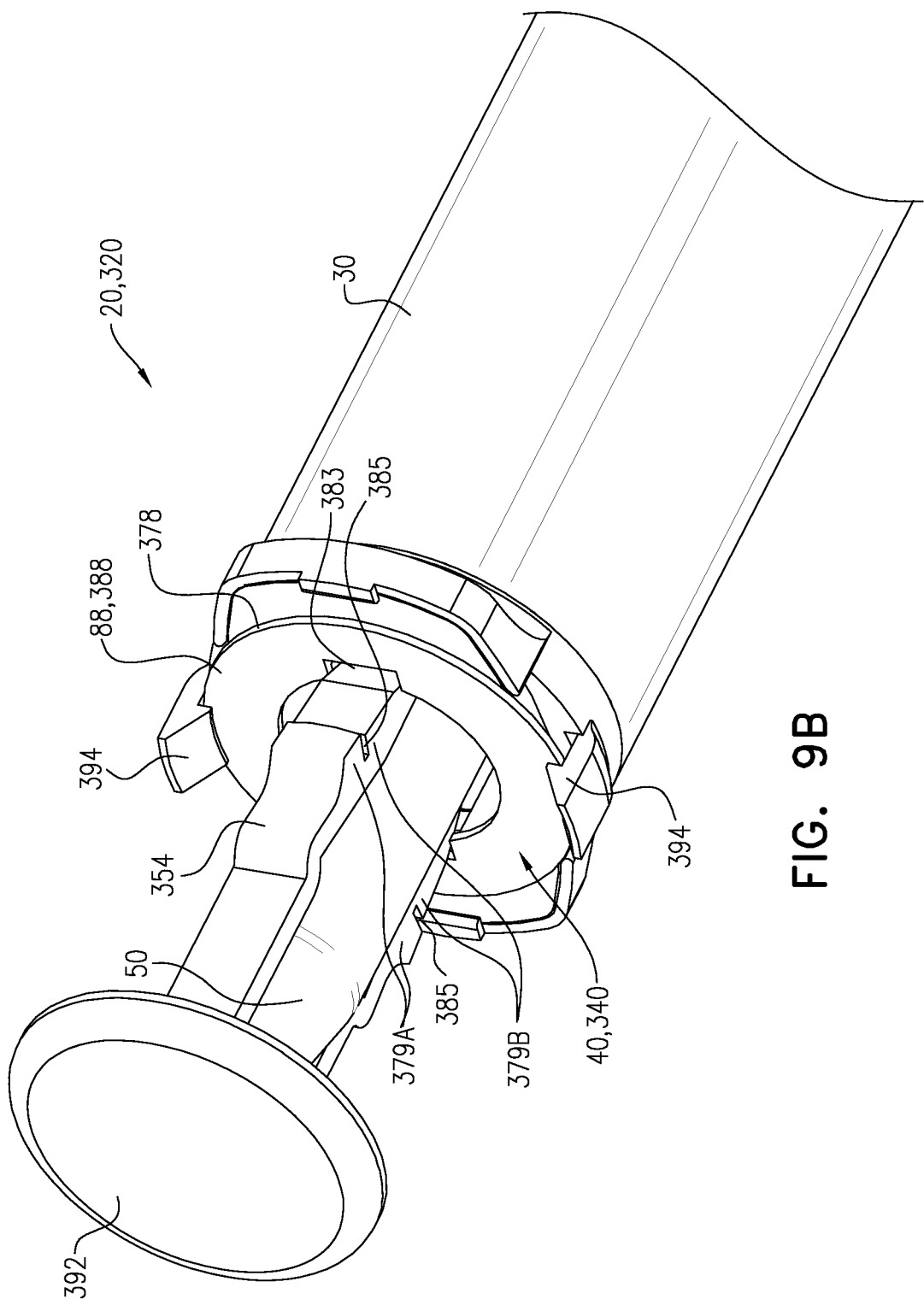
Figure 9C:
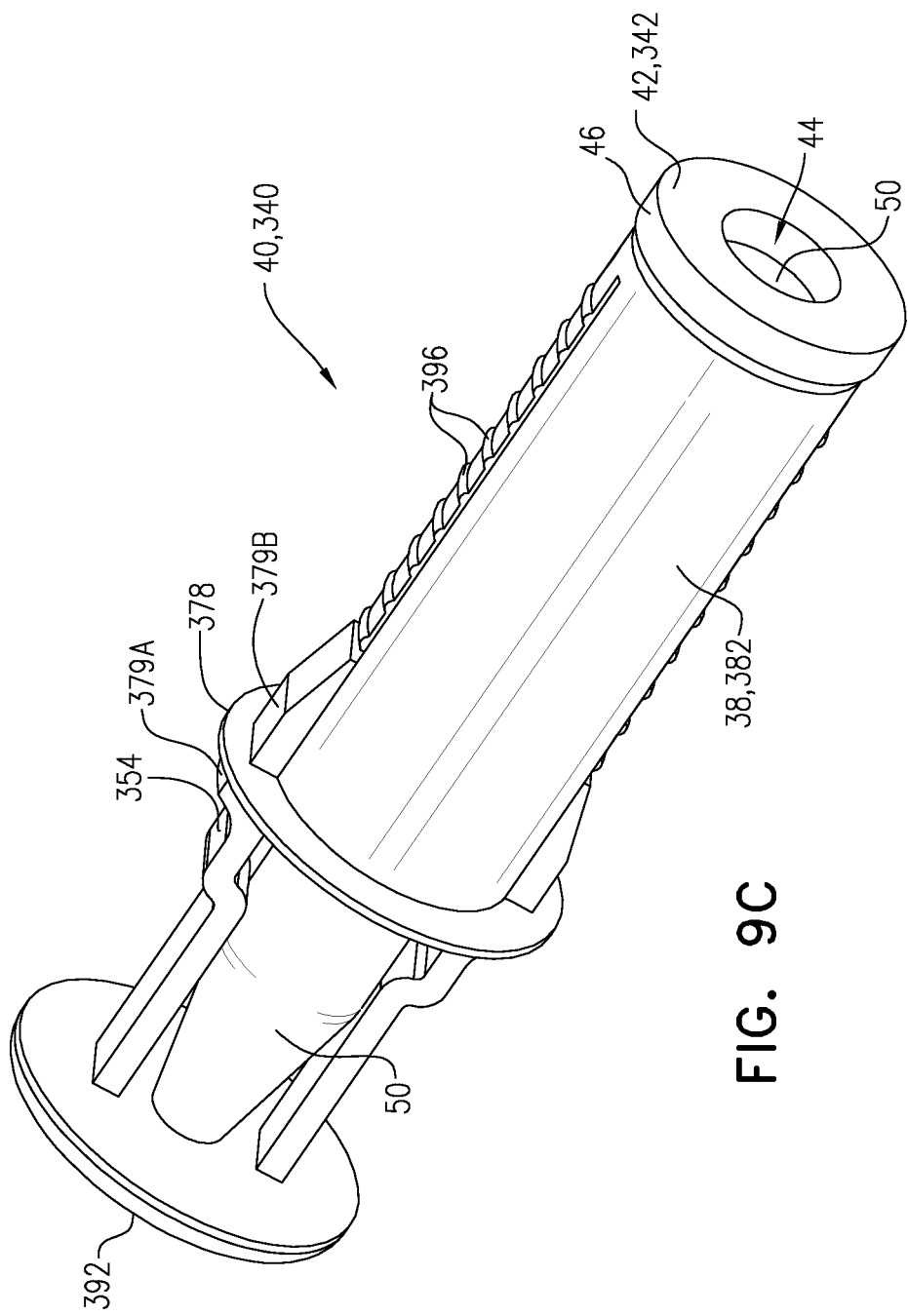

Reference is further made to FIGS. 9A-C, which are schematic illustrations of portions of sampling device 320, in accordance with respective applications of the present invention.

All references herein to sampling device 20 are to be understood as referring to sampling devices 120, 220, and 320, and like parts have like reference numerals.

Sampling device 20 comprises a filtration assembly 24 and collection vial 50. Filtration assembly 24 comprises a tubular container 30 and plunger 40. Tubular container 30 is shaped so as to define a proximal container opening 32 for receiving liquid specimen sample 22. Optionally, proximal container opening 32 has a conical or funnel shape to facilitate receipt of liquid specimen sample 22, which may, for example, be expressed (e.g., spit) from subject's mouth into tubular container 30, or transferred to tubular container 30 from a collection container. Optionally, the funnel shape of proximal container opening 32 is similar to funnel-shaped proximal opening 36 shown in FIG. 1 of US Patent Application Publication 2019/0381498 to Fruchter et al., which is incorporated herein by reference. Tubular container may be cylindrical, as shown, or may alternatively have another, non-circular cross-sectional shape. Alternatively or additionally, tubular container 30 may have different cross-sectional shapes along respective different longitudinal portions of the tubular container; optionally, one or more of the cross-sectional shapes is circular. Tubular container 30 is also shaped so as to define an inner wall 34. At least a portion of tubular container 30, such as a proximal portion, may define a syringe barrel.

Typically, tubular container 30 has an internal volume of at least 0.5 ml (e.g., at least 1 ml, such as at least 5 ml), no more than 500 ml (e.g., no more than 70 ml), and/or between 0.5 ml (e.g., 1 ml or 5 ml) and 500 ml (e.g., 70 ml).

For some applications, tubular container 30 does not comprise a Luer lock or any other type of needle-coupling mechanism.

For some applications, collection vial 50 has a volume of at least 1 ml, no more than 50 ml, and/or between 1 and 50 ml, such as at least 2 ml, no more than 20 ml, and/or between 2 and 20 ml, e.g., at least 3 ml (e.g., at least 5 ml), no more than 15 ml, and/or between 3 (e.g., 5) and 15 ml. For some applications, collection vial 50 has a greatest internal diameter of no more than 35 mm, e.g., no more than 20 mm, such as no more than 15 mm or no more than 10 mm.

Collection vial 50 is typically shaped so as to define a vial opening 52.

For some applications, collection vial 50 is tapered toward an end 89 of collection vial 50 opposite an end 91 of collection vial 50 that defines vial opening 52 (labeled in FIG. 3). For example, the collection vial may include a frustoconical tapered portion at end 89.

Collection vial 50 has a greatest outer diameter D1 (labeled in FIG. 3) that is less than (e.g., less than 80%, such as less than 70%) an inner diameter D2 (labeled in FIG. 3) of an axial portion of tubular container 30 in which plunger head 42 is distally advanceable.

Plunger 40 comprises a plunger head 42, which is shaped so as to define a plunger-head opening 44 through plunger head 42. Plunger 40 is insertable into tubular container 30 via proximal container opening 32, such that a lateral surface 46 of plunger head 42 (labeled in FIGS. 3, 4A, and 5) forms a fluid-tight movable seal with inner wall 34. To this end, lateral surface 46 may comprise an elastomeric material, such as natural rubber, synthetic rubber, a thermoplastic elastomer, or a combination thereof.

For some applications, such as shown in FIGS. 1A-9B and labeled in FIGS. 3, 5, 9A, and 9C, plunger 40 comprises a plunger rod 82, which has a distal end portion 84 to which plunger head 42 is coupled. In sampling devices 120 and 220, plunger 40 is a plunger 140, plunger head 42 is a plunger head 142, plunger rod 82 is a plunger rod 182, and distal end portion 84 is a distal end portion 184 to which plunger head 142 is coupled, optionally disengageably coupled, such as described hereinbelow with reference to FIGS. 1D-E, 2D-E, and 6D-E. In sampling device 320, plunger 40 is a plunger 340, plunger head 42 is a plunger head 342, plunger rod 82 is a plunger rod 382, and distal end portion 84 is a distal end portion 384 (labeled in FIG. 9A) to which plunger head 342 is coupled, optionally fixedly coupled, such as described hereinbelow with reference to FIGS. 7C-D and 8C-D and labeled in FIGS. 9A and 9C. References hereinbelow to plunger 40, plunger head 42, plunger rod 82, and distal end portion 84 are to be understood as including plungers 140 and 340, plunger heads 142 and 342, plunger rods 182 and 382, and distal end portions 184 and 384, respectively, unless otherwise indicated.

For some applications, a cross-sectional area of plunger-head opening 44 is at 20%, no more than 90%, and/or between 20% and 90% of a cross-sectional area of a distal surface of plunger head 42 (the cross-sectional area of the distal surface including the cross-sectional area of plunger-head opening 44).

When sampling device 20 is in its initial state (which is typically set during manufacture thereof), as shown in FIGS. 1A, 2A, 5, 6A, 7A, 8A, 9A, and 9C, collection vial 50 is positioned proximal to plunger head 42.

Typically, filtration assembly 24 further comprises a filter 60. Filter 60 is configured to concentrate at least a portion of liquid specimen sample 22 onto filter 60, while allowing a filtrate 61 to pass through filter 60. Typically, distal advancement of plunger 40 within tubular container 30 applies pressure to drive (e.g., push) at least a portion of liquid specimen sample 22 contained in tubular container 30 through filter 60, such as shown in the transitions between FIGS. 1B and 1C, between FIGS. 2B and 2C, between FIGS. 6B and 6C, between FIGS. 7A and 7B, and between FIGS. 8A and 8B. Typically, filtration assembly 24 is configured such that when plunger head 42 is within tubular container 30, fluid communication is blocked between (a) tubular container 30 distal to plunger head 42 and (b) proximal container opening 32.

Filter 60 comprises synthetic or natural materials formed, for example, as a matrix, membrane, fabric, beads, or other configuration. For some applications, filter 60 comprises a mechanical filter, which is configured to mechanically filter particulate from liquid specimen sample 22 by size-based filtration. Optionally, filter 60 comprises a depth filter.

Alternatively or additionally, for some applications, filter 60 comprises fixed antibodies configured to capture the particulate (e.g., free viral particles) by affinity-based filtration.

For some applications, for example, when filter 60 is used for capturing free virus, virions, or viral particles by size-based filtration, filter 60 may have a pore size of between 0.01 and 0.3 microns and/or a molecular weight cut off of between 10 kDa and 500 kDa. For some applications, filter 60 has a pore size of between 0.2 and 2.0 microns, for example, when filter 60 is used for capturing bacteria by size-based filtration.

For other applications, filter 60 has a nominal pore size of between 30 microns and 1.5 mm, the nominal pore size representative of a minimum size of spherical particles necessary for the filter to retain 85% of the spherical particles when H2O containing the spherical particles is passed through the filter at 20 degrees C. under pressure supplied by a 10 cm water column. For these applications, filter 60 may implement techniques described in U.S. Provisional Application 63/117,294, filed Nov. 23, 2020, is assigned to the assignee of the present application and incorporated herein by reference.

For example, the nominal pore size may be at least 40 microns, such as at least 60 microns, e.g., at least 100 microns, at least 120 microns, at least 150 microns, at least 200 microns, or at least 500 microns. Alternatively or additionally, for example, the nominal pore size may be less than 1 mm, such as less than 750 microns, less than 500 microns, or less than 250 microns.

Figure 10B:
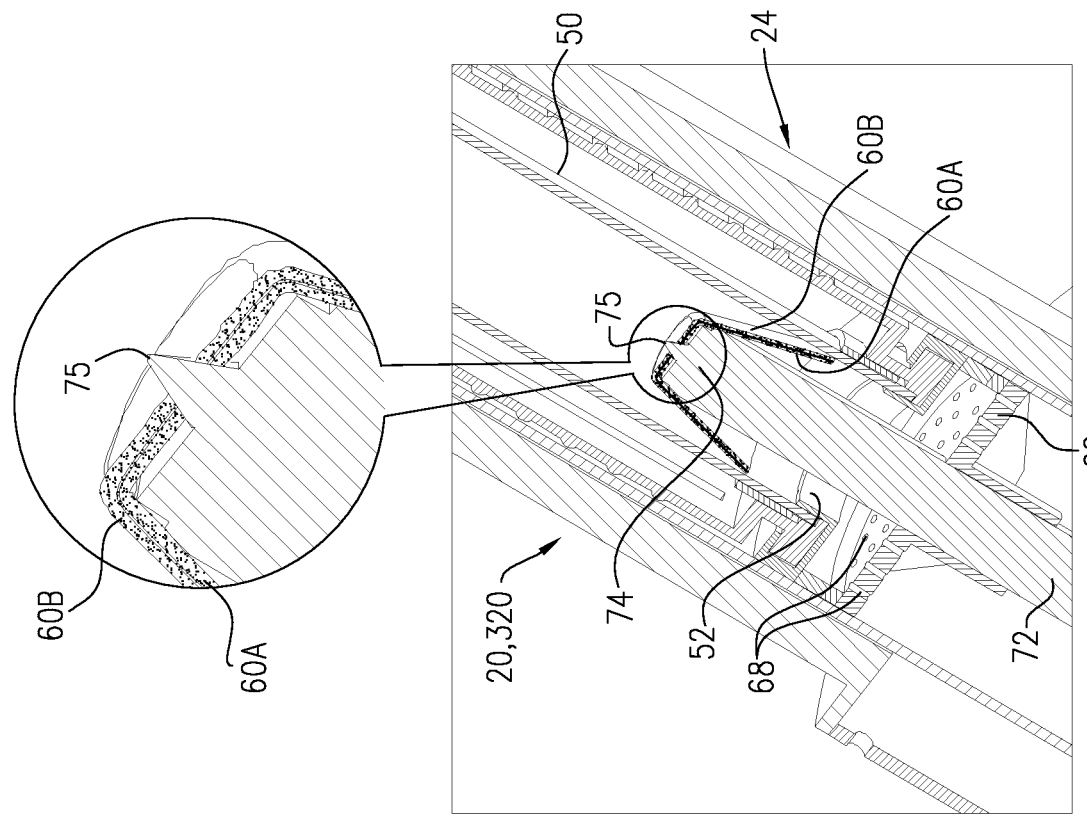
FIGS. 10A and 10B are schematic illustrations of another configuration of the sampling device of FIGS. 1A-G, in accordance with an application of the present invention.
Figure 10A:
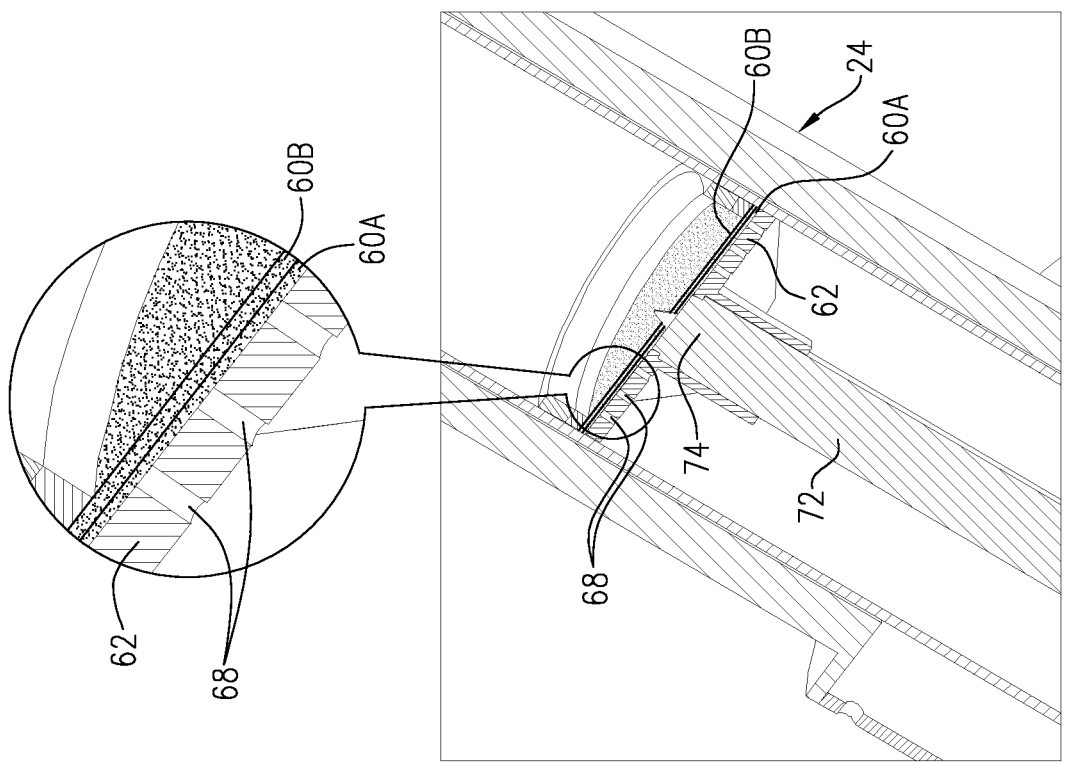

For some applications, filtration assembly 24 comprises a plurality of filters, such as described hereinbelow with reference to FIGS. 10A-B. Optionally, two or more of the plurality of filters touch one another, such as shown in FIGS. 10A-B, or are separated by one another by one or more thin spacers, e.g., having a thickness of at least 0.05 mm, no more than 1 mm, and/or between 0.05 and 1 mm (configuration not shown). Alternatively or additionally, two or more of the plurality of filters are spaced apart from another, which case filtration assembly 24 optionally comprises a corresponding number of filter supports, some or all of which may have some or all of the characteristics of filter support 62 (configuration not shown). Further alternatively or additionally, filtration assembly 24 comprises one or more additional filters downstream of filter 60 (configuration not shown).

Typically, filtration assembly 24 further comprises a waste liquid receptacle 56 for receiving filtrate 61. For some applications, a distal portion of tubular container 30 is shaped so as to define waste liquid receptacle 56, such as shown in the drawings. For other applications, waste liquid receptacle 56 is provided as a separate container coupled in fluid communication with tubular container 30 downstream (distally) to filter 60 (configuration not shown).

Optionally, waste liquid receptacle 56 is shaped so as to define an opening 58 through an external wall of waste liquid receptacle 56 to release displaced air. For example, opening 58 may be located on a side portion of the external wall, typically above the highest level that filtrate 61 is expected to reach during ordinary use of the device. For some applications, waste liquid receptacle 56 comprises an air filter (e.g., an N98 filter) that is disposed to filter air that passes out of waste liquid receptacle 56 through opening 58 (not shown). Alternatively or additionally, for some applications, waste liquid receptacle 56 comprises a one-way pressure-sensitive valve disposed in opening 58.

For some applications, waste liquid receptacle 56 contains a disinfectant or a liquid-absorbing material.

Reference is made to FIGS. 1A-G, 2A-G, 3-5, 7A-F, and 8A-F. For some applications, such as shown in FIGS. 1B-C and 2B-C for sampling device 120, and in FIGS. 7A-B and 8A-B for sampling device 320, during the above-mentioned distal advancement of plunger 40 within tubular container 30, collection vial 50 is positioned proximal to plunger head 42 such that vial opening 52 of collection vial 50 is in fluid communication with plunger-head opening 44. Collection vial 50 is configured to prevent escape of air from collection vial 50 as pressure builds up in collection vial 50 during distal advancement of plunger head 42 in tubular container 30 while sampling device 120 or 320 is oriented such that proximal container opening 32 faces upward away from the Earth. The air pressure builds up in collection vial 50 because of an air pocket trapped in collection vial 50 during distal advancement of plunger 40 within tubular container 30 inhibits fluid flow into collection vial 50 during distal advancement of plunger 40. Collection vial 50 typically is not shaped so as to define any pressure-release openings and does not comprise any pressure-release valves.

Reference is again made to FIGS. 1A-9B. For some applications, filter 60 is disposed within tubular container 30. For some of these applications, plunger 40 is insertable into tubular container 30 from outside tubular container 30 via proximal container opening 32 while filter 60 is disposed within tubular container 30. In other words, filter 60 is not coupled to plunger head 42, at least before insertion of plunger 40 into tubular container 30 (although filter 60 may become coupled to plunger head 42 during a portion of the use of sampling device 20). For other applications, filter 60 is coupled to the plunger head, such as described hereinbelow with reference to FIGS. 22A-25, 26A-29, 30A-33, 34A-35B, 36A-39, 40A-42E, 43A-E, 44A-B, and 45A-B.

For some applications, sampling device 20 is configured such that filter 60 is advanceable into collection vial 50 via vial opening 52 while collection vial 50 is disengageably coupled to filtration assembly 24.

For some applications, filtration assembly 24 is configured such that movement (such as distal advancement) of plunger head 42 and collection vial 50 within tubular container 30 advances filter 60 into (such as entirely into) collection vial 50 via plunger-head opening 44 and vial opening 52, for example, such as described hereinbelow with reference to FIGS. 1D-E, 2D-E, 6D-E, 7C-D, and 8C-D.

Reference is made to FIGS. 1A, 2A, 3-5, 7A, and 8A. For some applications, such as shown in FIGS. 1A, 2A, and 3-5 for sampling device 120, and in FIGS. 7A and 8A for sampling device 320, vial opening 52 of collection vial 50 is in fluid communication with plunger-head opening 44 (typically including when sampling device 120 or 320 is in its initial state, which is typically set during manufacture thereof).

Reference is made to FIGS. 6A-G. For some applications, such as shown in these figures for sampling device 220, sampling device 220 further comprises a fluid-tight frangible seal 276 when sampling device 220 is in its initial state, which is typically set during manufacture thereof). Collection vial 50 is disengageably coupled to plunger 40 and positioned proximal to plunger head 42 such that frangible seal 276 removably blocks liquid flow from plunger-head opening 44 into vial opening 52 of collection vial 50, such that upon breaching of frangible seal 276, such as shown in FIG. 6D, vial opening 52 is in fluid communication with plunger-head opening 44. Sampling device 320, described herein with reference to FIGS. 7A-F, 8A-F, and 9A-C, may also comprise frangible seal 276, mutatis mutandis (configuration not shown).

Frangible seal 276 may be coupled to plunger-head opening 44 (such as shown), plunger head 42 (configuration not shown), vial opening 52 (configuration not shown), another element disposed between plunger-head opening 44 and vial opening 52 (configuration not shown), or a combination of these locations.

For example, frangible seal 276 may comprise a pliable material (such as silicone) that is easily torn or a rigid material that is easily broken (e.g., shaped so as define slits to aid in breaking).

Reference is again made to FIGS. 1A-G, 2A-G, 3-5, 6A-G, 7A-F, and 8A-F. For some applications, filtration assembly 24 further comprises a filter support 62, which is disposed within tubular container 30. Filter support 62 is shaped so as to define:
  a proximal support surface 64, which may be perpendicular to a central longitudinal axis 66 of tubular container 30 (as shown), or may be angled with respect to central longitudinal axis 66 (configuration not shown), and
  a plurality of filtrate-passage openings 68 through filter support 62.

Filter 60 is disposed on proximal support surface 64.

For some of these applications, filter support 62 is shaped so as to further define a filter-support shaft-passage region 69, which, for some applications, is shaped so as to define a filter-support opening 70 through filter support 62. For these applications, filtration assembly 24 further comprises a shaft 72. Plunger head 42, filter support 62, and shaft 72 are configured such that a proximal portion 74 of shaft 72 (labeled in FIGS. 2D-F, 6D-F, and 8C-E) is axially movable through filter-support shaft-passage region 69 (e.g., filter-support opening 70), plunger-head opening 44, and vial opening 52, as shown in the transition between FIG. 2C and FIG. 2E, between FIG. 6C and FIG. 6E, and between FIG. 8B and FIG. 8D.

For other applications, such as shown in FIG. 4B, filter-support shaft-passage region 69 is at least partially frangible, and filter support 62 and shaft 72 are configured such that axial movement of proximal portion 74 of shaft 72 through filter-support shaft-passage region 69 forms filter-support opening 70 through filter support 62. After formation of filter-support opening 70, proximal portion 74 of shaft 72 (labeled in FIGS. 2D-F, 6D-F, and 8C-E) is axially movable through filter-support opening 70, plunger-head opening 44, and vial opening 52. Typically, pressure generated in liquid specimen sample 22 by distal advancement of plunger 40 within tubular container 30 is not sufficient to break filter-support shaft-passage region 69 and prematurely form filter-support opening 70.

For some applications, filter-support shaft-passage region 69 is integral with other portions (e.g., other more peripheral portions) of filter support 62 and is thinner than the other portions of filter support 62 (such as shown). Alternatively, for some applications, filter-support shaft-passage region 69 comprises a frangible membrane (configuration not shown).

Reference is again made to FIGS. 1A-G, 2A-G, 3-5, 6A-G, 7A-F, and 8A-F. Shaft 72 may be cylindrical, as shown, or may alternatively have another, non-circular cross-sectional shape, such as a polygonal shape (e.g., a rectangular, square, or triangular shape), an "x" shape, or an asterisk shape. Alternatively or additionally, shaft 72 may have different cross-sectional shapes along respective different longitudinal portions of the tubular container; optionally, one or more of the cross-sectional shapes is circular. Optionally, filter-support shaft-passage region 69 (e.g., filter-support opening 70) may have a shape corresponding to the shape of shaft 72.

Typically, a cross-sectional area of filter-support shaft-passage region 69 (e.g., filter-support opening 70) is substantially larger than an average cross-sectional area of filtrate-passage openings 68; for example, the cross-sectional area of filter-support shaft-passage region 69 (e.g., filter-support opening 70) may be at least 10 times, such as at least 25 times, the average cross-sectional area of filtrate-passage openings 68.

For some applications:
the cross-sectional area of filter-support shaft-passage region 69 (e.g., filter-support opening 70) is between 20 and 75 mm2,
the average cross-sectional area of filtrate-passage openings 68 is between 0.5 and 1.5 mm2,
the cross-sectional area of filter-support shaft-passage region 69 (e.g., filter-support opening 70) is between 2.5% and 20% of a cross-sectional area of proximal support surface 64 of filter support 62.

For some of these applications, proximal portion 74 of shaft 72, filter-support shaft-passage region 69 (e.g., filter-support opening 70), plunger-head opening 44, and vial opening 52 are coaxial. Alternatively or additionally, for some of these applications, proximal portion 74 of shaft 72, filter-support shaft-passage region 69 (e.g., filter-support opening 70), plunger-head opening 44, and vial opening 52 are coaxial with or parallel to central longitudinal axis 66 of tubular container 30.

For some applications, a cross-sectional area of proximal portion 74 of shaft 72 is between 80% and 110% of a cross-sectional area of filter-support shaft-passage region 69 (e.g., filter-support opening 70).

For some of these applications in which filter-support shaft-passage region 69 is shaped so as to define filter-support opening 70, when sampling device 20 is in its initial state (which is typically set during manufacture thereof), as shown in FIGS. 1A, 2A, 6A, 7A, and 8A, a proximal end 75 (labeled in FIGS. 3 and 4A) of proximal portion 74 of shaft 72 is positioned:
protruding proximally from support surface 64 of filter support 62, typically slightly (e.g., no more than 3 mm (such as shown in as shown in FIGS. 1A, 2A, 6A, 7A, and 8A),
within filter-support opening 70 (configuration not shown),
flush with proximal support surface 64 of filter support 62 (configuration not shown), or
distal to filter-support opening 70 (configuration not shown).

For some applications, such as shown, for example, in FIGS. 1D-E, 2D-E, 6D-E, 7C-D, and 8C-D, sampling device 20 is configured such that movement (e.g., distal advancement) of plunger head 42 and collection vial 50 within tubular container 30 advances filter 60 into (typically entirely into) collection vial 50 via plunger-head opening 44 and vial opening 52.

For some of these applications, sampling device 20 is configured such that the movement of plunger head 42 and collection vial 50 within tubular container 30 advances filter 60 into collection vial 50 via plunger-head opening 44 and vial opening 52 while filter 60 remains stationary with respect to a distal end of tubular container 30, such as shown in FIGS. 1D-E, 2D-E, 6D-E, 7C-D, and 8C-D.

Alternatively or additionally, proximal withdrawal of plunger 40 within and/or out of tubular container 30, or a combination of distal advancement and proximal withdrawal of plunger 40, advances filter 60 into (typically entirely into) collection vial 50 via plunger-head opening 44 and vial opening 52 (configurations not shown).

For some applications in which sampling device 20 is configured such that movement of plunger head 42 and collection vial 50 within tubular container 30 advances filter 60 into collection vial 50, relative axial movement between shaft 72 and collection vial 50 causes proximal portion 74 of shaft 72 to push filter 60 into collection vial 50 via vial opening 52, such as shown in FIGS. 1D, 2D, 6D, 7C, and 8C. In sampling device 220, advancing proximal portion 74 of shaft 72 into collection vial 50 breaches frangible seal 276 such that vial opening 52 is in fluid communication with plunger-head opening 44, such as shown in FIG. 6D.

As mentioned above, typically first distal advancement of plunger 40 within tubular container 30 applies pressure to drive (e.g., push) at least a portion of liquid specimen sample 22 contained in tubular container 30 through filter 60, without pushing filter support 62 distally within tubular container 30, such as shown in the transitions between FIGS. 1B and 1C, between FIGS. 2B and 2C, between FIGS. 6B and 6C, between FIGS. 7A and 7B, and between FIGS. 8A and 8B. For some applications, after this first distal advancement of plunger 40 within tubular container 30, further second distal advancement of plunger head 42 directly or indirectly pushes filter support 62 distally within tubular container 30, such as shown in FIGS. 1D-E, 2D-E, 6D-E, 7C-D, and 8C-D. During this further second distal advancement, proximal portion 74 of shaft 72 remains axially stationary with respect to collection vial 50. For these applications, filter support 62 is slidable along tubular container 30, and proximal portion 74 of shaft 72 is axially fixed with respect to proximal container opening 32 of tubular container 30.

As a result of this relative axial movement between shaft 72 and collection vial 50, proximal portion 74 of shaft 72 axially moves through filter-support shaft-passage region 69 (e.g., filter-support opening 70), plunger-head opening 44, and vial opening 52, into collection vial 50, as shown in FIGS. 1D, 2D, 6D, 7C, and 8C. During this movement, proximal portion 74 of shaft 72 engages filter 60 and pushes the filter into collection vial 50, as shown in FIGS. 1D, 2D, 6D, 7C, and 8C. Typically, additional distal advancement of plunger 40 within tubular container 30 pushes filter 60 entirely into collection vial 50, as shown in FIGS. 1D-E, 2D-E, 6D-E, 7C-D, and 8C-D.

In these applications, a lateral surface 63 (labeled in FIGS. 3 and 4A) of filter support 62 is typically configured to form a fluid-tight movable seal with inner wall 34 of tubular container 30.

For some applications, sampling device 20 is configured such that the further second distal advancement of plunger head 42, described hereinabove with reference to FIGS. 1D-E, 2D-E, 6D-E, 7C-D, and 8C-D, pushes filter support 62 distally within tubular container 30 with respect to shaft 72, such that proximal portion 74 of shaft 72 pushes filter 60 through filter-support shaft-passage region 69, plunger-head opening 44, and vial opening 52, into collection vial 50.

For some applications, filter support 62 and shaft 72 are releasably coupled to each other such that:
  the first distal advancement of plunger head 42 within tubular container 30, described hereinabove with reference to the transitions between FIGS. 1B and 1C, between FIGS. 2B and 2C, between FIGS. 6B and 6C, between FIGS. 7A and 7B, and between FIGS. 8A and 8B, does not decouple filter support 62 from shaft 72, and
  the further second distal advancement of plunger head 42, described hereinabove with reference to FIGS. 1D-E, 2D-E, 6D-E, 7C-D, and 8C-D, decouples filter support 62 from shaft 72.

For example, such as shown in FIG. 4A, proximal portion 74 of shaft 72 may be releasably coupled to filter support 62 by one or more frangible portions 73 of filtration assembly 24, such as of filter support 62 (as shown) or proximal portion 74 of shaft 72 (configuration not shown). Proximal portion 74 of shaft 72 may be positioned within filter-support opening 70, releasably coupled to filter support 62 by the one or more frangible portions 73.

For example, frangible portions 73 may be shaped as a plurality of tabs distributed around the perimeter of proximal portion 74 of shaft 72. Optionally, proximal portion 74 of shaft 72, filter-support opening 70, and the tabs are shaped so as to define a plurality of narrow spaces between proximal portion 74 of shaft 72 and the perimeter of filter-support opening 70; these narrow spaces may serve to allow passage of liquid specimen sample 22 through filter support 62, and thus serve the same function as filtrate-passage openings 68.

For some applications, sampling device 20 is configured such that the further second distal advancement of plunger head 42, described hereinabove with reference to FIGS. 1D-E, 2D-E, 6D-E, 7C-D, and 8C-D, pushes filter support 62 distally within tubular container 30 in the absence of a filter-support release action by a user. The user merely distally advances plunger head 42 within tubular container 30, and need not be aware of the transition between the first distal advancement and the subsequent further second distal advancement (although the user may feel an increase in resistance during the transition).

For other applications, filter support 62 and shaft 72 are releasably axially locked with respect to each other, and sampling device 20 is configured such that a filter-support release action by a user unlocks filter support 62 and shaft 72 from each other. For example, proximal portion 74 of shaft 72 may have a non-circular shape (e.g., a triangular shape), and the filter-support release action is rotation, by the user, of filter support 62 with respect to shaft 72, in order to align the shape of proximal portion 74 of shaft 72 with a corresponding shape of filter-support shaft-passage region 69 (e.g., filter-support opening 70).

For some applications, such as shown in FIGS. 1F, 2F, 6F, 7E, and 8E, collection vial 50 is disengageably coupled to plunger 40. Such as described hereinbelow, once collection vial 50 has been removed from plunger 40, a diagnostic test may be performed for the presence of particulate trapped by filter 60, which is now in collection vial 50. For some applications, such as for transporting collection vial 50 to a remote diagnostic laboratory, sampling device 20 further comprises a collection vial cap 80, which is configured to seal vial opening 52, such as shown in FIGS. 1G, 2G, 6G, 7F, and 8F.

For some applications, such as shown in FIGS. 1F, 2F, 6F, 7E, and 8E, sampling device 20 is configured such that collection vial 50 is decouplable from plunger 40 while plunger head 42 is within tubular container 30, typically, but not necessarily, via a proximal end 81 of plunger 40. For some of these applications, sampling device 20 is configured such that collection vial 50 is decouplable from plunger 40 while plunger head 42 is advanced as far as possible within tubular container 30. Alternatively or additionally, for some of these applications, sampling device 20 is configured such that collection vial 50 is decouplable from plunger 40 without any proximal withdrawal of plunger head 42 within tubular container 30.

For some applications in which plunger 40 comprises plunger rod 82, plunger rod 82 is shaped so as to define an internal plunger space 86 (labeled in FIGS. 3 and 5), and collection vial 50 is removably disposed at least partially within internal plunger space 86, such as shown in FIGS. 1A-E, 2A-E, 3, 4A, 5, 6A-E, 7A-D, 8A-D, and 9A-C. For some of these applications, a proximal end 88 of plunger rod 82 is shaped so as to define a plunger-space proximal opening 90 of internal plunger space 86. In sampling devices 120 and 220, internal plunger space 86 is an internal plunger space 186, proximal end 88 of plunger rod 82 is a proximal end 188 of plunger rod 182, and plunger-space proximal opening 90 is a plunger-space proximal opening 190 (labeled in FIGS. 3 and 5); in sampling device 320, internal plunger space 86 is an internal plunger space 386 (labeled in FIGS. 8A, 8E, and 9A), proximal end 88 of plunger rod 82 is a proximal end 388 (labeled in FIGS. 9A-B) of plunger rod 382, and plunger-space proximal opening 90 is a plunger-space proximal opening 390 (labeled in FIG. 9A). References hereinbelow to internal plunger space 86, proximal end 88, and plunger-space proximal opening 90 are to be understood as including internal plunger spaces 186 and 386, proximal ends 188 and 388, and plunger-space proximal openings 190 and 390, respectively, unless otherwise indicated.

For some applications, the sampling device is configured such that collection vial 50 is removable from internal plunger space 86 through plunger-space proximal opening 90, optionally while plunger head 42 is within tubular container 30 (collection vial 50 is also removable from internal plunger space 86 through plunger-space proximal opening 90 if plunger head 42 has been removed from tubular container 30).

Alternatively or additionally, the sampling device is configured such that filter 60 is removable from tubular container 30 (and from filtration assembly 24) via plunger-space proximal opening 90, optionally while plunger head 42 is within tubular container 30. In some configurations, such as described with reference to FIGS. 1A-E, 2A-E, 3, 4A, 5, 6A-E, 7A-D, 8A-D, and 9A-C, filter 60 is within collection vial 50 when filter 60 is removable from tubular container 30 (and from filtration assembly 24) via plunger-space proximal opening 90, optionally while plunger head 42 is within tubular container 30.

For some applications, collection vial 50 is disengageably coupled axially with respect to plunger 40, such as shown in FIGS. 1A-C, 2A-C, 3, 5, 6A-C, 7A-C, and 8A-C. In other words, when coupled with respect to plunger 40, collection vial 50 remains axially stationary with respect to plunger 40, and thus advances distally to the same extent as plunger 40, as can be seen in the transition from FIGS. 1A to 1C and from FIGS. 2A to 2C; the transition from FIGS. 6A to 6C; and the transition from FIGS. 7A to 7C and from FIGS. 8A to 8C.

Collection vial 50 is configured to become disengaged from plunger 40 in order to allow collection vial 50 to be removed from plunger 40 (such as from internal plunger space 86 through plunger-space proximal opening 90), such as shown in FIGS. 1F, 2F, 6F, 7E, and 8E.

For applications in which pushing on axial portion 87 of collection vial 50 distally advances plunger head 42 while plunger rod 82 remains stationary with respect to tubular container 30, such as described hereinbelow and shown in FIGS. 2D-E and 6D-E, the distal advancement of collection vial 50 shown in FIGS. 2D-E and 6D-E disengages collection vial 50 from plunger 40. For some of these applications, such as shown in FIGS. 2A-G, 3, 5, and 6A-G, sampling device 120 and 220 comprises one or more couplers 154, which are configured to disengageably couple an external surface of collection vial 50 axially with respect to an internal surface of internal plunger space 186, such as shown in FIGS. 1A-C, 2A-C, 3, 5, 6A-C, 7A-C, and 8A-C. Typically, the one or more couplers 154 are disengageably coupled to the external surface of collection vial 50 at least partially by friction, and, optionally, additionally by slight penetration of respective sharp portions of the one or more couplers 154 into the external surface of collection vial 50.

Optionally, the one or more couplers 154, upon becoming fully disengaged from collection vial 50 and the internal surface of internal plunger space 186, fall out of internal plunger space 186, typically into tubular container 30, such as shown in FIGS. 2E-F and 6E-F.

For other applications, such as shown in FIGS. 7A-F, 8A-F, and 9A-C, sampling device 320 comprises one or more couplers 354, which are configured to disengageably couple an external surface of collection vial 50 axially with respect to a proximal portion of plunger rod 382, such as a proximal end 388 of plunger rod 382, as shown. For example, the one or more couplers 354 may be configured to disengageably couple the external surface of collection vial 50 axially with respect to a flange 378 defined by the proximal portion of plunger rod 382, such as by proximal end 388 of plunger rod 382, as shown. For example, each of the one or more couplers 354 may be shaped so as to define proximal and distal graspers 379A and 379B that engage proximal and distal surfaces, respectively, of flange 378, thereby sandwiching a portion 383 (labeled in FIG. 9B) of flange 378 between proximal and distal graspers 379A and 379B in a slot 385 (labeled in FIG. 9B) defined by the coupler between proximal and distal graspers 379A and 379B. Optionally, portion 383 is indented, as shown.

Typically, the one or more couplers 354 are disengageably coupled to the external surface of collection vial 50 at least partially by friction, and, optionally, additionally by slight penetration of respective sharp portions of the one or more couplers 354 into the external surface of collection vial 50.

For some applications, such as shown in the transition between FIGS. 7B and 7C and between FIGS. 8B and 8C, distal advancement of plunger rod 382 within tubular container 30, such as until flange 378 prevents further distal advancement of plunger rod 382, causes the one or more couplers 354 to at least partially disengage from flange 378, so as to allow proximal withdrawal of collection vial 50 from plunger rod 382, typically by proximally withdrawing the one or more couplers 354, such as shown in the transition between FIGS. 7C and 7D and between FIGS. 8C and 8D. Optionally, the one or more respective proximal graspers 379A may continue to engage the proximal surface of flange 378, such as shown. Optionally, the one or more couplers 354 at least partially disengage from flange 378 by pivoting of respective portions of the one or more couplers 354 with respect to flange 378, such as shown.

For some applications, the one or more couplers 354 are configured to continue to engage collection vial 50 even after the one or more couplers entirely disengage from plunger rod 382, such as shown in FIGS. 7D and 8D.

For some applications in which the one or more couplers 354 comprise two or more couplers 354 (e.g., exactly two couplers 354, as shown), sampling device 320 further comprises a proximal grip 392. The two or more couplers 354 are fixed to and extend distally from proximal grip 392.

For some applications, such as shown in FIGS. 7A-F, 8A-F, and 9A-C, tubular container 30 comprises one or more proximal clips 394, which are configured to engage flange 378 (such as by snapping onto flange 378) upon maximal distal advancement of plunger 340 within tubular container 30, such as shown in FIGS. 7C, 8C, and 9B.

For some applications, an external surface of plunger rod 382 is shaped so as to define a plurality of protrusions 396 arranged along plunger rod 382, which are configured to engage inner wall 34 of tubular container 30. Protrusions 396 may slow down distal advancement of plunger rod 382 in tubular container 30, such as to provide uniform speed of advancement and controlled buildup of pressure and filtration in tubular container 30, which may aid in calibration of sampling device 320 during manufacture. Alternatively or additionally, protrusions 396 may provide an indication to the user of the speed and/or amount of distal advancement of plunger rod 382 in tubular container 30.

For some applications, collection vial 50 is disposed alongside plunger rod 82 (configuration not shown).

For some applications, sterile packaging is provided, in which at least sampling device 20 is removably disposed.

Reference is again made to FIGS. 1A-G, 2A-G, 6A-G, 7A-F, and 8A-F. In some applications of the present invention, a method for concentrating liquid specimen sample 22 is provided, the method comprising:
  placing liquid specimen sample 22 in tubular container 30 of filtration assembly 24, optionally proximal to filter 60 that is disposed within tubular container 30, such as shown in FIGS. 1A, 2A, 6A, 7A, and 8A;
  inserting plunger head 42 of plunger 40 into tubular container 30 via proximal container opening 32 of tubular container 30, while collection vial 50 is positioned proximal to plunger head 42, such that lateral surface 46 of plunger head 42 forms a fluid-tight movable seal with inner wall 34 of tubular container 30, such as shown in FIGS. 1B, 2B, 6B, 7B, and 8B;
  distally advancing plunger head 42 within tubular container 30 to drive at least a portion of liquid specimen sample 22 through filter 60, such as shown in FIGS. 1C, 2C, 6C, 7B, and 8B; and
  advancing filter 60 into (such as entirely into) collection vial 50 via plunger-head opening 44 and vial opening 52 of collection vial 50, such as shown in FIGS. 1D-E, 2D-E, 6D-E, 7C-D, and 8C-D.

For some applications, liquid specimen sample 22 is received from a subject's mouth. For some applications, liquid specimen sample 22 comprises gargled fluid, i.e., a gargle fluid that the subject has gargled in his or her mouth and spit out, perhaps along with some saliva. In the present application, including in the claims, "gargled fluid" means "gargle fluid" that has been gargled by a subject. Typically, the gargle fluid includes water, carbonated water, saline (e.g., phosphate buffered saline), pelargonium sidoides extract, tannic acid, balloon flower platycodon grandiflorus, berberine sulfate, S-carboxymethylcysteine, curcumin, coloring, flavoring, a detergent (such as Polysorbate 20 (e.g., Tween® 20)), or any combination thereof. In some applications, the gargle fluid is carbonated. Alternatively or additionally, for some applications, a detergent, such as Polysorbate 20 (e.g., Tween® 20) is added to the gargled fluid after being gargled by the subject. Alternatively, liquid specimen sample 22 may comprise another type of biological fluid, such as blood (e.g., diluted blood), urine, stool (e.g., diluted stool), gastrointestinal (GI) fluid, or bronchoalveolar lavage fluid.

Alternatively, liquid specimen sample 22 comprises saliva not swabbed from the throat of a subject (i.e., the saliva was collected without swabbing the subject's throat). (The distinction between "swab" as a verb and as a noun is noted. A "swab" (as a noun) may be used to obtain saliva without "swabbing" (as a verb) the subject's throat. For example, the subject may suck on a swab, or a swab may be dipped in a container into which gargle fluid or saliva has been placed.) By contrast, in commonly-practiced techniques for testing for strep, the tonsils are swabbed. Further alternatively, liquid specimen sample 22 comprises liquid from a cultured medium containing a biological sample which had been incubated within tubular container 30 or incubated separately from the device and then added to tubular container 30.

Liquid specimen sample 22 (e.g., saliva) may be spit directly by the subject into tubular container 30 or transferred by a healthcare worker from another container into which the subject spit. Alternatively, in the case of saliva, the saliva may be collected from the subject's mouth by having the subject suck on a swab or other absorbent collecting element, such as flocked swabs or cotton rolls.

For some applications in which the method does not comprise swabbing the throat of the subject, liquid specimen sample 22 is collected by drawing liquid specimen sample 22 out of an oral cavity of the subject via an anterior opening of the oral cavity by contacting one or more portions of the oral cavity with an absorbent material, e.g., a flocked or cotton swab, or a sponge (e.g., at a tip of a collector shaft), without swabbing the oropharynx of the subject. (For example, an ORAcollect®•RNA Saliva Collection Device (DNA Genotek Inc., a subsidiary of OraSure Technologies, Inc. (Bethlehem, PA, USA)) may be used.) Optionally, the absorbent material is located on a tip of a collector shaft, and liquid specimen sample 22 is drawn out of the oral cavity via the anterior opening of the oral cavity using the absorbent material by inserting the tip of the collector shaft into the oral cavity. For some of these applications, liquid specimen sample 22 is drawn out of the oral cavity via the anterior opening of the oral cavity using the absorbent material by the subject sucking on the absorbent material. For example, the one or more portions of the oral cavity may include one or more of buccal mucosa, the tongue (e.g., under the tongue), the gums (e.g., the lower gums), and/or the palatal mucosa. For example, for swabbing the lower gums, absorbent material (e.g., at a tip of a collector shaft) may be rubbed back and forth along the lower gums several times. (The anterior opening of the oral cavity is the opening of the mouth between the lips, between outside the oral cavity and inside the oral cavity.)

Alternatively, liquid specimen sample 22 comprises an incubated culture medium containing a biological sample.

For some applications, filter 60 is advanced into collection vial 50 while filter 60 remains stationary with respect to a distal end of tubular container 30, such as shown in FIGS. 1D-E, 2D-E, 6D-E, 7C-D, and 8C-D.

For some applications, liquid specimen sample 22 is placed in tubular container 30 proximal to filter 60 that is disposed on proximal support surface 64 defined by filter support 62 that is disposed within tubular container 30, such as shown in FIGS. 1A, 2A, 6A, 7A, and 8A. Plunger head 42 is distally advanced within tubular container 30 to drive the at least a portion of liquid specimen sample 22 through filter 60 and filtrate-passage openings 68 defined by filter support 62, such as shown in FIGS. 1B-C, 2B-C, 6B-C, 7B, and 8B.

For some applications, advancing filter 60 into collection vial 50 via plunger-head opening 44 and vial opening 52 comprises axially moving proximal portion 74 of shaft 72 and collection vial 50 with respect to each other, such that (a) proximal portion 74 of shaft 72 moves through (i) filter-support shaft-passage region 69 (e.g., filter-support opening 70) defined by filter support 62, (ii) plunger-head opening 44, and (iii) vial opening 52, and (a) proximal end 75 of shaft 72 pushes filter 60 through plunger-head opening 44 into collection vial 50 via vial opening 52, such as shown in FIGS. 1D-E, 2D-E, 6D-E, 7C-D, and 8C-D.

For some applications, advancing filter 60 into collection vial 50 via plunger-head opening 44 and vial opening 52 comprises moving plunger head 42 and collection vial 50 within tubular container 30, such as shown in FIGS. 1D-E, 2D-E, 6D-E, 7C-D, and 8C-D.

For some applications, advancing filter 60 into collection vial 50 via plunger-head opening 44 and vial opening 52 comprises axially moving proximal portion 74 of shaft 72 of filtration assembly 24 and collection vial 50 with respect to each other, such that (a) proximal portion 74 of shaft 72 moves through plunger-head opening 44 and vial opening 52, and (a) proximal end 75 of shaft 72 pushes filter 60 through plunger-head opening 44 into collection vial 50 via vial opening 52, such as shown in FIGS. 1D-E, 2D-E, 6D-E, 7C-D, and 8C-D.

Reference is made to FIGS. 1A-C and 2A-C. For some applications, collection vial 50 of sampling device 120 or 320 is positioned proximal to plunger head 42 such that vial opening 52 is in fluid communication with plunger-head opening 44, such as shown in FIGS. 1A-C and 2A-C for sampling device 120, and in FIGS. 7A-B and 8A-B for sampling device 320, and plunger head 42 is distally advanced within tubular container 30, while sampling device 20 is oriented such that proximal container opening 32 faces upward away from the Earth, to drive the at least a portion of liquid specimen sample 22 through filter 60, such as shown in FIGS. 1B-C, 2B-C, 7B, and 8B.

Reference is made to FIGS. 6A-C. For some applications, collection vial 50 of sampling device 220 is positioned proximal to plunger head 42 such that fluid-tight frangible seal 276 of sampling device 20 removably blocks flow of liquid specimen sample 22 from plunger-head opening 44 into vial opening 52, such as shown in FIGS. 6A-C. Advancing filter 60 into collection vial 50 via plunger-head opening 44 and vial opening 52 of collection vial 50 breaches frangible seal 276 such that vial opening 52 is in fluid communication with plunger-head opening 44, such as shown in FIG. 6D.

Reference is again made to FIGS. 1A-G, 2A-G, 6A-G, 7A-F, and 8A-F. For some applications, collection vial 50 is disengageably coupled to plunger 40, and the method further comprises decoupling collection vial 50 from plunger 40 after advancing filter 60 into collection vial 50, such as shown in FIGS. 1F, 2F, 6F, 7E, and 8E.

For some of these applications, collection vial 50 is decoupled from plunger 40 while plunger head 42 is within tubular container 30, such as shown in FIGS. 1F, 2F, 6F, 7E, and 8E. This prevents exposure of plunger head 42 and any residual portion of liquid specimen sample 22 that was not driven through filter 60. For some of these applications collection vial 50 is decoupled from plunger 40 (a) via proximal end 81 of plunger 40, (b) while the plunger head is advanced as far as possible within the tubular container, and/or (c) without proximally withdrawing the plunger head within the tubular container.

For some applications, plunger head 42 is inserted into tubular container 30 while collection vial 50 is disposed partially within internal plunger space 86, with axial portion 87 of collection vial 50 protruding proximally out of plunger-space proximal opening 90 of internal plunger space 86. For some of these applications, plunger head 42 is distally advanced within tubular container 30 to drive the at least a portion of liquid specimen sample 22 through filter 60 by pushing on axial portion 87 of collection vial 50.

For some of these applications in which plunger 40 comprises plunger rod 82 that is shaped so as to define internal plunger space 86, such as described hereinabove, plunger head 42 is inserted into tubular container 30 while collection vial 50 is disposed at least partially within internal plunger space 86, such as shown in FIGS. 1B, 2B, 6B, 7B, and 8B. For some applications, decoupling collection vial 50 from plunger 40 comprises removing collection vial 50 from internal plunger space 86 through plunger-space proximal opening 90 of internal plunger space 86.

Reference is made to FIG. 3. For some of these applications, collection vial 50 is removably disposed partially within internal plunger space 86, with an axial portion 87 of collection vial 50 protruding proximally out of plunger-space proximal opening 90 of internal plunger space 86. Axial portion 87 of collection vial 50 includes end 89 of collection vial 50 opposite end 91 of collection vial 50 that defines vial opening 52. Optionally, axial portion 87 of collection vial 50 protrudes proximally out of plunger-space proximal opening 90 by a distance D3 of at least 4 cm. For some applications, such as shown in FIGS. 1A-E, 2A-E, 3, and 6A-E, axial portion 87 may be used as a handle for plunger 40; pushing on axial portion 87 distally advances plunger 40 within tubular container 30.

For some of these applications in which plunger 40 comprises plunger rod 82, such as described hereinabove, plunger head 42 is inserted into tubular container 30 while collection vial 50 is disposed alongside plunger rod 82 (configuration not shown).

For some applications, filter support 62 is slidable along tubular container 30, and the method further comprises, after distally advancing plunger head 42 within tubular container 30 to drive the at least a portion of liquid specimen sample 22 through filter 60 and filtrate-passage openings 68 of filter support 62 (such as shown in FIGS. 1B-C, 2B-C, 6B-C, 7B, and 8B), further distally advancing plunger head 42 within tubular container 30 such that plunger head 42 distally pushes filter support 62 within tubular container 30, such as shown in FIGS. 1D-E, 2D-E, 6D-E, 7C-D, and 8C-D.

For some of these applications, such as shown in FIGS. 1A-G, 2A-G, 3-5, and 6A-G, plunger head 142 is disengageably coupled to distal end portion 184 of plunger rod 182. For some of these applications, plunger head 142 becomes decoupled from plunger rod 182 as plunger head 142 distally pushes filter support 62 within tubular container 30, such as shown in FIGS. 1D, 2D, and 6D.

For some applications in which axial portion 87 of collection vial 50 is used as a handle for plunger 140, such as described above with reference to FIGS. 1A-E, 2A-E, 3, and 6A-E, pushing on axial portion 87 distally advances plunger head 142 while plunger rod 182 remains stationary with respect to tubular container 30 (for example, plunger rod 182 and/or tubular container 30 may be shaped so as to set a maximum distal advancement of plunger rod 182 within tubular container 30, e.g., a proximal lip of plunger-space proximal opening 190 of internal plunger space 186 may have a greater diameter than that of tubular container 30). As a result, pushing on axial portion 87 distally advances plunger head 142 and decouples plunger head 142 from plunger rod 182, as plunger head 142 distally pushes filter support 62 within tubular container 30, such as shown in FIGS. 2D and 6D.

For other applications, such as shown in FIGS. 7A-F, 8A-F, and 9A-C, plunger head 342 is fixedly coupled to distal end portion 384 of plunger rod 382, and does not become decoupled from plunger rod 382 as plunger head 342 distally pushes filter support 62 within tubular container 30, such as shown in FIGS. 7C and 8C.

For other applications in which sampling device 320 comprises proximal grip 392, such as described hereinabove with reference to FIGS. 9A-C, pushing on proximal grip 392 distally advances plunger 340, causing plunger head 342 to distally push filter support 62 within tubular container 30, such as shown in FIGS. 7C and 8C.

For some applications, the method further comprises sealing vial opening 52 with collection vial cap 80 after filter 60 has been advanced into collection vial 50, such as shown in FIGS. 1G, 2G, 6G, 7F, and 8F.

For some applications, the method further comprises bathing filter 60 with liquid 1010 within collection vial 50 after filter 60 has been advanced into collection vial 50, such as shown in FIGS. 1G, 2G, 6G, 7F, and 8F. For example, liquid 1010 may be selected from the group consisting of: a lysis buffer, saline solution, and transport medium.

For some applications, the method further comprises, after filter 60 has been advanced into collection vial 50, detecting the presence of a biological particulate trapped by filter 60. For example, the biological particulate may be selected from the group consisting of: a virus, a bacterium, a microorganism, a fungus, a spore, a mite, a biological cell, a biological antigen, a protein, a protein antigen, and a carbohydrate antigen.

For some applications, detecting the presence of the biological particulate trapped by filter 60 comprising using a lateral flow immunoassay test strip to detect the presence of the biological particulate trapped by filter 60.

In some applications of the present invention, internal plunger space 86 of plunger rod 82 is shaped so as to define an internal collection chamber, into which filter 60 is advanced (configuration not shown). In these applications, sampling device 20 typically does not comprise collection vial 50 (configuration not shown).

In some applications of the present invention, collection vial 50 is removable from plunger 40 through plunger-head opening 44 (configuration not shown). For some of these applications, collection vial 50 is removable from internal plunger space 86 through plunger-head opening 44 (configuration not shown).

In some applications of the present invention, collection vial 50 is fixedly coupled to plunger 40 (configuration not shown).

In some applications of the present invention, proximal portion 74 of shaft 72 is axially slidable with respect to tubular container 30 (configuration not shown).

Reference is now made to FIGS. 10A and 10B, which are schematic illustrations of another configuration of sampling device 20, in accordance with an application of the present invention. In this configuration, filter 60 is a first filter 60A, and filtration assembly 24 further comprises a second filter 60B, disposed proximally to first filter 60A, such as in contact with a proximal surface of first filter 60A, as shown. Optionally, filtration assembly 24 still further comprises one or more additional filters (configuration not shown).

For some applications in which sampling device 20 is configured such that movement of plunger head 42 and collection vial 50 within tubular container 30 advances filter 60 into collection vial 50, such as described hereinabove, relative axial movement between shaft 72 and collection vial 50 causes proximal portion 74 of shaft 72 to push first filter 60A and second filter 60B into collection vial 50 via vial opening 52, such as shown in FIG. 10B.

For some applications, first and second filters 60A and 60B have different nominal pore sizes, as defined hereinabove. For these applications, second filter 60B typically has a larger nominal pore size than first filter 60A. For example, when the filters are used for capturing free virus, virions, or viral particles by size-based filtration, first filter 60A may have a pore size of between 0.01 and 0.3 microns and/or a molecular weight cut off of between 10 kDa and 500 kDa, and/or second filter 60B may have a nominal pore size of between 30 microns and 1.5 mm, or the other pore sizes provide for the large-pore filters described in above-mentioned U.S. Provisional Application 63/117,294, filed Nov. 23, 2020.

For other applications, first filter 60A may have a pore size of between 0.2 and 2.0 microns, for example, when the filters are used for capturing bacteria by size-based filtration.

For some applications, first filter 60A may comprise a fragile material, such as glass fibers, and second filter 60B may comprise a sturdier material, such as a polymer. Second filter 60B may mechanically support first filter 60A and prevent first filter 60A from breaking apart as proximal portion 74 of shaft 72 pushes the filters into collection vial 50.

For some of these applications, first and second filters 60A and 60B are coupled together at one or more locations on the filters, such that second filter 60B helps draw first filter 60A into collection vial 50. For example, the filters may be coupled together by gluing (using one or more drops of glue, such as a cyanoacrylate), soldering, overmolding, and/or mechanically connecting interlocking parts. Optionally, one or more filter supports are coupled together with first and second filters 60A and 60B, either between, above, and/or below the filters. Optionally, improving sealing between the perimeter of one or more of the filters with inner wall 34 of tubular container 30 may be achieved by reducing and/or filling spacing between the filter fibers, such as heating and compression, overmolding, and/or filling with adhesive material. For example, for configurations in which at least one of the filters comprises a meltable material, such as a polymer, the filter may be melted around its perimeter (edge) to achieve a better seal with inner wall 34 of tubular container 30.

For some applications in which second filter 60B comprises a sturdier material, such as a polymer, second filter 60B may be cut, such as in one or more lines. Such cutting may help prevent plugging of collection vial 50 by second filter 60B after insertion thereinto, such as shown in FIGS. 1G, 2G, 6G, 7F, and 8F.

Figure 11:
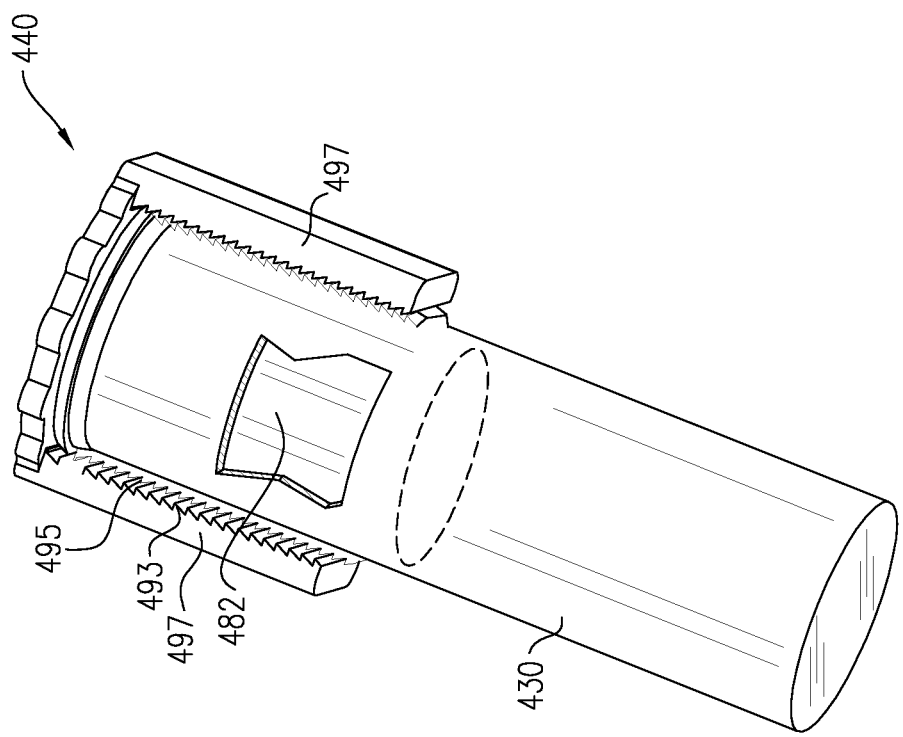
FIG. 11 is a schematic illustration of a plunger fully inserted into a tubular container, in accordance with an application of the present invention.

Reference is now made to FIG. 11, which is a schematic illustration of a plunger 440 fully inserted into a tubular container 430, in accordance with an application of the present invention. FIG. 11 shows plunger 440 maximally distally advanced with respect to tubular container 430. Plunger 440 comprises a plunger rod 482, which has a distal end portion to which a plunger head is coupled. Optionally, the features of plunger 440 and tubular container 430 may be combined with any of the plungers and tubular containers described herein.

Plunger 440 is shaped so as to define first ratchet teeth 493 that face radially inwardly and are configured to engage corresponding second ratchet teeth 495 that are defined by an external surface of tubular container 430 and face radially outward. Plunger 440 and tubular container 430 may respectively comprise one or more sets of first and second ratchet teeth 493 and 495 (for example, two sets, as shown). For some applications, plunger 440 comprises one or more teeth supports 497, which extend proximally alongside at least a portion of plunger rod 482, separated from plunger rod 482 to provide a space for insertion of tubular container 430. The one or more teeth supports 497 are shaped so as to define the one or more sets of first ratchet teeth 493.

Typically, first and second ratchet teeth 493 and 495 are configured to allow only distal advancement of plunger 440 with respect to tubular container 430 and to prevent proximal withdrawal of the plunger 440 with respect to tubular container 430. This one-way limitation may prevent the user from removing plunger 440 from tubular container 430 after distal advancement of plunger 440 within tubular container 430.

Figure 12:
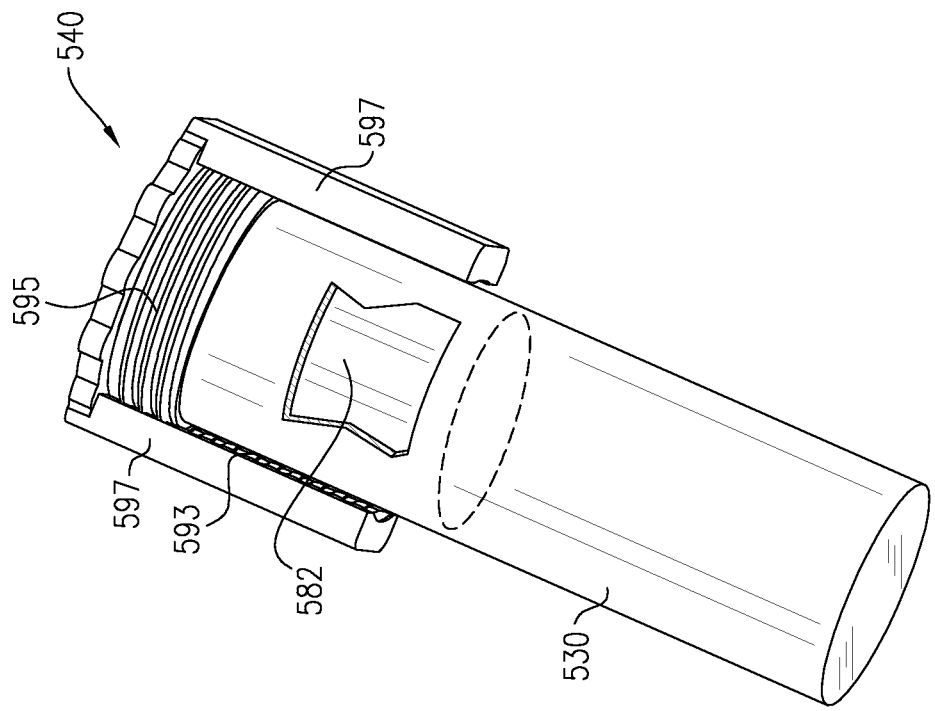
FIG. 12 is a schematic illustration of another plunger fully inserted into another tubular container, in accordance with an application of the present invention.

Reference is now made to FIG. 12, which is a schematic illustration of a plunger 540 fully inserted into a tubular container 530, in accordance with an application of the present invention. FIG. 12 shows plunger 540 maximally distally advanced with respect to tubular container 530. Plunger 540 comprises a plunger rod 582, which has a distal end portion to which a plunger head is coupled. Optionally, the features of plunger 540 and tubular container 530 may be combined with any of the plungers and tubular containers described herein.

Plunger 540 is shaped so as to define a first thread (configuration not shown) or one or more first thread segments 593 (as shown) that face radially inwardly and are configured to engage a corresponding second thread 595 that is defined by an external surface of tubular container 530 and faces radially outward. For some applications, plunger 540 comprises one or more thread supports 597, which extend proximally alongside at least a portion of plunger rod 582, separated from plunger rod 582 to provide a space for insertion of tubular container 530. The one or more thread supports 597 are shaped so as to define the first thread (configuration not shown) or the one or more first thread segments 593, respectively (as shown). Providing the threads may help the user apply sufficient and/or correct pressure to liquid specimen sample 22 for pushing liquid specimen sample 22 through a filter within tubular container 530.

Reference is now made to FIGS. 13A-D, which are schematic illustrations of filters 660A, 660B, 660C, and 660D, respectively, in accordance with respective applications of the present invention. Filters 660A, 660B, 660C, and 660D are respective implementations of filter 60, described herein, and may be substituted for filter 60 in any of the filtration assemblies described herein.

Filters 660A, 660B, 660C, and 660D are shaped so as to define respective pluralities of slits 662A, 662B, 662C, and 662D therethrough. These slits may improve passage of liquid 1010 through the filter during bathing of the filter in collection vial 50 after the filter has been placed in collection vial 50, such as described hereinabove FIGS. 1G, 2G, 6G, 7F, and 8F. As can be seen in FIGS. 2D-G, 6D-G, 8C-F, 10B, 19D-G, 20, and 21, during insertion of the filter into collection vial 50, the filter may be transformed into a cuplike shape from its initial flat shape while disposed on the filter support within the filtration assembly. This transformation may cause the filter to separate along the slits, creating openings through which liquid 1010 can pass.

Typically, when liquid specimen sample 22 is driven through the filters, liquid specimen sample 22 substantially does not pass through slits 662A, 662B, 662C, and 662D, but instead passes through pores of the filters, because the flat shape of the filters holds the edges of the slits together. This non-passage of liquid specimen sample 22 through slits in filters in a pattern similar to that of slits 662C was observed in experiments conducted by the inventors using gargled fluid as the liquid specimen sample.

For some applications, slits 662A, 662B, 662C, and 662D include respective radial-inward ends 664 and radially-outward ends 666, radially-inward ends 664 closer to a center 668 of the filters than are radially-outward ends 666. Optionally, radially-outward ends 666 are located on a perimeter 670 of the filters.

For some applications, the slits are curved, such as slits 662B and 662D. For some applications, the slits are straight, such as slits 662C. For some applications, the slits include segments angled with respect to one another, such as slits 662A.

For some applications, filters 660A, 660B, 660C, and 660D are shaped so as to define central regions 672 that are not shaped so as to define slits 662A, 662B, 662C, and 662D, respectively. Central regions 672 may have an area of at least 20 mm2, no more than 75 mm2, and/or between 20 and 75 mm2, and/or between 75% and 150% of an area of filter-support shaft-passage region 69 (e.g., filter-support opening 70).

Figure 14A:
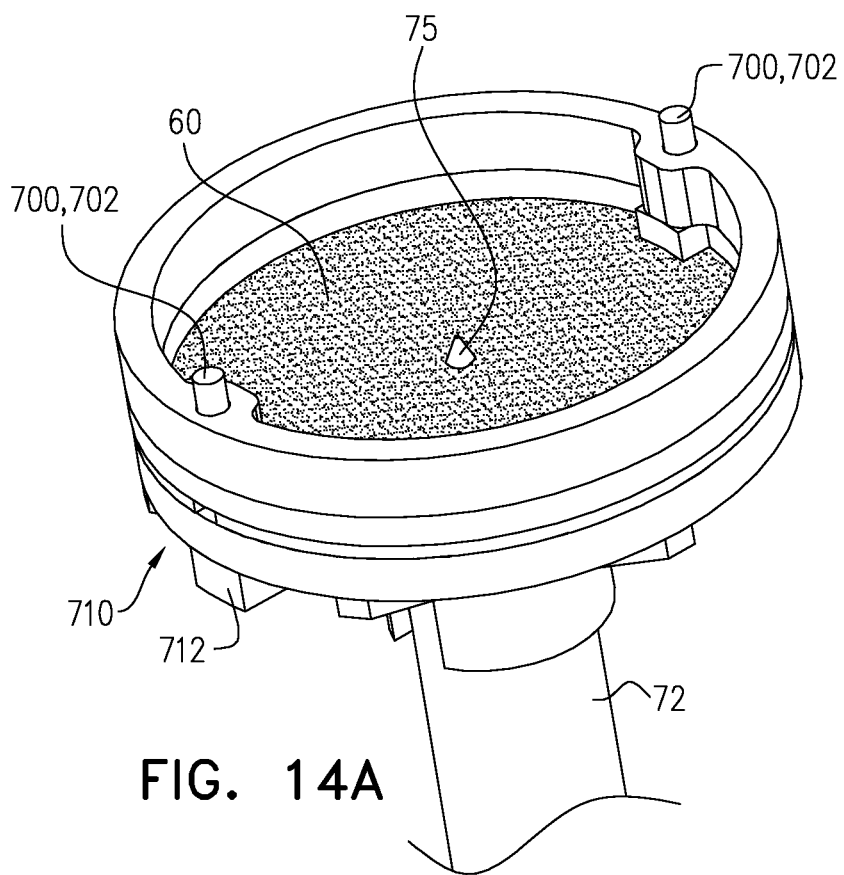
FIGS. 14A-B are a schematic illustration and a schematic cross-sectional illustration of an alternative configuration of coupling between a filter support and a shaft, in accordance with an application of the present invention.
Figure 14B:
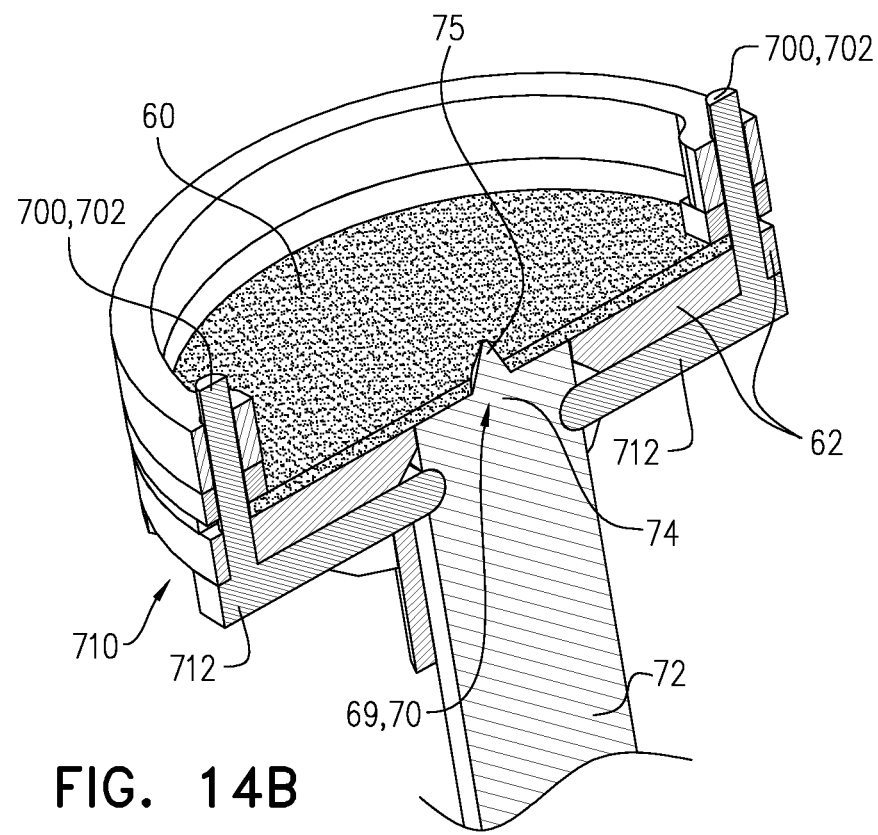

Reference is now made to FIGS. 14A-B, which are a schematic illustration and a schematic cross-sectional illustration of an alternative configuration of coupling between filter support 62 and shaft 72, in accordance with an application of the present invention. In this configuration, filter support 62 and shaft 72 are releasably axially locked with respect to each other such that:

the first distal advancement of plunger head 42 within tubular container 30, described hereinabove with reference to the transitions between FIGS. 1B and 1C, between FIGS. 2B and 2C, between FIGS. 6B and 6C, between FIGS. 7A and 7B, and between FIGS. 8A and 8B, does not axially unlock filter support 62 and shaft 72 with respect to each other, and the further second distal advancement of plunger head 42, described hereinabove with reference to FIGS. 1D-E, 2D-E, 6D-E, 7C-D, and 8C-D, axially unlocks filter support 62 and shaft 72 with respect to each other, thereby enabling axial movement with respect to each other.

For some applications, filtration assembly 24 comprises one or more release controls 700, which are configured to axially unlock filter support 62 and shaft 72 with respect to each other upon actuation of the one or more release controls 700 by the further second distal advancement of plunger head 42. For example, the one or more release controls 700 may comprise one or more pins 702, respectively, which extend proximally, and are actuated by being pushed distally.

For some applications, a locking assembly 710 is provided that comprises the one or more release controls 700 and one or more prongs 712 that engage shaft 72 (for example, respective indentations in shaft 72) when locking assembly 710 is in a locked state, such as shown in FIGS. 14A-B. Actuation of the one or more release controls 700 disengages the one or more prongs 712 from shaft 72, thereby transitioning locking assembly 710 to an unlocked state in which filter support 62 and shaft 72 can axially move with respect to each other (state not shown).

Figure 15:
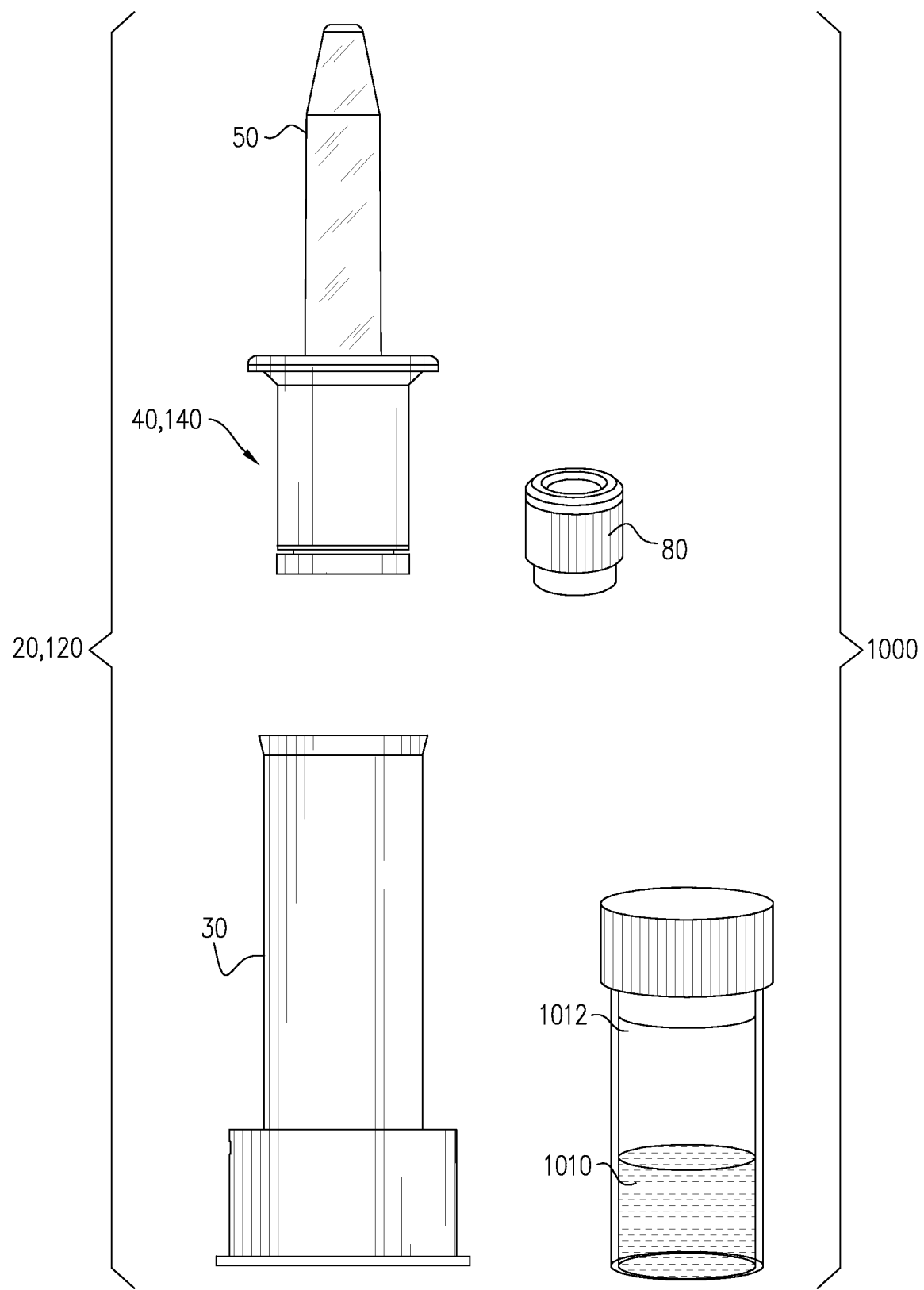
FIG. 15 is a schematic illustration of a testing kit, in accordance with an application of the present invention.

Reference is now made to FIG. 15, which is a schematic illustration of a testing kit 1000, in accordance with an application of the present invention. Testing kit 1000 comprises sampling device 20 (e.g., sampling device 120, as shown), sampling device 220, sampling device 320, sampling device 1320, sampling device 1420, sampling device 1520, sampling device 1620, or sampling device 1720 (not shown) and a liquid 1010 for bathing filter 60 within a collection vial (or an extraction tube, such as in the case of sampling device 1720). Liquid 1010 may, for example, be selected from the group consisting of: a lysis buffer, saline solution (e.g., phosphate buffered saline (PBS)), and transport medium (e.g., universal transport medium or a viral transport medium).

Testing kit 1000 may be used, for example, for collecting liquid specimen sample 22 from the subject and sending at least a portion of the specimen sample to a remote laboratory in the liquid in collection vial 50, such as for performing Polymerase Chain Reaction (PCR) testing for particulate in liquid specimen sample 22.

The particulate may, for example, be a virus (e.g., an Influenza virus, or a coronavirus, such as SARS-CoV-2), a bacterium (e.g., *Streptococcus* bacteria, such as *Streptococcus pyogenes* (Strep A)), a microorganism, an antigen, a human cell, a cellular biomarker, a hormone, a chemical mediator from cells (e.g., a mediator of inflammation), a pollen, mucous, saliva, sputum, a respiratory particle, droplets derived from the upper and lower airways, a nucleic acid including DNA and RNA, and a chemical originating from external vapors. When the particulate is a microorganism, the microorganism may be either a pathogenic microorganism or a non-pathogenic microorganism or both, for example, viruses, bacteria, protozoa, and fungi. When the particulate is a human cell, the human cell may be an epithelial cell, for example, a columnar epithelial cell primarily derived from the nasal cavity and a squamous epithelial cell primarily derived from the oral cavity. The human cell may also be a cellular responder of the immune system, for example, neutrophils, eosinophils, lymphocytes, monocytes, macrophages, mast cells, and histocytes.

Optionally, a separate liquid container 1012 is provided that contains liquid 1010, such as shown. Alternatively, liquid 1010 is contained in collection vial cap 80 and released upon placement of cap 80 on collection vial 50 (configuration not shown).

Figure 16A:
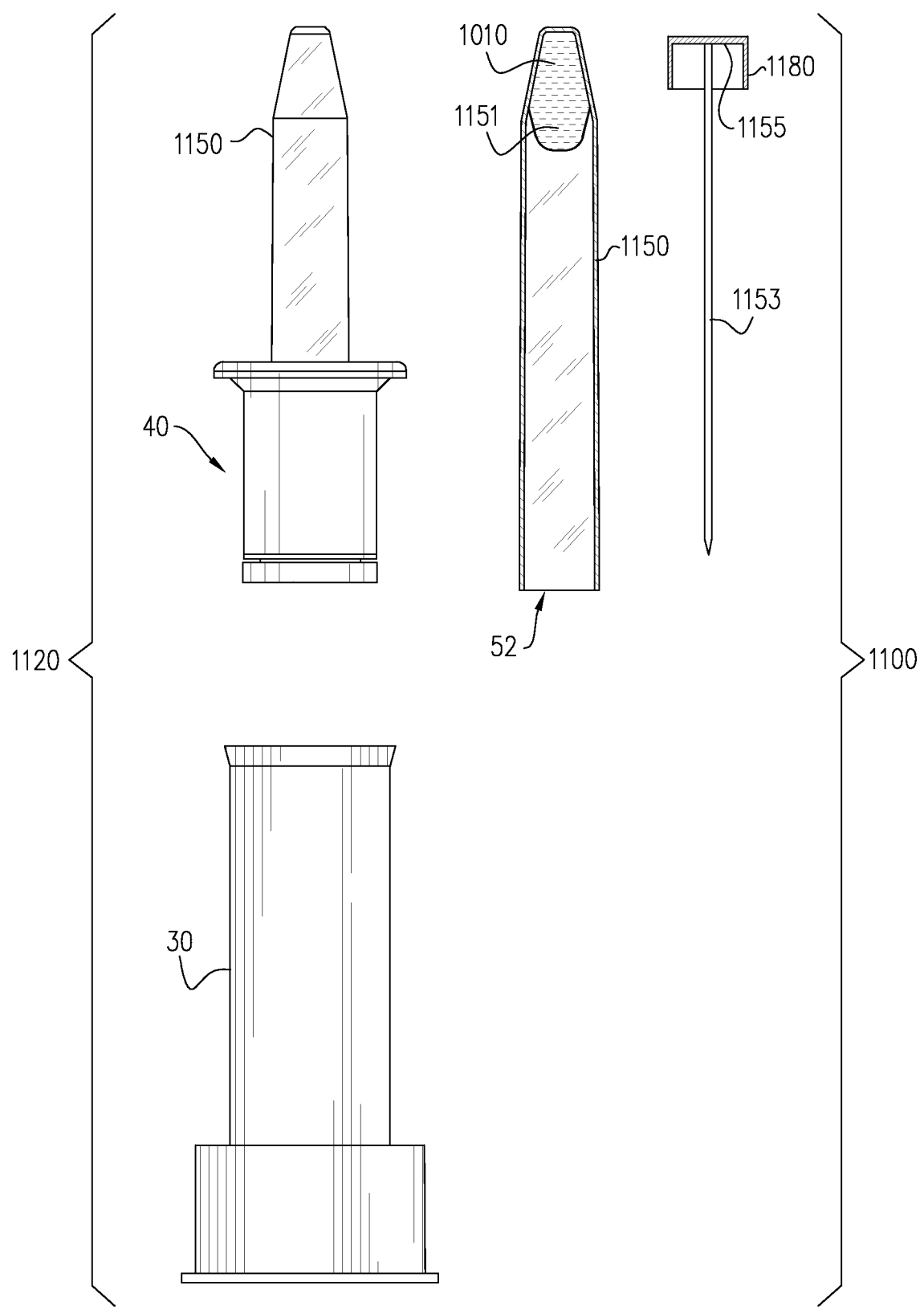
FIGS. 16A-C are schematic illustrations of another testing kit, in accordance with an application of the present invention.
Figure 16B:
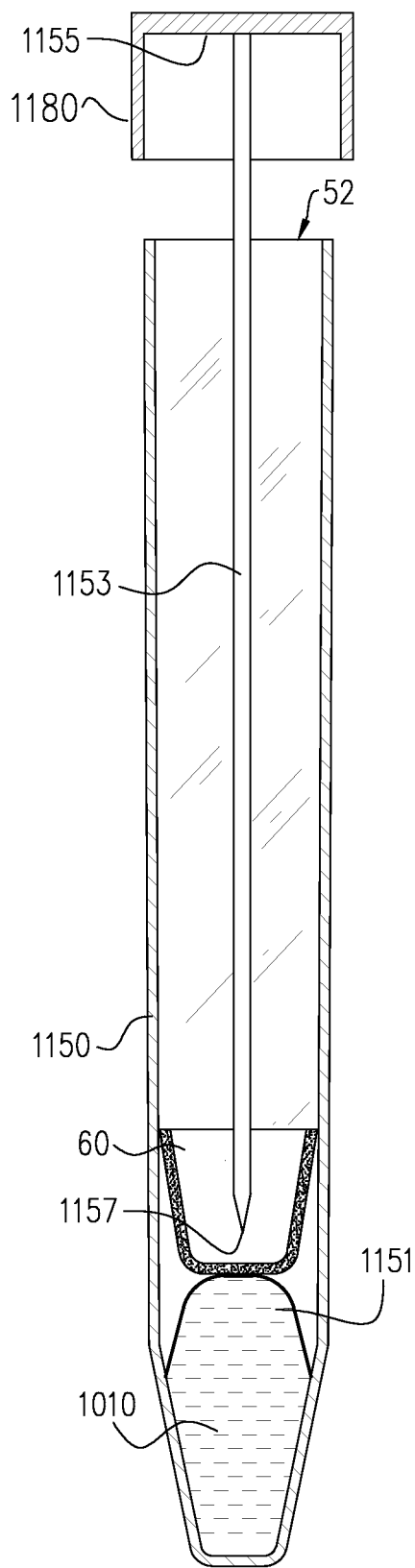
Figure 16C:
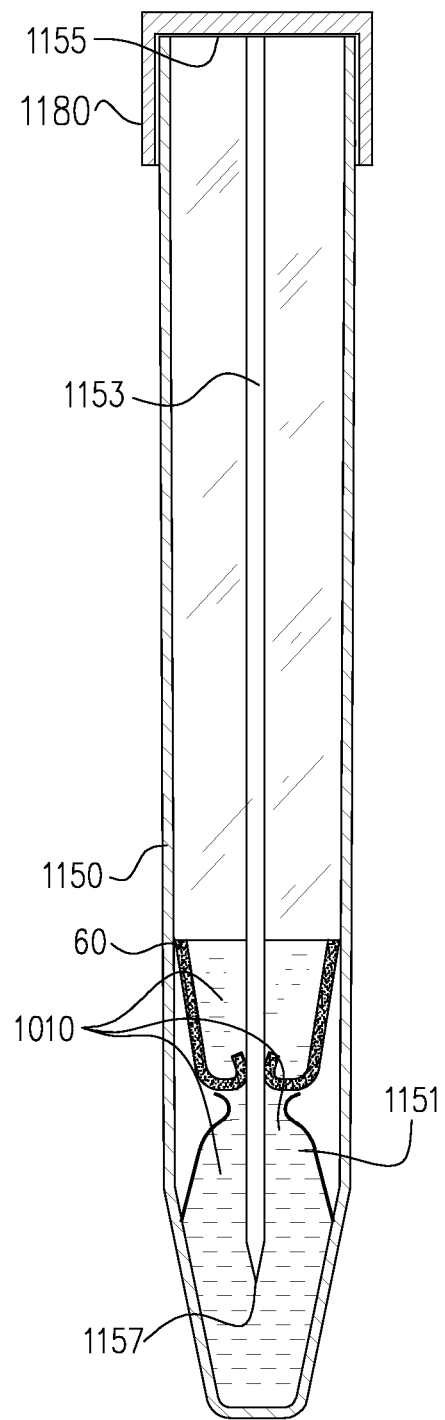

Reference is now made to FIGS. 16A-C, which are schematic illustrations of a testing kit 1100, in accordance with an application of the present invention. Testing kit 1100 comprises a sampling device 1120 and liquid 1010 for bathing filter 60, such as described hereinabove with reference to FIG. 15. Other than as described below, sampling device 1120 may be identical to sampling device 20, described hereinabove, or to sampling device 1320, described hereinbelow, and may implement any of the features of either of these sampling devices, mutatis mutandis. Sampling device 1120 comprises a collection vial 1150. Other than as described below, collection vial 1150 is identical to collection vial 50, described hereinabove, and may implement any of the features thereof, mutatis mutandis.

Collection vial 1150 comprises an internal chamber 1151, which contains liquid 1010 and is configured to prevent spillage of liquid 1010 out of collection vial 1150 regardless of an orientation of collection vial 1150.

Typically, internal chamber 1151 contains a volume of liquid 1010 of at least 0.1 ml (e.g., at least 2 ml, such as 3 ml), no more than 5 ml, and/or between 0.1 ml (e.g., 2 ml) and 5 ml, such as 3 ml.

For some applications, sampling device 1120 further comprises a collection vial cap 1180, which is configured to seal vial opening 52, such as shown in the transition between FIGS. 16B and 16C. For some of these applications, collection vial 1150 and collection vial cap 1180 are configured such that placement of collection vial cap 1180 on vial opening 52 of collection vial 1150 automatically releases liquid 1010 from internal chamber 1151, such as by rupturing, puncturing, or otherwise breaking at least one wall of internal chamber 1151, or opening a valve of internal chamber 1151, such as by a rotational force generated by rotation of collection vial cap 1180 (configuration not shown). For some applications, a method is provided that comprises, after filter 60 has been advanced into collection vial 1150, sealing vial opening 52 with collection vial cap 1180 so as to automatically release liquid 1010 from internal chamber 1151.

For example, collection vial cap 1180 may comprise a shaft 1153 that extends from an inner surface 1155 of collection vial cap 1180, and is configured to puncture internal chamber 1151 when collection vial cap 1180 is placed on vial opening 52. Shaft 1153 may or may not comprise a sharp tip 1157.

Figure 17:
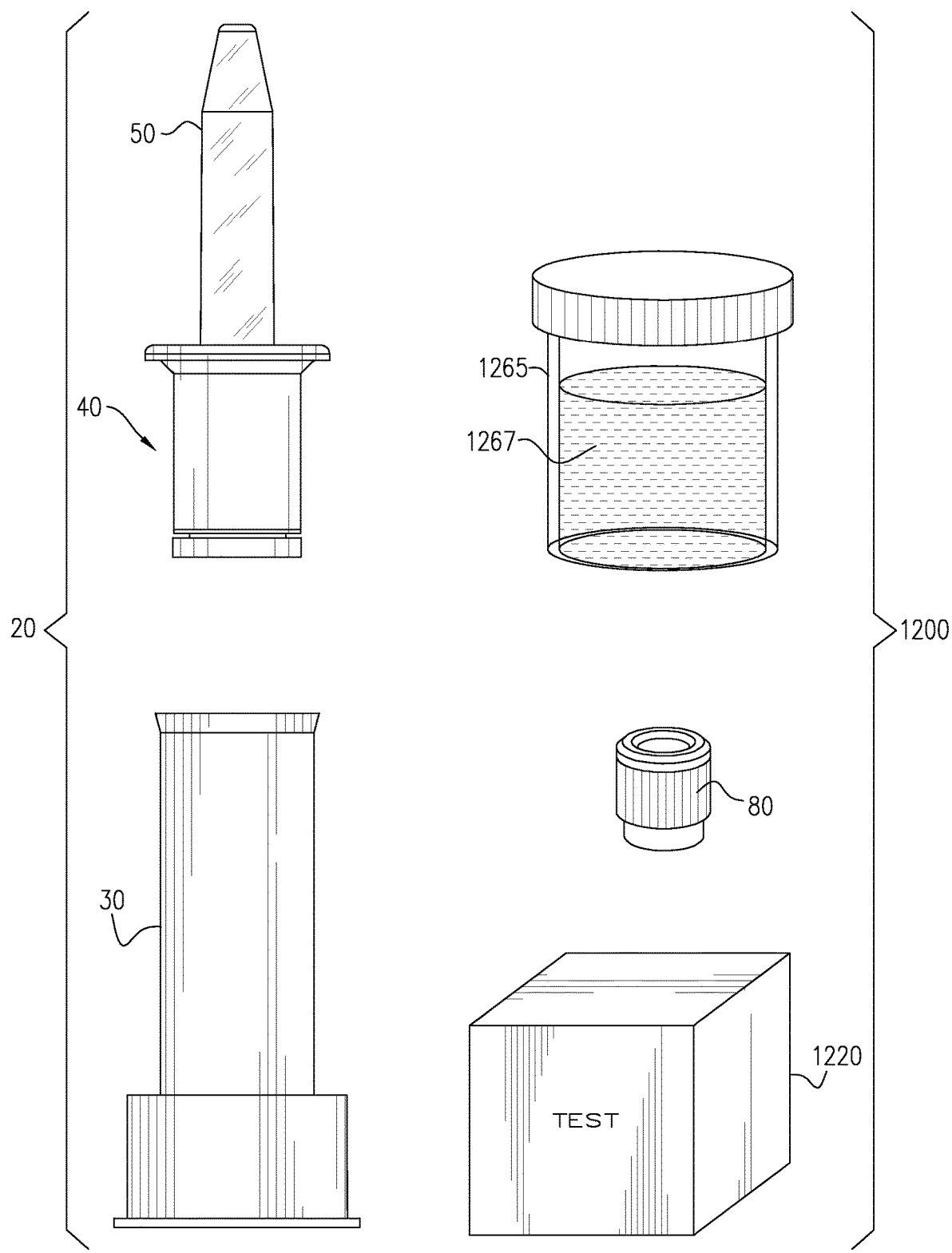
FIG. 17 is a schematic illustration of yet another testing kit, in accordance with an application of the present invention.

Reference is now made to FIG. 17, which is a schematic illustration of a testing kit 1200, in accordance with an application of the present invention. Testing kit 1200 comprises sampling device 20 (as shown) or sampling device 1320, sampling device 1420, sampling device 1520, sampling device 1620, or sampling device 1720 (not shown) and a test 1220 (e.g., a diagnostic test), which is configured to test for the present of a particulate in material trapped by filter 60. The particulate may, for example, be any of the particulates mentioned hereinabove. For some applications, test 1220 comprises a lateral flow immunoassay test strip, which is configured to detect the presence of the particulate (such as by detecting protein antigen, e.g., from a virus), and, optionally, one or more reagents for use with the lateral flow immunoassay strip.

Reference is made to FIGS. 15, 16A-B, and 17. For some applications, such as shown in FIG. 17, testing kit 1000, 1100, or 1200 further comprises a container 1265 containing oral wash fluid 1267. The subject may optionally gargle oral wash fluid 1267, and use sampling device 20 or sampling device 1320 to filter the gargled oral wash fluid. Typically, oral wash fluid 1267 comprises a non-irritant solution; for example, the non-irritant solution may comprise or consist of water. In some applications, the non-irritant solution comprises saline solution that may be hypertonic, isotonic, or hypotonic, for example, a phosphate-buffered saline solution.

For some applications, any of the collection vials described herein may comprise one or more small rigid spheres, contained within the vial. After liquid 1010 is placed or released within the collection vial and filter 60 is placed in the collection vial, such as described herein, the collection vial is agitated, such as shaken, which causes the spheres to break apart the filter, such as by macerating, crushing, shredding, or mashing the filter. This technique may be particularly useful when the filter comprises a fragile material, such as glass fibers. Optionally, the one or more spheres comprise a metal.

Reference is now made to FIGS. 18A-G, which are schematic illustrations of a sampling device 1320 for concentrating liquid specimen sample 22, and a method of using sampling device 1320, in accordance with respective applications of the present invention.

Reference is also made to FIGS. 19A-G, which are schematic cross-sectional illustrations of sampling device 1320 and the method of using sampling device 1320, in accordance with respective applications of the present invention.

Figures 19A, 19B, 19C, 19D, 19E, 19F, 19G:
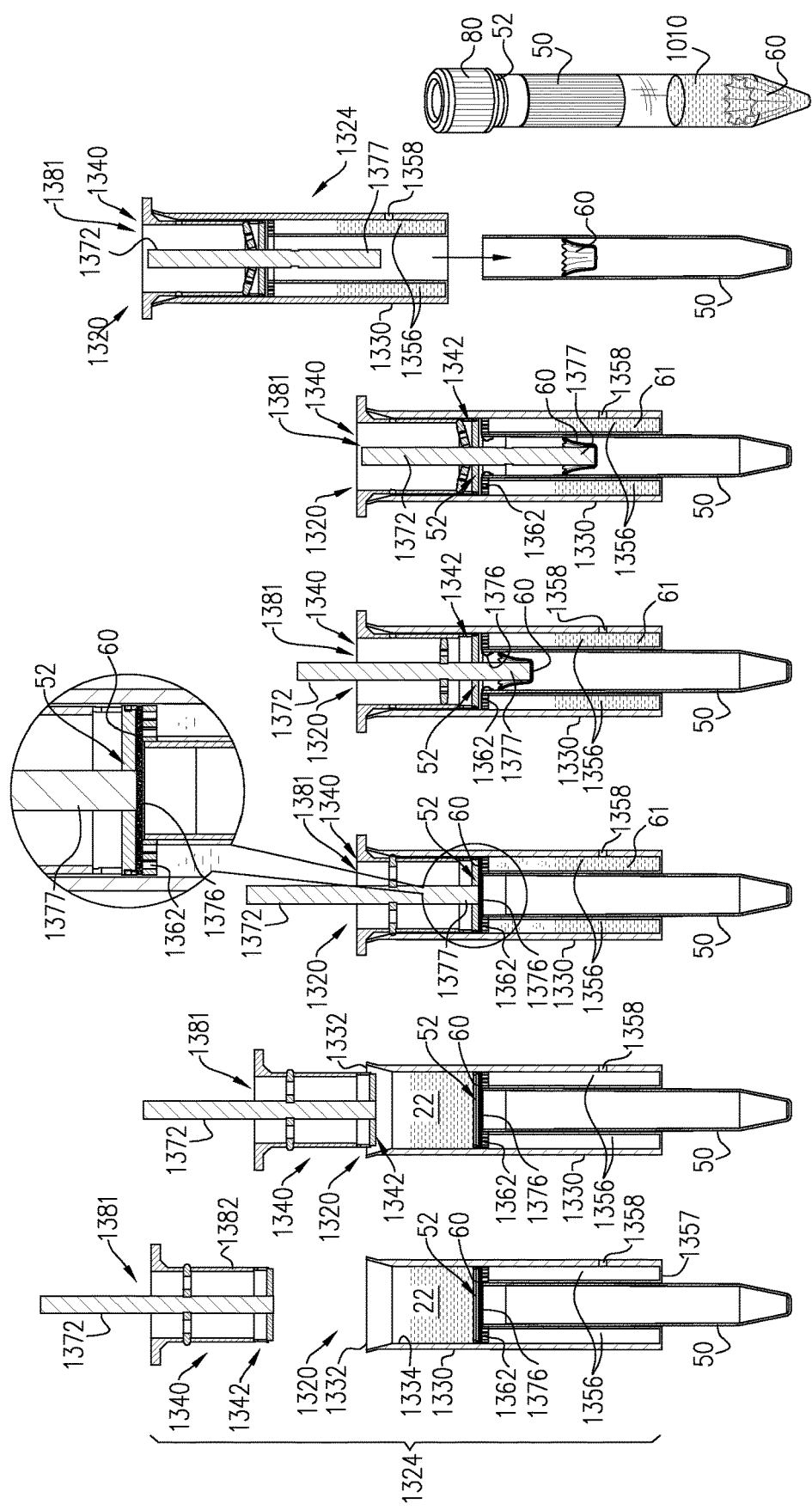
FIGS. 19A-G are schematic cross-sectional illustrations of the sampling device of FIGS. 18A-G and the method of using the sampling device, in accordance with respective applications of the present invention.
Figure 20:
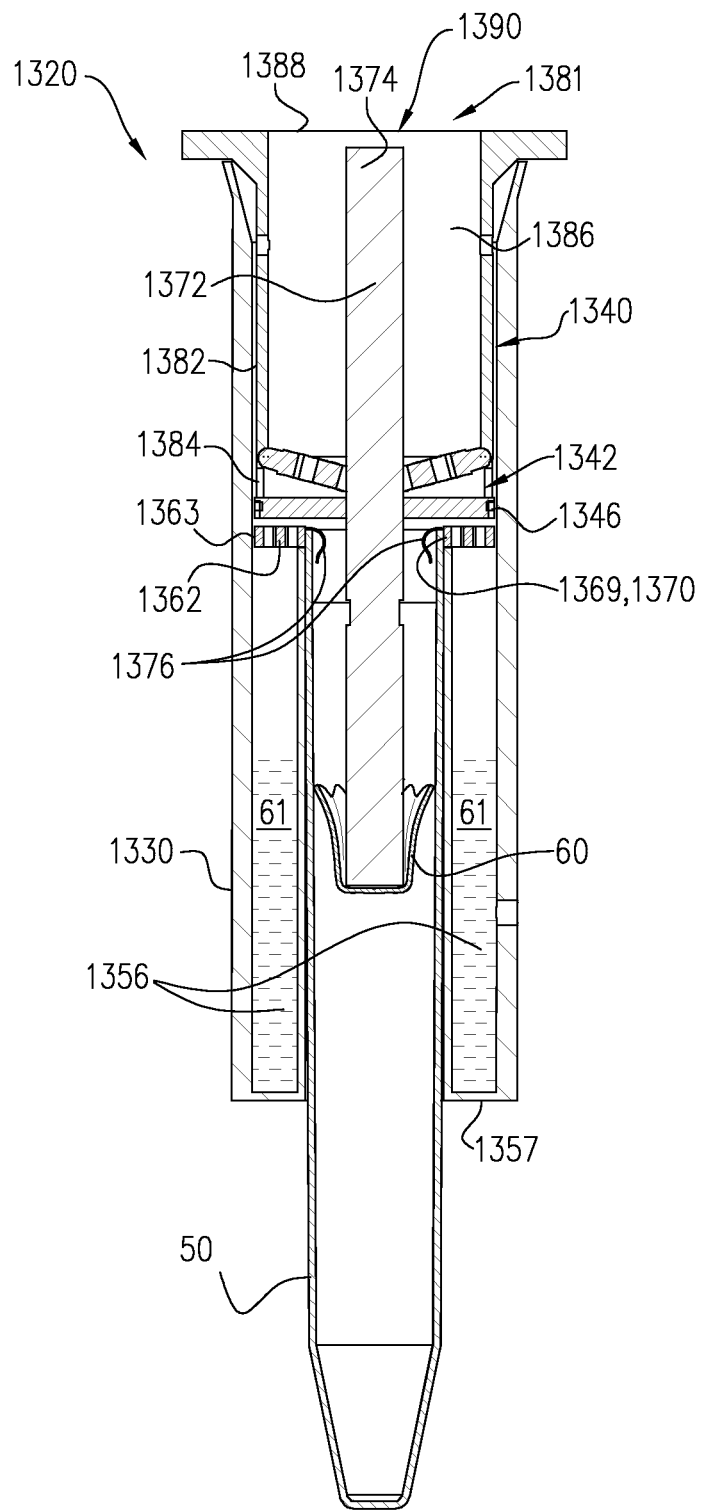
FIG. 20 is an enlarged schematic illustration of the sampling device of FIGS. 18A-G in the state shown in FIGS. 18E and 19E, in accordance with an application of the present invention.

Reference is further made to FIG. 20, which is an enlarged schematic illustration of sampling device 1320 in the state shown in FIGS. 18E and 19E, in accordance with an application of the present invention.

Sampling device 1320 typically comprises a filtration assembly 1324 and collection vial 50, which may have any of the properties described hereinabove. Filtration assembly 1324 comprises a tubular container 1330, a plunger 1340, and filter 60, which is disposed in tubular container 1330 and may have any of the properties described hereinabove with reference to FIGS. 1A-9B. Tubular container 1330 is shaped so as to define a proximal container opening 1332 for receiving liquid specimen sample 22. Optionally, proximal container opening 1332 has a conical or funnel shape to facilitate receipt of liquid specimen sample 22, which may, for example, be expressed (e.g., spit) from subject's mouth into tubular container 1330, or transferred to tubular container 1330 from a collection container. Optionally, the funnel shape of proximal container opening 1332 is similar to funnel-shaped proximal opening 36 shown in FIG. 1 of US Patent Application Publication 2019/0381498 to Fruchter et al., which is incorporated herein by reference. Tubular container may be cylindrical, as shown, or may alternatively have another, non-circular cross-sectional shape. Tubular container 1330 is also shaped so as to define an inner wall 1334.

For some applications, filtration assembly 1324 comprises a plurality of filters (configuration not shown). Optionally, two or more of the plurality of filters touch one another, or are separated by one another by one or more thin spacers (e.g., having a thickness of at least 0.05 mm, no more than 1 mm, and/or between 0.05 and 1 mm. Alternatively or additionally, two or more of the plurality of filters are spaced apart from another, which case filtration assembly 1324 optionally comprises a corresponding number of filter supports.

Typically, tubular container 1330 has an internal volume of at least 0.5 ml (e.g., at least 1 ml, such as at least 5 ml), no more than 500 ml (e.g., no more than 70 ml), and/or between 0.5 ml (e.g., 1 ml or 5 ml) and 500 ml (e.g., 70 ml).

For some applications, tubular container 1330 does not comprise a Luer lock or any other type of needle-coupling mechanism.

Plunger 1340 comprises a plunger head 1342. Plunger 1340 is insertable into tubular container 1330 via proximal container opening 1332, such that a lateral surface 1346 of plunger head 1342 (labeled in FIG. 20) forms a fluid-tight movable seal with inner wall 1334. To this end, lateral surface 1346 may comprise an elastomeric material, such as natural rubber, synthetic rubber, a thermoplastic elastomer, or a combination thereof.

Collection vial 50 is disengageably coupled to filtration assembly 1324, such as to tubular container 1330 of filtration assembly 1324, or to a filter support 1362 of filtration assembly 1324, described hereinbelow. Once collection vial 50 has been decoupled from filtration assembly 1324, a diagnostic test may be performed for the presence of particulate trapped by filter 60, which is now in collection vial 50. For some applications, such as for transporting collection vial 50 to a remote diagnostic laboratory, sampling device 1320 further comprises collection vial cap 80, which is configured to seal vial opening 52, such as shown in FIGS. 18G and 19G.

Filtration assembly 1324 is configured such that movement (typically distal advancement) of plunger head 1342 within tubular container 1330, when liquid specimen sample 22 is contained in tubular container 1330 and filter 60 is disposed in tubular container 1330, pushes at least a portion of liquid specimen sample 22 through filter 60. Filter 60 is configured to concentrate at least a portion of liquid specimen sample 22 onto filter 60, while allowing filtrate 61 to pass through filter 60. Typically, distal advancement of plunger 1340 within tubular container 1330 applies pressure to drive (e.g., push) at least a portion of liquid specimen sample 22 contained in tubular container 1330 through filter 60, such as shown in the transitions between FIGS. 18B and 18C and between FIGS. 19B and 19C.

Sampling device 1320 is configured such that filter 60 is advanceable into (e.g., entirely into) collection vial 50 via vial opening 52 while collection vial 50 is disengageably coupled to filtration assembly 1324, such as shown in FIGS. 18D-E and 19D-E.

For some applications, sampling device 1320 is configured such that filter 60 is advanceable into collection vial 50 via vial opening 52 while plunger head 1342 is within tubular container 1330, such as shown in FIGS. 18D-E and 19D-E. For some of these applications, sampling device 1320 is configured such that filter 60 is advanceable into collection vial 50 via vial opening 52 while plunger head 1342 is advanced as far as possible within tubular container 1330, such as shown in FIGS. 18D-E and 19D-E. Alternatively or additionally, for some applications, sampling device 1320 is configured such that filter 60 is advanceable into collection vial 50 via vial opening 52 without any proximal withdrawal of plunger head 1342 within tubular container 1330, such as shown in FIGS. 18D-E and 19D-E.

For some applications, filtration assembly 1324 is configured such that when plunger head 1342 is within tubular container 1330, fluid communication is blocked between (a) tubular container 1330 distal to plunger head 1342 and (b) proximal container opening 1332. For some of these applications, filter 60 is advanceable into collection vial 50 while plunger head 1342 is within tubular container 1330.

Typically, filtration assembly 1324 further comprises a waste liquid receptacle 1356 for receiving filtrate 61. For some applications, a distal portion of tubular container 1330 is shaped so as to define waste liquid receptacle 1356, such as shown in the drawings. For other applications, waste liquid receptacle 1356 is provided as a separate container coupled in fluid communication with tubular container 1330 downstream (distally) to filter 60.

Optionally, waste liquid receptacle 1356 is shaped so as to define an opening 1358 through an external wall of waste liquid receptacle 1356 to release displaced air. For example, opening 1358 may be located on a side portion of the external wall, typically above the highest level that filtrate 61 is expected to reach during ordinary use of the device. For some applications, waste liquid receptacle 1356 comprises an air filter (e.g., an N98 filter) that is disposed to filter air that passes out of waste liquid receptacle 1356 through opening 1358 (not shown). Alternatively or additionally, for some applications, waste liquid receptacle 1356 comprises a one-way pressure-sensitive valve disposed in opening 1358.

As mentioned above, collection vial 50 typically is not shaped so as to define any pressure-release openings and does not comprise any pressure-release valves.

For some applications, waste liquid receptacle 1356 contains a disinfectant or a liquid-absorbing material.

For some applications, sampling device 1320 further comprises a shaft 1372, and sampling device 1320 is configured such that that a distal portion 1377 of shaft 1372 is axially movable through vial opening 52 so as to advance filter 60 into collection vial 50 via vial opening 52, such as shown in FIGS. 18D-E and 19D-E.

For some of these applications, shaft 1372 is coupled to plunger 1340. Typically, sampling device 1320 is configured such that shaft 1372 remains axially stationary with respect to plunger head 1342 during the movement of plunger head 1342 within tubular container 1330, such as shown in the transitions between FIGS. 18B and 18C and between FIGS. 19B and 19C.

For some of these applications, plunger head 1342 is shaped so as to define a plunger-head opening 1344 through plunger head 1342, and shaft 1372 is slidable through plunger-head opening 1344, such as shown in the transitions between FIGS. 18C and 18E and between FIGS. 19C and 19E. Typically, plunger-head opening 1344 forms a fluid-tight movable seal with an outer surface of shaft 1372.

For some applications, sampling device 1320 further comprises a fluid-tight frangible seal 1376. Collection vial 50 is positioned distal to filter 60 such that frangible seal 1376 removably blocks liquid flow into vial opening 52.

Frangible seal 1376 may be coupled to filter-support shaft-passage region 1369 (e.g., filter-support opening 1370), described hereinbelow (such as shown), vial opening 52 (configuration not shown), another element disposed between filter-support shaft-passage region 1369 (e.g., filter-support opening 1370) and vial opening 52 (configuration not shown), or a combination of these locations.

For example, frangible seal 1376 may comprise a pliable material (such as silicone) that is easily torn or a rigid material that is easily broken (e.g., shaped so as define slits to aid in breaking).

For some applications, filtration assembly 1324 further comprises a filter support 1362, which is disposed within tubular container 1330. Filter support 1362 is shaped so as to define:
  a proximal support surface 1364, which may be perpendicular to a central longitudinal axis of tubular container 1330 (as shown), or may be angled with respect to the central longitudinal axis (configuration not shown), and
  a plurality of filtrate-passage openings 1368 through filter support 1362.

Filter 60 is disposed on proximal support surface 1364.

For some of these applications, filter support 1362 is shaped so as to further define a filter-support shaft-passage region 1369, which, for some applications, is shaped so as to define a filter-support opening 1370 through filter support 1362. For some of these applications, collection vial 50 is positioned distal to filter 60 such that frangible seal 1376 removably blocks liquid flow through filter-support shaft-passage region 1369 (e.g., filter-support opening 1370) into vial opening 52, such that upon breaching of frangible seal 1376 vial opening 52 is in fluid communication with filter-support shaft-passage region 1369 (e.g., filter-support opening 1370).

Filter-support shaft-passage region 1369 and filter-support opening 1370 may implement any of the features of filter-support shaft-passage region 69 and filter-support opening 70, respectively, as described hereinabove. In configurations in which frangible seal 1376 is provided, filter-support shaft-passage region 1369 is typically shaped so as to define filter-support opening 1370.

Typically, a cross-sectional area of filter-support shaft-passage region 1369 (e.g., filter-support opening 1370) is substantially larger than an average cross-sectional area of filtrate-passage openings 1368; for example, the cross-sectional area of filter-support shaft-passage region 1369 (e.g., filter-support opening 1370) may be at least 10 times, such as at least 25 times, the average cross-sectional area of filtrate-passage openings 1368.

For some applications:
the cross-sectional area of filter-support shaft-passage region 1369 (e.g., filter-support opening 1370) is between 20 and 75 mm2,
the average cross-sectional area of filtrate-passage openings 1368 is between 0.5 and 1.5 mm2, and/or
For some applications, a cross-sectional area of filter-support shaft-passage region 1369 (e.g., filter-support opening 1370) is between 2.5% and 20% of a cross-sectional area of proximal support surface 1364 of filter support 1362.

For some applications in which filtration assembly 1324 comprises waste liquid receptacle 1356, waste liquid receptacle 1356 is disposed downstream of filter support 1362, and filter support 1362 is shaped so as to define filtrate-passage openings 1368 through filter support 1362 into waste liquid receptacle 1356. Typically filter support 1362 is not shaped so as to define filter-support shaft-passage region 1369 (e.g., filter-support opening 1370) through filter support 1362 into waste liquid receptacle 1356.

For some applications in which sampling device 1320 further comprises shaft 1372, filter support 1362 and shaft 1372 are configured such that that distal portion 1377 of shaft 1372 is axially movable through filter-support shaft-passage region 1369 (e.g., filter-support opening 1370) and vial opening 52 so as to breach of frangible seal 1376 and advance filter 60 into collection vial 50 via vial opening 52, such as shown in FIGS. 18D and 19D.

For some of these applications, distal portion 1377 of shaft 1372, filter-support shaft-passage region 1369 (e.g., filter-support opening 1370), and vial opening 52 are coaxial. Alternatively or additionally, for some of these applications, distal portion 1377 of shaft 1372, filter-support shaft-passage region 1369 (e.g., filter-support opening 1370), and vial opening 52 are coaxial with or parallel to the central longitudinal axis of tubular container 1330.

For some applications, a cross-sectional area of distal portion 1377 of shaft 1372 is between 80% and 110% of a cross-sectional area of filter-support shaft-passage region 1369 (e.g., filter-support opening 1370).

For some applications, such as shown in FIGS. 18A-G, 19A-G, and 20, and labeled in FIGS. 18A, 19A, and 20, plunger 1340 comprises a plunger rod 1382, which has a distal end portion 1384 to which plunger head 1342 is coupled. Plunger rod 1382 and plunger head 1342 may be fabricated as a single integral piece, or as two pieces fixed together during manufacture. Plunger 1340 has a proximal end 1381.

For some of these applications, plunger rod 1382 is shaped so as to define an internal plunger space 1386, and shaft 1372 is removably disposed at least partially within internal plunger space 1386. For some of these applications, a proximal end 1388 of plunger rod 1382 is shaped so as to define a plunger-space proximal opening 1390 of internal plunger space 1386, and shaft 1372 is slidably disposed at least partially within internal plunger space 1386. Typically, a proximal portion 1374 of shaft 1372 is accessible via plunger-space proximal opening 1390 of internal plunger space 1386.

For some applications, sampling device 1320 is configured such that collection vial 50 is decouplable from filtration assembly 1324 while plunger head 1342 is within tubular container 1330, such as shown in FIGS. 18F and 19F. For some of these applications, sampling device 1320 is configured such that collection vial 50 is decouplable from filtration assembly 1324 while plunger head 1342 is advanced as far as possible within tubular container 1330, such as shown in FIGS. 18F and 19F. Alternatively or additionally, for some applications, sampling device 1320 is configured such that collection vial 50 is decouplable from filtration assembly 1324 without any proximal withdrawal of plunger head 1342 within tubular container 1330, also such as shown in FIGS. 18F and 19F.

For some applications, sampling device 1320 is configured such that collection vial 50 is decouplable from filtration assembly 1324 by distal movement of collection vial 50 with respect to tubular container 1330, such as shown in FIGS. 18F and 19F.

For some applications in which filtration assembly 1324 further comprises waste liquid receptacle 1356, collection vial 50 is disposed at least partially alongside waste liquid receptacle 1356, such as shown in FIGS. 18A and 19A (when sampling device 1320 is in its initial state, which is typically set during manufacture thereof). Typically, collection vial 50 extends distally beyond a distal end 1357 of waste liquid receptacle 1356.

For some applications, waste liquid receptacle 1356 surrounds collection vial 50, such as shown in FIGS. 18A and 19A. For some of these applications, collection vial 50 extends distally beyond and protrudes from distal end 1357 of waste liquid receptacle 1356. Even though waste liquid receptacle 1356 surrounds collection vial 50, the outer surface of collection vial 50 is not in fluid communication with the internal chamber of waste liquid receptacle 1356, such that the outer surface of collection vial 50 does not get wet and is not exposed to potentially infection biological substances.

For some applications, sterile packaging is provided, in which at least sampling device 1320 is removably disposed.

Figure 21:
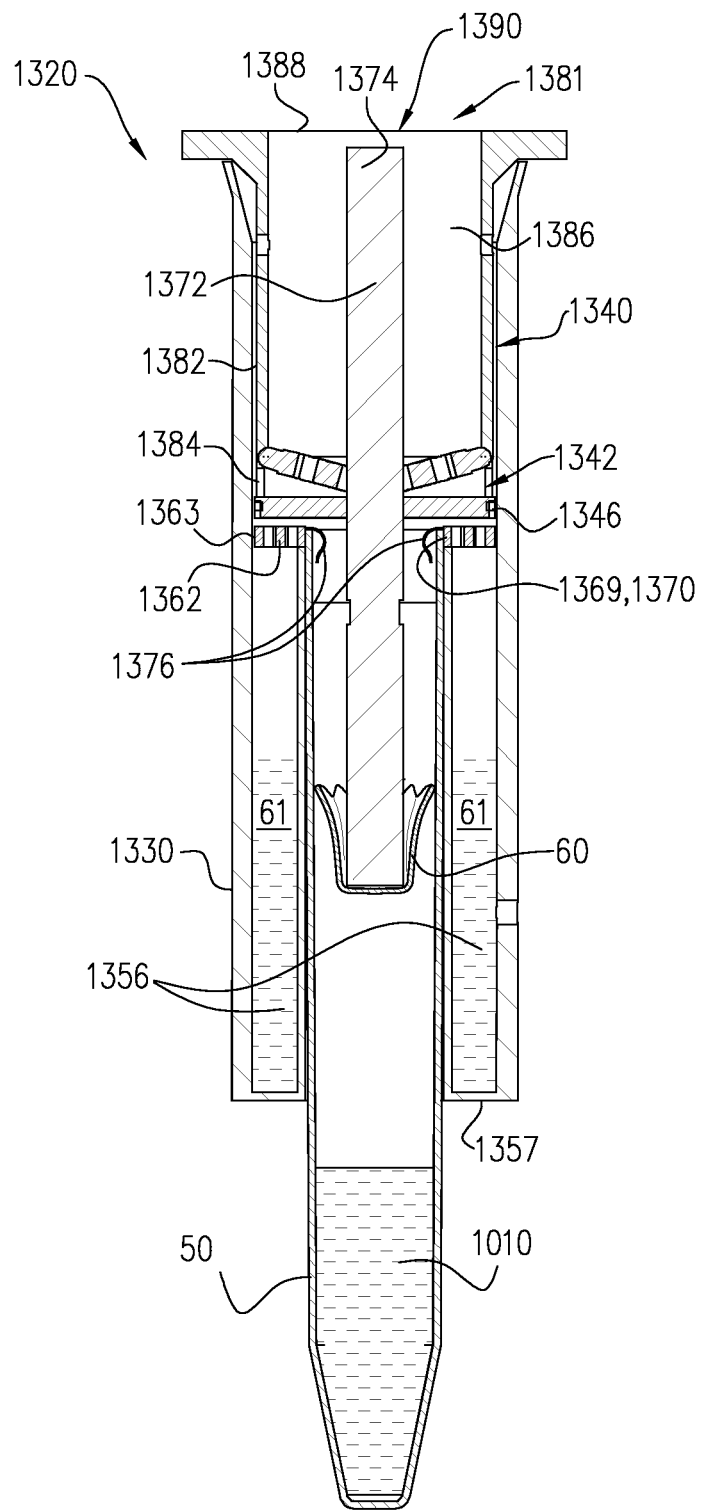
FIG. 21 is a schematic illustration of another configuration of the sampling device of FIGS. 18A-G in the state shown in FIGS. 18E and 19E, in accordance with an application of the present invention.

Reference is made to FIG. 21, which is a schematic illustration of another configuration of sampling device 1320 in the state shown in FIGS. 18E and 19E, in accordance with an application of the present invention. In this configuration, sampling device 1320 comprises frangible seal 1376, and further comprises liquid 1010 contained in collection vial 50, for bathing filter 60 within collection vial 50. For example, liquid 1010 may be selected from the group consisting of: a lysis buffer, saline solution, and transport medium.

Reference is again made to FIGS. 18A-G and 19A-G. In some applications of the present invention, a method for concentrating liquid specimen sample 22 is provided, the method comprising:

placing liquid specimen sample 22 in tubular container 1330 of filtration assembly 1324, proximal to filter 1360 that is disposed within tubular container 1330, such as shown in FIGS. 18A and 19A;

inserting plunger head 1342 of plunger 1340 into tubular container 1330 via proximal container opening 1332 of tubular container 1330, while collection vial 50 is disengageably coupled to the filtration assembly 1324, such that lateral surface 1346 of plunger head 1342 forms a fluid-tight movable seal with inner wall 1334 of tubular container 1330, such as shown in FIGS. 17B and 19B; plunger head 42 is shaped so as to define plunger-head opening 44 through plunger head 42;

distally advancing plunger head 1342 within tubular container 1330 to drive at least a portion of liquid specimen sample 22 through filter 60, such as shown in FIGS. 18C and 19C;

advancing filter 60 into (such as entirely into) collection vial 50 via vial opening 52 of collection vial 50 while collection vial 50 is disengageably coupled to filtration assembly 1324, such as shown in FIGS. 18D-E and 19D-E; and thereafter, decoupling collection vial 50 from filtration assembly 1324, such as shown in FIGS. 18F and 19F.

For some applications, liquid specimen sample 22 is received from a subject's mouth. For some applications, liquid specimen sample 22 comprises gargled fluid, such as described hereinabove with reference to FIGS. 1A-G, 2A-G, and 6A-G. Alternatively, liquid specimen sample 22 comprises saliva not swabbed from the throat of a subject, or obtained such as described hereinabove with reference to FIGS. 1A-G, 2A-G, and 6A-G. Liquid specimen sample 22 (e.g., saliva) may be spit directly by the subject into tubular container 1330 or transferred by a healthcare worker from another container into which the subject spit. Alternatively, in the case of saliva, the saliva may be collected from the subject's mouth by having the subject suck on a swab or other absorbent collecting element, such as flocked swabs or cotton rolls.

For some applications in which the method does not comprise swabbing the throat of the subject, liquid specimen sample 22 is collected by drawing liquid specimen sample 22 out of an oral cavity of the subject via an anterior opening of the oral cavity, such as described hereinabove with reference to FIGS. 1A-G, 2A-G, and 6A-G.

For some applications, filter 60 is advanced into collection vial 50 via vial opening 52 while plunger head 1342 is within tubular container 1330, such as shown in FIGS. 18D-E and 19D-E. For some of these applications, filter 60 is advanced into collection vial 50 via vial opening 52 while plunger head 1342 is advanced as far as possible within tubular container 1330, such as shown in FIGS. 18D-E and 19D-E. Alternatively or additionally, for some of these applications, filter 60 is advanced into collection vial 50 via vial opening 52 without proximally withdrawing plunger head 1342 within tubular container 1330, such as shown in FIGS. 18D-E and 19D-E.

For some applications in which filtration assembly 1324 is configured such that when plunger head 1342 is within tubular container 1330, fluid communication is blocked between (a) tubular container 1330 distal to plunger head 1342 and (b) proximal container opening 1332, filter 60 is advanced into collection vial 50 via vial opening 52 while plunger head 1342 is within tubular container 1330, such as shown in FIGS. 18D-E and 19D-E.

For some applications in which sampling device 1320 further includes shaft 1372, filter 60 is advanced into collection vial 50 by axially moving distal portion 1377 of shaft 1372 through vial opening 52, such as shown in FIGS. 18D-E and 19D-E.

For some applications in which shaft 1372 is coupled to plunger 1340, plunger head 1342 is distally advanced within tubular container 1330 while shaft 1372 remains axially stationary with respect to plunger head 1342, such as shown in FIGS. 18A-C and 19A-C.

For some applications, filter 60 is advanced into collection vial 50 by axially moving distal portion 1377 of shaft 1372 through filter-support shaft-passage region 1369 (e.g., filter-support opening 1370) and vial opening 52 so as to breach of frangible seal 1376 and advance filter 60 into collection vial 50 via vial opening 52.

Such as described above, for some applications, plunger 1340 comprises plunger rod 1382, which is shaped so as to define internal plunger space 1386, shaft 1372 is slidably disposed at least partially within internal plunger space 1386, and proximal end 1388 of plunger rod 1382 is shaped so as to define plunger-space proximal opening 1390 of internal plunger space 1386. For some applications, the method further comprises accessing proximal portion 1374 of shaft 1372 via plunger-space proximal opening 1390 of internal plunger space 1386, such as in order to axially advance shaft 1372.

For some applications, decoupling collection vial 50 is decoupled from filtration assembly 1324 while plunger head 1342 is within tubular container 1330, such as shown in FIGS. 18F and 19F. For some of these applications, collection vial 50 is decoupled from filtration assembly 1324 while plunger head 1342 is advanced as far as possible within tubular container 1330, such as shown in FIGS. 18F and 19F. Alternatively or additionally, for some of these applications, collection vial 50 is decoupled from filtration assembly 1324 without proximally withdrawing plunger head 1342 within tubular container 1330, such as shown in FIGS. 18F and 19F.

For some applications, collection vial 50 is decoupled from filtration assembly 1324 by distally moving collection vial 50 with respect to tubular container 1330, such as shown in FIGS. 18F and 19F.

For some applications, the method further comprises sealing vial opening 52 with a collection vial cap after filter 60 has been advanced into collection vial 50, such as shown in FIGS. 18G and 19G.

For some applications, the method further comprises bathing filter 60 with liquid 1010 within collection vial 50 after filter 60 has been advanced into collection vial 50, such as shown in FIGS. 18G and 19G. For example, the liquid may be selected from the group consisting of: a lysis buffer, saline solution, and transport medium.

For some applications, the method further comprises, after filter 60 has been advanced into collection vial 50, detecting the presence of a biological particulate trapped by filter 60, such as described hereinabove with reference to FIGS. 1A-G, 2A-G, and 6A-G.

In some applications of the present invention (configuration not shown), a sampling device is provided that is similar in some respects to sampling device 1320, and may implement any of the features thereof, mutatis mutandis. This sampling device, unlike sampling device 1320, does not comprise plunger 1340. This sampling device instead comprises a different liquid-pressure source. For example, the liquid-pressure source may comprise a positive-pressure pump (e.g., a hydraulic pump, a syringe, or a motorized and/or electrical pump) disposed upstream of filter 60; optionally, for some applications, the positive-pressure pump comprises a chamber with one or more flexible walls, the squeezing of which pumps liquid specimen sample 22 and/or air.

In an application of the present invention (not shown), the proximal portion of the shaft is axially movable with respect to the proximal container opening.

For some applications, the sampling device is configured to automatically axially move the shaft through the filter-support shaft-passage region, the plunger-head opening, and the vial opening.

For some applications, the sampling device further comprises a spring, which is configured to axially move the proximal portion of the shaft with respect to the proximal container opening.

For some applications, the tubular container includes a distal tubular portion that is distal to the filter support and is configured to have an adjustable length. The sampling device is configured such that shortening of the adjustable length axially moves the shaft through the filter-support shaft-passage region, the plunger-head opening, and the vial opening. For example, the distal tubular portion may be axially collapsible to provide the shortening of the length of the distal tubular portion.

Figure 22A:
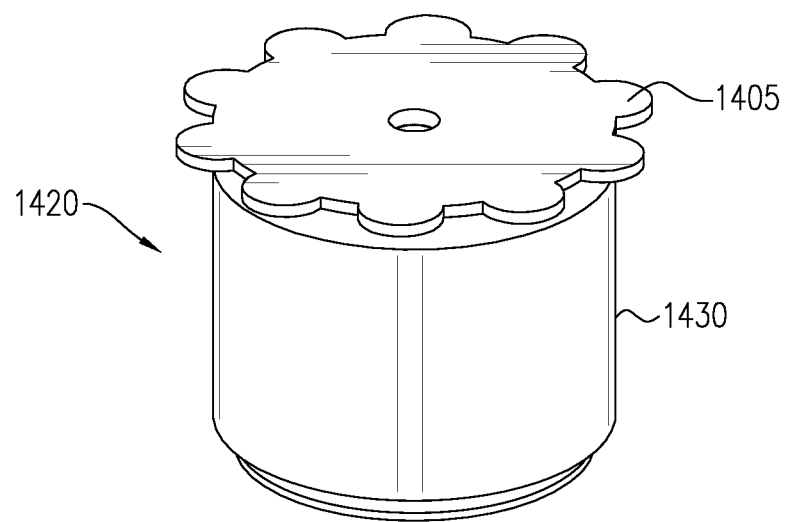
FIGS. 22A-B are schematic illustrations of another sampling device for concentrating a liquid specimen sample, and a portion of the sampling device, respectively, in accordance with an application of the present invention.
Figure 22B:
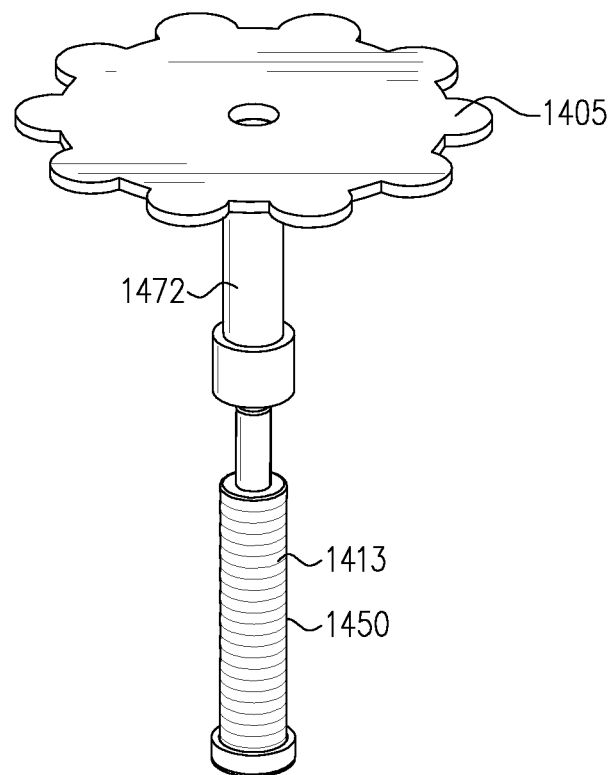

Reference is now made to FIGS. 22A-B, which are schematic illustrations of a sampling device 1420 for concentrating liquid specimen sample 22, and a portion of the sampling device, respectively, in accordance with an application of the present invention.

Reference is also made to FIGS. 23A-D, which are schematic illustrations of sampling device 1420 and a method of using sampling device 1420, in accordance with respective applications of the present invention.

Reference is also made to FIGS. 24A-D, which are schematic cross-sectional illustrations of sampling device 1420 and the method of using sampling device 1420, in accordance with respective applications of the present invention.

Figure 25:
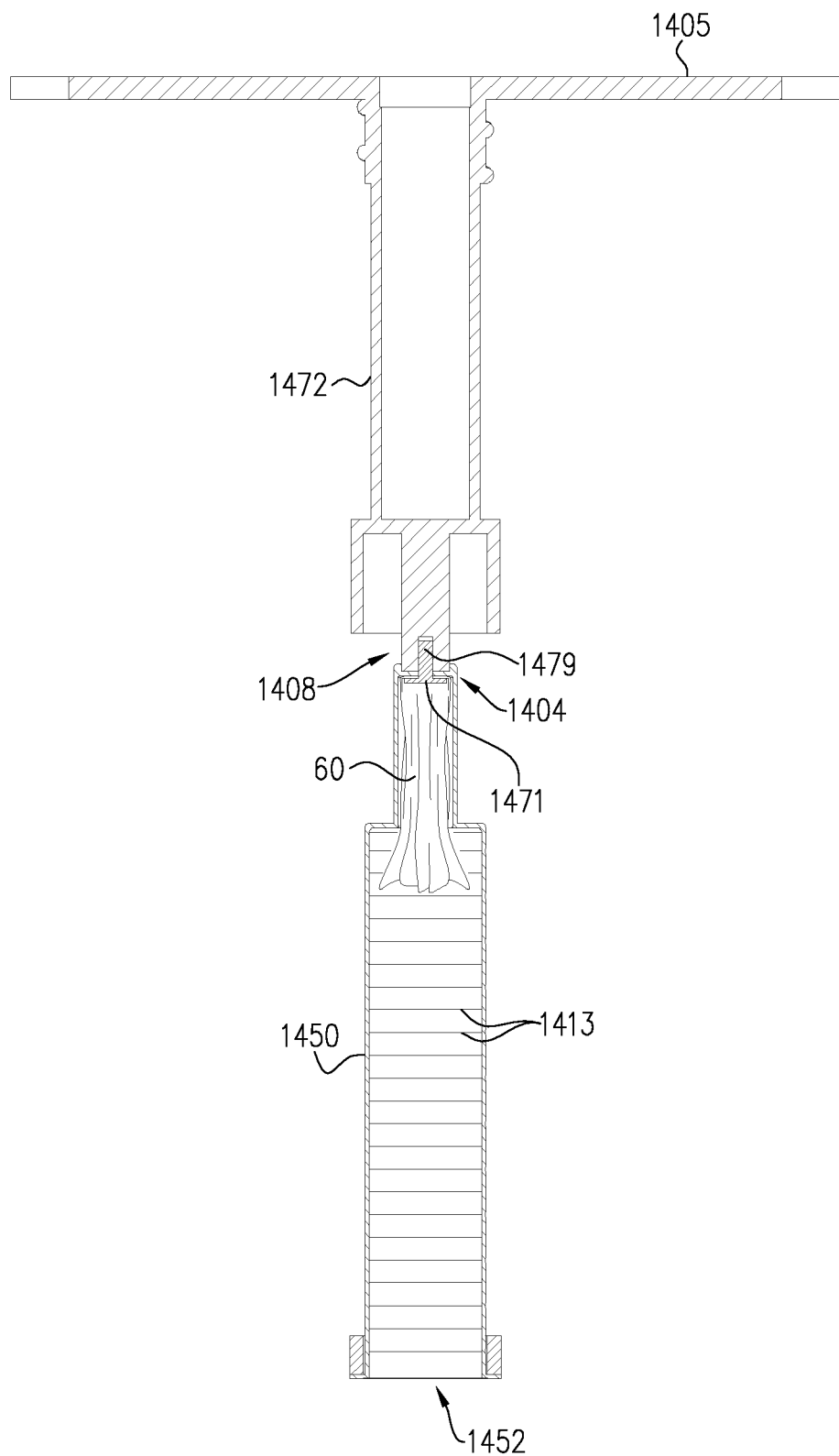
FIG. 25 is an enlarged schematic illustration of a portion of the sampling device of FIGS. 22A-B in the state shown in FIGS. 23D and 24D, in accordance with an application of the present invention.

Reference is further made to FIG. 25, which is an enlarged schematic illustration of a portion of sampling device 1420 in the state shown in FIGS. 23D and 24D, in accordance with an application of the present invention.

Sampling device 1420 typically comprises a filtration assembly 1424 and a collection vial 1450, which may have any of the properties described hereinabove. Filtration assembly 1424 comprises a tubular container 1430, a plunger 1440, and filter 60, which may have any of the properties described hereinabove with reference to FIGS. 1A-9B. Tubular container 1430 is shaped so as to define a proximal container opening 1432 for receiving liquid specimen sample 22. Optionally, proximal container opening 1432 has any of the characteristics described hereinabove regarding the other proximal container openings described herein. Tubular container 1430 is also shaped so as to define an inner wall 1434.

Collection vial 1450 typically is not shaped so as to define any pressure-release openings and does not comprise any pressure-release valves.

For some applications, filtration assembly 1424 comprises a plurality of filters (configuration not shown), optionally having any of the multi-filter configurations described hereinabove. Typically, tubular container 1430 may optionally have any of the characteristics, including, but not limited to, volume) of the tubular containers described hereinabove.

For some applications, tubular container 1430 does not comprise a Luer lock or any other type of needle-coupling mechanism.

As labeled in FIG. 24A, plunger 1440 comprises a plunger head 1442. Plunger 1440 is insertable into tubular container 1430 via proximal container opening 1432, such that a lateral surface 1446 of plunger head 1442 forms a fluid-tight movable seal with inner wall 1434. To this end, lateral surface 1446 may comprise an elastomeric material, such as natural rubber, synthetic rubber, a thermoplastic elastomer, or a combination thereof.

Collection vial 1450 is disengageably coupled to filtration assembly 1424, such as described hereinbelow. Once collection vial 1450 has been decoupled from filtration assembly 1424, a diagnostic test may be performed for the presence of particulate trapped by filter 60, which is now in collection vial 1450. For some applications, such as for transporting collection vial 1450 to a remote diagnostic laboratory, sampling device 1420 further comprises collection vial cap 80, which is configured to seal vial opening 1452, such as shown for collection vial 50 in FIGS. 18G and 19G, mutatis mutandis.

Filtration assembly 1424 is configured such that movement (typically distal advancement) of plunger head 1442 within tubular container 1430, when liquid specimen sample 22 is contained in tubular container 1430 and filter 60 is disposed in tubular container 1430, pushes at least a portion of liquid specimen sample 22 through filter 60. Filter 60 is configured to concentrate at least a portion of liquid specimen sample 22 onto filter 60, while allowing filtrate 61 to pass through filter 60. Typically, distal advancement of plunger 1440 within tubular container 1430 applies pressure to drive (e.g., push) at least a portion of liquid specimen sample 22 contained in tubular container 1430 through filter 60, such as shown in the transitions between FIGS. 23A and 23B and between FIGS. 24A and 24B.

Sampling device 1420 is configured such that filter 60 is advanceable into (e.g., entirely into) collection vial 1450 via vial opening 1452 while collection vial 1450 is disengageably coupled to filtration assembly 1424, such as shown in FIGS. 23C and 24C.

For some applications, sampling device 1420 is configured such that filter 60 is advanceable into collection vial 1450 via vial opening 1452 while plunger head 1442 is within tubular container 1430, such as shown in FIGS. 23C and 24C. For some of these applications, sampling device 1420 is configured such that filter 60 is advanceable into collection vial 1450 via vial opening 1452 while plunger head 1442 is advanced as far as possible within tubular container 1430, such as shown in FIGS. 23C and 24C. Alternatively or additionally, for some applications, sampling device 1420 is configured such that filter 60 is advanceable into collection vial 1450 via vial opening 1452 without any proximal withdrawal of plunger head 1442 within tubular container 1430, such as shown in FIGS. 23C and 24C.

For some applications, such as shown in FIGS. 24A-D, plunger 1440 comprises a plunger rod 1482, which has a distal end portion 1484 to which plunger head 1442 is coupled. Plunger rod 1482 and plunger head 1442 may be fabricated as a single integral piece, or as two pieces fixed together during manufacture. Plunger 1440 has a proximal end 1481.

For some of these applications, plunger rod 1482 is shaped so as to define an internal plunger space 1486. For some of these applications, a proximal end 1488 of plunger rod 1482 is shaped so as to define a plunger-space proximal opening 1490 of internal plunger space 1486. Plunger head 1442 is shaped so as to define a plunger-head opening 1444 through plunger head 1442 and into internal plunger space 1486.

Typically, collection vial 1450 is removably disposed at least partially within internal plunger space 1486.

Typically, collection vial 1450 is positioned proximal to plunger head 1442.

For some of these applications, collection vial 1450 is removably disposed at least partially within internal plunger space 1486 while collection vial 1450 is an axially-compressed configuration, such as shown in FIGS. 23A-B and 24A-B. Collection vial 1450 is elongatable from the axially-compressed configuration, such as shown in the transitions between FIG. 23B and FIG. 23C and between FIGS. 24B and 24C. Optionally, a wall 1413 of collection vial 1450 is accordion-shaped to allow the elongation.

Sampling device 1420 is typically configured such that filter 60 is removable from tubular container 1430 via plunger-space proximal opening 1490 while plunger head 1442 is within tubular container 1430 (filter 60 is also removable from tubular container 1430 via plunger-space proximal opening 1490 if plunger head 1442 has been removed from tubular container 1430).

Typically, filtration assembly 1424 further comprises a waste liquid receptacle 1456 for receiving filtrate 61. For some of these applications, plunger rod 1482 is shaped so as to define therewithin waste liquid receptacle 1456. Typically, waste liquid receptacle 1456 partially or entirely surrounds internal plunger space 1486, such as shown.

Filtration assembly 1424 is configured such that movement of plunger head 1442 within tubular container 1430, when liquid specimen sample 22 is contained in tubular container 1430 and filter 60 is disposed in tubular container 1430, pushes at least a portion of liquid specimen sample 22 through filter 60 and filtrate-passage openings 1468 (described hereinbelow) and into waste liquid receptacle 1456.

For some applications, waste liquid receptacle 1456 contains a disinfectant or a liquid-absorbing material.

Optionally, waste liquid receptacle 1456 is shaped so as to define an opening through an external wall of waste liquid receptacle 1456 to release displaced air, similar to opening 58 of waste liquid receptacle 56, described hereinabove with reference to FIGS. 2A-G. For example, the opening may be located on a proximal portion of the external wall, typically above the highest level that filtrate 61 is expected to reach during ordinary use of the device. For some applications, waste liquid receptacle 1456 comprises an air filter (e.g., an N98 filter) that is disposed to filter air that passes out of waste liquid receptacle 1456 through the opening. Alternatively or additionally, for some applications, waste liquid receptacle 1456 comprises a one-way pressure-sensitive valve disposed in the opening.

For some applications, plunger head 1442 is shaped so as to define a filter support 1462, which is shaped so as to define:
- a distal support surface 1459, which may be perpendicular to a central longitudinal axis of plunger head 1442 (as shown), or may be angled with respect to the central longitudinal axis (configuration not shown),
- a plurality of filtrate-passage openings 1468 through filter support 1462 into waste liquid receptacle 1456, and
- plunger-head opening 1444 (labeled in FIGS. 24C and 24D).

Filter 60 is (removably) disposed on distal support surface 1459.

For some applications, sampling device 1420 comprises a filter-withdrawal shaft 1472, which includes a distal portion 1408 (labeled in FIG. 25) that is directly or indirectly coupled to filter 60, typically via an end 1404 of collection vial 1450 opposite a vial opening 1452. Filter-withdrawal shaft 1472 is disposed passing through internal plunger space 1486 (a portion or an entirety of filter-withdrawal shaft 1472 may be disposed within internal plunger space 1486).

Sampling device 1420 is typically configured such that proximal withdrawal of filter-withdrawal shaft 1472 out of internal plunger space 1486, while plunger head 1442 is within tubular container 1430, pulls filter 60 into internal plunger space 1486 via plunger-head opening 1444 and out of internal plunger space 1486 via plunger-space proximal opening 1490 (as shown in the transitions between FIGS. 23B and 23C and between FIGS. 24B and 24C), and removes filter-withdrawal shaft 1472 and filter 60 from filtration assembly 1424 (as shown in the transitions between FIGS. 23C and 23D and between FIGS. 24C and 24D). It is noted that filter-withdrawal shaft 1472 of sampling device 1420 is not an element of filtration assembly 1424, but instead is removable therefrom, as shown in FIGS. 23D and 24D.

For some applications, sampling device 1420 comprises a distal plate 1471 (labeled in FIG. 24A), which is disposed in contact with a distal surface of filter 60, and is directly or indirectly coupled to filter-withdrawal shaft 1472 through end 1404 of collection vial 1450. For example, distal plate 1471 may be circular, i.e., shaped as a disc, or any other shape. Distal plate 1471 may be flexible, e.g., comprise silicone, or may be rigid, e.g., comprise metal or a polymer.

For some applications, plunger-space proximal opening 1490 and a longitudinal portion of filter-withdrawal shaft 1472 are shaped so as to define corresponding female and male screw threads 1423A and 1423B (labeled in FIG. 24D), respectively, which (a) removably couple filter-withdrawal shaft 1472 to plunger rod 1482, such as shown in FIGS. 22A, 23A-B, and 24A-B, while filter-withdrawal shaft 1472 is disposed passing through internal plunger space 1486, and (b) prevent the premature proximal withdrawal of filter-withdrawal shaft 1472 out of internal plunger space 1486. Sampling device 1420 is configured such that rotation of filter-withdrawal shaft 1472 and plunger-space proximal opening 1490 with respect to each other (a) causes an initial portion of the proximal withdrawal of filter-withdrawal shaft 1472 out of internal plunger space 1486, such as shown in the transitions between FIG. 23B and FIG. 23C and between FIG. 24B and FIG. 24C, and (b) decouples female and male screw threads 1423A and 1423B from each other, thereby allowing the continuation of the proximal withdrawal of filter-withdrawal shaft 1472 out of internal plunger space 1486, such as shown in FIGS. 23C-D and 24C-D.

Optionally, in configurations in which plunger 1440 and tubular container 430 are threadingly coupled to each other, such as described hereinabove with reference to FIG. 12, (a) the threading between plunger-space proximal opening 1490 and filter-withdrawal shaft 1472 and (b) the threading between plunger 1440 and tubular container 430 have opposite handedness.

For other applications, plunger-space proximal opening 1490 and filter-withdrawal shaft 1472 are not threadingly coupled together.

As mentioned above, for some applications, collection vial 1450 is removably disposed at least partially within internal plunger space 1486 while collection vial 1450 is the axially-compressed configuration, such as shown in FIGS. 23A-B and 24A-B. Collection vial 1450 is elongatable from the axially-compressed configuration, such as shown in the transitions between FIG. 23B and FIG. 23C and between FIGS. 24B and 24C. For these applications, sampling device 1420 is configured such that the proximal withdrawal of filter-withdrawal shaft 1472 out of internal plunger space 1486, while plunger head 1442 is within tubular container 1430, pulls filter 60 into collection vial 1450 and elongates collection vial 1450. At least a portion of filter 60 is typically bunched up within collection vial 1450, such as into a flower-like arrangement, from the filter's initial flat shape while disposed on the filter support.

For some applications, sampling device 1420 further comprises a shaft handle 1405, which is coupled to a proximal portion of filter-withdrawal shaft 1472.

For some applications, sampling device 1420 is configured such that collection vial 1450 is decouplable from filtration assembly 1424 while plunger head 1442 is within tubular container 1430, such as shown in FIGS. 23D and 24D. For some of these applications, sampling device 1420 is configured such that collection vial 1450 is decouplable from filtration assembly 1424 while plunger head 1442 is advanced as far as possible within tubular container 1430, such as shown in FIGS. 23D and 24D. Alternatively or additionally, for some applications, sampling device 1420 is configured such that collection vial 1450 is decouplable from filtration assembly 1424 without any proximal withdrawal of plunger head 1442 within tubular container 1430, also such as shown in FIGS. 23D and 24D.

For some applications, sterile packaging is provided, in which at least sampling device 1420 is removably disposed.

Reference is still made to FIGS. 22A-25. In some applications of the present invention, a method for concentrating liquid specimen sample 22 is provided. The method may optionally be practiced in combination with the method described hereinabove with reference to FIGS. 1A-G, 2A-G, 6A-G, 7A-F, and 8A-F, and/or the method described hereinabove with reference to FIGS. 18A-G and 19A-G.

The method comprises:
placing liquid specimen sample 22 in tubular container 1430 of filtration assembly 1424, such as shown in FIGS. 23A and 24A;
inserting plunger head 1442 of plunger 1440 into tubular container 1430 via proximal container opening 1432 of tubular container 1430, such as shown in FIGS. 23B and 24B;
distally advancing plunger head 1442 within tubular container 1430 to drive at least a portion of liquid specimen sample 22 through filter 60 disposed in tubular container 1430, such as shown in FIGS. 23B and 24B (it is noted that in this configuration, filter 60 is not initially disposed in tubular container 1430 when liquid specimen sample 22 is placed in tubular container 1430, and is inserted into tubular container 1430 as plunger head 1442 is inserted into tubular container); and
removing filter 60 from tubular container 1430 via plunger-space proximal opening 1490 while plunger head 1442 is within tubular container 1430, as shown in FIGS. 23C-D and 24C-D.

For some applications, liquid specimen sample 22 may be acquired and/or may have any of the characteristics described hereinabove.

For some applications, the method further comprises, after filter 60 has been removed from tubular container 1430, detecting the presence of a biological particulate trapped by filter 60, such as described hereinabove with reference to FIGS. 1A-G, 2A-G, and 6A-G.

For some applications in which sampling device 1420 comprises a filter-withdrawal shaft, the filter-withdrawal shaft is not pre-coupled to filter 60 (configuration not shown). Instead, the filter-withdrawal shaft is advanced within internal plunger space 1486 (and optionally inserted into plunger space 1486) and coupled to filter 60 after plunger 1440 has been inserted into tubular container 1430 (and optionally been moved within tubular container 1430 to push the at least a portion of liquid specimen 22 through filter 60).

Figure 26A:
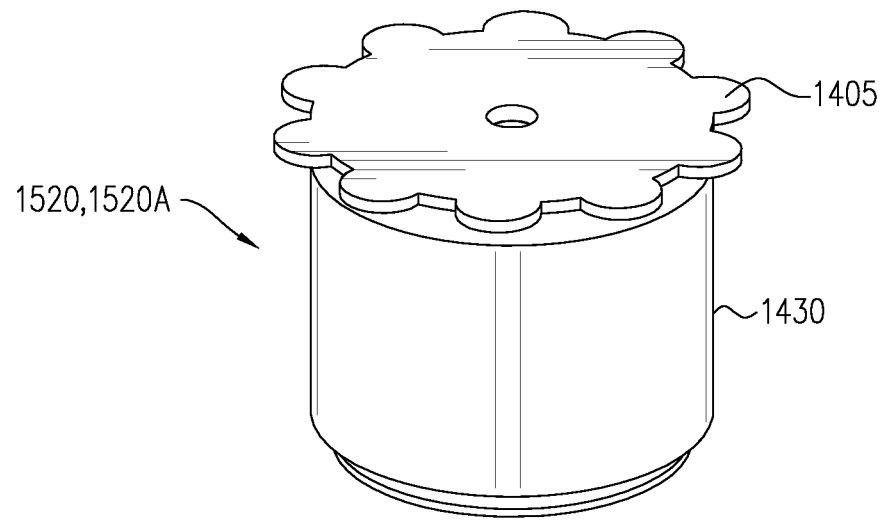
FIGS. 26A-B are schematic illustrations of yet another sampling device for concentrating a liquid specimen sample, and a portion of the sampling device, respectively, in accordance with an application of the present invention.
Figure 26B:
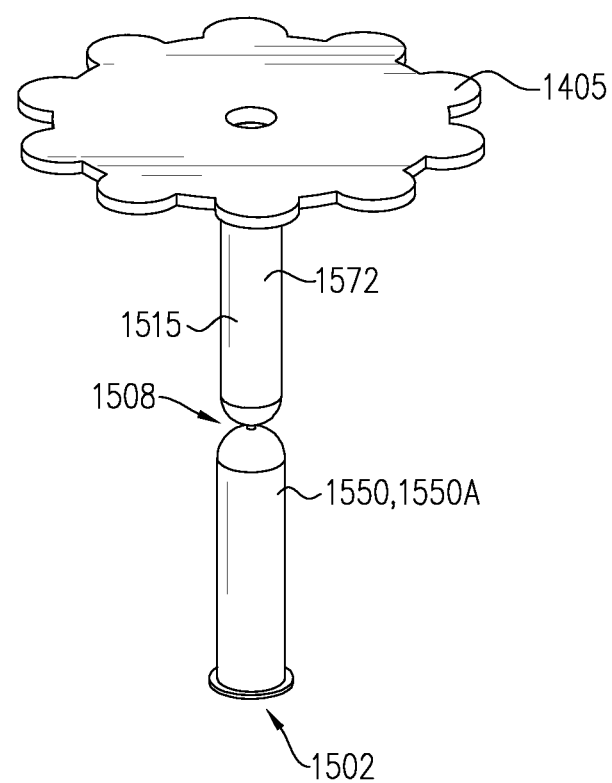

Reference is now made to FIGS. 26A-B, which are schematic illustrations of a sampling device 1520, 1520A for concentrating liquid specimen sample 22, and a portion of the sampling device, respectively, in accordance with an application of the present invention.

Reference is also made to FIGS. 27A-D, which are schematic illustrations of sampling device 1520, 1520A and a method of using sampling device 1520, 1520A, in accordance with respective applications of the present invention.

Reference is also made to FIGS. 28A-D, which are schematic cross-sectional illustrations of sampling device 1520, 1520A and the method of using sampling device 1520, 1520A, in accordance with respective applications of the present invention.

Figure 29:
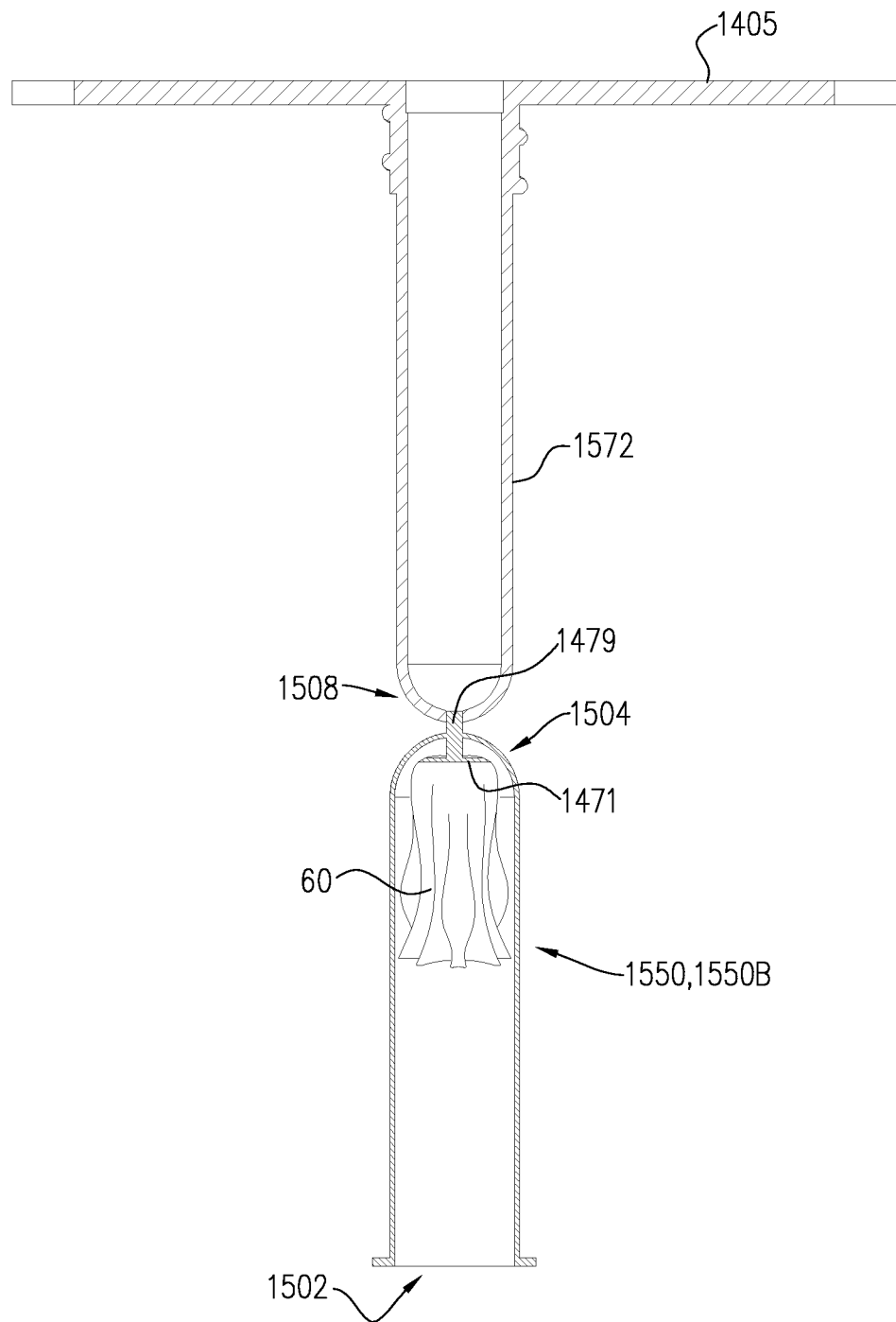
FIG. 29 is an enlarged schematic illustration of a portion of the sampling device of FIGS. 26A-B in the state shown in FIGS. 27D and 24D, in accordance with an application of the present invention.

Reference is further made to FIG. 29, which is an enlarged schematic illustration of a portion of sampling device 1520, 1520A in the state shown in FIGS. 27D and 28D, in accordance with an application of the present invention.

Figure 30A:
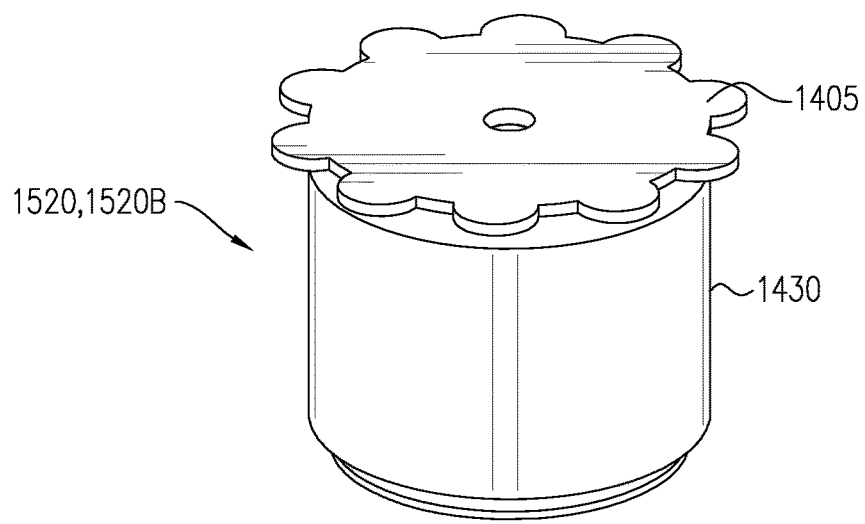
FIGS. 30A-B are schematic illustrations of a still another sampling device for concentrating a liquid specimen sample, and a portion of the sampling device, respectively, in accordance with an application of the present invention.
Figure 30B:
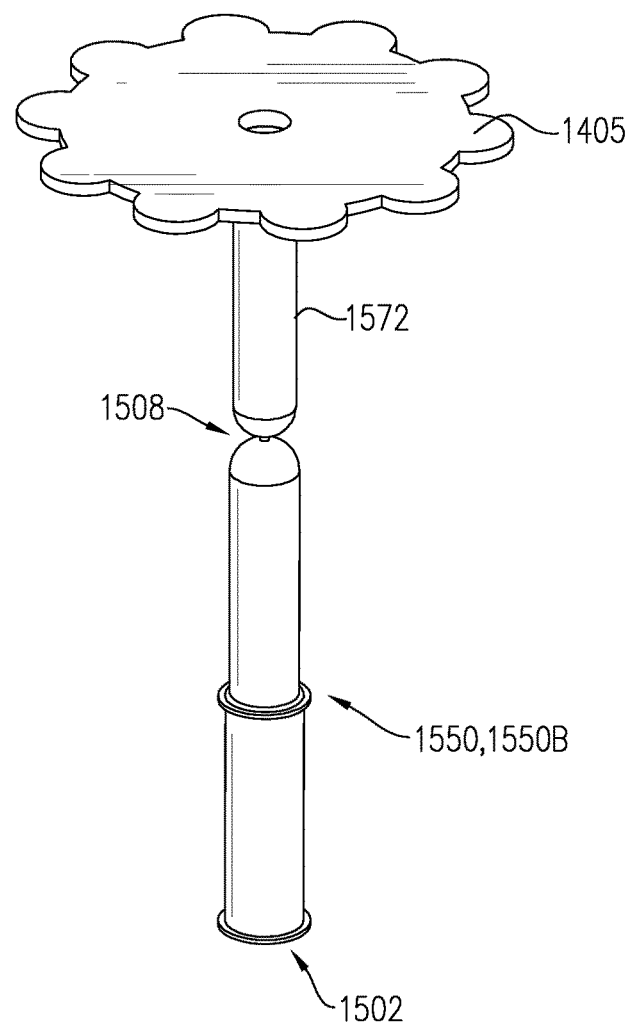

Reference is also made to FIGS. 30A-B, which are schematic illustrations of a sampling device 1520, 1520B for concentrating liquid specimen sample 22, and a portion of the sampling device, respectively, in accordance with an application of the present invention.

Reference is also made to FIGS. 31A-D, which are schematic illustrations of sampling device 1520, 1520B and a method of using sampling device 1520, 1520B, in accordance with respective applications of the present invention.

Reference is also made to FIGS. 32A-D, which are schematic cross-sectional illustrations of sampling device 1520, 1520B and the method of using sampling device 1520, 1520B, in accordance with respective applications of the present invention.

Figure 33:
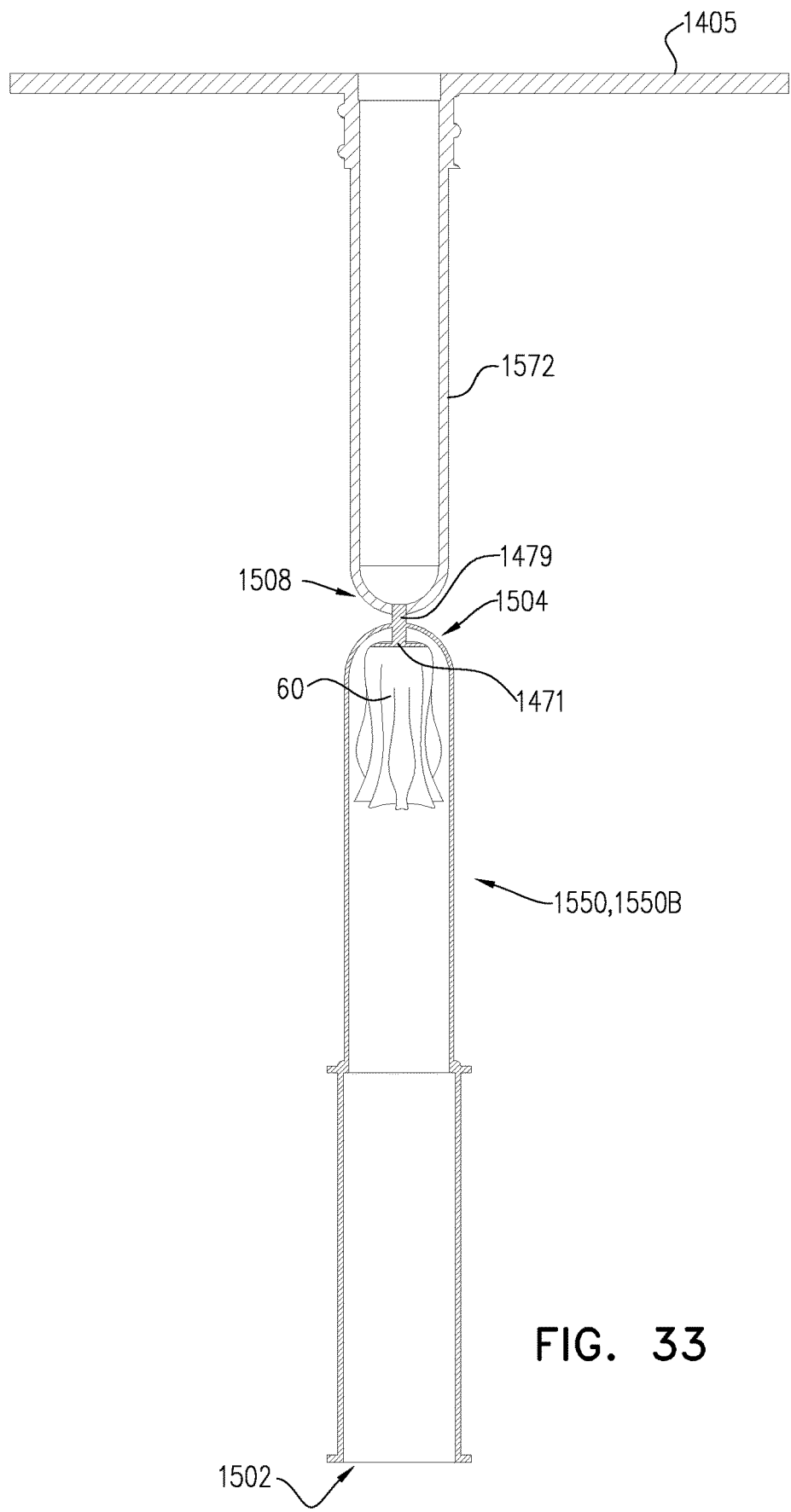
FIG. 33 is an enlarged schematic illustration of a portion of the sampling device of FIGS. 30A-B in the state shown in FIGS. 31D and 32D, in accordance with an application of the present invention.

Reference is further made to FIG. 33, which is an enlarged schematic illustration of a portion of sampling device 1520, 1520B in the state shown in FIGS. 31D and 32D, in accordance with an application of the present invention.

Sampling device 1520A and sampling device 1520B are two configurations of sampling device 1520, and are identical other than as described hereinbelow.

Other than as described hereinbelow, sampling device 1520 is generally similar to sampling device 1420 described hereinabove with reference to FIGS. 22A-25, and may implement any of the features thereof, mutatis mutandis. Like reference numerals refer to like parts.

Sampling device 1520A comprises a collection vial 1550, 1550A and sampling device 1520B comprises a collection vial 1550, 1550B. Sampling device 1520A comprises a filtration assembly 1524, 1524A and sampling device 1520B comprises a filtration assembly 1524, 1524B.

Unlike in sampling device 1420, in sampling device 1520, when collection vial 1550 is initially disengageably coupled to filtration assembly 1524, such as shown in FIGS. 27A-B, 28A-B, 31A-B, and 32A-B, collection vial 1550 does not define a distally-facing vial opening 1452.

Collection vial 1550 comprises a flexible material and is removably disposed at least partially within an internal plunger space 1586 of a plunger 1540 while collection vial 1550 is an inverted configuration, in which the inverted collection vial 1550 defines a proximal vial opening 1507, such as shown in FIGS. 27A-B, 28A-B, 31A-B, and 32A-B.

As labeled in FIGS. 28A and 32A, plunger 1540 comprises a plunger head 1542 (labeled in FIGS. 28C and 32C) that is shaped so as to define a plunger-head opening 1544 through plunger head 1542 and into an internal plunger space 1586.

For some applications, sampling device 1520 comprises a filter-withdrawal shaft 1572, which is disposed partially within the inverted collection vial 1550 within internal plunger space 1586. Filter-withdrawal shaft 1572 includes a distal portion 1508 that is directly or indirectly coupled to filter 60, typically via an end 1504 of collection vial 1450 opposite a vial opening 1502. Sampling device 1520 is configured such that proximal withdrawal of filter-withdrawal shaft 1572 out of internal plunger space 1586, while plunger head 1542 is within tubular container 1430:

inverts the inverted collection vial 1550 to an uninverted configuration, as shown in the transitions between FIG. 28B and FIG. 28C and between FIG. 32B and FIG. 32C, pulls filter 60 into collection vial 1550 via plunger-head opening 1544, as shown in the transitions between FIG. 28B and FIG. 28C and between FIG. 32B and FIG. 32C; at least a portion of filter 60 is typically bunched up within collection vial 1550, such as into a flower-like arrangement, from the filter's initial flat shape while disposed on the filter support, pulls collection vial 1550 out of internal plunger space 1586 via plunger-space proximal opening 1590, as shown in the transitions between FIG. 28C and FIG. 28D and between FIG. 32C and FIG. 32D, and removes filter-withdrawal shaft 1572 and filter 60 from filtration assembly 1524, as shown in the transitions between FIG. 28C and FIG. 28D and between FIG. 32C and FIG. 32D.

In the uninverted configuration, collection vial 1550 is shaped so as to define a vial opening 1502.

Optionally, a longitudinal portion of filter-withdrawal shaft 1572 that passes through plunger-head opening 1544 is narrower than a more proximal portion of filter-withdrawal shaft 1572.

Optionally, a portion 1515 of filter-withdrawal shaft 1572 is cylindrical (e.g., tubular) and has an outer diameter that is approximately equal to an inner diameter of the inverted collection vial 1550, in order to help maintain the inverted collection vial 1550 in the inverted configuration, such as shown in FIGS. 28A-B, until withdrawal of filter-withdrawal shaft 1572 therefrom, such as shown in FIG. 28C.

It is noted that filter-withdrawal shaft 1572 of sampling device 1520 is not an element of filtration assembly 1524, but instead is removable therefrom, as shown in FIGS. 27D, 28D, 31D, and 32D.

Reference is now made to FIGS. 26A-29. Sampling device 1520A is configured such that the inverted configuration of collection vial 1550A is a single-inverted configuration.

Reference is now made to FIGS. 30A-33. Sampling device 1520B is configured such that the inverted configuration of collection vial 1550B is a double-inverted configuration, such as shown in FIGS. 32A-B.

Reference is again made to FIGS. 26A-29 and 30A-33. In some applications of the present invention, a method for concentrating liquid specimen sample 22 is provided. The method may optionally be practiced in combination with the method described hereinabove with reference to FIGS. 1A-G, 2A-G, 6A-G, 7A-F, and 8A-F, and/or the method described hereinabove with reference to FIGS. 18A-G and 19A-G.

The method comprises:

placing liquid specimen sample 22 in tubular container 1430 of filtration assembly 1524, such as shown in FIGS. 27A, 28A, 31A, and 32A;

inserting plunger head 1542 of plunger 1540 into tubular container 1430 via proximal container opening 1532 of tubular container 1430, such as shown in FIGS. 27B, 28B, 31B, and 32B;

distally advancing plunger head 1542 within tubular container 1430 to drive at least a portion of liquid specimen sample 22 through filter 60 disposed in tubular container 1430, such as shown in FIGS. 27B, 28B, 31B, and 32B (it is noted that in this configuration, filter 60 is not initially disposed in tubular container 1430 when liquid specimen sample 22 is placed in tubular container 1430, and is inserted into tubular container 1430 as plunger head 1542 is inserted into tubular container); and removing filter 60 from tubular container 1430 via plunger-space proximal opening 1590 while plunger head 1542 is within tubular container 1430.

For some applications, filter 60 is removed from tubular container 1430 by proximally withdrawing filter-withdrawal shaft 1572 out of internal plunger space 1586, while plunger head 1542 is within tubular container 1430, so as to invert the inverted collection vial 1550 to an uninverted configuration (as shown in the transition between FIG. 28B and FIG. 28C and the transition between FIGS. 32B and 32C), to pull filter 60 into collection vial 1550 via plunger-head opening 1544 (as shown in the transition between FIG. 28B and FIG. 28C and the transition between FIGS. 32B and 32C), to pull collection vial 1550 out of internal plunger space 1586 via plunger-space proximal opening 1590 (as shown in the transition between FIG. 28C and FIG. 28D and the transition between FIGS. 32C and 32D), and to remove filter-withdrawal shaft 1572 and filter 60 from filtration assembly 1524 (as shown in the transition between FIG. 28C and FIG. 28D and the transition between FIGS. 32C and 32D).

For some applications, liquid specimen sample 22 may be acquired and/or may have any of the characteristics described hereinabove.

For some applications, the method further comprises, after filter 60 has been removed from tubular container 1430, detecting the presence of a biological particulate trapped by filter 60, such as described hereinabove with reference to FIGS. 1A-G, 2A-G, and 6A-G.

Figure 34B:
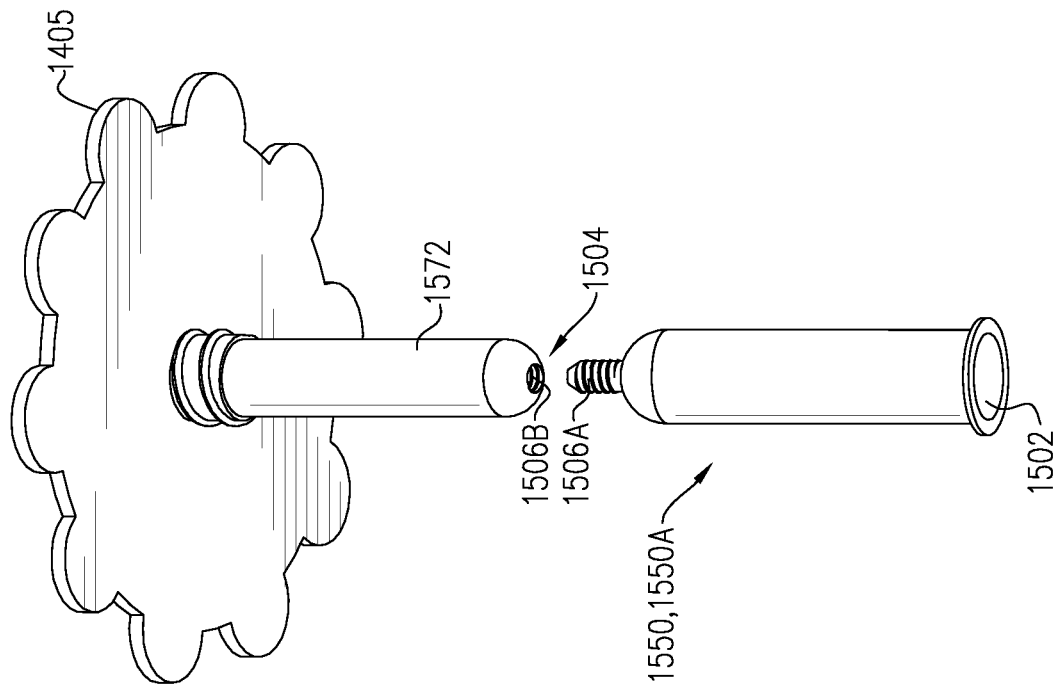
FIGS. 34A-B are schematic illustrations of a configuration of a portion of the sampling device of FIGS. 26A-29, in accordance with an application of the present invention.
Figure 34A:
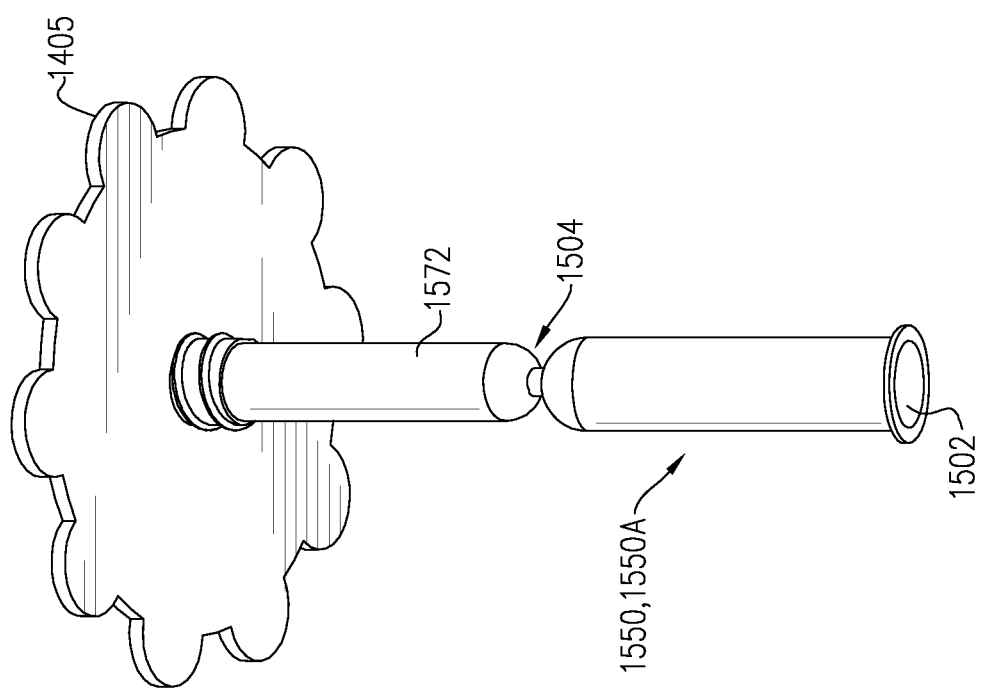
Figure 35B:
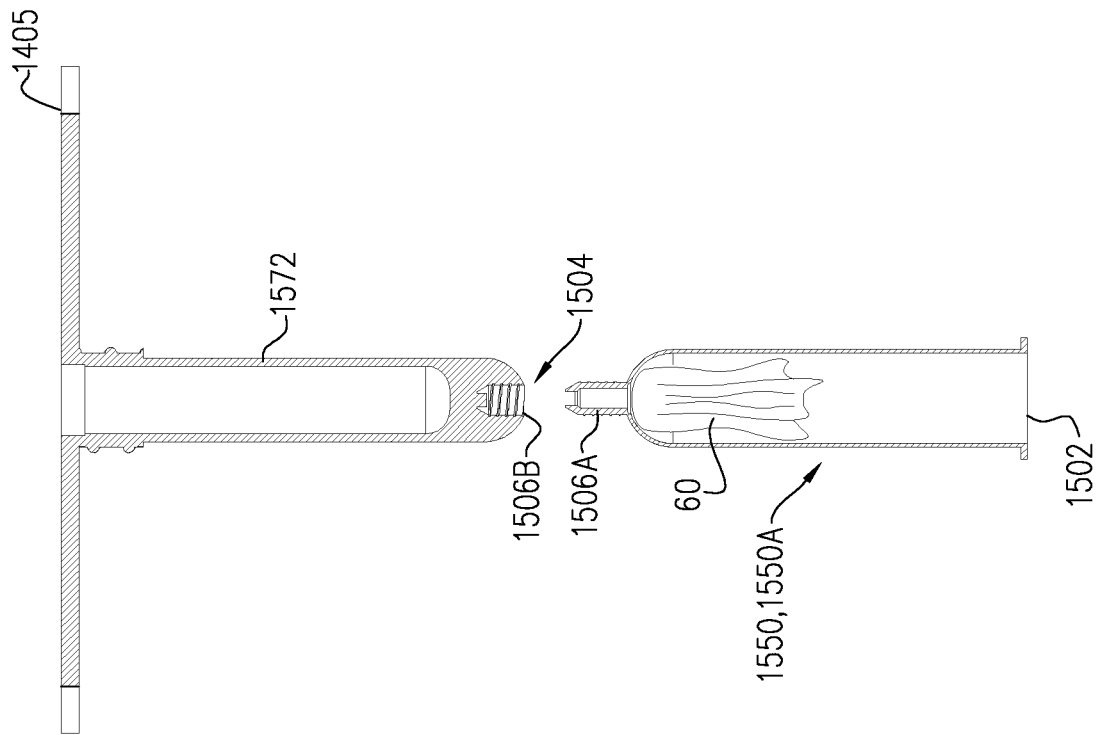
FIGS. 35A-B are schematic cross-sectional illustrations of the portion of sampling device of FIGS. 34A-B, in accordance with an application of the present invention.
Figure 35A:
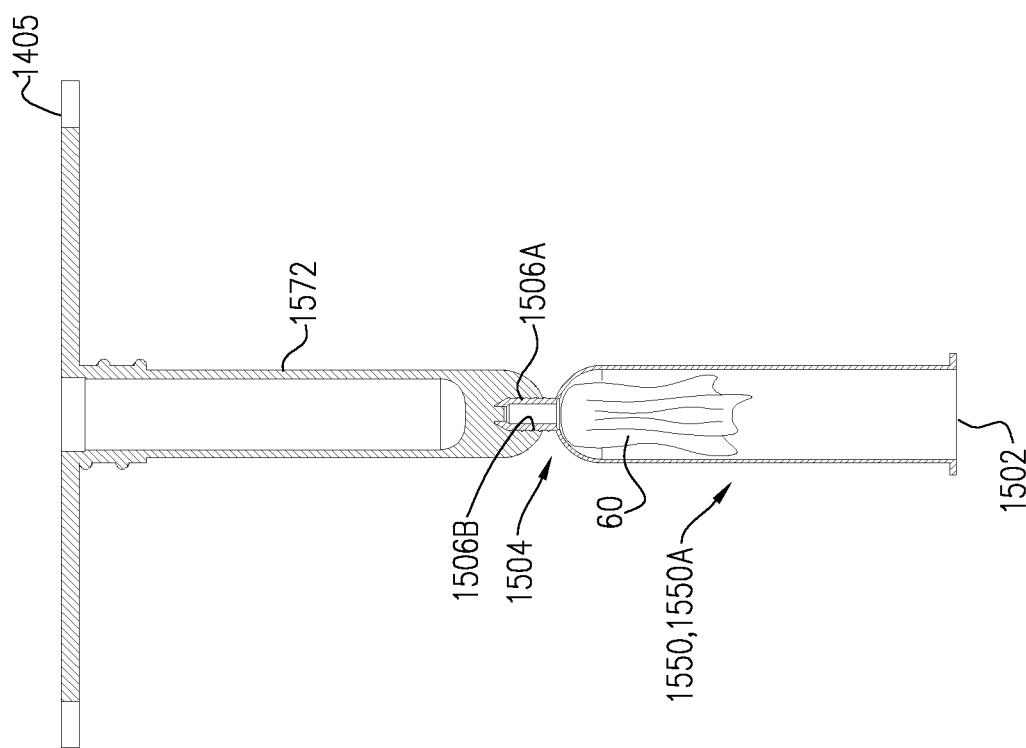

Reference is now made to FIGS. 34A-B, which are schematic illustrations of a configuration of a portion of sampling device 1520, 1520A, in accordance with an application of the present invention. Reference is also made to FIGS. 35A-B, which are schematic cross-sectional illustrations of the portion of sampling device 1520, 1520A, in accordance with an application of the present invention. Although the following configuration is described with reference to sampling device 1520, 1520A, described hereinabove with reference to FIGS. 26A-29, the configuration may also be implemented in sampling device 1520, 1520B, described hereinabove with reference to FIGS. 30A-33, and in sampling device 1420, described hereinabove with reference to FIGS. 22A-25, mutatis mutandis.

In this configuration, when collection vial 1550 is in the uninverted configuration, such as shown in FIGS. 34A-B and 35A-B, end 1504 of collection vial 1550 opposite vial opening 1502 comprises a vial interface 1506A. Filter-withdrawal shaft 1572 comprises a shaft interface 1506B. Vial interface 1506A and shaft interface 1506B are removably couplable together.

For some applications, vial threaded interface 1506A and shaft threaded interface 1506B are threaded, such as shown in FIGS. 34A-B and 35A-B. For some of these applications, vial threaded interface 1506A and shaft threaded interface 1506B are shaped so as to define male and female threads, respectively, such as shown. For other of these applications, vial threaded interface 1506A and shaft threaded interface 1506B are shaped so as to define female and male threads, respectively (configuration not shown).

Typically, after collection vial 1550 has been removed internal plunger space 1586 and has assumed the uninverted configuration shown in FIGS. 34A and 35A, filter-withdrawal shaft 1572 is decoupled from collection vial 1550 by decoupling vial interface 1506A and shaft interface 1506B from each other.

Figure 36A:
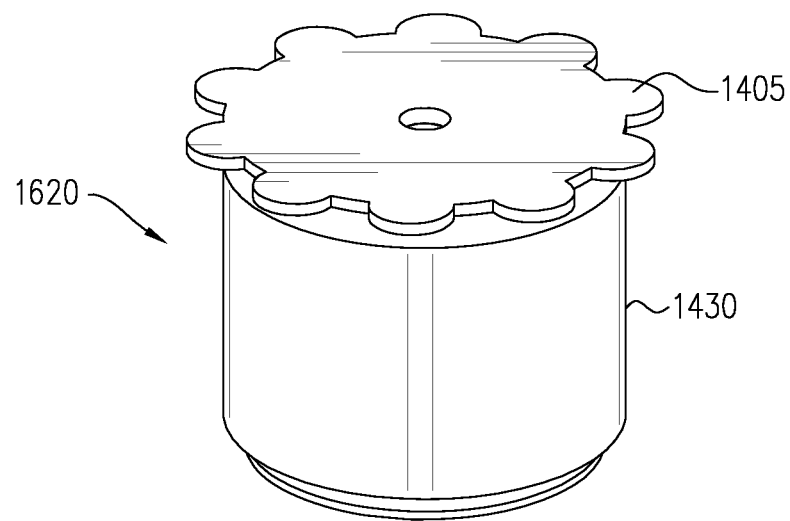
FIGS. 36A-B are schematic illustrations of another sampling device for concentrating a liquid specimen sample, and a portion of the sampling device, respectively, in accordance with an application of the present invention.
Figure 36B:
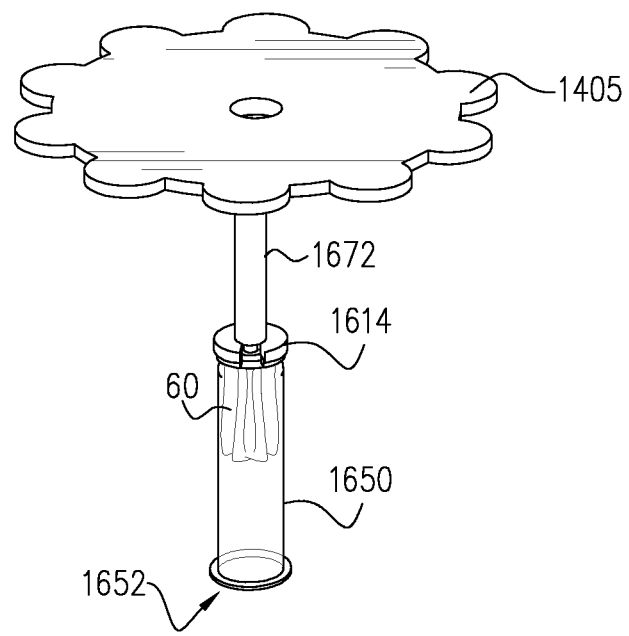

Reference is now made to FIGS. 36A-B, which are schematic illustrations of a sampling device 1620 for concentrating liquid specimen sample 22, and a portion of the sampling device, respectively, in accordance with an application of the present invention.

Reference is also made to FIGS. 37A-D, which are schematic illustrations of sampling device 1620 and a method of using sampling device 1620, in accordance with respective applications of the present invention.

Reference is also made to FIGS. 38A-D, which are schematic cross-sectional illustrations of sampling device 1620 and the method of using sampling device 1620, in accordance with respective applications of the present invention.

Figures 37A, 37B, 37C, 37D:
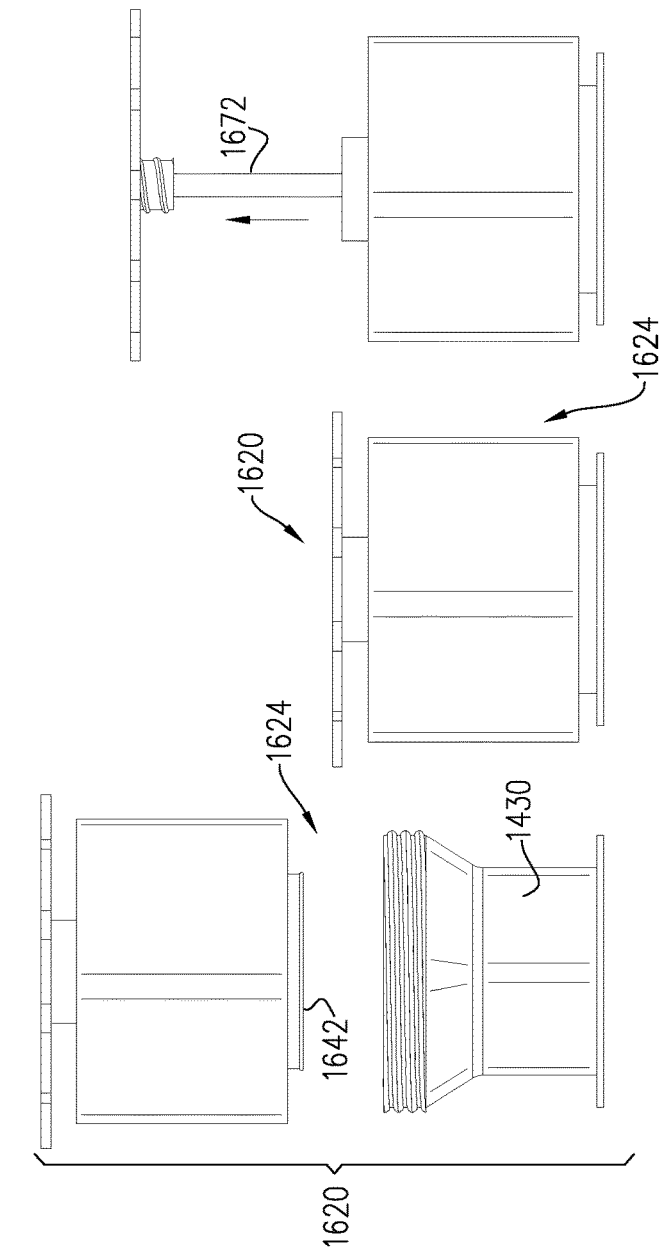
FIGS. 37A-D are schematic illustrations of the sampling device of FIGS. 36A-B and a method of using the sampling device, in accordance with respective applications of the present invention.
Figure 39:
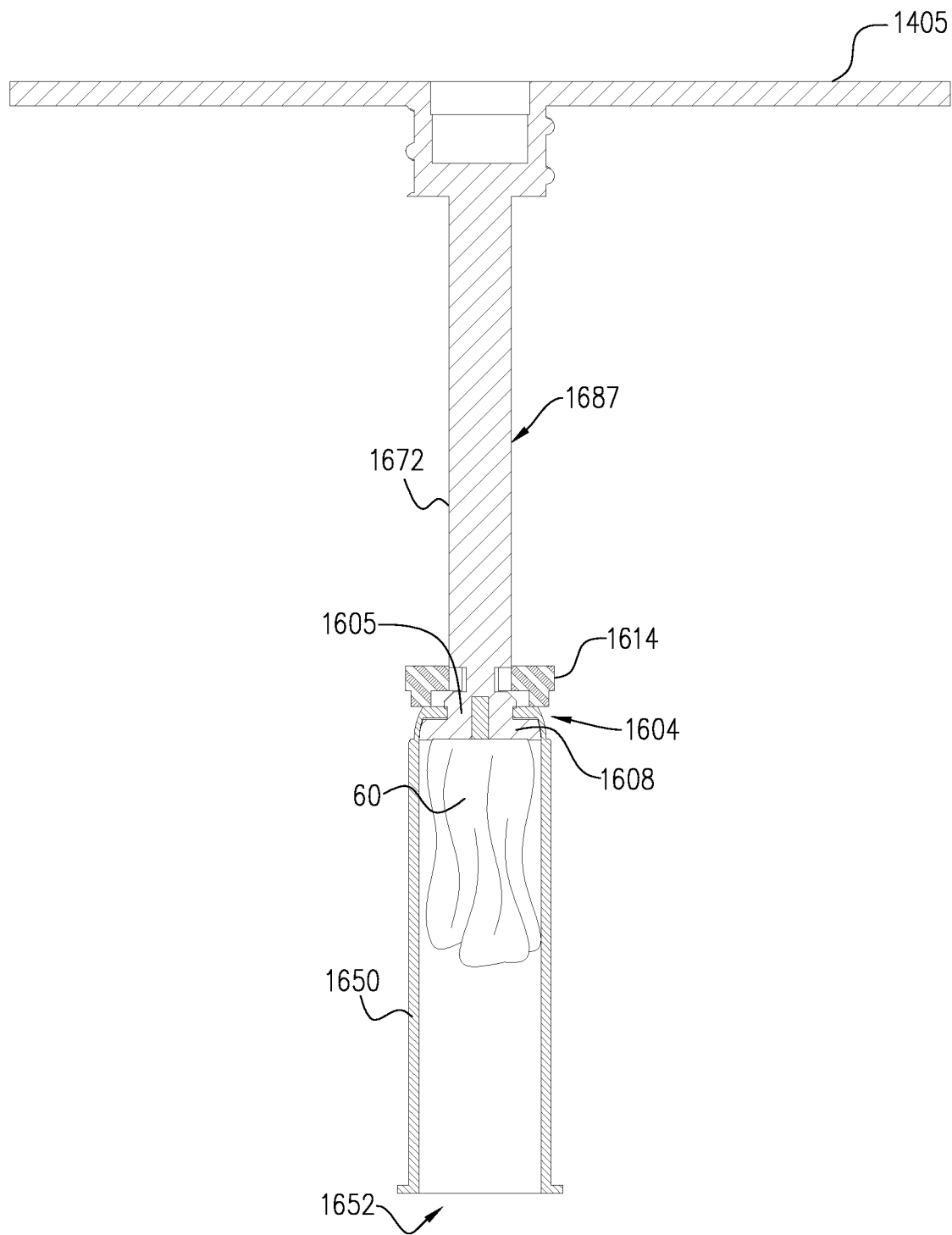
FIG. 39 is an enlarged schematic illustration of a portion of the sampling device of FIGS. 36A-B in the state shown in FIGS. 37D and 38D, in accordance with an application of the present invention.

Reference is further made to FIG. 39, which is an enlarged schematic illustration of a portion of sampling device 1620 in the state shown in FIGS. 37D and 38D, in accordance with an application of the present invention.

Other than as described hereinbelow, sampling device 1620 is generally similar to sampling device 1420 described hereinabove with reference to FIGS. 22A-25, and may implement any of the features thereof, mutatis mutandis. Like reference numerals refer to like parts.

Sampling device 1620 comprises a filtration assembly 1624 and a collection vial 1650, which may have any of the properties described hereinabove. However, unlike collection vial 1450, described hereinabove with reference to FIGS. 22A-25, collection vial 1650 typically does not assume an axially-compressed configuration in which the vial is elongatable (in other words, collection vial 1650 typically has a fixed length, as in convention vials). In addition, unlike the invertible collection vials 1550 of sampling device 1520, collection vial 1650 is typically not inverted during use in sampling device 1620.

Filtration assembly 1624 comprises tubular container 1430, a plunger 1640 (labeled in FIG. 38A), and filter 60, which may have any of the properties described hereinabove with reference to FIGS. 1A-9B.

Sampling device 1620 is typically configured such that filter 60 is removable from tubular container 1430 via a plunger-space proximal opening 1690 while a plunger head 1642 of plunger 1640 is within tubular container 1430 (filter 60 is also removable from tubular container 1430 via plunger-space proximal opening 1690 if plunger head 1642 has been removed from tubular container 1430). Plunger head 1642 is shaped so as to define a plunger-head opening 1644 through plunger head 1642 and into an internal plunger space 1686 of plunger 1640.

Sampling device 1620 is configured such that filter 60 is advanceable into (e.g., entirely into) collection vial 1650 via a vial opening 1652 while collection vial 1650 is disengageably coupled to filtration assembly 1624, such as shown in FIGS. 37C and 38C.

For some applications, sampling device 1620 is configured such that filter 60 is advanceable into collection vial 1650 via vial opening 1652 while plunger head 1642 is within tubular container 1430, such as shown in FIGS. 37C and 38C. For some of these applications, sampling device 1620 is configured such that filter 60 is advanceable into collection vial 1650 via vial opening 1652 while plunger head 1642 is advanced as far as possible within tubular container 1430, such as shown in FIGS. 37C and 38C. Alternatively or additionally, for some applications, sampling device 1620 is configured such that filter 60 is advanceable into collection vial 1650 via vial opening 1652 without any proximal withdrawal of plunger head 1642 within tubular container 1430, such as shown in FIGS. 37C and 38C.

For some applications, sampling device 1620 comprises a filter-withdrawal shaft 1672, which:
 is disposed partially within collection vial 1650 within an internal plunger space 1686,
 includes a proximal portion 1687 that is slidably disposed passing through a shaft-passage hole 1605 through an end 1604 of collection vial 1650 opposite vial opening 1652 (labeled in FIG. 39), and
 includes a distal portion 1608 (labeled in FIG. 39) that is directly or indirectly coupled to filter 60.

Sampling device 1620 is configured such that proximal withdrawal of filter-withdrawal shaft 1672, while plunger head 1642 is within tubular container 1430, pulls filter 60 into collection vial 1650 via plunger-head opening 1644 via vial opening 1652 (as shown in the transitions between FIGS. 37B and 37C and between FIGS. 38B and 38C). At least a portion of filter 60 is typically bunched up within collection vial 1650, such as into a flower-like arrangement, from the filter's initial flat shape while disposed on the filter support.

Typically, sampling device 1620 is configured such that further proximal withdrawal of filter-withdrawal shaft 1672 out of internal plunger space 1686, while plunger head 1642 is within tubular container 1430, pulls collection vial 1650 out of internal plunger space 1686 via plunger-space proximal opening 1690 (as shown in the transitions between FIGS. 37C and 37D and between FIGS. 38C and 38D). It is noted that filter-withdrawal shaft 1672 of sampling device 1620 is not an element of filtration assembly 1624, but instead is removable therefrom, as shown in FIGS. 37D and 38D.

For some applications, sampling device 1620 further comprises a seal 1614 that inhibits fluid leakage between proximal portion 1687 of filter-withdrawal shaft 1672 and shaft-passage hole 1605.

Optionally, an inner portion of seal 1614 may snap into an external circumferential groove of proximal portion 1687 of filter-withdrawal shaft 1672 upon the proximal withdrawal of most or all of filter-withdrawal shaft 1672 from collection vial 1650, such as shown in FIG. 39.

Reference is now made to FIGS. 22A-25, 26A-33, and 36A-39. As described hereinabove with reference to these figures, respectively, filter-withdrawal shafts 1472, 1572, and 1672, include respective distal portions 1408, 1508, and 1608 that are directly or indirectly coupled to filter 60. Exemplary ways in which the distal portions of the filter-withdrawal shafts may be directly or indirectly coupled to the filter include, but are not limited to:

the distal portion of the filter-withdrawal shaft may be directly coupled to the filter, such as shown in FIG. 39 for filter-withdrawal shaft 1672, e.g., by an adhesive and/or by distal plate 1471, which may be fixed, e.g., pinned, to the distal end of the distal portion of the filter-withdrawal shaft; in these configurations, the distal portion of the filter-withdrawal shaft passes through the end of the collection vial opposite the vial opening; and the distal portion of the filter-withdrawal shaft may be indirectly coupled to the filter, such as shown in FIGS. 25, 29, and 33, e.g., by a rod 1479 (labeled in FIGS. 25, 29, and 33) that (a) is fixed to the distal end of the distal portion of the filter-withdrawal shaft and (b) passes through the end of the collection vial opposite the vial opening, and optionally further by an adhesive and/or by distal plate 1471 which may be integral with rod 1479 or fixed to rod 1479.

It will be appreciated by persons skilled in the art who have read the present application that the distal portions of the filter-withdrawal shafts may be directly or indirectly coupled to the filter in additional ways, all of which are within the scope of the present invention.

Figure 40A:
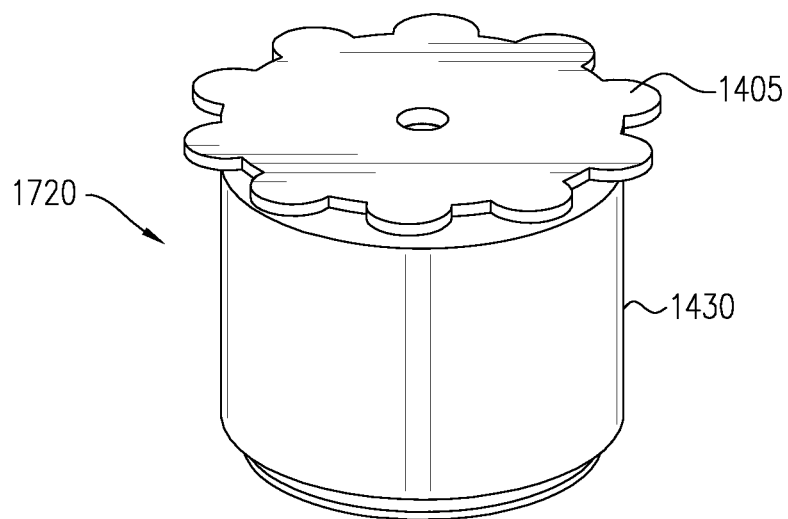
FIGS. 40A-B are schematic illustrations of yet another sampling device for concentrating a liquid specimen sample, and a portion of the sampling device, respectively, in accordance with an application of the present invention.
Figure 40B:
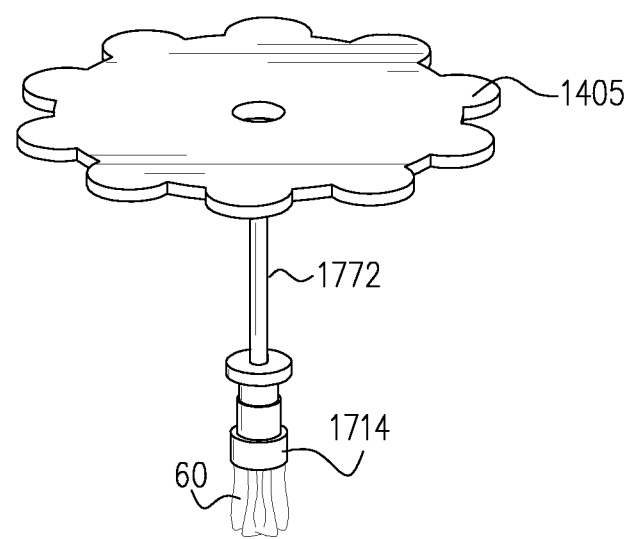

Reference is now made to FIGS. 40A-B, which are schematic illustrations of a sampling device 1720 for concentrating liquid specimen sample 22, and a portion of the sampling device, respectively, in accordance with an application of the present invention.

Reference is also made to FIGS. 41A-E, which are schematic illustrations of sampling device 1720 and a method of using sampling device 1720, in accordance with respective applications of the present invention.

Reference is also made to FIGS. 42A-E, which are schematic cross-sectional illustrations of sampling device 1720 and the method of using sampling device 1720, in accordance with respective applications of the present invention.

Other than as described hereinbelow, sampling device 1720 is generally similar to sampling device 1420 described hereinabove with reference to FIGS. 22A-25, and may implement any of the features thereof, mutatis mutandis. Like reference numerals refer to like parts.

Similar to sampling device 1420, sampling device 1720 typically comprises a filtration assembly 1724, which may have any of the properties described hereinabove. Filtration assembly 1724 comprises tubular container 1430, a plunger 1740, and filter 60, which may have any of the properties described hereinabove with reference to FIGS. 1A-9B. However, sampling device 1720 does not comprise a collection vial configured or disposed in a similar manner to collection vials 1450, 1550, 1550A, 1550B, and/or 1650. Nevertheless, sampling device 1720 may optionally comprise an extraction tube 1718, such as described hereinbelow with reference to FIGS. 41E and 42E.

Plunger head 1742 is shaped so as to define a plunger-head opening 1744 through plunger head 1742 and into an internal plunger space 1786 of a plunger rod 1782. A proximal end of plunger rod 1782 is shaped so as to define a plunger-space proximal opening 1790 of internal plunger space 1786.

Sampling device 1720 comprises a filter-withdrawal shaft 1772, which includes a distal portion 1708 (labeled in FIG. 42D) that is directly or indirectly coupled to filter 60, and which is disposed passing through internal plunger space 1786. Exemplary ways in which distal portion 1708 of filter-withdrawal shaft 1772 may be directly or indirectly coupled to filter 60 include, but are not limited to:

distal portion 1708 of filter-withdrawal shaft 1772 may be directly coupled to filter 60, such as shown in FIG. 39, e.g., by an adhesive and/or by distal plate 1471, which may be fixed, e.g., pinned, to the distal end of the distal portion of the filter-withdrawal shaft; and distal portion 1708 of filter-withdrawal shaft 1772 may be indirectly coupled to filter 60, such as shown in FIGS. 25, 29, and 33 for filter-withdrawal shafts 1472, 1572, and 1672, respectively, e.g., by a rod that is fixed to the distal end of the distal portion of the filter-withdrawal shaft and optionally further by an adhesive and/or by distal plate 1471 which may be integral with the rod or fixed to the rod.

It will be appreciated by persons skilled in the art who have read the present application that the distal portion of the filter-withdrawal shaft may be directly or indirectly coupled to the filter in additional ways, all of which are within the scope of the present invention.

Sampling device 1720 is configured such that proximal withdrawal of filter-withdrawal shaft 1772 out of internal plunger space 1786, while plunger head 1742 is within tubular container 1430, pulls filter 60 into internal plunger space 1786 via plunger-head opening 1744 and out of internal plunger space 1786 via plunger-space proximal opening 1790, and removes filter-withdrawal shaft 1772 and filter 60 from filtration assembly 1724. At least a portion of filter 60 is typically bunched up, such as into a flower-like arrangement, from the filter's initial flat shape while disposed on the filter support.

It is noted that filter-withdrawal shaft 1772 of sampling device 1720 is not an element of filtration assembly 1724, but instead is removable therefrom, as shown in FIGS. 41D-E and 42D-E.

Typically, but not necessarily, after filter-withdrawal shaft 1772 and filter 60 have been removed from filtration assembly 1724, filter 60 and at a portion of filter-withdrawal shaft 1772 are inserted into extraction tube 1718, such as shown in FIGS. 41E and 42E. As mentioned below, the bunching up of at least a portion of filter 60 may help facilitate this insertion; in some respects, the bunched-up filter may function somewhat analogously to a conventional swab. Reagents may also be placed in the extraction tube 1718, before or after insertion of filter 60, as known in the diagnostic testing arts. Optionally, extraction tube 1718 implements all or a portion of the techniques described hereinabove with reference to FIGS. 16A-C, mutatis mutandis.

For some applications, sampling device 1720 comprises a filter receptacle 1714 that is slidably coupled to a distal end portion of filter-withdrawal shaft 1772 and shaped so as to define a distal receptacle opening 1716. Sampling device 1720 is configured such that the proximal withdrawal of filter-withdrawal shaft 1772 out of internal plunger space 1786, while plunger head 1742 is within tubular container 1430, pulls a portion of filter 60 into filter receptacle 1714 via distal receptacle opening 1716. For example, the portion of filter 60 may include a central portion (as viewed when filter 60 is flat). This pulling of the portion of filter 60 into filter receptacle 1714 typically causes the remainder of filter 60 to become bunched up, such as into a flower-like arrangement, and be disposed at least partially outside filter receptacle 1714, from the filter's initial flat shape while disposed on the filter support. The bunched-up filter may function somewhat analogously to a conventional swab, and, because of the reduced diameter because of the bunching up, may be readily inserted into extraction tube 1718, such as described above and shown in FIGS. 41E and 42E.

Reference is still made to FIGS. 40A-42E, and is further made to FIGS. 43A-E, which are schematic illustrations of a sampling device 1720, 1720A and a method of using sampling device 1720, 1720A, in accordance with respective applications of the present invention. Sampling device 1720A is one implementation of sampling device 1720, described hereinabove with reference to FIGS. 40A-42E.

Figure 44B:
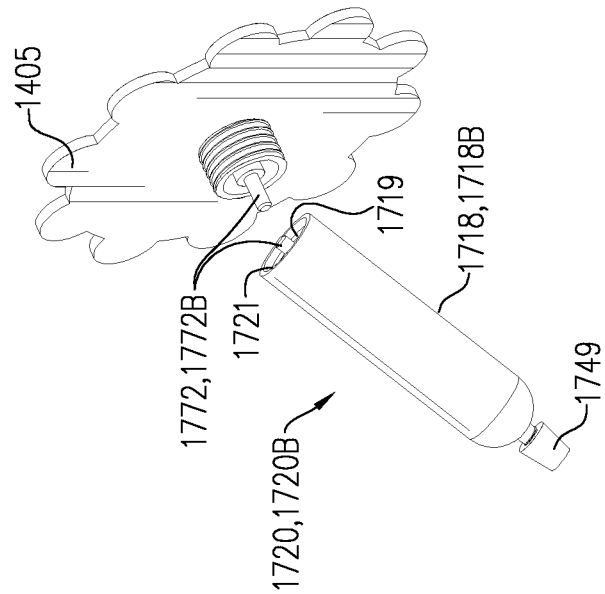
FIGS. 44A-B are schematic illustrations of a portion of another sampling device and a method of using the sampling device, in accordance with respective applications of the present invention.
Figure 44A:
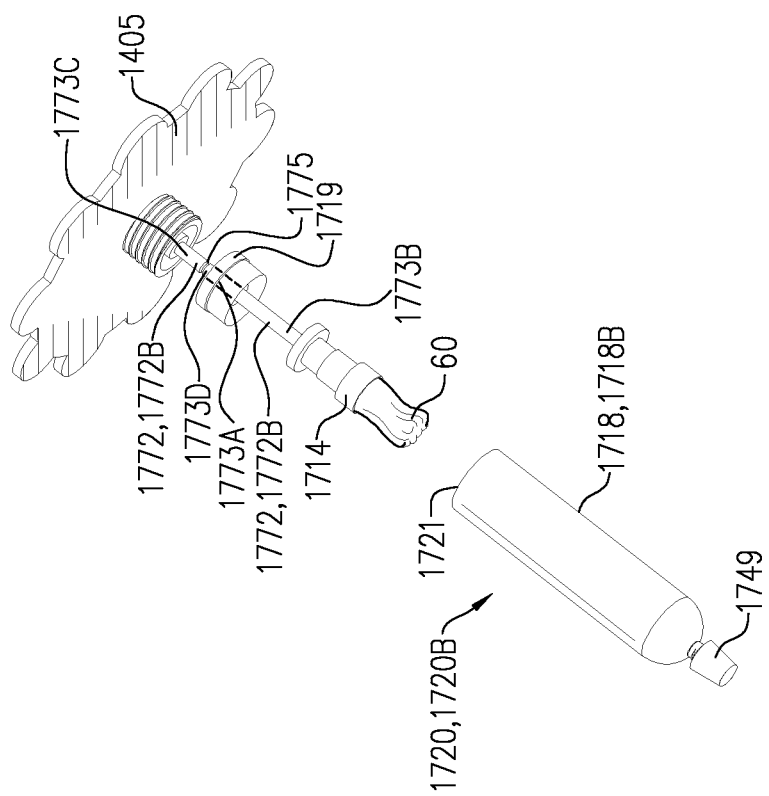

Reference is additionally made to FIGS. 44A-B, which are schematic illustrations of a portion of a sampling device 1720, 1720B and a method of using sampling device 1720, 1720B, in accordance with respective applications of the present invention. Sampling device 1720B is one implementation of sampling device 1720, described hereinabove with reference to FIGS. 40A-42E.

Sampling device 1720, 1720A, 1720B further comprises an extraction-tube cap 1719, which is disposed radially surrounding filter-withdrawal shaft 1772 along a first longitudinal portion 1773A of filter-withdrawal shaft 1772, such that a distal second longitudinal portion 1773B of filter-withdrawal shaft 1772 is distal to extraction-tube cap 1719 (labeled in FIGS. 43B and 44A). Typically, extraction-tube cap 1719 has an outer diameter that is greater than an outer diameter of filter-withdrawal shaft 1772. Extraction-tube cap 1719 and filter-withdrawal shaft 1772 may be integral with each other, or may comprise separate pieces that are coupled together, typically during manufacture.

Reference is still made to FIGS. 43A-E and 44A-B. For some applications, filter-withdrawal shaft 1772, 1772A, 1772B is shaped so as to define, proximal to extraction-tube cap 1719, a proximal third longitudinal portion 1773C that is configured to provide a predetermined separation border 1775 between proximal third longitudinal portion 1773C and filter-withdrawal shaft 1772 distal to predetermined separation border 1775. For these applications, a method of using sampling device 1720, 1720A, 1720B further comprises separating, at predetermined separation border 1775, proximal third longitudinal portion 1773C from filter-withdrawal shaft 1772, 1772A, 1772B distal to predetermined separation border 1775, such as shown in the transition between FIG. 43C and FIG. 43D.

For some applications, such as shown, proximal third longitudinal portion 1773C is longitudinally connected to first longitudinal portion 1773A of filter-withdrawal shaft 1772 by a fourth longitudinal portion 1773D of filter-withdrawal shaft 1772 longitudinally between predetermined separation border 1775 and extraction-tube cap 1719. For other applications, proximal third longitudinal portion 1773C is directly longitudinally adjacent extraction-tube cap 1719 (configuration not shown).

For some applications, predetermined separation border 1775 is defined by one or more of the following features:
- a lesser cross-sectional area of filter-withdrawal shaft 1772 at predetermined separation border 1775 than longitudinally adjacent to predetermined separation border 1775, such as shown in the figures,
- scoring, such as shown in the figures,
- perforation (configuration not shown),
- corresponding male and female screw threads (configuration not shown), and/or
- corresponding male and female tapered friction-fitting surfaces (configuration not shown).

For some applications, a method of using sampling device 1720 comprises separating, at predetermined separation border 1775, proximal third longitudinal portion 1773C from filter-withdrawal shaft 1772 distal to predetermined separation border 1775. For applications in which predetermined separation border 1775 is defined by the lesser cross-sectional area of filter-withdrawal shaft 1772 at predetermined separation border 1775 than longitudinally adjacent to predetermined separation border 1775, separating comprises breaking filter-withdrawal shaft 1772 at predetermined separation border 1775. For applications in which predetermined separation border 1775 is defined by scoring or perforation, separating comprises breaking filter-withdrawal shaft 1772 at predetermined separation border 1775. For applications in which predetermined separation border 1775 is defined by corresponding male and female screw threads, separating comprises unscrewing the male and the female screw threads from each other. For applications in which predetermined separation border 1775 is defined by corresponding male and female tapered friction-fitting surfaces, separating comprises separating the male and the female tapered friction-fitting surfaces from each other.

Reference is again made to FIGS. 43A-E. For some applications, filter-withdrawal shaft 1772, 1772A is shaped so as to define an internal channel 1791 that passes longitudinally through first longitudinal portion 1773A and has:
- one or more distal openings 1793 (e.g., lateral openings, as shown) distal to extraction-tube cap 1719, and
- a proximal opening 1795 that is disposed at predetermined separation border 1775 and that is open to outside filter-withdrawal shaft 1772 upon separation of proximal third longitudinal portion 1773C at predetermined separation border 1775 (and is typically sealed to outside filter-withdrawal shaft 1772 before separation of proximal third longitudinal portion 1773C at predetermined separation border 1775).

Reference is still made to FIGS. 43A-E. For some applications in which sampling device 1720, 1720A further comprises extraction tube 1718 having a proximal end opening 1721, filter-withdrawal shaft 1772, 1772A, filter 60, extraction tube 1718, and extraction-tube cap 1719 are configured such that filter 60 and distal second longitudinal portion 1773B of filter-withdrawal shaft 1772 are disposable within extraction tube 1718 via proximal end opening 1721 of extraction tube 1718, such that extraction-tube cap 1719 seals at least a portion of extraction tube 1718 other than allowing fluid flow through internal channel 1791 via one or more distal openings 1793 and proximal opening 1795. For these applications, a method of using sampling device 1720, 1720A further comprises dripping a liquid through internal channel 1791 and out of proximal opening 1795. For example, the liquid may comprise reagents in which filter 60 was inserted. For example, the liquid may be dripped onto a diagnostic test, such as onto a sample pad 1797 of a lateral flow immunoassay test strip 1799.

For some applications (configuration not shown), filter-withdrawal shaft 1772, 1772A is not shaped so as to define predetermined separation border 1775. For some of these applications (configuration not shown), filter-withdrawal shaft 1772, 1772A is shaped so as to define an internal channel that passes longitudinally through filter-withdrawal shaft 1772, 1772A and is open at a proximal end of the filter-withdrawal shaft. Typically, the proximal opening of the internal channel is sealed by a removable plug.

Reference is made to FIGS. 44A-B. For some applications in which sampling device 1720 further comprises extraction tube 1718 having proximal end opening 1721, filter-withdrawal shaft 1772B, filter 60, extraction tube 1718, and extraction-tube cap 1719 are configured such that filter 60 and distal second longitudinal portion 1773B of filter-withdrawal shaft 1772 are disposable within extraction tube 1718 via proximal end opening 1721 of extraction tube 1718, such that extraction-tube cap 1719 seals at least a portion of extraction tube 1718. Optionally, extraction tube 1718 comprises a screw-off distal tip cap 1749 that removably seals a distal end 1751 of extraction tube 1718 opposite proximal end opening 1721. Upon removal of distal tip cap 1749, liquid can be dripped out of extraction tube 1718 via an opening through distal end 1751.

Reference is now made to FIGS. 45A-B, which are schematic illustrations of a distal portion of plunger head 1442, in accordance with an application of the present invention. The features of this configuration may also be implemented in plunger heads 1542, 1642, and/or 1742, mutatis mutandis, described herein with reference to FIGS. 26A-33, 36A-39, and 40A-44B, respectively. In this configuration, plunger head 1442 further comprises one or more one-way valves 1431 that are configured to provide one-way flow through filtrate-passage openings 1468 into waste liquid receptacle 1456. For example, one-way valves 1431 may comprise flaps. Pressure generated distal to one-way valves 1431 by distal advancement of plunger head 1442 opens the valve and allows filtrate 61 to pass into waste liquid receptacle 1456.

In an embodiment, the techniques and apparatus described herein are combined with techniques and apparatus described in one or more of the following patent applications, which are assigned to the assignee of the present application and are incorporated herein by reference:
PCT Publication WO 2018/158768 to Fruchter et al., and US Patent Application Publication 2019/0381498 in the national stage thereof;
U.S. Provisional Application 62/727,208, filed Sep. 5, 2018;
U.S. Provisional Application 62/727,268, filed Sep. 5, 2018;
PCT Publication WO 2020/049566 to Fruchter et al.;
PCT Publication WO 2020/049569 to Fruchter et al., and US Patent Application Publication 2021/0215585 in the national stage thereof;
U.S. Provisional Application 62/896,295, filed Sep. 5, 2019;
U.S. Provisional Application 62/988,145, filed Mar. 11, 2020;
U.S. Provisional Application 62/988,259, filed Mar. 11, 2020;
U.S. Provisional Applications 63/020,723, filed May 6, 2020; 63/037,707, filed Jun. 11, 2020; 63/067,535, filed Aug. 19, 2020; 63/117,294, filed Nov. 23, 2020; 63/156,843, filed Mar. 4, 2021; 63/158,005, filed Mar. 8, 2021; 63/166,378, filed Mar. 26, 2021; and 63/176,565, filed Apr. 19, 2021;
U.S. Provisional Application 63/071,529, filed Aug. 28, 2020;
International Application PCT/IL2020/050957, filed Sep. 3, 2020, which published as PCT Publication WO 2021/044417 to Holtz et al.;
US Patent Application Publication 2021/0102876 to Fruchter et al.;
PCT Publication WO 2021/181339 to Feldman et al.;
PCT Publication WO 2021/181338 to Fruchter et al.;
PCT Publication WO 2021/224925 to Levitz et al.;
International Application PCT/IL2021/051035, filed Aug. 24, 2021, which published as WO 2022/044002 to Levitz et al.; and/or
U.S. Provisional Application 63/134,282, filed Jan. 6, 2021.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A sampling device for concentrating a liquid specimen sample, the sampling device comprising:
(a) a filtration assembly, which comprises:
  (i) a tubular container, which is shaped so as to define an inner wall and a proximal container opening for receiving the liquid specimen sample;
  (ii) a plunger, which
    (A) comprises (1) a plunger head and (2) a plunger rod, which (a) has a distal end portion to which the plunger head is coupled, and (b) is shaped so as to define an internal plunger space having a plunger-space proximal opening through a proximal end of the plunger rod, and
    (B) is insertable into the tubular container via the proximal container opening, such that a lateral surface of the plunger head forms a fluid-tight movable seal with the inner wall; and
  (iii) a filter; and
(b) a filter-collection receptacle, which is disengageably coupled to the filtration assembly,
wherein the filtration assembly is configured such that movement of the plunger head within the tubular container, when the liquid specimen sample is contained in the tubular container and the filter is disposed in the tubular container, pushes at least a portion of the liquid specimen sample through the filter,
wherein the sampling device is configured such that the filter is advanceable into the filter-collection receptacle while the filter-collection receptacle is disengageably coupled to the filtration assembly, and
wherein the sampling device is configured such that the filter-collection receptacle is removable from the filtration assembly via the plunger-space proximal opening while the plunger head is within the tubular container.

2. The sampling device according to claim 1, wherein the sampling device is configured such that the filter is advanceable entirely into the filter-collection receptacle while the filter-collection receptacle is disengageably coupled to the filtration assembly.

3. The sampling device according to claim 1, wherein the filter-collection receptacle is disengageably coupled to the tubular container of the filtration assembly.

4. The sampling device according to claim 1,
wherein the plunger rod is shaped so as to define therewithin a waste liquid receptacle,
wherein the plunger head is shaped so as to define a filter support, which is shaped so as to define (a) a distal support surface, (b) a plurality of filtrate-passage openings through the filter support into the waste liquid receptacle, and (c) the plunger-head opening,
wherein the filter is disposed on the distal support surface, and
wherein the filtration assembly is configured such that movement of the plunger head within the tubular container, when the liquid specimen sample is contained in the tubular container and the filter is disposed in the tubular container, pushes at least a portion of the liquid specimen sample through the filter and the filtrate-passage openings and into the waste liquid receptacle.

5. The sampling device according to claim 1, wherein the filter-collection receptacle is removably disposed at least partially within the internal plunger space.

6. The sampling device according to claim 5,
wherein the plunger head is shaped so as to define a plunger-head opening through the plunger head and into the internal plunger space,
wherein the filter-collection receptacle is shaped so as to define a receptacle opening and a shaft-passage hole at an end of the filter-collection receptacle opposite the receptacle opening,
wherein the sampling device is configured such that the filter is advanceable into the filter-collection receptacle via the plunger-head opening and the receptacle opening while the filter-collection receptacle is disengageably coupled to the filtration assembly,
wherein the sampling device comprises a filter-withdrawal shaft, which (a) is disposed partially within the filter-collection receptacle within the internal plunger space, (b) includes a proximal portion that is slidably disposed passing through the shaft-passage hole, and (c) includes a distal portion that is directly or indirectly coupled to the filter, and
wherein the sampling device is configured such that proximal withdrawal of the filter-withdrawal shaft, while the plunger head is within the tubular container, pulls the filter into the filter-collection receptacle via the plunger-head opening and the receptacle opening.

7. The sampling device according to claim 1, wherein the sampling device is configured such that the filter is advanceable into the filter-collection receptacle without any proximal withdrawal of the plunger head within the tubular container.

8. A sampling device for concentrating a liquid specimen sample, the sampling device comprising:
(a) a filtration assembly, which comprises:
(i) a tubular container, which is shaped so as to define an inner wall and a proximal container opening for receiving the liquid specimen sample;
(ii) a plunger, which (A) comprises a plunger head, and (B) is insertable into the tubular container via the proximal container opening, such that a lateral surface of the plunger head forms a fluid-tight movable seal with the inner wall; and
(iii) a filter; and
(b) a filter-collection receptacle, which is disengageably coupled to the filtration assembly,
wherein the filtration assembly is configured such that movement of the plunger head within the tubular container, when the liquid specimen sample is contained in the tubular container and the filter is disposed in the tubular container, pushes at least a portion of the liquid specimen sample through the filter,
wherein the sampling device is configured such that the filter is advanceable into the filter-collection receptacle while the filter-collection receptacle is disengageably coupled to the filtration assembly,
wherein the filter-collection receptacle is shaped so as to define a receptacle opening, and wherein the sampling device is configured such that the filter is advanceable into the filter-collection receptacle via the receptacle opening while the filter-collection receptacle is disengageably coupled to the filtration assembly,
wherein the sampling device further comprises a shaft, and
wherein the sampling device is configured such that that a distal portion of the shaft is axially movable through the receptacle opening so as to advance the filter into the filter-collection receptacle via the receptacle opening.

9. The sampling device according to claim 8, wherein the shaft is coupled to the plunger, and wherein the sampling device is configured such that the shaft remains axially stationary with respect to the plunger head during the movement of the plunger head within the tubular container.

10. The sampling device according to claim 1, wherein the sampling device is configured such that the filter-collection receptacle is decouplable from the filtration assembly without any proximal withdrawal of the plunger head within the tubular container.

11. The sampling device according to claim 1, wherein the sampling device is configured such that the filter-collection receptacle is decouplable from the filtration assembly by distal movement of the filter-collection receptacle with respect to the tubular container.

12. A testing kit comprising the sampling device according to claim 1, the testing kit further comprising a liquid selected from the group consisting of: a lysis buffer, saline solution, and transport medium, for bathing the filter.

13. A testing kit comprising the sampling device according to claim 1, the testing kit further comprising a lateral flow immunoassay test strip, which is configured to detect the presence of a biological particulate trapped by the filter.

14. The testing kit according to claim 13, further comprising reagents for use with the lateral flow immunoassay test strip.

15. The testing kit according to claim 13, wherein the biological particulate is selected from the group consisting of: a virus, a bacterium, a microorganism, a fungus, a spore, a mite, a biological cell, a biological antigen, a protein, a protein antigen, and a carbohydrate antigen.

16. The testing kit according to claim 12, wherein the filter-collection receptacle comprises an internal chamber, which contains the liquid and is configured to prevent spillage of the liquid out of the filter-collection receptacle regardless of an orientation of the filter-collection receptacle.

17. A sampling device for concentrating a liquid specimen sample, the sampling device comprising:
(a) a filtration assembly, which comprises:
(i) a tubular container, which is shaped so as to define an inner wall and a proximal container opening for receiving the liquid specimen sample;
(ii) a plunger, which (A) comprises a plunger head, and (B) is insertable into the tubular container via the proximal container opening, such that a lateral surface of the plunger head forms a fluid-tight movable seal with the inner wall; and
(iii) a filter; and
(b) a filter-collection receptacle, which is disengageably coupled to the filtration assembly,
wherein the filtration assembly is configured such that movement of the plunger head within the tubular container, when the liquid specimen sample is contained in the tubular container and the filter is disposed in the tubular container, pushes at least a portion of the liquid specimen sample through the filter,
wherein the sampling device is configured such that the filter is advanceable into the filter-collection receptacle while the filter-collection receptacle is disengageably coupled to the filtration assembly,
wherein the filter-collection receptacle is shaped so as to define a receptacle opening, and wherein the sampling device is configured such that the filter is advanceable into the filter-collection receptacle via the receptacle opening while the filter-collection receptacle is disengageably coupled to the filtration assembly, wherein the plunger head is shaped so as to define a plunger-head opening through the plunger head, wherein the filtration assembly comprises a filter support, which is disposed within the tubular container, and is shaped so as to define: (a) a proximal support surface, (b) a plurality of filtrate-passage openings through the filter support, and (c) a filter-support shaft-passage region, wherein the filter is disposed on the proximal support surface, wherein the filtration assembly comprises a shaft, wherein the filter-collection receptacle is positioned proximal to the plunger head such that the receptacle opening is in fluid communication with the plunger-head opening, and wherein the plunger head, the filter support, and the shaft are configured such that a proximal portion of the shaft is axially movable through the filter-support shaft-passage region, the plunger-head opening, and the receptacle opening.

18. A method for concentrating a liquid specimen sample, the method comprising:

placing the liquid specimen sample in a tubular container of a filtration assembly of a sampling device via a proximal container opening of the tubular container;

inserting a plunger head of a plunger of the filtration assembly into the tubular container via the proximal container opening of the tubular container, while a filter-collection receptacle is disengageably coupled to the filtration assembly, such that a lateral surface of the plunger head forms a fluid-tight movable seal with an inner wall of the tubular container, wherein the plunger further comprises a plunger rod, which (a) has a distal end portion to which the plunger head is coupled, and (b) is shaped so as to define an internal plunger space having a plunger-space proximal opening through a proximal end of the plunger rod;

distally advancing the plunger head within the tubular container to drive at least a portion of the liquid specimen sample through a filter of the filtration assembly;

advancing the filter into the filter-collection receptacle while the filter-collection receptacle is disengageably coupled to the filtration assembly; and thereafter, decoupling the filter-collection receptacle from the filtration assembly by removing the filter-collection receptacle from the filtration assembly via the plunger-space proximal opening while the plunger head is within the tubular container.

19. The method according to claim 18, wherein the filter is disposed within the tubular container before the liquid specimen sample is placed in the tubular container, and wherein placing the liquid specimen sample in the tubular container comprises placing the liquid specimen sample in the tubular container proximal to the filter that is disposed within the tubular container.

20. The method according to claim 18, wherein advancing the filter into the filter-collection receptacle comprises advancing the filter entirely into the filter-collection receptacle while the filter-collection receptacle is disengageably coupled to the filtration assembly.

21. The method according to claim 18, wherein the plunger rod is shaped so as to define therewithin a waste liquid receptacle, wherein the plunger head is shaped so as to define a filter support, which is shaped so as to define (a) a distal support surface, (b) a plurality of filtrate-passage openings through the filter support into the waste liquid receptacle, and (c) the plunger-head opening, wherein the filter is disposed on the distal support surface, and wherein distally advancing the plunger head within the tubular container pushes at least a portion of the liquid specimen sample through the filter and the filtrate-passage openings and into the waste liquid receptacle.

22. The method according to claim 18, wherein the filter-collection receptacle is removably disposed at least partially within the internal plunger space.

23. The method according to claim 22, wherein the plunger head is shaped so as to define a plunger-head opening through the plunger head and into the internal plunger space, wherein the filter-collection receptacle is shaped so as to define a receptacle opening and a shaft-passage hole at an end of the filter-collection receptacle opposite the receptacle opening, wherein advancing the filter into the filter-collection receptacle comprises advancing the filter into the filter-collection receptacle via the plunger-head opening and the receptacle opening while the filter-collection receptacle is disengageably coupled to the filtration assembly, wherein the sampling device comprises a filter-withdrawal shaft, which (a) is disposed partially within the filter-collection receptacle within the internal plunger space, (b) includes a proximal portion that is slidably disposed passing through the shaft-passage hole, and (c) includes a distal portion that is directly or indirectly coupled to the filter, and wherein advancing the filter into the filter-collection receptacle comprises proximally withdrawing the filter-withdrawal shaft, while the plunger head is within the tubular container, so as to pull the filter into the filter-collection receptacle via the plunger-head opening and the receptacle opening.

24. The method according to claim 18, wherein advancing the filter into the filter-collection receptacle comprises advancing the filter into the filter-collection receptacle while the plunger head is within the tubular container.

25. The method according to claim 24, wherein advancing the filter into the filter-collection receptacle comprises advancing the filter into the filter-collection receptacle without proximally withdrawing the plunger head within the tubular container.

26. The method according to claim 18, wherein the filter-collection receptacle is disengageably coupled to the tubular container of the filtration assembly.

27. A method for concentrating a liquid specimen sample, the method comprising:

placing the liquid specimen sample in a tubular container of a filtration assembly of a sampling device via a proximal container opening of the tubular container;

inserting a plunger head of a plunger of the filtration assembly into the tubular container via the proximal container opening of the tubular container, while a filter-collection receptacle is disengageably coupled to the filtration assembly, such that a lateral surface of the plunger head forms a fluid-tight movable seal with an inner wall of the tubular container;

distally advancing the plunger head within the tubular container to drive at least a portion of the liquid specimen sample through a filter of the filtration assembly;

advancing the filter into the filter-collection receptacle while the filter-collection receptacle is disengageably coupled to the filtration assembly; and thereafter, decoupling the filter-collection receptacle from the filtration assembly by removing the filter-collection receptacle from the filtration assembly via the plunger-space proximal opening while the plunger head is within the tubular container, wherein the sampling device further includes a shaft, and wherein advancing the filter into the filter-collection receptacle comprises axially moving a distal portion of the shaft through a receptacle opening of the filter-collection receptacle so as to advance the filter into the filter-collection receptacle via the receptacle opening.

28. The method according to claim 27, wherein the shaft is coupled to the plunger, and wherein distally advancing the plunger head within the tubular container comprises distally advancing the plunger head within the tubular container while the shaft remains axially stationary with respect to the plunger head.

29. The method according to claim 18, wherein decoupling the filter-collection receptacle from the filtration assembly comprises decoupling the filter-collection receptacle from the filtration assembly while the plunger head is within the tubular container.

30. The method according to claim 29, wherein decoupling the filter-collection receptacle from the filtration assembly comprises decoupling the filter-collection receptacle from the filtration assembly without proximally withdrawing the plunger head within the tubular container.

31. The method according to claim 18, wherein decoupling the filter-collection receptacle from the filtration assembly comprises distally moving the filter-collection receptacle with respect to the tubular container.

32. The method according to claim 18, further comprising bathing the filter with a liquid filter-collection receptacle after the filter has been advanced into the filter-collection receptacle.

33. The method according to claim 32, wherein the liquid is selected from the group consisting of: a lysis buffer, saline solution, and transport medium.

34. The method according to claim 32, wherein the filter-collection receptacle includes an internal chamber, which contains the liquid and is configured to prevent spillage of the liquid out of the filter-collection receptacle regardless of an orientation of the filter-collection receptacle.

35. The method according to claim 18, further comprising, after the filter has been advanced into the filter-collection receptacle, detecting the presence of a biological particulate trapped by the filter.

36. The method according to claim 35, wherein detecting the presence of the biological particulate trapped by the filter comprising using a lateral flow immunoassay test strip to detect the presence of the biological particulate trapped by the filter.

37. The method according to claim 35, wherein the biological particulate is selected from the group consisting of: a virus, a bacterium, a microorganism, a fungus, a spore, a mite, a biological cell, a biological antigen, a protein, a protein antigen, and a carbohydrate antigen.

38. The method according to claim 18, wherein the sampling device is configured to bunch up at least a portion of the filter during advancing of the filter into the filter-collection receptacle while the filter-collection receptacle is disengageably coupled to the filtration assembly.

39. The method according to claim 38, wherein the sampling device is configured to bunch up the at least a portion of the filter into a flower-like arrangement during the advancing of the filter into the filter-collection receptacle while the filter-collection receptacle is disengageably coupled to the filtration assembly.

40. The sampling device according to claim 1, wherein the sampling device is configured to bunch up at least a portion of the filter during advancing of the filter into the filter-collection receptacle while the filter-collection receptacle is disengageably coupled to the filtration assembly.

41. The sampling device according to claim 40, wherein the sampling device is configured to bunch up at least a portion of the filter into a flower-like arrangement during the advancing of the filter into the filter-collection receptacle while the filter-collection receptacle is disengageably coupled to the filtration assembly.

* * * * *